(12) United States Patent
Novick et al.

(10) Patent No.: US 12,380,455 B2
(45) Date of Patent: **\*Aug. 5, 2025**

(54) METHOD, DEVICE, AND SYSTEM OF DETECTING MULE ACCOUNTS AND ACCOUNTS USED FOR MONEY LAUNDERING

(71) Applicant: BIOCATCH LTD., Tel Aviv (IL)

(72) Inventors: Itai Novick, Rehovot (IL); Avi Turgeman, New York, NY (US)

(73) Assignee: BIOCATCH LTD., Tel Aviv (IL)

( * ) Notice: Subject to any disclaimer, the term of this patent is extended or adjusted under 35 U.S.C. 154(b) by 215 days.

This patent is subject to a terminal disclaimer.

(21) Appl. No.: 18/218,026

(22) Filed: Jul. 4, 2023

(65) Prior Publication Data

US 2024/0013225 A1    Jan. 11, 2024

Related U.S. Application Data

(63) Continuation of application No. 18/099,945, filed on Jan. 22, 2023, now Pat. No. 11,741,476, which is a continuation of application No. 17/549,931, filed on Dec. 14, 2021, now Pat. No. 11,580,553, which is a continuation-in-part of application No. 16/872,381, filed on May 12, 2020, now Pat. No. 11,210,674, which is a continuation of application No. 16/242,015, filed on Jan. 8, 2019, now Pat. No. 10,685,355, and a continuation-in-part of application No. 16/057,825, filed on Aug. 8, 2018, now Pat. No.
(Continued)

(51) Int. Cl.
*G06Q 20/40* (2012.01)
*G06Q 20/10* (2012.01)

(52) U.S. Cl.
CPC ......... *G06Q 20/4016* (2013.01); *G06Q 20/10* (2013.01)

(58) Field of Classification Search
CPC .......................... G06Q 20/4016; G06Q 20/10
See application file for complete search history.

(56) References Cited

U.S. PATENT DOCUMENTS

| | | | |
|---|---|---|---|
| 7,158,118 B2 * | 1/2007 | Liberty | G06F 3/0383 |
| 8,170,953 B1 * | 5/2012 | Tullis | G06Q 20/085 |
| | | | 705/77 |

(Continued)

*Primary Examiner* — Gary S Gracia
(74) *Attorney, Agent, or Firm* — AlphaPatent Associates Ltd.; Daniel J. Swirsky

(57) ABSTRACT

Method, device, and system of detecting a mule bank account, or a bank account used for terror funding or money laundering. A method includes: monitoring interactions of a user with a computing device during online access with a bank account; and based on the monitoring, determining that the bank account is utilized as a mule bank account to illegally receive and transfer money, or is used for money laundering or terror funding. The method takes into account one or more indicators, such as, utilization of a remote access channel, utilization of a virtual machine or a proxy server, unique behavior across multiple different accounts, temporal correlation among operations, detection of a set of operations that follow a pre-defined mule account playbook, detection of multiple incoming fund transfers from multiple countries that are followed by a single outgoing fund transfer to a different country, and other indicators.

19 Claims, 1 Drawing Sheet

Related U.S. Application Data 10,523,680, which is a continuation of application No. 15/203,817, filed on Jul. 7, 2016, now Pat. No. 10,069,837, said application No. 16/242,015 is a continuation-in-part of application No. 15/885,819, filed on Feb. 1, 2018, now Pat. No. 10,834,590, which is a continuation-in-part of application No. 14/675,764, filed on Apr. 1, 2015, now abandoned, which is a continuation-in-part of application No. 14/566,723, filed on Dec. 11, 2014, now Pat. No. 9,071,969, which is a continuation-in-part of application No. 13/922,271, filed on Jun. 20, 2013, now Pat. No. 8,938,787, which is a continuation-in-part of application No. 13/877,676, filed as application No. PCT/IL2011/000907 on Nov. 29, 2011, now Pat. No. 9,069,942, said application No. 14/675,764 is a continuation-in-part of application No. 14/320,653, filed on Jul. 1, 2014, now Pat. No. 9,275,337, and a continuation-in-part of application No. 14/320,656, filed on Jul. 1, 2014, now Pat. No. 9,665,703, and a continuation-in-part of application No. 14/325,393, filed on Jul. 8, 2014, now Pat. No. 9,531,733, and a continuation-in-part of application No. 14/325,394, filed on Jul. 8, 2014, now Pat. No. 9,547,766, and a continuation-in-part of application No. 14/325,395, filed on Jul. 8, 2014, now Pat. No. 9,621,567, and a continuation-in-part of application No. 14/325,396, filed on Jul. 8, 2014, now abandoned, and a continuation-in-part of application No. 14/325,397, filed on Jul. 8, 2014, now Pat. No. 9,450,971, and a continuation-in-part of application No. 14/325,398, filed on Jul. 8, 2014, now Pat. No. 9,477,826, said application No. 16/242,015 is a continuation-in-part of application No. 15/368,608, filed on Dec. 4, 2016, now Pat. No. 10,949,757, which is a continuation-in-part of application No. 15/001,259, filed on Jan. 20, 2016, now Pat. No. 9,541,995, which is a continuation of application No. 14/320,653, filed on Jul. 1, 2014, now Pat. No. 9,275,337, which is a continuation-in-part of application No. 13/922,271, filed on Jun. 20, 2013, now Pat. No. 8,938,787, and a continuation-in-part of application No. 13/877,676, filed as application No. PCT/IL2011/000907 on Nov. 29, 2011, now Pat. No. 9,069,942, said application No. 15/368,608 is a continuation-in-part of application No. 14/727,873, filed on Jun. 2, 2015, now Pat. No. 9,526,006, and a continuation-in-part of application No. 15/360,291, filed on Nov. 23, 2016, now Pat. No. 9,747,436, which is a continuation-in-part of application No. 14/718,096, filed on May 21, 2015, now Pat. No. 9,531,701, which is a continuation-in-part of application No. 14/675,768, filed on Apr. 1, 2015, now Pat. No. 9,418,221, which is a continuation-in-part of application No. 14/566,723, filed on Dec. 11, 2014, now Pat. No. 9,071,969.

(60) Provisional application No. 62/621,600, filed on Jan. 25, 2018, provisional application No. 62/190,264, filed on Jul. 9, 2015, provisional application No. 61/973,855, filed on Apr. 2, 2014, provisional application No. 61/417,479, filed on Nov. 29, 2010, provisional application No. 61/843,915, filed on Jul. 9, 2013.

(56) References Cited

U.S. PATENT DOCUMENTS

| | | | | |
|---|---|---|---|---|
| 8,285,658 | B1* | 10/2012 | Kellas-Dicks | G06F 21/316 |
| | | | | 706/45 |
| 9,203,860 | B1* | 12/2015 | Casillas | H04L 63/1441 |
| 10,037,421 | B2* | 7/2018 | Turgeman | G07C 9/33 |
| 10,049,209 | B2* | 8/2018 | Turgeman | G06F 3/041 |
| 10,055,560 | B2* | 8/2018 | Turgeman | G06F 21/316 |
| 10,069,837 | B2* | 9/2018 | Turgeman | H04L 61/4511 |
| 10,069,852 | B2* | 9/2018 | Turgeman | G06F 21/121 |
| 10,079,853 | B2* | 9/2018 | Turgeman | H04L 67/535 |
| 10,083,439 | B2* | 9/2018 | Turgeman | G06Q 20/308 |
| 10,164,985 | B2* | 12/2018 | Turgeman | H04L 63/1408 |
| 2001/0004733 | A1* | 6/2001 | Eldering | G06Q 30/0268 |
| | | | | 725/35 |
| 2002/0023229 | A1* | 2/2002 | Hangai | G06F 21/32 |
| | | | | 726/21 |
| 2002/0089412 | A1* | 7/2002 | Heger | G06F 21/32 |
| | | | | 340/5.82 |
| 2003/0074201 | A1* | 4/2003 | Grashey | G10L 17/22 |
| | | | | 704/E17.015 |
| 2004/0017355 | A1* | 1/2004 | Shim | G06F 3/0338 |
| | | | | 345/157 |
| 2004/0021643 | A1* | 2/2004 | Hoshino | G06F 3/03547 |
| | | | | 345/173 |
| 2004/0128240 | A1* | 7/2004 | Yusin | G07F 7/08 |
| | | | | 705/42 |
| 2005/0289264 | A1* | 12/2005 | Illowsky | H04L 65/1094 |
| | | | | 710/72 |
| 2006/0006803 | A1* | 1/2006 | Huang | H01J 61/0672 |
| | | | | 313/607 |
| 2006/0123101 | A1* | 6/2006 | Buccella | G06F 21/552 |
| | | | | 709/223 |
| 2008/0059474 | A1* | 3/2008 | Lim | H04L 63/1425 |
| | | | | 707/E17.106 |
| 2008/0098456 | A1* | 4/2008 | Alward | G06F 21/316 |
| | | | | 726/1 |
| 2008/0192005 | A1* | 8/2008 | Elgoyhen | G06F 3/017 |
| | | | | 345/158 |
| 2009/0157792 | A1* | 6/2009 | Fiatal | H04L 63/08 |
| | | | | 709/201 |
| 2009/0172551 | A1* | 7/2009 | Kane | G06Q 30/02 |
| | | | | 715/733 |
| 2009/0189736 | A1* | 7/2009 | Hayashi | G06F 21/32 |
| | | | | 340/5.81 |
| 2009/0199296 | A1* | 8/2009 | Xie | G06F 21/316 |
| | | | | 726/23 |
| 2009/0241188 | A1* | 9/2009 | Komura | H04L 63/1416 |
| | | | | 726/22 |
| 2009/0300589 | A1* | 12/2009 | Watters | G06Q 40/00 |
| | | | | 717/140 |
| 2010/0042403 | A1* | 2/2010 | Chandrasekar | G06Q 30/02 |
| | | | | 704/9 |
| 2010/0161487 | A1* | 6/2010 | Patel | G06Q 20/108 |
| | | | | 705/43 |
| 2010/0171753 | A1* | 7/2010 | Kwon | G06F 3/04886 |
| | | | | 345/173 |
| 2010/0281539 | A1* | 11/2010 | Burns | H04L 63/1441 |
| | | | | 726/13 |
| 2011/0012829 | A1* | 1/2011 | Yao | G06F 3/045 |
| | | | | 345/157 |
| 2011/0055077 | A1* | 3/2011 | French | G06Q 20/3255 |
| | | | | 705/39 |
| 2011/0071933 | A1* | 3/2011 | Daly | G06Q 40/00 |
| | | | | 705/35 |
| 2011/0159850 | A1* | 6/2011 | Faith | G06Q 30/0207 |
| | | | | 455/411 |
| 2011/0162076 | A1* | 6/2011 | Song | G06F 21/86 |
| | | | | 709/217 |
| 2011/0225644 | A1* | 9/2011 | Pullikottil | H04L 63/1425 |
| | | | | 726/11 |
| 2011/0271342 | A1* | 11/2011 | Chung | H04L 63/145 |
| | | | | 726/23 |

(56) References Cited

U.S. PATENT DOCUMENTS

| | | | |
|---|---|---|---|
| 2012/0123932 A1* | 5/2012 | LeCuyer | G06Q 20/26 705/39 |
| 2012/0154273 A1* | 6/2012 | McDade, Sr. | G06F 3/041 345/157 |
| 2012/0204257 A1* | 8/2012 | O'Connell | G06F 21/316 726/19 |
| 2012/0239557 A1* | 9/2012 | Weinflash | G06Q 40/02 705/39 |
| 2012/0297476 A1* | 11/2012 | Zeljkovic | H04L 63/145 726/22 |
| 2013/0018796 A1* | 1/2013 | Kolhatkar | G06Q 20/405 705/44 |
| 2013/0024300 A1* | 1/2013 | Choudhuri | G06Q 30/018 705/16 |
| 2013/0036416 A1* | 2/2013 | Raju | G06F 9/45558 718/1 |
| 2013/0097682 A1* | 4/2013 | Zeljkovic | H04L 9/3234 726/7 |
| 2013/0097706 A1* | 4/2013 | Titonis | G06F 21/566 726/22 |
| 2013/0111586 A1* | 5/2013 | Jackson | G06F 21/316 726/23 |
| 2013/0239206 A1* | 9/2013 | Draluk | H04L 63/083 726/19 |
| 2013/0305357 A1* | 11/2013 | Ayyagari | H04L 41/069 726/22 |
| 2013/0312097 A1* | 11/2013 | Turnbull | H04L 63/1425 726/24 |
| 2013/0346309 A1* | 12/2013 | Giori | G06Q 20/0655 705/43 |
| 2014/0033317 A1* | 1/2014 | Barber | G06Q 30/0609 709/224 |
| 2014/0078061 A1* | 3/2014 | Simons | G06F 3/03543 345/163 |
| 2014/0114843 A1* | 4/2014 | Klein | G06F 21/566 705/39 |
| 2014/0244499 A1* | 8/2014 | Gruner | G06Q 20/4014 705/42 |
| 2014/0317734 A1* | 10/2014 | Valencia | G06F 21/552 726/22 |
| 2014/0324677 A1* | 10/2014 | Walraven | G06Q 20/4016 705/39 |
| 2015/0026027 A1* | 1/2015 | Priess | G06Q 10/04 705/35 |
| 2015/0081549 A1* | 3/2015 | Kimberg | G06Q 20/4016 705/44 |
| 2015/0279155 A1* | 10/2015 | Chun | G06Q 20/4016 463/25 |
| 2015/0348038 A1* | 12/2015 | Femrite | G06Q 20/4014 705/44 |
| 2016/0034673 A1* | 2/2016 | Chandra | H04L 63/0861 726/7 |
| 2016/0044025 A1* | 2/2016 | Goyal | G06F 21/36 726/6 |
| 2016/0048937 A1* | 2/2016 | Mathura | G06Q 40/12 705/30 |
| 2016/0155126 A1* | 6/2016 | D'Uva | G06Q 20/4016 705/44 |
| 2016/0196414 A1* | 7/2016 | Stuntebeck | G01P 15/0802 726/17 |
| 2016/0267447 A1* | 9/2016 | Davis | G06Q 20/10 |

* cited by examiner

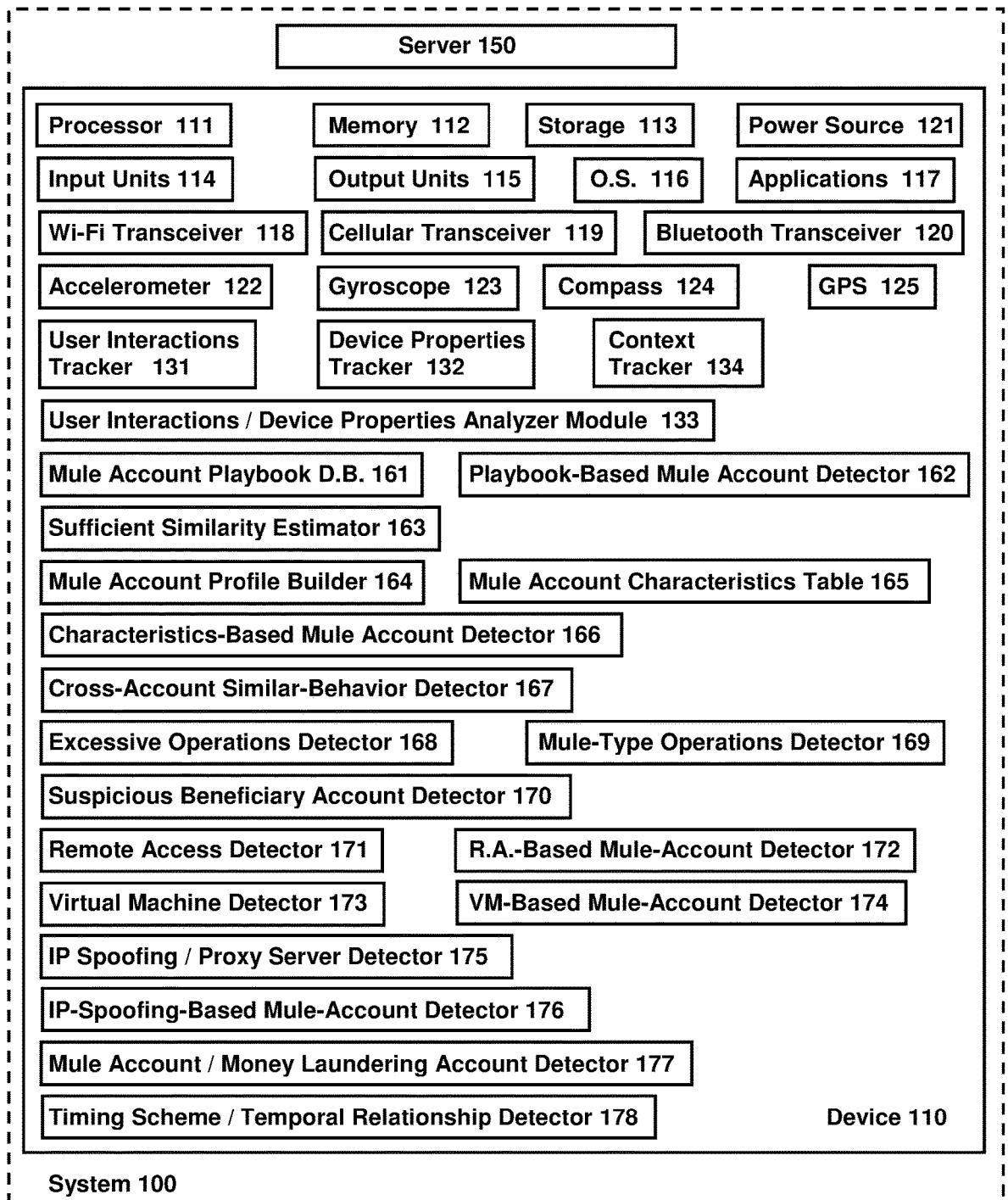

METHOD, DEVICE, AND SYSTEM OF DETECTING MULE ACCOUNTS AND ACCOUNTS USED FOR MONEY LAUNDERING

CROSS-REFERENCE TO RELATED APPLICATIONS

This patent application is a Continuation of U.S. Ser. No. 18/099,945, filed on Jan. 22, 2023, which is hereby incorporated by reference in its entirety.

The above-mentioned U.S. Ser. No. 18/099,945 is a Continuation of U.S. Ser. No. 17/549,931, filed on Dec. 14, 2021, now U.S. Pat. No. 11,580,553 (issued on Feb. 14, 2023), which is hereby incorporated by reference in its entirety.

The above-mentioned U.S. Ser. No. 17/549,931 is a Continuation of U.S. Ser. No. 16/872,381, filed on May 12, 2020, now U.S. Pat. No. 11,210,674 (issued on Dec. 28, 2021), which is hereby incorporated by reference in its entirety.

The above-mentioned U.S. Ser. No. 16/872,381 is a Continuation of U.S. Ser. No. 16/242,015, filed on Jan. 8, 2019, now U.S. Pat. No. 10,685,355 (issued on Jun. 16, 2020), which is hereby incorporated by reference in its entirety.

The above-mentioned U.S. Ser. No. 16/242,015 claims benefit and priority from U.S. 62/621,600, filed on Jan. 25, 2018, which is hereby incorporated by reference in its entirety.

The above-mentioned U.S. Ser. No. 16/242,015 is a Continuation-in-Part (CIP) of U.S. Ser. No. 16/057,825, filed on Aug. 8, 2018, now U.S. Pat. No. 10,523,680 (issued on Dec. 31, 2019), which is hereby incorporated by reference in its entirety; which is a Continuation of U.S. Ser. No. 15/203,817, filed on Jul. 7, 2016, now U.S. Pat. No. 10,069,837 (issued on Sep. 4, 2018), which is hereby incorporated by reference in its entirety; which claims priority and benefit from U.S. 62/190,264, filed on Jul. 9, 2015, which is hereby incorporated by reference in its entirety.

The above-mentioned U.S. Ser. No. 16/242,015 is also a Continuation-in-Part (CIP) of US filed on Feb. 1, 2018, now U.S. Pat. No. 10,834,590 (issued on November 2020), which is hereby incorporated by reference in its entirety.

The above-mentioned U.S. Ser. No. 15/885,819 is a Continuation-in-Part (CIP) of U.S. Ser. No. 14/675,764, filed on Apr. 1, 2015, now abandoned, which is hereby incorporated by reference in its entirety.

The above-mentioned U.S. Ser. No. 14/675,764 claims priority and benefit from U.S. 61/973,855, filed on Apr. 2, 2014, which is hereby incorporated by reference in its entirety.

The above-mentioned U.S. Ser. No. 14/675,764 is a Continuation-in-Part (CIP) of U.S. Ser. No. 14/566,723, filed on Dec. 11, 2014, now U.S. Pat. No. 9,071,969 (issued on Jun. 30, 2015); which is a Continuation of U.S. Ser. No. 13/922,271, filed on Jun. 20, 2013, now U.S. Pat. No. 8,938,787 (issued on Jan. 20, 2015); which is a Continuation-in-Part (CIP) of U.S. Ser. No. 13/877,676, filed on Apr. 4, 2013, now U.S. Pat. No. 9,069,942 (issued on Jun. 30, 2015); which is a National Stage of PCT International Application number PCT/IL2011/000907, having an International Filing Date of Nov. 29, 2011; which claims priority and benefit from U.S. 61/417,479, filed on Nov. 29, 2010; all of which are hereby incorporated by reference in their entirety.

The above-mentioned U.S. Ser. No. 14/675,764 is a Continuation-in-Part (CIP) of U.S. Ser. No. 14/320,653, filed on Jul. 1, 2014, now U.S. Pat. No. 9,275,337 (issued on Mar. 1, 2016); which claims priority and benefit from U.S. 61/843,915, filed on Jul. 9, 2013; all of which are hereby incorporated by reference in their entirety.

The above-mentioned U.S. Ser. No. 14/675,764 is a Continuation-in-Part (CIP) of U.S. Ser. No. 14/320,656, filed on Jul. 1, 2014, now U.S. Pat. No. 9,665,703 (issued on May 30, 2017); which claims priority and benefit from U.S. 61/843,915, filed on Jul. 9, 2013; all of which are hereby incorporated by reference in their entirety.

The above-mentioned U.S. Ser. No. 14/675,764 is a Continuation-in-Part (CIP) of U.S. Ser. No. 14/325,393, filed on Jul. 8, 2014, now U.S. Pat. No. 9,531,733 (issued on Dec. 27, 2016); which claims priority and benefit from U.S. 61/843,915, filed on Jul. 9, 2013; all of which are hereby incorporated by reference in their entirety.

The above-mentioned U.S. Ser. No. 14/675,764 is a Continuation-in-Part (CIP) of U.S. Ser. No. 14/325,394, filed on Jul. 8, 2014, now U.S. Pat. No. 9,547,766 (issued on Jan. 17, 2017); which claims priority and benefit from U.S. 61/843,915, filed on Jul. 9, 2013; all of which are hereby incorporated by reference in their entirety.

The above-mentioned U.S. Ser. No. 14/675,764 is a Continuation-in-Part (CIP) of U.S. Ser. No. 14/325,395, filed on Jul. 8, 2014, now U.S. Pat. No. 9,621,567 (issued on Apr. 11, 2017); which claims priority and benefit from U.S. 61/843,915, filed on Jul. 9, 2013; all of which are hereby incorporated by reference in their entirety.

The above-mentioned U.S. Ser. No. 14/675,764 is a Continuation-in-Part (CIP) of U.S. Ser. No. 14/325,396, filed on Jul. 8, 2014, now abandoned; which claims priority and benefit from U.S. 61/843,915, filed on Jul. 9, 2013; all of which are hereby incorporated by reference in their entirety.

The above-mentioned U.S. Ser. No. 14/675,764 is a Continuation-in-Part (CIP) of U.S. Ser. No. 14/325,397, filed on Jul. 8, 2014, now U.S. Pat. No. 9,450,971 (issued on Sep. 20, 2016); which claims priority and benefit from U.S. 61/843,915, filed on Jul. 9, 2013; all of which are hereby incorporated by reference in their entirety.

The above-mentioned U.S. Ser. No. 14/675,764 is a Continuation-in-Part (CIP) of U.S. Ser. No. 14/325,398, filed on Jul. 8, 2014, now U.S. Pat. No. 9,477,826 (issued on Oct. 25, 2016); which claims priority and benefit from U.S. 61/843,915, filed on Jul. 9, 2013; all of which are hereby incorporated by reference in their entirety.

The above-mentioned U.S. Ser. No. 16/242,015 is also a Continuation-in-Part (CIP) of US filed on Dec. 4, 2016, now U.S. Pat. No. 10,949,757 (issued on Mar. 16, 2021), which is hereby incorporated by reference in its entirety.

The above-mentioned U.S. Ser. No. 15/368,608 is a Continuation-in-Part (CIP) of U.S. Ser. No. 15/001,259, filed on Jan. 20, 2016, now U.S. Pat. No. 9,541,995 (issued on Jan. 10, 2017); which is a Continuation of U.S. Ser. No. 14/320,653, filed on Jul. 1, 2014, now U.S. Pat. No. 9,275,337 (issued on Mar. 1, 2016); all of which are hereby incorporated by reference in their entirety.

The above-mentioned U.S. Ser. No. 14/320,653 claims priority and benefit from U.S. 61/843,915, filed on Jul. 9, 2013, which is hereby incorporated by reference in its entirety.

The above-mentioned U.S. Ser. No. 14/320,653 is also a Continuation-in-Part (CIP) of U.S. Ser. No. 13/922,271, filed on Jun. 20, 2013, now U.S. Pat. No. 8,938,787 (issued on Jan. 20, 2015), which is hereby incorporated by reference in its entirety.

The above-mentioned U.S. Ser. No. 14/320,653 is also a Continuation-in-Part (CIP) of U.S. Ser. No. 13/877,676, filed on Apr. 4, 2013, now U.S. Pat. No. 9,069,942 (issued on Jun. 30, 2015); which is a National Stage of PCT International Application number PCT/IL2011/000907, filed on Nov. 29, 2011; which claims priority and benefit from U.S. 61/417,479, filed on Nov. 29, 2010; and all of the above-mentioned patent applications are hereby incorporated by reference in their entirety.

The above-mentioned Ser. No. 15/368,608 is also a Continuation-in-Part (CIP) of U.S. Ser. No. 14/727,873, filed on Jun. 2, 2015, now U.S. Pat. No. 9,526,006 (issued on Dec. 20, 2016), which is hereby incorporated by reference in its entirety.

The above-mentioned Ser. No. 15/368,608 is also a Continuation-in-Part (CIP) of U.S. Ser. No. 15/360,291, filed on Nov. 23, 2016, now U.S. Pat. No. 9,747,436 (issued on Aug. 29, 2017); which is a Continuation-in-Part (CIP) of U.S. Ser. No. 14/718,096, filed on May 21, 2015, now U.S. Pat. No. 9,531,701 (issued on Dec. 27, 2016); which is a Continuation-in-Part (CIP) of U.S. Ser. No. 14/675,768, filed on Apr. 1, 2015, now U.S. Pat. No. 9,418,221 (issued on Aug. 16, 2016); which is a Continuation-in-Part of the above-mentioned U.S. Ser. No. 14/566,723, filed on Dec. 11, 2014, now U.S. Pat. No. 9,071,969 (issued on Jun. 30, 2015); all of which are hereby incorporated by reference in their entirety.

FIELD

The present invention is related to the security of electronic devices and systems.

BACKGROUND

Millions of people utilize mobile and non-mobile electronic devices, such as smartphones, tablets, laptop computers and desktop computers, in order to perform various activities. Such activities may include, for example, browsing the Internet, sending and receiving electronic mail (email) messages, taking photographs and videos, engaging in a video conference or a chat session, playing games, or the like.

Some activities may be privileged, or may require authentication of the user in order to ensure that only the authorized user engages in the activity. For example, a user may be required to correctly enter his username and his password in order to access his email account, or in order to access his online banking interface or website.

SUMMARY

The present invention may include, for example, systems, devices, and methods for detecting the identity of a user of an electronic device or system; for determining whether or not an electronic device or system is being used by a fraudulent user (or an attacker) or by a legitimate user; for determining whether or not an electronic device or system is being utilized for an illegal activity or illegitimate activity or fraudulent activity, or for money laundering purposes (e.g., through or via a "mule" bank account) or for tax evasion purposes or for terror funding purposes, or for funding of terrorist activity or for funding of illegal activity or criminal activity; for differentiating among users of a computerized service or among users of an electronic device; and/or for detecting that a user of an electronic device or electronic system is currently performing, or has recently or previously performed, online interactions that indicate that a fraudulent activity or money laundering activity is attempted or is being performed or has been performed. The present invention may provide other and/or additional benefits or advantages.

BRIEF DESCRIPTION OF THE DRAWINGS

FIG. 1 is a schematic block-diagram illustration of a system, in accordance with some demonstrative embodiments of the present invention.

DETAILED DESCRIPTION OF SOME EMBODIMENTS OF THE PRESENT INVENTION

The Applicants have realized that some cyber-attackers or criminals, or persons that are involved in online theft or money laundering or tax evasion, may utilize a "mule bank account" or a "money-in, money-out" bank account as a temporary tool for illegally or fraudulently channeling money.

For example, user Adam has a bank account at First-Bank. His log-in credentials (username, password) are stolen by cyber-attacker Mallory, who then logs-in to the bank account of Adam using the stolen credentials. Attacker Mallory poses as the user Adam, and performs a wire transfer from Adam's bank account into an external bank account, owned formally by user Bob, either at the same institution (First-Bank) or at another institution (Second-Bank). Attacker Mallory then logs-out from the bank account of the victim (user Adam). Later, such as a few hours later or a few days later, once the wire transfer was indeed performed, attacker Mallory logs-in to the recipient bank account, namely to Bob's bank account; which is actually controlled and/or owned by attacker Mallory or by someone else on her behalf; and attacker Mallory performs an online wire transfer from the Bob bank account, towards another bank account that is owned by Carl and is controlled or owned by attacker Mallory (or, in another scenario, directly towards a retailer bank account from which Mallory purchases goods or services for her benefit).

In this scenario, the bank account owned by user Adam is the victim's bank account; the bank account that is formally owned by Bob is the "mule" bank account, and is the immediate or direct recipients of the funds from the victim's bank account; and the bank account that is formally owned by Carl is the "real destination" bank account", from which the attacker Mallory can withdraw the stolen funds or otherwise use the stolen funds. The "mule" bank account of Bob is utilized, directly or indirectly, by the attacker Mallory as an intermediate bank account, to channel the funds through it from the victim's account to the real destination. Utilization of a "mule" bank account may be done for various purposes; for example, to make it more difficult for the bank(s) and/or for law enforcement to track or trace the exact passage of stolen money. Additionally or alternatively, it may facilitate the theft due to geographic considerations or due to banking-related considerations; for example, both the Victim bank account and the Mule bank account are at the same banking institution, and thus the transfer from the Victim account to the Mule account is completed faster and/or is approved faster and/or requires a reduced security level, whereas the Real Destination bank account is at a different banking institution and/or in a foreign country (and thus transfers to it may take more time to complete, and/or may require an increased level of security).

The Applicants have realized that a computerized system may be built and trained to identify signals or signs that indicate that a particular bank account, such as Bob's bank account in the above example, are a "mule" bank account; and to generate a fraud alert signal, and/or to trigger increased scrutiny of such account, and/or to trigger increased scrutiny of transaction(s) in such account, and/or to block or put a "hold" on a transaction into or from such account, and/or to require the account owner (Bob) to contact customer service telephonically or physically as additional security measure(s).

Reference is made to FIG. 1, which is a schematic block-diagram illustration of a system 100, in accordance with some demonstrative embodiments of the present invention. System 100 may comprise, for example, an end-user device 110 able to communicate with a server 150 of a computerized service.

As non-limiting examples, end-user device 110 may be a laptop computer, a desktop computer, a smartphone, a tablet, a smart-watch, or other electronic device and/or portable device and/or non-portable device.

End-user device 110 may comprise, for example, a processor 111 to execute code or programs or instructions; a memory unit 112 to temporarily store data (e.g., RAM, Flash memory); a storage unit 113 to store data long-term (e.g., Hard Disk Drive (HDD), Solid State Drive (SSD), Flash memory); one or more input units 114 (e.g., touch-screen, physical keyboard, physical keypad, on-screen keyboard, on-screen keypad, computer mouse, trackball, joystick, touch-pad, stylus, pointing device, acoustic microphone); one or more output units 115 (e.g., screen, touch-screen, multi-touch screen, display unit, audio speakers); an Operating System (OS) 116; one or more applications 117; a Wi-Fi transceiver 118; optionally, a cellular transceiver 119; optionally, a Bluetooth transceiver 120; a power source 121 (e.g., internal battery, external battery, rechargeable battery, connection to an electric power outlet or socket); one or more accelerometers 122; one or more gyroscopes 123; one or more compass units 124; a Global Positioning System (GPS) unit 125; one or more other sensors, such as location-based sensors, location-detecting sensors, spatial orientation sensors or detectors, device slanting sensors or detectors, or the like; or and/or other suitable units or modules.

As non-limiting examples, server 150 may be a web-server or an application-server of a banking system, a brokerage system, a system that provides loans or mortgages or credit or other financial services, a retailer or e-commerce seller, a dating or match-making website, a social network, or the like.

Server 150 may be implemented by using similar components to those of end-user device 110, for example, processor, storage unit, input unit, output unit, transceivers, and so forth.

A user interactions tracker 131 may monitor and/or track all the user interactions and/or gestures that are performed by the user via one or more input-unit(s) of the end-user device. It may be implemented as a client-side (end-user side) module or unit, and/or as a server-side module or unit. For example, it may be implemented as or using JavaScript code and/or CSS code and/or HTML5 code, which may be included in or embedded in or called from one or more HTML page(s) that are served by server 150 to a Web-browser of end-user device 110; or, it may be implemented as integral part of, or as an extension or add-on or plug-in to, a web-browser running on end-user device 110; or, it may be implemented as part of the native code or the native programming language of an application or "app" that runs on end-user device 110 (e.g., implemented as integral or internal part of the native program code of a banking "app" or mobile application).

The tracked user-interactions data and/or the tracked input-unit(s) interactions data, may be logged or stored locally within device 110, and/or remotely in server 150; in conjunction with time/date stamps, and optionally in conjunction with contextual data indicating in which context they were measured or sensed or monitored (e.g., movement of the on-screen pointer 75 pixels sideways via the mouse-unit was monitored at a particular time/date stamp, and contextually in the web-page or form of "Perform a Wire Transfer", and more particularly in the context of moving the on-screen pointer from the field of "First Name of Beneficiary" to the field of "Last Name of Beneficiary").

A device properties tracker 132 may monitor and/or track particular features and/or properties of the end-user device 110, and/or of a particular unit of device 110; for example, readings or measurements or data sensed by accelerometer(s) 122, by gyroscope(s) 123, by compass unit(s) 124, by GPS unit 125, by device spatial-orientation sensor(s), and/or by other sensors of device 110.

The tracked device properties may be logged or stored locally within device 110, and/or remotely in server 150; in conjunction with time/date stamps, and optionally in conjunction with contextual data as detected and tracked by a Context Tracker 134 which indicate in which context they were measured or sensed or monitored (e.g., spatial rotation of the entire device 110 by 45 degrees towards the ground was monitored at a particular time/date stamp, and contextually while the user was viewing the web-page of "apply for a new credit card", and more particularly while the user was scrolling-down through a list of options in a drop-down list of answers to the question "What is your age range").

The monitored user-interactions data, and/or the monitored device properties data, may be analyzed by a User Interactions/Device Properties Analyzer Module 133; which may be implemented locally within device 110 and/or remotely in server 150; and which may perform or execute one or more of the methods described herein.

In a first set of embodiments, the input-unit interactions and/or the device properties, that are monitored and logged in a particular bank account (of user Bob from the above example), are analyzed by the User Interactions/Device Properties Analyzer Module 133 in view of a pre-defined pattern or playbook that is pre-defined in the system as indicative to the bank account being a Mule (or fraudulent, or money laundering) bank account. For example, a Mule Account Playbook Database 161 may store digital representations of such playbooks, and the actual user interactions/device properties that were monitored and logged in Bob's bank account may be compared or matched to each playbook in the Mule Account Playbook Database 161 by a Playbook-Based Mule Account Detector 162. If the actual user interactions/device properties that were monitored and logged in Bob's bank account, are identical or similar or sufficiently similar (e.g., beyond a pre-defined threshold level of similarity) to at least one pre-defined mule account playbook stored in the Mule Account Playbook Database 161, then the Playbook-Based Mule Account Detector 162 generates a notification that the monitored bank account (Bob's account) is estimated or is determined to be a mule bank account, and a fraud mitigation module is triggered to perform fraud mitigation operations.

Each "mule playbook" in the Mule Account Playbook Database 161 may comprise a set of one or more indicators. For example, a first "mule playbook" may store data indicating that the bank account is never used for ATM withdrawals, is never used for cash withdrawals at the bank teller, is never used for check writing, and is often or always or exclusively used for transferring-out money immediately via wire transfer after (or, within N days after) receiving money through a wire transfer.

A second "mule playbook" may store data indicating that the bank account is used exclusively to receive wire transfers from K or more bank accounts (e.g., of victims) in a first country (e.g., the United States) and to perform wire transfers of at least 90 percent of the available funds each time to one single bank account (e.g., the Real Destination bank account) in a second country (e.g., Russia) within N days of receiving each incoming wire transfer.

A third "mule playbook" may comprise one of the above two sets of data, plus an indication that the transactions for wiring-out the funds are performed by using keyboard in a manner that suggests or that indicates that the user is not used to type the personal details of the owner of the account (e.g., segmented typing or non-fluid typing of the login credentials, rather than fluid typing or fluid typing) and/or by using particular input-unit interactions that are pre-defined in the playbook (e.g., moving between fields using the TAB key and not using the mouse).

A fourth "mule playbook" may comprise one of the first or second sets of data, plus an indication that the user's operations within the monitored bank account follow a particular intra-website or intra-application pattern or sequence or order; for example, logging in to the bank account, then (within T1 seconds) checking the status of incoming wire transfers, then (within T2 seconds) checking the current available balance, then (within T3) seconds initiating a wire transfer of at least K percent of the available balance to a destination bank account that is located in a different country from the country of the monitored bank account; together with an indication that all the operations in the monitored account are always performed via a laptop computer and not by via a smartphone and not via a tablet (e.g., since most hackers or cyber-attackers utilize a laptop computer or a desktop computer to perform fraudulent operations, rather than smartphones or tablets that are often utilized by legitimate bank customers).

The Playbook-Based Mule Account Detector 162 may optionally utilize a Sufficient Similarity Estimator 163, to determine whether monitored interactions are sufficiently similar to those indicated in a particular Mule Playbook. For example, a set of monitored interactions or operations in a particular bank account, may match 90 percent, but not the entire 100 percent, of the data described in a particular Mule Playbook. The Sufficient Similarity Estimator 163 is configured to check this similarity level against a pre-defined threshold value of similarity, such as 85 percent; and since 90>85 the Sufficient Similarity Estimator 163 declares that there is sufficient similarity, and the Playbook-Based Mule Account Detector 162 generates a Mule Account notification.

Optionally, the threshold value, or range-of-values, that are utilized by the Sufficient Similarity Estimator 163, may be adjusted or modified or set, optionally dynamically by the system and/or autonomously by the system, in order to achieve a particular level of detections; for example, a threshold level of similarity of 70 percent, may yield results of 16 suspicious bank accounts out of 100 monitored bank accounts; the threshold level of similarity may be adjusted or modified from 70 percent to 82 percent, to thereby yield only 2 bank accounts out of the 100 monitored bank accounts, or in order to yield, generally or in average, up to K percent of monitored bank accounts that required additional scrutiny or that trigger a Mule Account notification.

In a second set of embodiments, a Mule Account Profile Builder unit 164 analyzes all the monitored and logged data for each bank account that is already known to be a mule bank account, and deduces or generates one or more parameters, conditions and/or formulas that enable the system to identify other bank accounts as Mule accounts. For example, a particular bank has one million bank accounts of one million customers. The fraud department of that bank had positively identified 50 particular accounts, as accounts that have been used as Mule bank accounts; for example, based on manual review of those accounts, based on police or law enforcement information that indicated bank accounts of criminals or of cyber-attackers, based on data from anti-money-laundering authorities, or the like. The fraud department manually flags those 50 particular bank accounts as Known mule bank accounts.

Then, the Mule Account Profile Builder unit 164 processes all the data that was monitored and logged for the utilization of each one of those 50 known mule accounts; for example, processing and analyzing the input-unit interactions, the mouse-gestures, the keyboard-utilization behavior, the spatial properties of the devices used, the sequence or order of operations performed, and/or other data or meta-data of each one of these Known mule accounts. The Mule Account Profile Builder unit 164 searches and finds, for example, one or more characteristics that uniquely characterize all the Known mule accounts, or at least N percent (e.g., at least 75 percent) of all the Known mule bank accounts; and optionally, that do Not characterize, or are not detected, in a set of at least P other, non-mule, bank accounts (e.g., bank accounts that are pre-flagged in the system as bank accounts of legitimate users).

For example, the Mule Account Profile Builder unit 164 may analyze the input-unit interactions and/or the device properties and/or the operations and transactions, of each one of the Known mule accounts, and may detect that at least N percent of the Known mule accounts exhibit the following characteristics: (a) the user utilized the TAB key and not the computer-mouse and not the touch-pad to move from the Beneficiary Name field to the Beneficiary Address field; and also (b) the user submitted the "perform wire transfer" form or request by pressing the Enter key on the keyboard, and not by clicking or tapping on the Submit button on the screen; and also (c) the user completed the filling-out of the "wire transfer" form within S seconds (e.g., within 45 seconds); and also (d) the user moved the mouse-pointer on the screen, while filling-in the entire "wire transfer" form, for no more than P pixels in total (e.g., not more than 2,400 pixels in total for the entire form).

The Mule Account Profile Builder unit 164 may actively check that in a "control group", of at least N bank accounts that are Known (or pre-flagged) as Non-Mule accounts (e.g., a control group of 100 or 500 or 1,600 such Known Non-Mule accounts), at least 90 percent (or at least M percent) of such known non-mule accounts are accounts that do Not exhibit these four characteristics in the aggregate. Accordingly, the Mule Account Profile Builder unit 164 determines that these four characteristics are indicative of a Mule bank account, and stores data that represents this set of four characteristics in a Mule Account Characteristics Table 165.

The Mule Account Characteristics Table 165 is populated by such sets of characteristics; and a Characteristics-Based Mule Account Detector 166 later compares the interactions and monitored data of a particular bank account (that is not yet known to be mule or non-mule), and to automatically check whether the investigated account exhibits or includes at least one set of characteristics that are stored in the Mule Account Characteristics Table 165. If a monitored bank account is observed to indeed exhibit at least one set of characteristics that is stored in the Mule Account Characteristics Table 165, then the Characteristics-Based Mule Account Detector 166 flags that monitored bank account as a Mule Account, and/or triggers a notification that such account is a Mule account or requires additional review or scrutiny, and/or triggers a fraud mitigation module to operate with regard to this particular account.

In some embodiments, the Mule Account Profile Builder unit 164 need not necessarily generate a set of characteristics or parameters; but rather, may generate a Score Formula that produces a particular range of values when it operates on Known Mule accounts, yet produces a different range of values when it operates on Known Non-Mule accounts. For example, the Mule Account Profile Builder unit 164 may generate a formula that: takes the number of mouse-clicks performed on average in a usage session (log-in to log-off) in an account (denoted M), multiplies it by the total number of seconds that was spent on the page of "wire transfer" (accessing the page, until leaving the page; denoted T), divides it by the total number of times that the TAB key was pressed in the "wire transfer" page (denoted B), multiplies it by the number of key combinations (or by the number of "keyboard shortcuts") that were performed in the "wire transfer" page (denoted C), multiplies it by the total number of pixels that the on-screen-pointer was dragged on screen during the "wire transfer" page visit (denoted P), and divides it by 1.75 if the end-user device is identified to be running Linux or Unix operating system; such that, for example, the Score Formula is (M T C P/B) and optionally further divided by 1.75 if Linux or Unix is detected.

The Mule Account Profile Builder unit 164 may run this demonstrative formula, or other formula, on each account in the group of 50 pre-flagged accounts that are Known to be Mule accounts; and observes that in each one of these Known mule accounts, the Score Formula generates a score in the range of 45 to 82. Then, Mule Account Profile Builder unit 164 may run this demonstrative formula, or other formula, on each account in a "control group" of 50 or 600 pre-flagged accounts that are Known to be Non-Mule accounts; and observes that in each one of these Known Non-Mule accounts, the Score Formula generates a score in the range of 740 to 935. Accordingly, the Mule Account Profile Builder unit 164 defines a rule that if a bank account, that is Not already known to be mule or non-mule, is monitored and logged, and its interactions generate a score in the range of 45 to 82 (or, generate a score that is smaller than 83, or that is smaller than 100), then such account is estimated to be a Mule account, and a notification is generated accordingly, and a fraud mitigation module is triggered to operate with regard to such account.

Accordingly, the identification of a Mule bank account, in accordance with some embodiments of the present invention, need not be based on discrete parameters or discrete conditions that are compared one-by-one across accounts; but rather, may be based on a complex formula that receives as input a set of numerical values that describe various aspects of the user interactions with the account, and that generate as output a single output number, that is then compared to a threshold value or to a threshold range-of-values in order to classify a bank account as mule or non-mule.

It is noted that in some embodiments, the classification of a bank account may be binary; for example, bank account number 12345 may generate a score of 47, and may thus be classified at high level of certainty as a Mule bank account; whereas, bank account number 67890 may generate a score of 875, and may thus be classified at high level of certainty as a Non Mule bank account. In other embodiments, the system may utilize a tri-state classification, or a tertiary classification; for example, (i) an account that generated a score of 0 to 120 is classified as Mule; (ii) an account that generated a score of 740 or above is classified as Non-Mule; (iii) an account that generated a score in the range of 120 to 740 is classified as "insufficient data to classify for certain as mule or non-mule".

In a third set of embodiments, a Cross-Account Similar-Behavior Detector module 167 operates to analyze and/or compare the user interactions and/or the device properties, between (i) a first account which is actually the Victim account, and (ii) a second account which is actually the Mule account; or, between (I) a first account which is the Victim account, and (II) a second account which is the Real Destination account; or, between (a) a first account which is actually the Mule account, and (b) a second account which is the Real Destination account; or, among three accounts which are (A) the Victim account, (B) the Mule account, (C) the Real Destination account. The Cross-Account Similar-Behavior Detector module 167 may detect identical of similar to sufficiently-similar characteristics, to the user interactions and/or device properties and/or the operations or transactions, in the above-mentioned pairs or triplets of accounts; and may thus estimate or determine that one of the accounts is a Mule account (or, is a Victim account; or, is a Read Destination account).

In some embodiments, the above-mentioned comparison(s) may be performed, for example, if the both of the two accounts that are being monitored or compared (or, if all three accounts) are with the same bank, or are part of the same banking system, or utilize the same "app" or website or interface; such that they system administrator, or a trusted third-party on its behalf, may collect, monitor, log and track the user-interactions and the device properties for each one of the accounts, and may compare them to each other to establish the determination of sufficient similarity. In other embodiments, the above-mentioned comparison(s) may be performed even if the compared bank accounts are at different banks and are accessed through different "apps" or different web-sites; for example, if the two (or three) banks or banking systems that are involved, utilize the same plug-in or extension or add-on or third-party security provider that monitors interactions with bank accounts of multiple banks, and is thus able to notify Bank 1 that a particular account in Bank 1 is estimated to be a Mule account that received money from a particular (victim) account in Bank 2 and that transferred-out funds to a particular (real destination) account in Bank 3, even though the three accounts are scattered across three different banking institutions.

In a first example, victim Victor has account number 111 with Bank A, and attacker Mallory controls a Mule account number 222 with Bank B. Each bank utilizes a browser (or app) having a plug-in or extension or add-on that monitors user interactions and sends them for analysis at the same trusted third party (cyber-security analysis entity). The Cross-Account Similar-Behavior Detector module 167 analyzes the user interactions and device properties in Account 111 and in Account 222, and finds them to be sufficiently similar to each other (e.g., beyond a pre-defined level of similarity). For example, the Cross-Account Similar-Behavior Detector module 167 detects that in each one of these two bank accounts (victim account 111; mule account 222), the following hold true: (a) the "wire transfer" page was filled-out and submitted within T seconds (e.g., within 45 seconds or less); and (b) the "wire transfer" page was submitted by a pressing of the Enter key and not by clicking or tapping the Submit on-screen button; and (c) at least K percent (e.g., at least 80 percent) of the fields in the "wire transfer" page or form, were filled-out by segmented manual typing and not by fluid manual typing; and (d) the total number of pixels that the on-screen-pointer was dragged in the "wire transfer" page is less than P pixels (e.g., less than 1,800 pixels in total). Optionally, the Cross-Account Similar-Behavior Detector module 167 may also detect that this particular set of characteristics, is sufficiently unique in the general population of bank accounts, or is sufficiently unique in a "control group" of bank accounts that are known to be neither Mule accounts nor Victim accounts, beyond a pre-defined threshold level of sufficiency (e.g., in a control group of 500 bank accounts that are known to be non-mule and non-victim accounts, less than 0.5 percent of the accounts exhibit this particular set of characteristics). The Cross-Account Similar-Behavior Detector module 167 further takes into account that not only do Account 111 and Account 222 exhibit the same set of these four characteristics, that the general population and/or a control group of accounts does Not exhibit; but also, importantly, Account 111 and Account 222 are related to each other because a wire transfer of funds was performed from Account 111 to Account 222 (and optionally, that later wire transfer of at least K percent of those funds was performed from Account 222 to Account 333). Therefore, the Cross-Account Similar-Behavior Detector module 167 determines that Account 111 and Account 222 were actually controlled or utilized by the same person; and since they are formally owned by two different persons (e.g., victim Victor, and mule-account owner Bob or Mallory), the recipient bank account 222 is estimated to be a Mule account; and a Mule account notification is generated with regard to Account 222, and/or a fraud mitigation module is triggered to operate with regard to Account 222 and/or with regard to Account 111.

In a second example, victim Victor has account number 111 with Bank A, and attacker Mallory controls a Mule account number 222 with Bank B, and also controls a Real Destination account 333 with Bank C. Each bank utilizes a browser (or app) having a plug-in or extension or add-on that monitors user interactions and sends them for analysis at the same trusted third party (cyber-security analysis entity). The Cross-Account Similar-Behavior Detector module 167 analyzes the user interactions and device properties in Account 222 and in Account 333, and finds them to be sufficiently similar to each other (e.g., beyond a pre-defined level of similarity). For example, the Cross-Account Similar-Behavior Detector module 167 detects that in each one of these two bank accounts (mule account 222; real destination account 333), the following hold true: (a) the "wire transfer" page was filled-out and submitted within T seconds (e.g., within 60 seconds or less); and (b) at least K percent (e.g., at least 85 percent) of the fields in the "wire transfer" page or form, were filled-out by using copy-and-paste operations and not by manual typing of character-by-character data entry; and (c) the "wire transfer" page or form was accessed by, or was operated by, a user that utilized a touch-screen of an iPad tablet (and not by smartphone, and not by laptop computer, and not by desktop computer); and (d) when the user pressed the "submit" button, he also at the same time rotated the tablet by approximately 20 to 30 degrees counter-clockwise; and (e) when the user utilized the touch-screen to scroll-down in the "wire transfer" page or form, the user also slanted the tablet by approximately 40 to 50 degrees relative to the ground. Optionally, the Cross-Account Similar-Behavior Detector module 167 may also detect that this particular set of characteristics, is sufficiently unique in the general population of bank accounts, or is sufficiently unique in a "control group" of bank accounts that are known to be neither Mule accounts nor Real Destination accounts, beyond a pre-defined threshold level of sufficiency (e.g., in a control group of 600 bank accounts that are known to be non-mule and non-real-destination accounts, less than 0.7 percent of the accounts exhibit this particular set of characteristics). The Cross-Account Similar-Behavior Detector module 167 further takes into account that not only do Account 222 and Account 333 exhibit the same set of these five characteristics, that the general population and/or a control group of accounts does Not exhibit; but also, importantly, Account 222 and Account 333 are related to each other because a wire transfer of funds was performed from Account 222 to Account 333 (and optionally, that the outgoing wire transfer from Account 222 was in an amount of at least K percent of the funds that were received via an incoming wire transfer that arrived into Account 222 during the N days prior to the outgoing transfer). Therefore, the Cross-Account Similar-Behavior Detector module 167 determines that Account 222 and Account 333 were actually controlled or utilized by the same person; and since they are formally owned by two different persons (e.g., user Bob and user Carl), the transferring bank account 222 is estimated to be a Mule account; and a Mule account notification is generated with regard to Account 222, and/or a fraud mitigation module is triggered to operate with regard to Account 222 and/or with regard to Account 333 (the final recipient of the funds) and/or with regard to Account 111 (the original source of the funds).

In a third example, victim Victor has account number 111 with Bank A, and attacker Mallory controls a Mule account number 222 with Bank B, and also controls a Real Destination account 333 with Bank C. Each bank utilizes a browser (or app) having a plug-in or extension or add-on that monitors user interactions and sends them for analysis at the same trusted third party (cyber-security analysis entity). The Cross-Account Similar-Behavior Detector module 167 analyzes the user interactions and device properties in Account 111 and in Account 333, and finds them to be sufficiently similar to each other (e.g., beyond a pre-defined level of similarity). For example, the Cross-Account Similar-Behavior Detector module 167 detects that in each one of these two bank accounts (victim account 111; final destination account 333), the following hold true: (a) the "wire transfer" page was filled-out and submitted within T seconds (e.g., within 55 seconds or less); and (b) at least K percent (e.g., at least 95 percent) of the fields in the "wire transfer" page or form, were filled-out by using copy-and-paste operations and not by manual typing of character-by-character data entry; and (c) the "wire transfer" page or form was accessed by, or was operated by, a user that utilized a touch-screen of an iPad tablet (and not by smartphone, and not by laptop computer, and not by desktop computer); and (d) when the user pressed the "submit" button, he also at the same time rotated the tablet by 15 to 25 degrees clockwise; and (e) when the user utilized the touch-screen to scroll-up in the "wire transfer"

page or form, the user also slanted the tablet by approximately 30 to 35 degrees relative to the ground and away from the user. Optionally, the Cross-Account Similar-Behavior Detector module 167 may also detect that this particular set of characteristics, is sufficiently unique in the general population of bank accounts, or is sufficiently unique in a "control group" of bank accounts that are known to be neither Mule accounts nor Real Destination accounts, beyond a pre-defined threshold level of sufficiency (e.g., in a control group of 800 bank accounts that are known to be non-mule and non-real-destination accounts, less than 1 percent of the accounts exhibit this particular set of characteristics). The Cross-Account Similar-Behavior Detector module 167 further takes into account that not only do Account 111 and Account 333 exhibit the same set of these five characteristics, that the general population and/or a control group of accounts does Not exhibit; but also, importantly, Account 111 and Account 333 are detected by the system to be indirectly related to each other, because each one of them either sent money via wire transfer to Account 222 or receive money via wire transfer from Account 222 (and optionally, that the two wire transfer amounts are in the range of 0.80 to 1.20 of each other, or are within another pre-defined threshold range. Therefore, the Cross-Account Similar-Behavior Detector module 167 determines that Account 111 and Account 333 were actually controlled or utilized by the same person; and since they are formally owned by two different persons (e.g., victim Victor, and attacker Mallory), the recipient bank account 333 is estimated to be a Real Destination account; and a Mule account notification is generated with regard to Account 333, and/or a fraud mitigation module is triggered to operate with regard to Account 222 and/or with regard to Account 333 (the final recipient of the funds) and/or with regard to Account 111 (the original source of the funds).

In a fourth example, the above-mentioned set of four or five characteristics, or another set of characteristics, is detected across all Three accounts, namely, are detected in the usage session that the attacker performed in Account 111, and are also detected in one or more usage sessions in Account 222, and are also detected in one or more usage sessions in Account 333; thereby triggering the Cross-Account Similar-Behavior Detector module 167 to generate a notification that these three accounts are actually a victim account, a mule account, and a real destination account, respectively, and to trigger the operation of a fraud mitigation module.

It is noted that for demonstrative purposes, the first account in the above examples, or in other examples mentioned herein, is referred to as a "victim" account; however, the first account need not necessarily be of a victim, but rather, may be owned or controlled by a criminal or an attacker or by a person that attempts to perform tax evasion or money laundering. For example, Account 111 may be a USA bank account that is owned by user David, who receives income into the account by providing programming services to clients; the income is then channeled or transferred by David himself, from his own bank account 111 in the USA, to a "mule" bank account 222 that is owned by his sister Sarah in a different bank and in a different country (e.g., Russia); the transfer is reported as "business expense" in the USA, and is reported as "investment" in Russia, in order to evade taxes or to perform money laundering; and the funds are then transferred, for example, by David himself who logs-in into Sarah's account number 222, from account 222 to a third "real destination" account 333. The system of the present invention may detect this type of scenarios, in which the originating bank account is not necessarily a "victim" account, but rather, is owned or is controlled at all times by the "fraudster" or criminal himself.

The present invention may similarly be able to detect that a bank account is utilized for terror funding, or for funding of terrorist activity. For example, a set of bank accounts that are known to have been utilized for terror funding (e.g., 20 or 50 such accounts) are automatically analyzed by the modules and units of the present invention, and particularly by the modules that analyze the behavioral characteristics and the user-interactions characteristics in those bank accounts; and a pattern is extracted from that analysis, or a behavioral/transactional score is generated based on that analysis. Then, the system of the present invention may analyze the behavior and the transactions in another bank account, in order to determine whether the behavior and the transactions in that other account are sufficiently similar (e.g., beyond a pre-defined threshold value of similarity) to the pattern or characteristics that were identified from the 20 or 50 bank accounts that are already known as terror funding accounts (e.g., accounts utilized by captured terrorists); and if the similarity is sufficient, then the system may generate a notification that the other bank account is estimated or is determined to be, similarly, a terror funding bank account.

The present invention may similarly be used to detect banking fraud in a scenario that involves only a single bank account, or only two bank accounts (and not necessarily three bank accounts). For example, an "open banking" channel is utilized by some banks and/or by some retailers, enabling a user to initiate from the retailer's website a payment from the bank account of the user to the bank account of the retailer. The present invention may be configured to characterize the user interactions, the user behavior and the transaction properties in such "open banking" transactions that turned out to be fraudulent, or that are known to be fraudulent; may deduce or extract a behavioral/transactional profile or pattern for such "open banking" fraud; and may detect that another bank account is utilized to perform "open banking" fraud based on a detection that sufficiently similar user behavior and/or user interactions and/or transactions are observed in that other bank account.

In some embodiments, the system may utilize an Excessive Operations Detector module 168, to detect that a particular bank account exhibits an excessive number of baking operations in general, or of a particular type of banking operations (e.g., wire transfers; incoming wire transfers; outgoing wire transfers), within a pre-defined time-period (e.g., within a day, or a week, or a month, or within the most-recent 10 days, or the like). For example, the Excessive Operations Detector module 168 may detect that in Account 222, there are 13 incoming wire transfers within a period of 4 days, followed immediately (e.g., within H hours of the last incoming transfer) by a single outgoing wire transfer of at least K percent of the total incoming funds (e.g., at least 95 percent of the incoming funds); and optionally, that all the incoming wire transfers (or at least N percent of them) are from bank accounts located in a first country (e.g., the USA), while the single outgoing wire transfer is (in some embodiments) to a bank account located in a second country (e.g., Russia). The Excessive Operations Detector module 168 may compare the number of incoming transfers (13 transfers within 4 days) to a pre-defined threshold value (e.g., 2 incoming transfers per day; equivalent to 8 transfers in 4 days), and may thus determine that there is detected an Excessive number of incoming wire transfers in Account 222, thereby triggering a Mule account flagging and notification for Account 222.

Additionally or alternatively, a Mule-Type Operations Detector module 169 compares the above-mentioned operations to a set of pre-defined conditions or threshold values, and determines that Account 222 is a Mule account based on such comparisons; for example, in view of the above-mentioned insights, that all the incoming wire transfers originated from the same country and were then followed by a transfer-out of at least K percent of the funds to a destination bank account in a different country); and may similarly flag the Account 222 as a mule account, and may trigger fraud prevention operations.

In some embodiments, a Suspicious Beneficiary Account Detector 170 may similarly operate to identify Account 222 and/or Account 333, as an account that is utilized for money laundering and/or tax evasion and/or fraudulent activity. For example, the Suspicious Beneficiary Account Detector 170 may compare the number of transactions, the type of transactions, and/or the amounts of transactions, that are performed in Account 222 (or, in Account 333), as a beneficiary account that received incoming wire transfer(s), to the characteristics of similar beneficiary accounts in the general population or in a "control group" of known bank accounts, or to threshold values that were established by the system by analysis of operations in such control group or general population of bank accounts. For example, the system may analyze the operations performed in a control group of 5,000 checking accounts, that received between 5 to 8 incoming wire transfers within a total period of 6 months; and may detect that in 99 percent of these 5,000 bank accounts, (I) not more than 75 percent of the incoming funds were also transferred-out within 14 days of the most-recent incoming transfer, and also (II) the outgoing wire transfer was performed via a non-Linux end-user device, and also (III) the outgoing wire transfer has taken at least T seconds to be entered (e.g., at least 180 seconds), and also (IV) in the outgoing wire transfer form, at least N percent of the fields (e.g., at least 80 percent of the fields) were filled-out by manual typing of character-by-character typing operations (e.g., and not by copy-and-paste operations). The system may thus generate a rule, or a set of rules, indicating that if a bank account has between 5 to 8 incoming wire transfers within 6 months, and the bank account does Not exhibit this set of four characteristics, then the bank account is detected as an account involved in fraudulent activity, and a fraud notification is generated, and fraud mitigation operations are executed.

Additionally or alternatively, in some embodiments, the Suspicious Beneficiary Account Detector 170 may compare the data exhibited in a particular usage session (or, the data exhibited while a particular transaction is entered by the user), to previous/past/historic usage sessions in that same bank account, in order to detect that the bank account is utilized for fraudulent activity during the particular usage session (or transaction) that is investigated or monitored. For example, user Alice is a graphic designer who owns bank account number 444, in which she receives between 6 to 10 incoming wire transfers every month, from her various clients, each incoming wire transfer in the range of 750 to 1,800 dollars. The Suspicious Beneficiary Account Detector 170 detects that in past usage sessions in the Alice bank account number 444, the user had always performed a transfer-out of not more than 1,200 dollars, to a particular beneficiary (e.g., a sub-contractor of Alice), not more than once per month. The Suspicious Beneficiary Account Detector 170 also observes that in past usage sessions in the Alice bank account number 444, the user had always utilized an Android smartphone to check her balance, and has never utilized an Apple device to check her balance. The Suspicious Beneficiary Account Detector 170 also observes that in past usage sessions in the Alice bank account number 444, the user had always checked the balance in her Savings account, before performing a transfer-out operation from her Checking account to the beneficiary. Then, when attacker Mallory logs-in to Alice's bank account number 444, using stolen credentials, the Suspicious Beneficiary Account Detector 170 detects that in this usage session, (I) the user transferred-out 4,500 dollars (and not an amount within the previous maximum of 1,200 dollars), and also (II) the user utilized an Apple MacBook to perform the wire-out transaction (and not the Android smartphone as in previous usage sessions), and also (III) the user did not check her Savings account balance prior to commanding the wire-out from the Checking account. Therefore, the Suspicious Beneficiary Account Detector 170 determines that in this particular usage session, in which the transfer-out transaction was commanded, the account number 444 was not controlled by the legitimate user Alice, but rather was most-probably controlled by a cyber-attacker; and may thus generate a fraud notification, and/or may trigger fraud mitigation operations.

Some embodiments may utilize a Remote Access Detector module 171, to detect that a particular bank account is or was being controlled by a user that utilizes a Remote Access tool to remotely-access a remotely-located computer which in turn performed the access to the bank account. For example, cyber-attacker Mallory is physically located in a first country (e.g., China), and utilizes a laptop computer having a Remote Access tool, to take-over a desktop computer of victim Victor who is located in another country (e.g., the United States), and to log-in to the victim's bank account (e.g., at a United States banking platform), and to perform a wire transfer from the victim's bank account to a bank account of user Bob (e.g., which is actually a mule bank account). The system may detect that the bank account of victim Victor, particularly during the usage session in which the wire transferred was commanded, was controlled by a remotely-located attacker who took-over the victim's computer; for example, for example, based on lags or delays or latency that are detected in the communication channel, and/or by using one or more methods or modules that are described in U.S. Pat. No. 9,838,373, which is hereby incorporated by reference in its entirety. Based on such detection, and by detecting that a wire transfer was performed during the Remote Access usage session from the remotely-controlled bank account to the recipient account, a Remote-Access-Based Mule-Account Detector module 172 determines that the bank account of the recipient (Bob in this example) is actually a Mule bank account, and generates a mule account notification with regard to that bank account, and triggers a fraud mitigation process.

Some embodiments may utilize a Virtual Machine Detector module 173, to detect that a particular bank account is or was being controlled by a user that utilizes a Virtual Machine (VM) that is spawned and/or generated and/or controlled and/or run through a Virtual Machine Monitor (VMM), to access a bank account. For example, cyber-attacker Mallory is physically operating a laptop computer that runs Linux operating system, and utilizes a VMM that creates a Virtual Machine of Windows 10 operating system; and through the Windows Virtual Machine, the attacker accesses the bank account of victim Victor (e.g., by entering his stolen credentials), and to perform a wire transfer from the victim's bank account to a bank account of user Bob (e.g., which is actually a mule bank account). The system may detect that the bank account of victim Victor, particularly during the usage session in which the wire transferred was commanded, was controlled or accessed via a Virtual Machine (VM) or other virtualized environment, for example, for example, based on lags or delays or latency that are detected in the communication channel, and/or by using one or more other methods or modules that are described in U.S. Pat. No. 9,483,292 which is hereby incorporated by reference in its entirety. Based on such detection, and by detecting that a wire transfer was performed during the Virtual Machine usage session (or during the Virtualized usage session) from a first bank account to a recipient account, a Virtual Machine Based Mule-Account Detector module 174 determines that the bank account of the recipient (Bob in this example) is actually a Mule bank account, and generates a mule account notification with regard to that bank account, and triggers a fraud mitigation process.

Some embodiments may utilize an IP Spoofing/Proxy Server Detector module 175, to detect that a particular bank account is or was being controlled by a user that utilizes IP spoofing or IP address spoofing; namely, creation of Internet Protocol (IP) packets having a false source IP address, for hiding the identity of the accessing user and/or for impersonating another user or another source, such as by utilizing a Proxy Server. For example, cyber-attacker Mallory is physically located in a first country (e.g., Ukraine), and utilizes a laptop computer to access a Virtual Private Network (VPN) and/or a proxy server that is/are located in (or hosted in, or served from) a second country (e.g., the United States), and to access through the VPN/through the proxy server an online account of victim Victor who is located in the second country (e.g., the United States), and to log-in to the victim's bank account (e.g., at a United States banking platform), and to perform a wire transfer from the victim's bank account to a bank account of user Bob (e.g., which is actually a mule bank account). The system may detect that the bank account of victim Victor, particularly during the usage session in which the wire transferred was commanded, was controlled by an end-user device that performed IP address spoofing, for example, based on lags or delays or latency that are detected in the communication channel (e.g., the spoofed IP address is a nearby IP address in the same country as the bank server computer, but a Ping time indicates a far-away end-user-device in a far country), and/or by using a Bogon Filtering mechanism (e.g., detecting a bogus/fake IP address that is not in any range allocated by the Internet Assigned Numbers Authority (IANA) or by a delegated Regional Internet Registry (RIR) for public Internet use), and/or by using a Martian Packet detection mechanism, and/or by detecting a substantial change of at least K percent between the Time-To-Live (TTL) of a first IP packet and the TTL of a second IP packet that are incoming from the same end-user device. Based on such detection, and by detecting that a wire transfer was performed during the Remote Access usage session from the remotely-controlled bank account to the recipient account, an IP-Spoofing-Based Mule-Account Detector module 176 determines that the bank account of the recipient (Bob in this example) is actually a Mule bank account, and generates a mule account notification with regard to that bank account, and triggers a fraud mitigation process.

Some embodiments may utilize a Mule Account/Money Laundering Account Detector module 177, which may operate by taking into account one or more parameters or conditions or detected observations, for example, one or more of the following: (1) detecting of an access to a bank account via a Remote Access tool that allows a first user to utilize a first computer in order to remotely control a second computer from which the access to the bank server is performed; (2) detecting that the bank account is accessed via a Virtual Machine (VM) or other virtualized platform; (3) detecting that the bank account is accessed via a proxy server and/or via a VPN; (4) detecting that the bank account is accessed via a mechanism that performs, or that is estimated to be performing, IP address spoofing; (5) detecting input-unit gestures and/or interactions that are performed in the account and that do not match, or are not sufficiently similar to, a behavioral profile of the account owner as constructed in previous/past/historical usage-sessions in that account; (6) detecting input-unit gestures and/or interactions that are performed in the account and that do not match, or are not sufficiently similar to, a typical behavioral profile of a legitimate (non-fraudulent) account owner, as constructed by analyzing interactions across multiple accounts of multiple legitimate users in usage-sessions that are determined to be legitimate and non-fraudulent; (7) detecting input-unit gestures and/or interactions that are performed in the account and that do not match, or are not sufficiently similar to, a behavioral profile of the account owner as constructed in the most-recent previous usage-session in that account; (8) detecting input-unit gestures and/or interactions that are performed in the account and that do not match, or are not sufficiently similar to, a behavioral profile of the account owner as constructed based on user-provided information or account information (e.g., the legitimate account-owner had indicated in a past survey that she is 74 years old and is a novice in online banking, whereas the current account-user is performing advanced keyboard shortcuts and copy-and-paste operations that characterize a non-novice user); (9) detecting that input-unit gestures and/or interactions, that are observed in the account from which a wire transfer is originating, is identical or is sufficiently similar to input-unit gestures and/or interactions that are observed in the account that is the recipient of that wire transfer; (10) detecting that one or more such characteristics, are also accompanied by a particular pre-defined Timing Scheme, for example, by utilizing a Timing Scheme/Temporal Relationship Detector module 178 which detects that the user of Account 222 only accesses that account in a time-window of between 1 to 12 hours after an incoming wire transfer is received at that Account 222, and not during any other time-slots, or that otherwise detects that access session to Account 222 and/or that balance checking in Account 222 and/or wire transfer operations in Account 222 are only performed during a particular time-slot after a particular Event (or type of event) has occurred (e.g., incoming wire transferred was received), and/or that otherwise determines a particular Temporal Relationship or Temporal Correlation between accesses to Account 222 and event(s) occurring in Account 222, or between a certain type of operations or transactions in Account 222 and a certain type of events in that account; (11) detecting that a single particular bank account (e.g., the account of victim Victor) is alternately utilized by two different human users who exhibit two different patterns of behavioral characteristics (e.g., victim Victor is novice and slow-typing and uses only the mouse for field navigation; attacker Mallory is an expert user who is fast-typing, utilizes keyboard shortcuts); (12) detecting that multiple bank accounts, that are formally owned by two or more different persons, are accessed by users that exhibit the same pattern of interactions and are thus estimated to be utilized by a single user and not by multiple different user (e.g., attacker Mallory is accessing the victim account and the mule account, and exhibits the same interactions across these two accounts, such as, fast typing, utilization of keyboard shortcuts; exhibiting same or similar type of corrective action to an aberration or anomaly that is injected to the input/output of the GUI; or the like); (13) detecting existence of correlation, or detecting a particular type of correlation, or detecting a lack of correlation, between input-unit interactions (e.g., the user taps on "submit" button on the touchscreen of a tablet) and spatial device properties (e.g., the user rotates/spins the devices or makes it slanted), as a tell-tale that a particular user is operating a particular bank account, or as a differentiating behavioral characteristic among users (e.g., enabling to detect an attacker operating in a victim's account), or as a cross-account common characteristic (e.g., enabling to detect that one single person is operating two or more different accounts), and/or by using methods and/or modules that are described in U.S. Pat. No. 8,938,787, which is hereby incorporated by reference in its entirety, and/or by using methods and/or modules that are described in U.S. Pat. No. 9,071,969, which is hereby incorporated by reference in its entirety, and/or by using methods and/or modules that are described in U.S. Pat. No. 9,526,006, which is hereby incorporated by reference in its entirety; (14) generating an input/output anomaly or aberration or interference or irregular behavior (e.g., irregular or abnormal behavior of an on-screen pointer in response to input-unit interaction), and monitoring whether and which type of corrective action is performed by the user, as a tell-tale that a particular user is operating a particular bank account, or as a differentiating behavioral characteristic among users (e.g., enabling to detect an attacker operating in a victim's account), or as a cross-account common characteristic (e.g., enabling to detect that one single person is operating two or more different accounts), and/or by using methods and/or modules that are described in U.S. Pat. No. 9,069,942, which is hereby incorporated by reference in its entirety; (15) estimating properties of a motor-control loop model or function of a user of an online account, and utilizing it as a differentiating characteristic among users (e.g., enabling to detect an attacker operating in a victim's account), or as a cross-account common (e.g., enabling to detect that one single person is operating two or more different accounts), and/or by using methods and/or modules that are described in U.S. Pat. No. 9,541,995, which is hereby incorporated by reference in its entirety.

Some embodiments may determine, detect, or estimate whether an online banking account or an online financial account (e.g., at a bank or a banking institution, at a brokerage firm, at an investments brokerage, or the like), (I) is accessed by a legitimate user, or (II) is used to receive and/or transfer money illegally and/or is utilized as a Mule bank account and/or is utilized for money laundering purposes and/or is utilized for fraudulent or fraud-related purposes.

In some embodiments, the determining comprises: (a) monitoring interactions of the user with a computing device during online access to the banking account; (b) based on said monitoring, determining whether said online banking account (I) is accessed by a legitimate user, or (II) is used to receive and/or transfer money illegally and/or is utilized as a Mule bank account and/or is utilized for money laundering purposes and/or is utilized for fraudulent or fraud-related purposes.

For example, the method comprises: sampling or monitoring multiple interactions of said user with a computing device during online access to a banking account to detect whether the user is located remotely from said computing device and controlling remotely said computing device via said remote access channel; and based on said remote access detection, determining whether said online banking account (I) is accessed by a legitimate user, or (II) is used to receive and/or transfer money illegally and/or is utilized as a Mule bank account and/or is utilized for money laundering purposes and/or is utilized for fraudulent or fraud-related purposes.

In some embodiments, the method comprises: detecting whether said user's device is more-probably communicating indirectly with a trusted server via a proxy server during online access to a banking account; and based on said proxy detection, determining whether said online banking account (I) is accessed by a legitimate user, or (II) is used to receive and/or transfer money illegally and/or is utilized as a Mule bank account and/or is utilized for money laundering purposes and/or is utilized for fraudulent or fraud-related purposes.

In some embodiments, the method comprises: detecting whether said user's device is more-probably communicating through a virtual machine during online access to a banking account; and based on said virtual machine detection, determining whether said online banking account (I) is accessed by a legitimate user, or (II) is used to receive and/or transfer money illegally and/or is utilized as a Mule bank account and/or is utilized for money laundering purposes and/or is utilized for fraudulent or fraud-related purposes.

In some embodiments, the method comprises: (i) monitoring/sampling interactions of a user with a computing device during multiple online accesses to a banking account, to create a profile of the interaction of said user with an input unit; (ii) matching the said profile with interactions of a user with a computing device during online access to said banking account; and based on said matching, determining whether said online banking account (I) is accessed by a legitimate user, or (II) is used to receive and/or transfer money illegally and/or is utilized as a Mule bank account and/or is utilized for money laundering purposes and/or is utilized for fraudulent or fraud-related purposes.

In some embodiments, the method comprises: monitoring interactions of a user with a computing device during online access to a banking account A, which transfers money to banking account B; and based on said matching, determining whether said online banking account B (I) is accessed by a legitimate user, or (II) is used to receive and/or transfer money illegally and/or is utilized as a Mule bank account and/or is utilized for money laundering purposes and/or is utilized for fraudulent or fraud-related purposes.

In some embodiments, the method comprises: (i) monitoring interactions of a user with a computing device during online access to a banking account A, which transfers money to banking account B; (ii) monitoring interactions of a user with a computing device during online access to a banking account B; (iii) matching the said user/computing device interactions; and based on said matching, determining whether said online banking account B, (I) is accessed by a legitimate user, or (II) is used to receive and/or transfer money illegally and/or is utilized as a Mule bank account and/or is utilized for money laundering purposes and/or is utilized for fraudulent or fraud-related purposes.

In some embodiments, the method comprises: (i) monitoring the transfers to a banking account; (ii) analyzing temporal relationship between said transfers and the interaction of a user with said online banking account; based on analysis of temporal relationship between said transfers and the interaction of a user with said online banking account, determining whether said online banking account (I) is accessed by a legitimate user, or (II) is used to receive and/or transfer money illegally and/or is utilized as a Mule bank account and/or is utilized for money laundering purposes and/or is utilized for fraudulent or fraud-related purposes.

In some embodiments, the method comprises: (i) sampling the user/computing device interactions during multiple online accesses to a banking account; (ii) estimating the number of users who access the said online banking account; and based on said estimating, determining whether said online banking account (I) is accessed by a legitimate user, or (II) is used to receive and/or transfer money illegally and/or is utilized as a Mule bank account and/or is utilized for money laundering purposes and/or is utilized for fraudulent or fraud-related purposes.

In some embodiments, the method comprises: (i) sampling the user/computing device interactions during online accesses to multiple banking accounts; (ii) estimating whether the said banking account is accessed by a user which also accesses other online banking accounts; and based on said estimating, determining whether said online banking account (I) is accessed by a legitimate user, or (II) is used to receive and/or transfer money illegally and/or is utilized as a Mule bank account and/or is utilized for money laundering purposes and/or is utilized for fraudulent or fraud-related purposes.

For demonstrative purposes, portions of the discussion herein may relate to reaching a determination that a particular bank account is used as a Mule bank account, or is connected to a Mule bank account as a Victim account or as a Final Destination account. However, some embodiments of the present invention may utilize the same or similar conditions or criteria or parameters in order to reach a determination that a particular bank account is utilizes for money laundering, for terror funding, and/or for other illegal purposes.

In some embodiments, upon estimation or determination that a bank account is used as a Mule bank account and/or for money laundering and/or for terror funding, the system or method may automatically trigger and/or initiate and/or perform one or more pre-defined operations, for example: generate a notification or alert or alarm to a system administrator and/or a bank representative and/or a regulatory agency and/or a law enforcement agency; generate or place a temporary or fixed "freeze" or "hold" on the account; block or cancel or reverse one or more transactions (e.g., wire transfer) that were performed and/or that are pending and/or that were scheduled to be performed; require the account owner to perform one or more fraud mitigation steps, e.g., to perform two factor authentication, to speak telephonically with a bank representative or with a fraud prevention department, to physically arrive to the bank and speak face-to-face to a bank representative, to provide or upload or send particular documents that clarify or verify or confirm the user's identity and/or the nature or purpose of suspected transactions or of recent transactions, and/or other suitable operations.

The term "bank account" as used herein may include, as non-limiting examples, an account of a human being and/or of a legal entity (e.g., corporation, company, partnership, or the like), at a bank or at a banking institution or at other financial institution (e.g., credit union; securities account; brokerage account; trading account; checking account; savings account; or the like).

Some embodiments include a method comprising: (a) monitoring interactions of a user with a computing device during online access with a banking account; (b) based on said monitoring, determining that said online banking account is utilized as a mule bank account to illegally receive and transfer money.

In some embodiments, the method comprises: (A) based on analysis of user interactions with said computing device, determining that said user is located remotely from said computing device and is controlling remotely said computing device via said remote access channel; (B) based on detection of utilization of said remote access channel, determining that said online banking account is used as a mule bank account to illegally receive and transfer money.

In some embodiments, the method comprises: (A) based on analysis of communications latency in a communication channel between said computing device and a remote server, determining that said user is located remotely from said computing device and is controlling remotely said computing device via said remote access channel; (B) based on detection of utilization of said remote access channel, determining that said online banking account is used as a mule bank account to illegally receive and transfer money.

In some embodiments, the method comprises: (A) sampling multiple interactions of said user with an input unit of said computing device; and if a frequency of said multiple interactions is below a pre-defined threshold, then, determining that said user is located remotely from said computing device and controlling remotely said computing device via a remote access channel; (B) based on detection of utilization of said remote access channel, determining that said online banking account is used as a mule bank account to illegally receive and transfer money.

In some embodiments, the method comprises: (A) sampling touch-based gestures of a touch-screen of said computing device; (B) sampling accelerometer, gyro and device orientation data of said computing device, during a time period which at least partially overlaps said sampling of touch-based gestures of the touch-screen of the computing device; (C) based on a mismatch between (i) sampled touch-based gestures, and (ii) sampled accelerometer, gyro and device orientation data, determining that the computing device was controlled remotely via a remote access channel; (D) based on detection of utilization of said remote access channel, determining that said online banking account is used as a mule bank account to illegally receive and transfer money.

In some embodiments, the method comprises: (A) based on analysis of user interactions with said computing device, determining that said computing device is communicating with said banking account via a proxy server; (B) based on detection of utilization of said proxy server, determining that said online banking account is used as a mule bank account to illegally receive and transfer money.

In some embodiments, the method comprises: (A) based on analysis of user interactions with said computing device, determining that said computing device is communicating with said banking account via a virtual machine; (B) based on detection of utilization of said virtual machine, determining that said online banking account is used as a mule bank account to illegally receive and transfer money.

In some embodiments, the method comprises: (A) sampling interactions of said user with said computing device during multiple online accesses to said banking account, and creating a user-specific profile of the interaction of said user with an input unit of said computing device; (B) matching said user-specific profile with fresh interactions of said user during a fresh online access to said banking account; (C)

based on said matching, determining that said online banking account is used as a mule bank account to illegally receive and transfer money.

In some embodiments, the method comprises: (A) sampling interactions of said user with said computing device during multiple online accesses to said banking account, and creating a user-specific profile of the interaction of said user with an input unit of said computing device; (B) matching said user-specific profile with interactions of said user with said banking account via an electronic device that is different from said computing device; (C) based on said matching, determining that said online banking account is used as a mule bank account to illegally receive and transfer money.

In some embodiments, the method comprises: (A) monitoring and analyzing interactions of said user, who utilizes said computing device to transfer funds from said online banking account to a target banking account that is not accessed by said computing device; (B) based on said analyzing, determining that said target banking account, that is not accessed by said computing device, is used as a mule bank account to illegally receive and transfer money.

In some embodiments, the method comprises: (A) monitoring and analyzing interactions of said user, who utilizes said computing device to transfer funds from said online banking account to a target banking account that is not accessed by said computing device; and creating a first user-specific profile based on said interactions monitored and analyzed in step (A); and (B) monitoring and analyzing interactions of another user, who utilizes another computing device to access said target bank account; and creating a second user-specific profile based on said interactions monitored and analyzed in step (B); and (C) determining a match between the first user-specific profile and the second user-specific profile; and (D) based on said match, determining that said target bank account is used as a mule bank account to illegally receive and transfer money.

In some embodiments, the method comprises: (A) monitoring incoming transfers into said online banking account; (B) analyzing temporal relationship between (i) said incoming transfers, and (ii) interactions of said user via said computing device with said online banking account; (C) based on analysis of said temporal relationship, determining that said target bank account is used as a mule bank account to illegally receive and transfer money.

In some embodiments, the method comprises: (A) monitoring and analyzing user interactions during multiple, different, usage sessions in which said online bank account was accessed; (B) based on step (A), creating a plurality of user-specific profiles that correspond to a plurality of users that accessed said online bank account, and generating an estimated number of said plurality of users that accessed said online bank account; (C) based on step (B), determining that said target bank account is used as a mule bank account to illegally receive and transfer money.

In some embodiments, the method comprises: (A) monitoring and analyzing user interactions during usage sessions in which said online bank account was accessed, and generating a primary user-specific interaction profile that characterizes the interactions of said user with said online bank account; (B) monitoring and analyzing interactions of users during usage sessions in which other online bank account were accessed; and generating, respectively, a plurality of user-specific interaction profiles; (C) detecting a match between (I) said primary user-specific interaction profile that was generated in step (A), and (II) another user-specific interaction profile that was generated in step (B) pertaining to another online bank account; (D) based on said match, determining that at least one bank account is utilized by said user as a mule bank account to illegally receive and transfer money.

In some embodiments, the method comprises: (A) monitoring and analyzing user interactions during online accesses to multiple different banking accounts; (B) based on step (A), determining that a particular banking account is accessed by a particular user which also accesses one or more other online banking accounts; (C) based the determining of step (B), determining that at least one bank account is utilized by said user as a mule bank account to illegally receive and transfer money.

In some embodiments, the method comprises: (A) monitoring and analyzing user interactions during a single usage session in which said online bank account was accessed; (B) detecting that the user interactions in said single usage session, match a pre-defined playbook of steps that characterizes operations in a mule bank account; (C) based on the detecting of said (B), determining that said online bank account was used as a mule bank account to illegally receive and transfer money.

In some embodiments, the method comprises: (A) monitoring and analyzing user interactions during multiple usage sessions in which said online bank account was accessed; (B) detecting that the user interactions in said multiple usage session, comprise: (i) an incoming funds transfer, and (ii) a subsequent outgoing funds transfer, and (iii) lack of cash withdrawals, and (iv) lack of check withdrawals; (C) based on the detecting of said (B), determining that said online bank account was used as a mule bank account to illegally receive and transfer money.

In some embodiments, the method comprises: (A) monitoring and analyzing user interactions during multiple usage sessions in which said online bank account was accessed; (B) detecting that the user interactions in said multiple usage session, comprise: (i) multiple incoming funds transfer that are incoming from a plurality of different countries, and (ii) multiple outgoing funds transfers that are outgoing to a single country that is different from said plurality of different countries; and further detecting that each incoming funds transfer is followed, with N hours, by an outgoing funds transfer of at least K percent of the incoming funds; wherein N is a pre-defined positive value; wherein K is a pre-defined positive value; (C) based on the detecting of said (B), determining that said online bank account was used as a mule bank account to illegally receive and transfer money.

In some embodiments, the method comprises: (A) receiving a list of bank accounts that are known to be mule bank accounts; analyzing user interactions that were performed via input units of computing devices by users that accessed said mule bank accounts; and extracting a set of interaction features that characterize the user interactions across multiple mule bank accounts; (B) subsequently, checking whether user interactions in a particular bank account, match said set of interaction features that were extracted in step (A); and if the checking result is positive, then determining that said particular bank account was used as a mule bank account to illegally receive and transfer money.

In some embodiments, the method comprises: (A) detecting that a set of banking operations comprise: (i) a first funds transfer from a first bank account to a second bank account, followed by (ii) a second funds transfer from the second bank account to a third bank account; (B) analyzing (i) a first set of user interactions that were performed in a first usage session in which funds were transferred out from the first bank account, and also (ii) a second set of user interactions that were performed in a second usage session in which funds were transferred out from the second bank account to the third bank account; and detecting a set of user-specific features that appear in both the first set of user interactions and the second set of user interactions; (C) based on the detecting of step (B), then: (I) determining that said first bank account was a victim bank account, and (II) determining that said second bank account was used as a mule bank account, and (III) determining that said third bank account was used as a real destination bank account.

In some embodiments, the method comprises: (A) analyzing user interactions with said computing device, and determining that an outgoing funds transfer was commanded by said user interactions while said user is located remotely from said computing device and is controlling remotely said computing device via said remote access channel; (B) based on detection of utilization of said remote access channel to perform said outgoing funds transfer, determining that said online banking account is used as a mule bank account to illegally receive and transfer money.

In some embodiments, the method comprises: (A) analyzing user interactions with said computing device, and determining that an outgoing funds transfer was commanded by said user interactions while said user was utilizing a Virtual Machine to access said bank account; (B) based on detection of utilization of the Virtual Machine to perform said outgoing funds transfer, determining that said online banking account is used as a mule bank account to illegally receive and transfer money.

In some embodiments, the method comprises: (A) analyzing user interactions with said computing device, and determining that an outgoing funds transfer was commanded by said user interactions while said user was utilizing a proxy server to access said bank account; (B) based on detection of utilization of the proxy server to perform said outgoing funds transfer, determining that said online banking account is used as a mule bank account to illegally receive and transfer money.

In some embodiments, the method comprises: generating a notification alert that said online bank account is utilized as a mule bank account.

Although portions of the discussion herein relate, for demonstrative purposes, to wired links and/or wired communications, some embodiments of the present invention are not limited in this regard, and may include one or more wired or wireless links, may utilize one or more components of wireless communication, may utilize one or more methods or protocols of wireless communication, or the like. Some embodiments may utilize wired communication and/or wireless communication.

The present invention may be implemented by using hardware units, software units, processors, CPUs, DSPs, integrated circuits, memory units, storage units, wireless communication modems or transmitters or receivers or transceivers, cellular transceivers, a power source, input units, output units, Operating System (OS), drivers, applications, and/or other suitable components.

The present invention may enable machines and/or computerized systems to have new capabilities and/or new functions that were not available to such machines or systems so far; including, for example: a new capability to correctly differentiate among multiple human users; a new capability for machines or computerized systems to differentiate between (I) a legitimate or "naïve" user, and (II) a fraudster or a human user having criminal intent or an illegitimate user; a new capability for machines or computerized systems allowing the machine or the computerized system to defend itself or to protect itself against cyber-attacks and/or illegitimate operations, and/or against impostors or identity-thieves or dishonest users; a new capability for machines or computerized systems to correctly identify and/or detect that a current user of an online resource or an online destination, is not the same human user that had accessed the same resource previously, even if the two access sessions were performed via the same device and/or via the same browser or application and/or from the same IP address and/or when the user/s are already logged-in and/or are already authenticated; a new capability for machines or computerized systems to defend or protect themselves against fraudulent transactions or criminal behavior or against hackers, crackers, human hackers, automated hacking tools, "bot" or other automated scripts; a new capability for machines or computerized systems to initiate and to perform fraud-mitigation operations based on analysis of user interactions; improved security and/or integrity and/or reliability of machines and computerized systems; and/or other new capabilities that conventional machines and conventional computerized systems do not have and that the present invention provides.

Embodiments of the present invention may be utilized with a variety of devices or systems having a touch-screen or a touch-sensitive surface; for example, a smartphone, a cellular phone, a mobile phone, a smart-watch, a tablet, a handheld device, a portable electronic device, a portable gaming device, a portable audio/video player, an Augmented Reality (AR) device or headset or gear, a Virtual Reality (VR) device or headset or gear, a "kiosk" type device, a vending machine, an Automatic Teller Machine (ATM), a laptop computer, a desktop computer, a vehicular computer, a vehicular dashboard, a vehicular touch-screen, or the like.

The system(s) and/or device(s) of the present invention may optionally comprise, or may be implemented by utilizing suitable hardware components and/or software components; for example, processors, processor cores, Central Processing Units (CPUs), Digital Signal Processors (DSPs), circuits, Integrated Circuits (ICs), controllers, memory units, registers, accumulators, storage units, input units (e.g., touch-screen, keyboard, keypad, stylus, mouse, touchpad, joystick, trackball, microphones), output units (e.g., screen, touch-screen, monitor, display unit, audio speakers), acoustic microphone(s) and/or sensor(s), optical microphone(s) and/or sensor(s), laser or laser-based microphone(s) and/or sensor(s), wired or wireless modems or transceivers or transmitters or receivers, GPS receiver or GPS element or other location-based or location-determining unit or system, network elements (e.g., routers, switches, hubs, antennas), and/or other suitable components and/or modules.

The system(s) and/or devices of the present invention may optionally be implemented by utilizing co-located components, remote components or modules, "cloud computing" servers or devices or storage, client/server architecture, peer-to-peer architecture, distributed architecture, and/or other suitable architectures or system topologies or network topologies.

In accordance with embodiments of the present invention, calculations, operations and/or determinations may be performed locally within a single device, or may be performed by or across multiple devices, or may be performed partially locally and partially remotely (e.g., at a remote server) by optionally utilizing a communication channel to exchange raw data and/or processed data and/or processing results.

Some embodiments may be implemented by using a special-purpose machine or a specific-purpose device that is not a generic computer, or by using a non-generic computer or a non-general computer or machine. Such system or device may utilize or may comprise one or more components or units or modules that are not part of a "generic computer" and that are not part of a "general purpose computer", for example, cellular transceivers, cellular transmitter, cellular receiver, GPS unit, location-determining unit, accelerometer(s), gyroscope(s), device-orientation detectors or sensors, device-positioning detectors or sensors, or the like.

Discussions herein utilizing terms such as, for example, "processing", "computing", "calculating", "determining", "establishing", "analyzing", "checking", "detecting", "measuring", or the like, may refer to operation(s) and/or process(es) of a processor, a computer, a computing platform, a computing system, or other electronic device or computing device, that may automatically and/or autonomously manipulate and/or transform data represented as physical (e.g., electronic) quantities within registers and/or accumulators and/or memory units and/or storage units into other data or that may perform other suitable operations.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments", "some embodiments", and/or similar terms, may indicate that the embodiment(s) so described may optionally include a particular feature, structure, or characteristic, but not every embodiment necessarily includes the particular feature, structure, or characteristic. Repeated use of the phrase "in one embodiment" does not necessarily refer to the same embodiment, although it may. Repeated use of the phrase "in some embodiments" does not necessarily refer to the same set or group of embodiments, although it may.

As used herein, and unless otherwise specified, the utilization of ordinal adjectives such as "first", "second", "third", "fourth", and so forth, to describe an item or an object, merely indicates that different instances of such like items or objects are being referred to; and does not intend to imply as if the items or objects so described must be in a particular given sequence, either temporally, spatially, in ranking, or in any other ordering manner.

Functions, operations, components and/or features described herein with reference to one or more embodiments of the present invention, may be combined with, or may be utilized in combination with, one or more other functions, operations, components and/or features described herein with reference to one or more other embodiments of the present invention. The present invention may comprise any possible combinations, re-arrangements, assembly, re-assembly, or other utilization of some or all of the modules or functions or components that are described herein, even if they are discussed in different locations or different chapters of the above discussion, or even if they are shown across different drawings or multiple drawings, or even if they are depicted in any drawing(s) without necessarily being connected via a line or an arrow.

Some embodiments of the present invention may comprise, or may utilize, one or more of the following units, modules, systems, devices, operations, and/or examples.

Some embodiments may comprise a device, method, and system of detecting user identity based on motor-control loop model. A includes: during a first session of a user who utilizes a pointing device for interacting with a computerized service, monitoring the pointing device dynamics and gestures of the user; based on the monitored dynamics and gestures, estimating parameters that characterize a sensorimotor control loop model of the user; storing in a database a record indicating that the user is associated with the parameters that characterize the sensorimotor control loop model of the user.

Some embodiments of the present invention may include a method comprising: (a) during a first session of a user who utilizes a pointing device for interacting with a computerized service, monitoring on-screen movements of an on-screen pointer; (b) defining a sensorimotor control loop model by utilizing at least a function that takes into account at least (A) a first trajectory parameter indicating current velocity of pointing device movement, and (B) a second trajectory parameter indicating translation error; (c) by analyzing estimated dynamics of the pointing device, determining (AA) at least one sensorimotor control loop parameter that characterizes utilization of said pointing device by said user, and (BB) at least one parameter corresponding to a noise characteristic of the sensorimotor control loop that characterizes utilization of said pointing device by said user; (d) differentiating between (i) said user and (ii) one or more other users, based on (AA) said at least one sensorimotor control loop parameter that characterizes utilization of said pointing device by said user, and (BB) said at least one parameter corresponding to the noise characteristics of the sensorimotor control loop that characterizes utilization of said pointing device by said user.

In some embodiments, the method comprises: storing in a database a record indicating that said user is associated with said parameters that characterize the sensorimotor control loop model of said user; in a subsequent session of interaction with said computerized service: monitoring pointing device dynamics and gestures of a subsequent user, estimating current parameters that characterize a sensorimotor control loop of said subsequent user, comparing the current parameters to said record of parameters, and based on results of said comparing, determining whether said subsequent user of the second session is the same person as said user of the first session.

In some embodiments, the method comprises: based on the monitored pointing device dynamics and gestures of said user, estimating whether or not an elbow of said user is resting on a surface; based on estimation of whether or not the elbow of said user is resting on the surface, differentiating between said user and another user interacting with said computerized service.

In some embodiments, the method comprises: based on the monitored pointing device dynamics and gestures of said user, estimating whether the user is right-handed; based on estimation of whether said user is right-handed, differentiating between said user and another user interacting with said computerized service. In some embodiments, the method comprises: based on the monitored pointing device dynamics and gestures of said user, estimating an eye saccade model of said user; based on the estimated eye saccade model of said user, differentiating between said user and another user interacting with said computerized service.

Some embodiments may comprise a monitoring module for monitoring usage of an electronic device, the monitoring module configured to perform a method comprising: (a) during a first session of a user who utilizes a pointing device for interacting with a computerized service, monitoring on-screen movements of an on-screen pointer; (b) defining a sensorimotor control loop model by utilizing at least a function that takes into account at least (A) a first trajectory parameter indicating current velocity of pointing device movement, and (B) a second trajectory parameter indicating translation error; (c) by analyzing estimated dynamics of the pointing device, determining (AA) at least one sensorimotor control loop parameter that characterizes utilization of said pointing device by said user, and (BB) at least one parameter corresponding to a noise characteristic of the sensorimotor control loop that characterizes utilization of said pointing device by said user; wherein said determining comprises: generating a function that describes the sensorimotor control loop model that causes said on-screen movements of said on-screen pointer; (d) differentiating between (i) said user and (ii) one or more other users, based on said function that describes the sensorimotor control loop model.

In some embodiments, the monitoring module is further configured to perform: storing in a database a record indicating that said user is associated with said parameters that characterize the sensorimotor control loop model of said user; in a subsequent session of interaction with said computerized service: monitoring pointing device gestures of a subsequent user, estimating current parameters that characterize a sensorimotor control loop of said subsequent user, comparing the current parameters to said record of parameters, and based on results of said comparing, determining whether to authenticate identity of said subsequent user. In some embodiments, the monitoring module is further configured to perform: estimating a user-specific muscular profile which characterizes the motor control loop; estimating a user-specific coordination index which characterizes the motor control loop; differentiating between two or more users based on the user-specific muscular profile and the user-specific coordination index. In some embodiments, the monitoring module is further configured to perform: based on the monitored pointing device dynamics and gestures of said user, estimating one or more parameters characterizing an eye-hand cognitive correction feedback of said user; based on the estimated one or more parameters characterizing the eye-hand cognitive correction feedback of said user, differentiating between said user and another user interacting with said computerized service. In some embodiments, the monitoring module is further configured to perform: based on the monitored pointing device dynamics and gestures of said user, estimating an eye-hand coordination model of said user in response to an introduced interference to user experience at said computerized service; based on the estimated eye-hand coordination model of said user in response to the introduced interference to user experience at said computerized service, differentiating between said user and another user interacting with said computerized service.

Some embodiments comprise a monitoring system for monitoring usage of an electronic device, the monitoring system configured to perform a method comprising: (a) during a first session of a user who utilizes a pointing device for interacting with a computerized service, monitoring on-screen movements of an on-screen pointer; (b) defining a sensorimotor control loop model by analyzing the on-screen movements of the on-screen pointer; (c) by analyzing estimated dynamics of the pointing device, determining (AA) at least one sensorimotor control loop parameter that characterizes utilization of said pointing device by said user, and (BB) at least one parameter corresponding to a noise characteristic of the sensorimotor control loop that characterizes utilization of said pointing device by said user; wherein said determining comprises: generating a function that describes the sensorimotor control loop model that causes said on-screen movements of said on-screen pointer; (d) differentiating between (i) said user and (ii) one or more other users, based on said function that describes the sensorimotor control loop model. In some embodiments, the monitoring system is further configured to perform: estimating parameters of a sensorimotor control loop which comprises eye, hand, and brain coordination and control of the pointing device. In some embodiments, the monitoring system is further configured to perform: presenting to said user a number of choices; subsequently, modifying the number of choices presented to said user; based on the monitored pointing device dynamics and gestures of said user, estimating a level of awareness of said user to modification of the number of choices; based on the estimated level of awareness of said user, differentiating between said user and another user interacting with said computerized service. In some embodiments, the monitoring system is further configured to perform: based on the monitored pointing device dynamics and gestures of said user, estimating parameters of a Fitts's Law function indicating ability of said user to rapidly reach an on-screen target; based on the estimated parameters of the Fitts's Law function of said user, differentiating between said user and another user interacting with said computerized service.

In some embodiments, the monitoring system is further configured to perform: based on the monitored pointing device dynamics and gestures of said user, estimating a level of accuracy of said user in reaching an on-screen user interface element; based on the estimated level of accuracy of said user, differentiating between said user and another user interacting with said computerized service.

Some embodiments comprise a computer-implemented process comprising: (a) during a usage session of a user who utilizes a pointing device for interacting with a computerized service, monitoring on-screen movements of an on-screen pointer; (b) analyzing the on-screen movements of the on-screen pointer to derive from them estimated dynamics of the pointing device as utilized by said user, and to define a sensorimotor control loop model that characterizes the utilization of said pointing device by said user; (c) differentiating between (i) said user and (ii) one or more other users, based on a subsequent analysis of subsequent on-screen movements of the on-screen pointer which correspond to pointing device dynamics that do not match said sensorimotor control loop model that was defined for said user. In some embodiments, estimating parameters of a motor control loop of said user comprises: estimating the parameters that characterize the sensorimotor control loop as a function of translation error, current velocity, and motor control noise, based on monitored pointing device dynamics and gestures. In some embodiments, the process comprises: estimating parameters of a first sensorimotor control loop, associated with pointing device based interaction of a first user during a first session at a first computerized service; estimating parameters of a second sensorimotor control loop, associated with pointing device based interaction of a second user during a second session at a second, different, computerized service; if the parameters of the first sensorimotor control loop match the parameters of the second sensorimotor control loop, then determining that the first user and the second user are the same person. In some embodiments, estimating the parameters of the sensorimotor control loop comprises: estimating parameters of a sensorimotor control loop which comprises sensory organ, muscle, and brain. In some embodiments, the process comprises: based on the monitored pointing device dynamics and gestures of said user, estimating both movement agility and movement dexterity of said user; based on both the estimated movement agility and the estimated movement dexterity of said user, differentiating between said user and another user interacting with said computerized service.

The present invention may include, for example, systems, devices, and methods for detecting identity of a user of an electronic device, and for determining whether or not an electronic device is being used by a fraudulent user; as well as for determining identity of a user based on motor-control loop model.

In some embodiments, a method comprises: during a first session of a user who utilizes a pointing device for interacting with a computerized service, monitoring the pointing device dynamics and gestures of said user; based on the monitored dynamics and gestures, estimating parameters that characterize a sensorimotor control loop model of said user; storing in a database a record indicating that said user is associated with said parameters that characterize the sensorimotor control loop model of said user. In some embodiments, the method comprises, in a subsequent session of interaction with said computerized service: monitoring pointing device dynamics and gestures of a subsequent user; estimating current parameters that characterize a sensorimotor control loop of said subsequent user; comparing the current parameters to said record of parameters, and based on results of said comparing, determining whether said subsequent user of the second session is the same person as said user of the first session.

The present invention may include a non-portable system (e.g., for desktop computers or for non-portable computing devices) and/or a mobile or portable system (e.g., for mobile devices, smartphones, tablets), which may utilize multimodal passive-biometric integration of algorithms (e.g. kernel-SVM, random forests classification, machine-learning algorithms, non-machine-learning algorithms) applied on features of behavior (e.g., curve features, affine transformation of x-y space, motor control theory based features, as well as keyboard and mouse synergy such as the time interval between mouse move and keyboard typing). The systems may actively challenge (interact with) the user unconsciously, thereby allowing active sensing of biometric traits or user-specific traits (e.g., to deduce user-specific traits of hand-eye coordination), thereby enabling detection or confirmation of user identity, or confirmation that a user is indeed the genuine user (e.g., the account owner), or detecting that a user is estimated to be a non-genuine user or a "fraudster" or cracker or hacker or imposter or illegitimate user.

The passive solution is demonstrated herein in the context of fraud preventing of a remote access application, for example, accessing a bank account or brokerage account over a wired or wireless communication link (e.g., Internet connection, cellular link, Wi-Fi link, WAN, LAN, or the like). A first method may extract unique cognitive motor parameters; whereas a second method may extract unique behavioral, physiological and/or anatomical parameters. Their combination may allow biometric accuracy for continuous user authentication.

In accordance with the present invention, a first demonstrative method may extract and utilize user-specific traits that relate to sensorimotor control (or, motor control) of a pointing device (e.g., a mouse). The sensorimotor control system is affected by several factors, including, for example, anatomical features, the system's noise level and previous sensorimotor events. As a result, internal representations of the action-perception loop may differ between users. The method may capture parameters of the action-perception loop in a task that involves usage of the pointing device. These parameters cover, for example, the motor and sensory noise, the control loop parameters, or the like. It is clarified that the discussion herein may utilize, interchangeably, terms such as "motor control", "motor control loop", "motor control loop model", "sensori-motor control", "sensori-motor control loop", "sensori-motor control loop model", and/or similar terms (e.g., motor-control-related parameters, functions, equations, calculations, or the like).

By estimating the user's specific sensorimotor control parameters, the system may extract user's traits which are more inherent and less task-dependent. In a demonstrative model, a movement starts at rest in (X0, Y0) and ends at rest in (X1, Y1), where x and y represent the horizontal and vertical components of the position of a cursor on a screen, respectively. In some embodiments, a control loop (e.g., of the second order) may assume that the force of the hand on the mouse, may be governed by a linear combination of two components (or two terms): the translation error (the distance to the target), and the current velocity.

The translation error (in the x axis) at time (t) may be represented using Equation (1):

$$\Delta x = (x_1 - x(t)) \qquad (1)$$

The current velocity for the x-axis, Vx (and similarly, Vy for the y-axis) may be represented using Equation (2):

$$v_x = \frac{d}{dt}x(t) \qquad (2)$$

Three control loop features, regarding the hand's displacement along the x-axis (and similarly, for the y-axis) may be extracted using Equation (3):

$$\frac{d^2 x(t)}{dt^2} = \alpha_x \Delta x + \beta_x v_x + n_x \qquad (3)$$

In Equation (3), $\alpha_x$ and $\beta_x$ are loop parameters; and $n_x$ is the sensorimotor control noise (e.g. Gaussian random variable).

Accordingly, the system may simulate trajectories which may be similar to human traits.

The Applicants have generated illustration of charts which demonstrates characteristics of control loops that may be determined and/or estimated in accordance with some demonstrative embodiments of the present invention. Each chart describes two hand/mouse movements, represented by solid and dashed lines. Two charts correspond to a first user ("User-A"), whereas two other charts correspond to a second user ("User-B"). Charts may demonstrate a screen cursor displacement in two dimensions, x and y, resulted by the movement; whereas other charts demonstrate the current hand/mouse velocity, as a function of time. The charts may demonstrate a second order control loop of two different users, characterized by different control loop and noise parameter values.

Although the velocity curve (e.g., in the second chart) may be different for each movement (e.g., solid vs. dashed lines), it may be generated by the same model parameters. By estimating these parameters, the system may distinguish between a genuine user and an intruder or fraudster or imposter, regardless of the specific movements actually performed in a specific session; as demonstrated by a comparison of "User-A" and "User-B" in the charts, generated by different control loop and noise parameters values.

This demonstrative model may be extended to take into account other models of sensorimotor control, including forward and feedback models. For example, if the error terms are distorted by a non-linear function, such as sign(x)

$\sqrt{|x|}$, then the system may achieve different properties of movements such as synchronized peak velocities for different movements.

In accordance with the present invention, the motor traits of each user may be modeled and/or detected, thereby building a model which corresponds to each user and represents motor traits of that user. In some embodiments, for example, a motor model may be built for each user based on hand movements and/or gestures of the user within K sessions (e.g., K may be equal to 1, or 2, or 5, or 12, or 40, or other positive integer, indicating the number of previous sessions). Then, in a subsequent session, actual motor behavior of a tested user may be captured and compared to the previously-modeled motor behavior of that user. If the currently-captured motor behavior corresponds to the pre-calculated user-specific model, then the system may determine that the current user is indeed the genuine user. In contrast, if the currently-captured motor behavior does not correspond to the pre-calculated user-specific model, then the system may determine or may estimate that the current user is not the genuine user, and may generate an alert or alarm, may send notification(s) to relevant personnel or administrators, and/or may require the user to perform additional security tasks (e.g., to contact a customer service or fraud department by phone, to utilize two-factor authentication, to answer one or more pre-defined security questions, or the like).

A demonstrative experiment has collected input from N=64 users, each user performing approximately m=40 virtual bank transactions on a demonstration website. For each mouse stroke, the system extracted several user-specific features (including sensorimotor control related features) and calculated an estimate of the parameters of the linear model presented above. The system ranked the features using the random forest machine learning algorithm. The sensorimotor control related features were among the best user-specific features for detecting and/or confirming user identity.

The Applicants have generated a chart demonstrating some of the experiment results in accordance with the present invention. Each one of three symbols represents a different user. The chart demonstrates the space of $\beta_x$ and $\beta_y$, averaged over the different strokes in a session (the average number of strokes is per session approximately 50). The chart demonstrates a clear discrimination potential among three users (depicted by utilizing three colors or three different symbols), and further demonstrates the system's ability to uniquely identify each user according to his or her cognitive behavioral profile.

In accordance with the present invention, hand or cursor trajectories may be used to extract or estimate biometric parameters or user-specific information. Some conventional methods attempted to extract user-specific features that were based on direct measures of the trajectory, such as the perpendicular error; the limitation of these methods is that the less the environment is controlled, the more the user's activity is heterogeneous and thus the within subject variability of some features is high. The present invention utilizes the theory of sensorimotor control of movement for improved model-based biometrics and user-specific feature extraction, which may be a robust, task independent description of a user's interaction with a computer, a computing device, an electronic device, a mouse, an input unit, or the like, and may also predict movement dynamics in a new environment (e.g., a new application or website or web-page that the user did not access before) and/or under an intentional (undetected) distortion of the relationship between the positions of hand and the cursor (e.g., visuo-motor rotation). The present invention may allow to predict the behavior of a particular user under a rotation distortion, given a trained model of the user's sensorimotor control parameters.

The present invention may identify or detect that a user is attempting to pose as another user. Different users are likely to have different motor-control related characteristics. Therefore, different users are likely to move differently their hand, when controlling an electronic device. By modeling and estimating the motor and cognitive characteristics of a user, and by utilizing these characteristics to test a new set of data (e.g., an attempt to log in to a email account) the system may detect a fraud or a possible fraud, e.g., a fraudster attempting to interact with a website that a genuine user had accessed before and that the system had already built a sensorimotor control model for the genuine user.

The present invention may address attempts to falsify an identity. If a "bot" or automated program or scripts attempts to falsify identity of a human user, it is expected to move the cursor or pointer differently than humans in general, and differently than the specific genuine user in particular. By extracting the sensorimotor control parameters of a current interaction session, the system may detect suspicious non-human activity, posing as a genuine human user. Moreover, if a fraudster opens multiple accounts, he or she may be over-trained with the target application (or website, or web-page), thereby having a dedicated trained sensorimotor control loop for the target application (or website, or web-page); and this in turn might be detected as suspicious activity. It is noted that the present invention may avoid capturing any personally identifiable information (PII) while extracting and/or utilization of biometric (or user-specific) features.

The present invention may utilize motor-control related modeling and analysis, in order to extract user-specific traits. Instead of, or in addition to, searching for repeated patterns in user interactions within an application, the present invention may utilize a comprehensive approach which synergizes system identification, a control-engineering discipline, sensorimotor control related features, and a cognitive-science discipline, thereby allowing the system to "reverse engineer" the process in order to find individual parameters for biometric purposes. This may enable robustness and improved performance, as well as the ability to predict user-specific patterns of movement under new environment, e.g., as challenge-response.

In accordance with the discipline of control engineering, the present invention may utilize system identification (SI) and statistical methods to build mathematical models of dynamical systems from measured data corresponding to user interactions or gestures. The system estimates the parameters of a sensorimotor control model which describes the action-perception loop of the hand-eye coordination in mouse and touch dynamics, by using SI techniques. For example, the system may extract the motor and sensory noises and the control loop parameters, which may be used for building a biometric profile.

The system may measure each feature independently for both axes (x-axis and y-axis), and may also measure several statistics over it, e.g., mean, standard deviation, range, maximum, minimum, kurtosis, skewness, quantiles, or the like. The sensorimotor control model accuracy may be improved by testing higher orders and linear-non-linear transformation to encapsulate non-linear effects (e.g., based on Fitt's law).

In accordance with the present invention, an experiment was held with 200 anonymous users who were directed to a virtual yet realistic bank account management website. To demonstrate the concept of reverse engineering of a motor control loop, a user moves the cursor from initial location X0 to target position X1 (generalization may be performed, to two dimensions).

The system ranked the features using Random Forest Classification, and yielded motor-control features which were in the top ten list of best features.

An experiment showed that applying system identification (SI) techniques on a motor control model of movement may produce highly robust features, which are not based merely on the specific movement statistics, but rather, are based on a generative model which encapsulates cognitive human traits or other user-specific traits.

In accordance with the present invention, another demonstrative embodiment may monitor, identify, and utilize Inter and Intra Application Usage Stream or interaction stream. The system may capture the user's application usage behavior, by monitoring and tracking the sequence and time span of each application screen or web-page (inter-page sequence), as well as navigation order and time span between the user-interface elements within each screen or web-page (intra-page sequence). The system may capture the user's application usage behavior, by monitoring and tracking the user page-specific intra-page behavior, such as, order of navigation between fields (text input, buttons, select-boxes, or the like), angle and/or velocity of entering and exiting each field, average or typical time spent in each field, location of mouse clicks within each field (e.g., right-side, center, left-side), or the like. The system may condition behavioral biometric traits (e.g., mouse movements, mouse clicks, keystrokes) on the application and task; thereby reducing the heterogeneity in behavior due to the actual software application in use.

The Applicants have generated a map demonstrating utilization of user-specific usage stream model, in accordance with the present invention. Each one of external circles represents an application or a website (or, a specific page in an application or website). Each one of inner circles represents a user-interface (UI) element (e.g., a dialog box, a drop-down menu, a radio button, a checkbox, a field in a form, a "submit" button, a button, or the like). Each transition is characterized by an associated transition probability. Moreover, each state, whether external or internal, is also characterized by the time duration.

The system may model the behavior as a hierarchical fully observed continuous-time Markov chain, where each state is represented by a page in the first level and an element in the second level. Optionally, some embodiments may extend the model to semi-Markov chain, or Markov renewal process.

The user profile may be characterized by the initial distribution to start with: State $x_0(Pr(x_0))$, the transition probability matrix to move from state $X_{t-1}$ to state $X_t$ ($Pr(X_t|x_{t-1})$) and the distribution of time duration $T_t$ given the current state and possibly the previous state: $Pr(T_t|x_t, x_{t-1})$. These statistics may be estimated from a supervised training set.

When a new session is observed, the system may compare the observed Markov chain with the empirical expected model by a statistical test; for example, by measuring one or more of: the $\chi^2$ test of goodness of fit (GOF), the exact goodness of fit, and/or the likelihood or the log ratio test between the hypothesis that the session belongs to the (declared) user and the hypothesis that it is not. Similarly, the system may compute the GOF of the observed mean duration per page and the GOF of the session length. The first may be done, for example, by the likelihood of an exponential model, or by computing a two-sample Kolmogorov-Smirnov test.

In accordance with the present invention, different users navigate differently between applications (or websites), and within an application (or within a website). For example, some users utilize the Alt-Tab key combination in Windows, or shift between browser tabs, more often than other users do. Within an application or webpage, some people use some UI elements more than others. For instance, in a banking website or web-page or application, users perform different tasks and have different task control-flow (e.g., firstly checking the current balance, then making a payment; or, firstly checking online messages, then checking debits, then checking credits). For example, User-A may typically check his account balance, and only then perform an online payment to a utility company; whereas User-B may typically review a snapshot of her account, then read any waiting messages, and only then perform an online payment. Even if multiple users have the same working flow, they may spend different time periods in different applications (or application pages, or application segments) or user-interface elements. For example, User-A typically spends approximately 3 to 5 seconds reviewing his bank account balance; whereas User-B typically spends approximately 18 to 25 seconds reviewing her bank account balance.

The Applicants have generated a graph chart demonstrating experiment results in accordance with the present invention. In a demonstrative experiment, information was collected from 30 participants reading a web-based news site. The system collected the time duration and page name of the main site categories (e.g., sports, science, politics). The graph chart depicts the experiment results, demonstrating receiver operation curve (ROC) of page stream analysis in that news website. The horizontal axis (denoted FP) represents False Positive Error; the vertical axis represents True Positive value. The curved graph line 401 indicates the ROC curve, or indicates that the decision by the above analysis that the user is genuine is statistically significant; compared to the straight graph line 402 which indicates 50% chance to make a mistake or to give a true answer, or which indicates 50% chance by pure guessing that the user is genuine (or not genuine).

The present invention utilizes a high level of behavioral-based biometric parameters corresponding to application usage flow (or website usage flow, or web-page usage flow, or service usage flow), instead of (or in addition to) utilizing low-level motor behavior of mouse dynamics and/or keystroke dynamics. Optionally, the present invention may condition the low-level motor behavior to specific application usage, e.g., how do users behave when they perform a certain task in a certain application. Some behavioral biometric measurements of keystroke and/or mouse dynamics may be critically dependent on the application or task within an application (e.g., typing speed in a spreadsheet application versus a word processing application). By closely monitoring the application changes, the system may build and update an interaction behavioral model which is task-dependent and/or application-dependent. Integrating a general non-application-dependent biometric model with application-depended models may further increase biometric performance.

The present invention may identify a "fraudster" or imposter or a user attempting to pose as another individual, or trying to "spoof" the system. An imposter would need to replicate the genuine user patterns of activity, including time span at each application window (or web-page, or web-section) and user-interface element. This may be highly unlikely, and may be very difficult for a fraudster (or for an automatic script) to know or to predict or to imitate. By combining signal processing and learning algorithms, the system may generate a specific model for each genuine user and test new samples of interaction for their "goodness of fit" with the pre-trained model or the previously-generated model (e.g., built based on previous interaction sessions of that logged-in user). Furthermore, false or fake identity derived from automated scripts or software is likely to have a regular transition rate with small variance, which is not typical to humans; and therefore, detecting this type of fraudulent activity may also be possible. In some embodiments of the present invention, no personally identifiable information (PII) needs to be collected or stored in order to allow the biometric modality to function.

The present invention may include a system. At an overview, for example, a desktop client may run as a Microsoft Windows service, and may communicate with a provided Application Programming Interface (API) and with a server using REST calls or other suitable bindings. The connector subscribes to key/mouse/application events, and dispatches the events towards or among multiple (e.g., four) receivers or receiver modules. Each of the receiver modules internally buffers the data, as some of the features examined are activity-window related (as opposed to single-stroke related). The receiver modules periodically generate new keys. The rate of the generation may be based on the rate of fresh-data flow. The keys may be delivered to the encoder, which encrypts and stores them in storage (e.g., volatile or non-volatile storage). The messaging module may reliably transmit these keys to the server, and may receive trust-level indicators in the responses, which may be reported back via the API. Other suitable architectures may be used.

For example, the system may comprise an API connector which may interface with a service, a software, an application, a web-based service, a browser-based service, a server-side service or application, a client-side service or application, a web-site, or the like. API connector may have access to mouse dynamics, keystroke dynamics, UI and GUI elements displayed and/or used, the particular pages or regions of the application that are being used, and/or other data. API connector may transfer keystroke data to keyboard receiver module; API connector may transfer mouse strokes data to mouse receiver module; API connector may transfer key and mouse strokes data to session stream receiver module; API connector may transfer session state and context data to session stream receiver module. Other suitable receiver modules may be used.

Keyboard receiver module may comprise, for example, a typing dynamics module able to analyze or determine user-specific characteristics or traits of typing dynamics; a semantics/formatting module able to define the context of which the keystrokes being inserted; an activity window statistics module able to collect and/or aggregate statistic data about the activity window relative to the monitored keystrokes; and a usage patterns module able to identify other suitable user-specific usage patterns that may be derived from analysis of keystrokes. Keyboard receiver module may output a set or batch, of one or more biometric or behavioral traits, that are user-specific and correspond to the particular user interacting via the keyboard in the particular current session being monitored. The output feature (s) may be transported to a features encoder module.

Mouse receiver module may comprise, for example, a mouse strokes dynamics module able to analyze and/or determine user-specific traits based on the captured or monitored mouse strokes dynamics; and an activity window statistics module able to collect and/or aggregate statistic data about the activity window relative to the monitored mouse dynamics. Mouse receiver module may output a set or batch, of one or more biometric or behavioral traits, that are user-specific and correspond to the particular user interacting via the mouse in the particular current session being monitored. The output feature(s) may be transported to the features encoder module.

Patterns receiver module may analyze the monitored user interactions in order to identify and/or detect user-specific behavioral traits; for example, by utilizing in-field and between-field navigation module able to detect a pattern of in-field navigation and/or between-field navigation (e.g., performed with the mouse, or performed with the Tab key); by utilizing a desktop and application usage pattern module able to detect a usage pattern in the application, such as, online banking, e-commerce, healthcare, email, social networks, etc. Patterns receiver module may output a set or batch, of one or more biometric or behavioral traits, that are user-specific and correspond to the particular user utilizing the particular application (or service, or software, or website, or web-page) in the particular current session being monitored. The output feature(s) may be transported to the features encoder module.

Session stream receiver module may receive session state and context data, and may detect user-specific behavioral traits related to the session stream of the particular user being monitored in the current particular interaction session. For example, a desktop session trace module may monitor and detect the session trace in a desktop application; and an in-application session trace module may monitor and detect the in-application usage trace. The session stream receiver module may determine, for example, that the user checked her account balance before making an online payment; or, that the user reviewed past orders before placing a new order; or, that the user checked her inbox messages before performing a wire transfer. Such user-specific behavioral traits may be transferred to the features encoder module (e.g., for further comparison with previously-captured user-specific behavioral traits).

The features encoder may utilize short-term memory to temporarily store the received inputs. The features encoder may encode or translate the received inputs into a pre-defined format that allows efficient transport of the extracted behavioral features to a remote server, using a messaging layer and a transport element (e.g., a wired or wireless communication link or transceiver).

Server may receive the encoded user-specific features, together with data indicating which user is currently being monitored (e.g., based on his username, or based on data corresponding to his username); and may retrieve from a database or a storage unit previously-stored record(s) for that particular user, indicating previously-stored user-specific features or patterns. The server may compare the currently-captured behavioral traits, to previously-captured or typically-identified traits of that particular user; and may generate one or more response indicator(s), which may be sent back via the messaging layer and may then be transported back to the service or software being used by the user via the API connector.

For example, server may determine that in the currently-monitored interaction session, the current user moves between fields by using mouse clicks; whereas, in all or in 90 percent (or another threshold percentage) of past interactions that correspond to the currently logged-in user, movement between fields was performed with the Tab key on the keyboard; and thus, server may send back a response indicating "possibly fraudulent interaction", which may be used (by itself, or by taking into account other responses for that user) to trigger further actions (e.g., to block the currently logged-in user from performing subsequent operation, or a certain type of operations, or to require the user to contact customer service via phone, or the like).

In another example, server may detect that the currently-monitored logged-in user is accessing the wire transfer section of a banking website, immediately after logging-in; whereas, in previous interactions of that logged-in user, the user had always (or had typically) checked the account balance and checked incoming messages before accessing the wire transfer section. Accordingly, server 555 may send back a "suspicious activity" response that may trigger further user-authentication steps or may impose certain usage restrictions which may be lifted if the user performs additional authentication measures.

The system may comprise components and/or software modules, able to perform operations, estimations, calculations and/or other tasks as described above, in order to implement the functionalities of the present invention. The system may comprise, for example: a pointing device that a user may utilize in order to operate (or interact with) an electronic device and/or to access a system or a service; a pointing device monitoring module able to monitor and/or track and/or capture, for example, dynamics and/or gestures related to the pointing device; a control loop estimator (or a control loop model estimator) able to estimate or calculate or determine values of parameters that characterize a control loop (or a control loop model) of a user, based on monitored point device dynamics and/or gestures; and a database to store records indicating association among users (e.g., logged-in users, and/or non-logged-in users) and their respective control loop models (or the values of the parameters of their control loop models).

The system may further comprise: a comparator/matching module able to compare (or match) current values of control loop model of a current user, to previously-stored values of control loop model(s) of one or more previous sessions and/or user(s); a user identity determination module able to determine or to estimate, based on the results of control loop model parameters comparison, whether or not a current user is the same person as a previous user; a fraud mitigation module able to perform one or more fraud mitigating steps based on a determination that a current user is not, or may not be, the genuine user (e.g., by requiring the current user to respond to a challenge, to answer security question(s), to contact customer service by phone, to perform two-step authentication or two-factor authentication, or the like).

The system may further comprise: a translation error estimator able to estimate a translation error parameter associated with a user; a velocity estimator able to estimate velocity of dynamics and/or gestures of a user; a motor control noise estimator able to estimate a motor control noise of a user; an x-axis biometric feature estimator able to estimate a biometric feature or trait of the user along the x-axis based on monitored point device dynamics and/or gestures; a y-axis biometric feature estimator able to estimate a biometric feature or trait of the user along the y-axis based on monitored point device dynamics and/or gestures; a combined x-y axes biometric feature estimator able to estimate a biometric feature or trait of the user along a combination (e.g., a complex combination) of the x-axis and the y-axis, based on monitored point device dynamics and/or gestures; and a statistics-based biometric feature estimator able to estimate a user-specific biometric feature by calculating a statistics function applied to the x-axis control loop and/or the y-axis control loop (or to a combination thereof), for example, able to apply mean, standard deviation, range, maximum, minimum, kurtosis, skewness, quantiles, or other function(s).

The system may comprise, for example: a pointing device; a pointing device monitoring module; a keyboard allowing a user to input keystrokes; a keyboard monitoring module to monitor and/or track and/or store keystrokes entered by the user; a state-and-context identifier module able to identify and store the state and/or the context of a service or web-site or web-page or application, corresponding to a particular keystroke or a particular set of keystrokes, and/or corresponding to particular pointing device dynamics and/or gestures; a UI elements identifier module able to identify and store the UI or GUI elements that are displayed to the user and/or are utilized by the user; a user-specific trait generator to generate a user-specific trait or parameter value, indicating a user-specific service usage pattern; a user-specific inter-application usage pattern identifier module to estimate or calculate a user-specific inter-application usage pattern; and a user-specific intra-application usage pattern identifier module to estimate or calculate a user-specific intra-application usage pattern.

The system may further comprise: a frequent interaction type detector to determine whether a particular user more frequently utilizes the pointing device or the keyboard in order to perform a particular type of interaction with a service; a form fill-out type detector to determine whether a particular user more frequently utilizes the pointing device or the keyboard in order to fill-out a particular form of a service (or a particular field of the service, or a particular data item of the service); a form submission type detector to determine whether a particular user more frequently utilizes the pointing device or the keyboard in order to submit a particular form of a service; and a cursor movement type detector to determine whether a particular user more frequently utilizes the pointing device or the keyboard in order to move the cursor within a service (e.g., among fields or among data items of the service).

The system may further comprise: a data pasting type detector to determine whether a particular user more frequently utilizes the pointing device or the keyboard in order to perform a data paste operation in a particular form (or a particular field) of a service; a paste-or-type detector to determine whether a particular user more frequently pastes data into a particular field or, alternatively, more frequently types data into that particular field; an inter-application usage monitoring module to determine a user-specific inter-application usage pattern by monitoring and detecting that a particular user, in most of his/her interactions with a particular service, performs a first particular action prior to preforming a second particular action; an inter-application page-sequence monitoring module to determine a user-specific page-sequence within a service or website, by monitoring and detecting that a particular user, in most of his/her interactions with a particular service or website, visits a first particular page prior to visiting a second particular page; and an inter-application time-spent monitoring module to determine a user-specific inter-application time-spent trait, by monitoring and detecting that a particular user, in most of his/her interactions with a particular service or website, spends a first time-period at a first section (or web-page) of the service, and spends a second (different) time period at a second section (or web-page) of that service.

The system may further comprise: a field monitoring module to monitor field(s) in a computerized service and to generate (in coordination with module(s) described herein) a user-specific field-usage pattern associated with each field of that service; for example, monitoring and/or taking into account one or more of: (a) a mouse angle of approach to the field, (b) a mouse angle of exit from the field, (c) velocities of mouse approach and mouse exit, (d) time period spent within the field, and/or (e) location of a mouse click event within the field. The system may further comprise a user-specific field-usage pattern estimator to determine a user-specific field-usage pattern based on the monitored field(s) and interactions.

The system may further comprise, for example, a database able to store the above-calculated parameters or traits or user-specific features, with the user to which they correspond; a comparator/matching module able to compare (or match) currently-calculated features of a current usage session, with previously-stored features of a previous usage sessions (or multiple previous usage sessions); a user identity detection module to determine, based on the comparison results, whether or not the current user is the same as a previous user (or is the genuine user); and a fraud mitigation module able to perform one or more fraud mitigating steps based on a determination that a current user is not, or may not be, the genuine user.

The components and/or modules of the system(s) may be co-located, or may be distributed over multiple locations, multiple devices, a "cloud computing" service or system, a system utilizing client/server architecture, a system utilizing peer-to-peer architecture, or other suitable implementations. System(s) may be implemented by using, for example, a processor, a processor core, a Central Processing Unit (CPU), an Integrated Circuit (IC), a logic circuit, a controller, memory units, storage units, input units, output units, wireless communication units (e.g., wireless transceiver), cellular communication units (e.g., cellular transceiver), wired communication units and/or links, or the like.

Some embodiments may characterize a user based on (a) the combination or assembly of motor-based units or motoric units (or motor-based elements, or motoric elements), and/or the particular user-specific sequencing and/or ordering and/or timing in which such motoric units are activated. The motoric units may be regarded as the "building blocks" of the motoric system of the human user. A motoric unit may comprise one or more muscles, nerves, cells, and/or other body parts that may be able to move, contract, shrink, expand, stretch, or otherwise modify their properties. For example, activation of a rapid motoric unit may cause application of force (e.g., movement) or other reaction within a short time period (e.g., within 20 or 50 or 75 milliseconds, or within the range of 10 to 80 milliseconds); whereas, activation of a slow motoric unit may cause application of force or other reaction within a longer time period (e.g., after at least or 100 or 150 milliseconds).

Different humans may have different muscle profiles or bodily profiles, inherited or genetic profiles, different motoric coordination, different ability to activate and deactivate particular motoric unit(s) within certain timing or ordering or sequence, and/or other user-specific characteristics related to motoric units, which may be extracted or estimated by the present invention and may be utilized for user identification purposes, user authentication purposes, fraud detection purposes, or the like.

In a demonstrative implementation, a movement or a user-interaction with an electronic device or an input unit, may be captured or monitored, and may be divided into short segments (e.g., each segment corresponding to 20 or 30 or 40 or 50 milliseconds). Segments, or batches or sets of segments, may be analyzed and/or compared, or may be represented as a histogram in order to identify user-specific patterns or traits. In one example, a first user may move the input device to the right, while slightly moving it also clockwise (or upwardly; or downwardly); whereas, a second user may move the input device to the right, while slightly moving it also counter-clockwise (or upwardly; or downwardly). Such user-specific traits may be estimated and/or detected, and may be utilized for distinguishing or differentiating among users (e.g., a genuine user versus a fraudulent user).

The Applicants have generated charts of histograms of segments, in accordance with some demonstrative embodiments of the present invention. The vertical axis in each chart may indicate the percentage out of all movements (or segments) recorded for a certain type of movement (e.g., horizontal movement of the input device to the right). The horizontal axis in each chart may indicate the angular deviation between segments; such that, for example, positive values indicate a clockwise movement or deviation; whereas, negative values indicate a counter-clockwise movement or deviation. A first chart may correspond to User A, and a second chart may correspond to User B. The system may detect that User A typically performs a slight counter-clockwise movement of the input device, when moving the input device horizontally to the right; whereas, User B typically performs a slight clockwise movement of the input device, when moving the input device horizontally to the right. This may be used for user identification, user authentication, fraud detection, or other purposes.

A third chart may correspond to User C, and a fourth chart may correspond to User D. The variance in each chart may be calculated, in order to extract user-specific traits related to the sequencing, timing and/or ordering of movements (or segments), which may indicate the user-specific coordination skills. For example, even though the third and fourth charts may not show a clear skew of clockwise or counter-clockwise movement, the third and fourth charts may demonstrate that User C and User D have different coordination skills or different coordination sets; and such user-specific patterns may be used for user identification, user authentication, fraud detection, or other purposes.

The Applicants have generated is a schematic chart representing coordination index and muscular profiles of four different users, in accordance with the present invention. For example, the user-specific muscular profile may be deduced or estimated; and the user-specific coordination index may be deduced or estimated. The horizontal axis may correspond to the muscular profile; whereas the vertical axis may correspond to the coordination index. Four different users (denoted User 1, User 2, User 3, and User 4) may have different estimated values of muscular profile and/or coordination index, thereby "placing" such four users in different locations or regions of the chart; and allowing to differentiate or distinguish among users, for user identification, user authentication, fraud detection, or other purposes.

Some embodiments may utilize a combination of one or more user-specific Physical Biometric (PB) features and/or one or more user-specific Cognitive Biometric (CB) features and/or one or more user-specific Behavioral Biometric (BB) features, which may be estimated or extracted, and then utilized for purposes of user identification, identity verification, fraud detection, fraud mitigation, differentiation or distinguishing among users, or other purposes. In the following discussion, a User Activity Window (UAW) may indicate all the movements of the input unit (e.g., all mouse movements and/or mouse clicks) during a usage session or during all usage sessions of a user; and a Stroke may indicate a part of the UAW. For example, the UAW may be divided into multiple strokes (or interaction elements, or interaction units), based on one or more events or triggers or conditions, such as: movement to another direction in a large angle (e.g., greater than 45 degrees); a long pause (e.g., greater than 200 or 300 or 400 milliseconds); a mouse-click or double-click (or, a drag-and-drop operation may be regarded as a single stroke); mouse-pointer is moved "out of" the screen or active window; or other criteria for division into strokes. Furthermore, a stroke may optionally be divided into stroke-parts, corresponding to "smooth" portions or parts of that stroke; although, in many cases, a stroke comprises a single smooth part which is the entirety of that stroke. In a demonstrative implementation, the following user-specific biometric traits may be extracted and then utilized, individually and/or in various combination(s) with each other.

A demonstrative user-specific biometric trait may comprise estimation of the user's arm length (PB-1): For long and straight or nearly-straight parts of a stroke, which are mostly along the X-axis, calculate the average radius of curvature; and average over the all strokes in the UAW.

A demonstrative user-specific biometric trait may comprise estimation of the user's wrist length (PB-2): For short parts of a stroke which are mostly along the X-axis, calculate the average radius of curvature; and average over the all strokes in the UAW.

A demonstrative user-specific biometric trait may comprise estimation of the user's (a) wrist range/flexibility of movement and (b) agility, to the right side (PB-3): For short parts of a stroke going right which are mostly along the X-axis, calculate the length of the part (for range) and the average speed, acceleration, deceleration and jerk along the part (for agility); and average over the all strokes in the UAW.

A demonstrative user-specific biometric trait may comprise estimation of the user's (a) wrist range/flexibility of movement and (b) agility, to the left side (PB-4): For short parts of a stroke going left which are mostly along the X-axis, calculate the length of the part (for range) and the average speed, acceleration, deceleration and jerk along the part (for agility); and average over the all strokes in the UAW.

A demonstrative user-specific biometric trait may comprise estimation of the user's dexterity of Fine Motor Skills (PB-5). For strokes that end in click on a web-page field: the ratio of stroke length to direct path, speed and angle change at the target (large speed change and shorter correction means more accuracy and dexterity), start speed, acceleration, deceleration and jerk; the system may combine some or all of these parameters to generate a measure of dexterity. Additionally or alternatively, with disturbances: Disabled button, Input field focus loss, moved target (and more) disturbances, forces the user to repeat her access to the button or change speed and angles of approach, thereby allowing again to measure or estimate dexterity.

A demonstrative user-specific biometric trait may comprise estimation of the user's fingers range of movement (PB-6). For short parts of a stroke which are mostly along the Y-axis, calculate the length of the part; average over the all strokes in the UAW.

A demonstrative user-specific biometric trait may comprise estimation of the user's mouse-wheel finger range of movement (PB-7): Find (a) maximal number of pixels scrolled by consecutive wheel events, and (b) maximal consecutive number of wheel events with no pause longer than a pre-defined value (e.g., 50 or 100 or 150 or 180 milliseconds).

A demonstrative user-specific biometric trait may comprise estimation of the user's elbow position (PB-8): Estimate whether or not the user's elbow is in the air (or is resting on a desk or table), by estimating variance of the length, speeds and acceleration is short parts of strokes going left and/or by estimating variance of the length, speeds and acceleration is short parts of strokes going right.

A demonstrative user-specific biometric trait may comprise estimation of the user's left-handedness or right-handedness (PB-9): Estimate whether the user is right-handed or left-handed, based on input unit interactions. For example, right-handed users may have stronger movement to the left than to the right; whereas left-handed users may have stronger movement to the right than to the left. Without disturbance, the system may estimate and compare (a) speed, acceleration, deceleration and jerk to left, with (b) speed, acceleration, deceleration and jerk to right, with regard to short parts of strokes and/or for long parts of strokes; or may otherwise compare the left and right agility, or the ratio of the average speeds and accelerations in PB-3 and PB-4. Additionally or alternatively, introduce a disturbance in which the mouse-pointer is stuck or disappears, and determine right-or-left handedness based on the direction of the oval or ellipse or circle that the user performs as a movement to find or refresh the mouse-pointer.

A demonstrative user-specific biometric trait may comprise estimation of the user's eye-hand coordination model, and/or eye-hand cognitive correction model, and/or eye-hand feedback model (CB-1), by estimating parameters of the user's motor control loop.

A demonstrative user-specific biometric trait may comprise estimation of the user's accuracy in reaching an on-screen target by utilizing an input device (CB-2); for example, as discussed above with reference to biometric trait PB-5.

A demonstrative user-specific biometric trait may comprise estimation of the user's eye saccades and/or smooth pursuit models (CB-3). For example, a stream of clicks of dragging of the mouse-pointer may be analyzed, and optionally, images or video from a front-facing camera of the electronic device may be analyzed, in order to estimate unique user-specific features of eye gazes or saccades of the user eye(s). Additionally or alternatively, the smooth pursuit user-specific features, allowing the user's eye(s) to closely follow a moving object, may be tracked and estimated based on similar data.

A demonstrative user-specific biometric trait may comprise estimation of the user's eye-hand coordination model (CB-4); for example, by using CB-2 and/or PB-5. Additionally or alternatively, a disturbance or interference may be introduced or injected to the user experience, such as, a rotation disturbance, allowing the system to measure how well (and/or how rapidly) the specific user compensates for such disturbance. Optionally, a compensatory-tracking task may be introduced, optionally disguised as a short-term interference or disturbance (e.g., without the user knowing that this is actually a challenge measuring his/her eye-hand coordination).

A demonstrative user-specific biometric trait may comprise estimation of the user's awareness (CB-5); for example, by calculating the time that is required for the specific user to process information when the page is loaded, and/or when the page is updated (but not reloaded). Additionally or alternatively, an interference may be introduced (e.g., the mouse-pointer may be disappeared or may become "stuck" or non-responsive), and the system may measure how long it takes the user to find out that something is "wrong" with the mouse-pointer, and/or how long it takes the user to find out that the mouse-pointer is operating "normally" again (e.g., the interference being removed).

A demonstrative user-specific biometric trait may comprise estimation of the user's reaction time(s) to various events (CB-6). For example, without introducing an interference, the system may calculate the time required for the specific user to process event(s) when page is loaded, and/or when the page is updated (and not reloaded). Additionally or alternatively, similarly to CB-5, the system may introduce an interference or disturbance and measure the user's reaction, for example, which type of reaction, direction of reactive movement, number of clicks in reactive action, properties of the reaction such as movement in circle or oval or straight line(s) or other shapes, the time length of such reaction, how long it takes the user to initiate the reaction and/or to perform the corrective action and/or to detect that the interference was removed, or the like; for example, reaction to the mouse-pointer or cursor becoming "stuck" or disappearing, or the "submit" button disappearing, or the like.

A demonstrative user-specific biometric trait may comprise estimation of the user's interactions in view of Hick's Law or Hick-Hyman Law (CB-7). For example, the system may introduce an interference which modifies the number of choices that are presented to the user on a page, allowing the system to estimate the parameter "b" in Hick's law, such that the processing time (T) is equal to $b \times \log_2 (n+1)$, where "n" denotes the number of equally probably choices. Additionally or alternatively, a visible Captcha mechanism may be used, and the system may modify the number of available choices and estimate the user-specific processing time or user-specific parameters in Hick's law equation.

A demonstrative user-specific biometric trait may comprise estimation of the user's interactions in view of Fitts's Law or Fitts' Law (CB-8). For example, the system may monitor the user's interactions to estimate the user-specific parameters that relate to the time required for that user to rapidly move to a target area, taking into account the distance and/or the target size. Some implementations may estimate one or more user-specific parameters in the Shannon formulation (or other suitable formula) for movement along a single dimension, for example, according to which, $T = a + b \times \log_2 (1+D/W)$; where T indicates the movement time; a indicates the intercept (the start/stop time of the input unit); b indicates the slope, the inherent 1/speed of the device; D indicates the distance from the starting point to the center of the target; W indicates the width of the target measured along the axis of motion.

A demonstrative user-specific biometric trait may comprise estimation of the user-specific page usage stream model (BB-1). For example, the system may calculate the probabilities to move from a first page to a second page (e.g., from a pre-defined list of given pages), by estimating a Markov chain model per website and per user.

A demonstrative user-specific biometric trait may comprise estimation of the web-page fields usage stream model (BB-2); for example, calculating the probabilities to go from one field to a second field (in a given list of fields in a form or in the complete website), by estimating a Markov chain model per website (and/or per form) and per user.

A demonstrative user-specific biometric trait may comprise estimation of the mouse-related behavioral patterns, for a specific form or web-page (BB-3). For example, for each user the system may collect the user's average angles of approach to each field, angles of exit from each field; speed, acceleration, deceleration and jerk of approach; speed, acceleration, deceleration and jerk of exit; location of clicks in each field (e.g., center, right-side, left-side); types of movement (Tab key versus mouse), Fitts' Law parameters, time of movement between specific fields in the form; and in input fields, the time from click or Tab key to start of text input and time from end of text input to first mouse event. Different users have different preferences which may be determined uniquely on per-user basis.

A demonstrative user-specific biometric trait may comprise estimation of the mouse-related behavioral patterns, for page fields or per a type of UI elements or GUI elements (e.g., select boxes, buttons, input fields, drop-down menu) (BB-4). For example, the system may measure the user's average angles of approach to each UI element, angles of exit from each UI element; speed, acceleration, deceleration and jerk of approach; speed, acceleration, deceleration and jerk of exit; location of clicks in each UI element (e.g., center, right-side, left-side); types of movement (Tab key versus mouse), Fitts' law parameters, time of movement between specific UI element in the form; in input fields, the time from click or Tab key to start of text input and time from end of text input to first mouse event. Different users have different preferences which may be determined uniquely on per-user basis.

A demonstrative user-specific biometric trait may comprise estimation of the user-specific preferences that are reflected in UI interactions (BB-5); for example, determining whether the specific user prefers to scroll with a mouse-wheel or with the arrow keys on the keyboard or with the scroll bar in the margin of the page or with the scroll line in the touchpad; usage of the Tab key or the mouse in order to move between fields or UI elements; use of the mouse or the Enter key to submit a form or a query; or the like.

Some embodiments may calculate, estimate and/or utilize one or more of the following user-specific features, or a combination of some of them: average speed of input unit movement (e.g., mouse movement); standard deviation of the speed of movement; the 10% percentile (or other pre-defined percentile) of the speed of movement, or multiple different percentiles which may indicate about the user-specific distribution of speed-of-movement; average acceleration in the direction of movement (only positive values) (e.g., utilizing PB-2, PB-3, PB-4 and/or PB-6); average acceleration in the direction of movement (only negative values) (e.g., utilizing PB-2, PB-3, PB-4 and/or PB-6); standard deviation of acceleration in the direction of movement (e.g., utilizing PB-2, PB-3, PB-4 and/or PB-6); the 10% percentile of acceleration in the direction of movement (e.g., utilizing PB-2, PB-3, PB-4 and/or PB-6); the 90% percentile of acceleration in the direction of movement (e.g., utilizing PB-2, PB-3, PB-4 and/or PB-6); the number of positive values of acceleration in the direction of movement divided by number of negative values of acceleration in the direction of movement (e.g., utilizing PB-2, PB-3, PB-4 and/or PB-6); the average acceleration perpendicular to the direction of movement (only positive values) (e.g., utilizing PB-1, PB-2, PB-3, PB-4 and/or PB-6); the average acceleration perpendicular to the direction of movement (only negative values) (e.g., utilizing PB-1, PB-2, PB-3, PB-4 and/or PB-6); the median of absolute value of angular velocity (e.g., utilizing PB-1, PB-2, PB-3, PB-4 and/or PB-6); the 10% percentile of angular velocity (e.g., utilizing PB-1, PB-2, PB-3, PB-4 and/or PB-6); the 90% percentile of angular velocity (e.g., utilizing PB-1, PB-2, PB-3, PB-4 and/or PB-6); the standard deviation of angular velocity (e.g., utilizing PB-1, PB-2, PB-3, PB-4 and/or PB-6); the median of curvature (e.g., utilizing PB-1, PB-2, PB-3, PB-4 and/or PB-6); the 10% percentile of curvature (e.g., utilizing PB-1, PB-2, PB-3, PB-4 and/or PB-6); the 90% percentile of curvature (e.g., utilizing PB-1, PB-2, PB-3, PB-4 and/or PB-6); the median speed at a click event (e.g., utilizing CB-1); the average time between mouse-down and mouse-up events (e.g., zero value indicating none such events); the average direction of movement before a click (e.g., angle between the mouse at the click event, and the mouse K-events before the click, where K may be 3 or 5 or other positive integer), optionally taking into account or detecting circular movement prior to the click event, and optionally utilizing CB-1 and/or CB-2; Ratio of mouse move events to all mouse events; Ratio of mouse click events to all mouse events; Ratio of mouse wheel events to all mouse events; Ratio of sharp angles to all angles; the average angle of sharp (or wide) angles (e.g., utilizing PB-1, PB-2, PB-3, PB-4, PB-5 and/or PB-6); number or frequency of long breaks (e.g., a break of more than 100 or 200 or 300 or 400 milliseconds); an average break time; number or frequency of large jumps in movements, such that a large distance exists between two consecutive mouse events (e.g., distance greater than 100 or 150 or 200 pixels); average jump length of such large jumps; average time between last mouse move and the following click-event; or the like.

In some implementations, the speed of movement may be divided into three "bins"; the system may extract features that are the normalized number of speed values that are in bin X followed by a speed value in bin Y (hence 9 features); which may indicate the tendency of the user to have large speed movements followed by low speed movements (or vice versa); and optionally keeping constant the speed bin boundaries for each UAW.

In some embodiments, the system may measure or estimate for each mouse point/mouse event, in each stroke, some or all of the following 16 parameters: Speed (absolute velocity); Absolute acceleration; Absolute jerk (derivative of acceleration); Acceleration in direction of movement; Acceleration perpendicular to direction of movement; Affine curvature; Direction of movement (angle); First derivative of direction of movement; Second derivative of direction of movement; Curvature; First derivative of curvature; Second derivative of curvature; First derivative of dual_x; First derivative of dual_y; Second derivative of dual_x; Second derivative of dual_y; where dual_x and dual_y are the dual coordinates, which may be calculated as:

$$dual_x = v_y/(y \cdot V_x - x \cdot V_y) \quad (4)$$

$$dual_y = V_x/(x \cdot V_y - y \cdot V_x) \quad (5)$$

Optionally, the system may calculate or estimate, for each one (or for some of) the above-mentioned 16 parameters, one or more of the following ten indicators: Average; Standard deviation; Max value-Min value (span); Skewness; Kurtosis; 10% percentile; 25% percentile; 50% percentile; 75% percentile; 90% percentile. The above may yield 160 user-specific features (16 times 10), which may be estimated and/or utilized, individually or in suitable combinations.

Some embodiments may calculate and/or estimate one or more of the following user-specific features (e.g., utilizing CB-1 and/or CB-2 and/or PB-5): the total time of each movement or stroke; the Straightness (e.g., ratio between total length of stroke to the direct path or the smoothed path); Stroke length; Pause since previous stroke; Bounding rectangle long side; Bounding rectangle short side; Bounding rectangle area; Bounding rectangle ratio of short to long sides; Linear motor control model for X axis; Linear motor control model for Y axis; the stroke's starting direction with regard to the stroke's direction; The stroke's ending direction with regard to the stroke's direction; Average speed in direction of stroke; Average speed perpendicular to direction of stroke; Average starting speed; Average starting absolute acceleration; Average end speed; Average end absolute acceleration; Average starting curvature; Average end curvature; Ratio between total length of stroke to the direct path (non-smoothed); Median noise (difference between actual path and smoothed path). Other user-specific parameters may be estimated or calculated; for example, related to the rotated path in direction of the stroke, and/or related to the rotated path perpendicular to the direction of the stroke. The linear motor control model for X axis, and for the Y axis, may be calculates as:

$$a_x = \alpha \cdot V_x + \beta \cdot (x - x_{end}) \quad (6)$$

$$a_y = \alpha \cdot V_y + \beta \cdot (y - y_{end}) \quad (7)$$

Some embodiments of the present invention may be utilized in order to differentiate or distinguish between: an authorized user versus an unauthorized user; a genuine user versus an imposter or fraudster or hacker; a human user versus an automatic script or malware or "bot"; a local user (e.g., operating a local computing device) versus a remote user (authorized, or non-authorized attacker) utilizing a remote access terminal (or a remote access malware); a first authorized user and a second authorized user (e.g., husband and wife accessing a joint bank account; or two managers or business partners accessing a business bank account); a first authorized user and a second, unauthorized, user (e.g., a parent accessing a bank account; and a son or daughter using the banking website after the parent has left the computing device without logging-out); and/or for other user identity detection purposes, user identity verification purposes, user authentication purposes, security purposes, fraud detection purposes, fraud mitigation purposes, or the like.

The term "pointing device" as used herein may include, for example, a mouse, a trackball, a pointing stick, a stylus, a joystick, a motion-sensing input device, a touch screen, a touch-pad, or the like.

The term "device" or "electronic device" as used herein may include, for example, a mobile device, a non-mobile device, a non-portable device, a desktop computer, a workstation, a computing terminal, a laptop computer, a notebook computer, a netbook computer, a computing device associated with a mouse or a similar pointing accessory, or the like.

The term "genuine user" as used herein may include, for example, an owner of a device; a legal or lawful user of a device; an authorized user of a device; a person who has legal authorization and/or legal right to utilize a device, for general purpose(s) and/or for one or more particular purpose(s); or the person who had originally defined user credentials (e.g., username and password) for performing an activity through the device.

The term "fraudulent user" as used herein may include, for example, any person who is not the "genuine user" of the device; an attacker; an intruder; a man-in-the-middle attacker; a man-in-the-browser attacker; an unauthorized user; an impersonator; a hacker; a cracker; a person attempting to hack or crack or compromise a security measure utilized by the device or by a system or a service or a website, or utilized by an activity or service accessible through the device; a fraudster; a human fraudster; a "bot" or a malware or an automated computerized process (e.g., implemented by using software modules and/or hardware components) which attempts to imitate human behavior or which attempts to act as if such "bot" or malware or process was the genuine user; or the like.

The present invention may be used in conjunction with various suitable devices and systems, for example, various devices that have a touch-screen; an ATM; a kiosk machine or vending machine that has a touch-screen; a touch-keyboard; a system that utilizes Augmented Reality (AR) components or AR glasses (e.g., Google Glass); a device or system that may detect hovering gestures that do not necessarily touch on the screen or touch-screen; a hovering screen; a system or device that utilize brainwave analysis or brainwave control in which the user's brainwaves are captured or read and the user's brain may directly control an application on the mobile device; and/or other suitable devices or systems.

Some embodiments may identify multiple (different) users that utilize the same device, or the same account, before or after a typical user profile is built, or even during a training period in which the system learns the behavioral patterns. This may be used for detection of "friendly fraud" incidents, or identification of users for accountability purposes, or identification of the user that utilized a particular function in an Administrator account (e.g., optionally used in conjunction with a requirement that certain users, or users with certain privileges, may not share their password or credentials with any other person); or identification of a licensee in order to detect or prevent software piracy or unauthorized usage by non-licensee user(s), for software or products that are sold or licensed on a per-user basis or a per-seat basis.

In some embodiments, the present invention may be utilized to decrease (or increase, or modify) friction from an authentication process. For example, after a login form was filled and submitted by the user, a demonstrative system may skip or not skip an additional authentication step (e.g., a security question) if the system recognizes the user as the genuine user.

In some embodiments, the present invention may be utilized to increase (or decrease, or modify) the system's tolerance for mistakes (or failed attempts) made by the user in an authentication process. For example, a demonstrative system may allow three consecutive failed attempts in logging-in, and may then "lock" the account and may require that the user (e.g., a bank customer) to call a customer service number for further handling. However, if the present invention is utilized, some embodiments may recognize that although three failed log-in attempts were performed, they were all performed in a GUI-utilization manner that closely matches the previously-stored user-specific profile of GUI utilization; and therefore, the system may become more "forgiving" and may allow such user one more (or a few more) log-in attempts before "locking" the account or putting the process on hold.

In some embodiments, the system may periodically update the user-specific GUI-utilization profile, based on the ongoing utilization by the user. For example, the user may start utilizing the system on January 1st, and the system may utilize ten log-in sessions, performed in January, for generating an initial user-specific profile of GUI utilization. The system may proceed to utilize the generated profile, during 25 subsequent log-in profiles of that user, in the months of February through June. The system may continue to update the user-specific profile, based on log-in sessions as they take place. Optionally, the system may discard historic data of GUI-utilization (e.g., in a First-In-First-Out (FIFO) order), since, for example, a user may change the way of utilizing the GUI over time, due to learning the system better, becoming more familiar with the system, getting older in age, or the like. In some embodiments, the system may continuously update the user-specific profile of GUI utilization, In some embodiments of the present invention, a method comprises: during a first session of a user who utilizes a pointing device for interacting with a computerized service, monitoring the pointing device dynamics and gestures of said user; based on the monitored dynamics and gestures, estimating parameters that characterize a sensorimotor control loop model of said user. In some embodiments, the method comprises: storing in a database a record indicating that said user is associated with said parameters that characterize the sensorimotor control loop model of said user. In some embodiments, the method comprises, in a subsequent session of interaction with said computerized service: monitoring pointing device dynamics and gestures of a subsequent user; estimating current parameters that characterize a sensorimotor control loop of said subsequent user; comparing the current parameters to said record of parameters, and based on results of said comparing, determining whether said subsequent user of the second session is the same person as said user of the first session.

In some embodiments, the method comprises, in a subsequent session of interaction with said computerized service: monitoring pointing device gestures of a subsequent user; estimating current parameters that characterize a sensorimotor control loop of said subsequent user; comparing the current parameters to said record of parameters, and based on results of said comparing, determining whether to authenticate identity of said subsequent user. In some embodiments, estimating parameters of a motor control loop of said user comprises: estimating the parameters that characterize the sensorimotor control loop as a function of translation error, current velocity, and motor control noise, based on monitored pointing device dynamics and gestures. In some embodiments, estimating parameters of a motor control loop of said user comprises: estimating a linear control loop model as a linear function of translation error, current velocity, and motor control noise, based on monitored pointing device dynamics and gestures.

In some embodiments, the method comprises: estimating parameters of a first sensorimotor control loop, associated with pointing device based interaction of a first user during a first session at said computerized service; estimating parameters of a second sensorimotor control loop, associated with pointing device based interaction of a second user during a second session at said computerized service; if the parameters of the first sensorimotor control loop match the parameters of the second sensorimotor control loop, then determining that the first user and the second user are the same person. In some embodiments, the method comprises: estimating parameters of a first sensorimotor control loop, associated with pointing device based interaction of a first user during a first session at a first computerized service; estimating parameters of a second sensorimotor control loop, associated with pointing device based interaction of a second user during a second session at a second, different, computerized service; if the parameters of the first sensorimotor control loop match the parameters of the second sensorimotor control loop, then determining that the first user and the second user are the same person.

In some embodiments, estimating the parameters of the sensorimotor control loop comprises: estimating parameters of a sensorimotor control loop which comprises sensory organ, muscle, and brain. In some embodiments, estimating the parameters of the sensorimotor control loop comprises: estimating parameters of a sensorimotor control loop which comprises eye, hand, and brain coordination and control of the pointing device. In some embodiments, the method comprises: estimating a first user-specific biometric feature corresponding to a first motor control loop of said user across an x-axis; estimating a second user-specific biometric feature corresponding to a second motor control loop of said user across a y-axis.

In some embodiments, the method comprises: estimating a third user-specific biometric feature by calculating a statistics function, applied to one of said first and second motor control loops; wherein the statistics function is selected from the group consisting of: mean, standard deviation, range, maximum, minimum, kurtosis, skewness, quantiles. In some embodiments, the method comprises: estimating a first user-specific biometric feature corresponding to a motor control loop of said user across a combination of x-axis and y-axis.

In some embodiments, the method comprises: estimating a user-specific muscular profile which characterizes the motor control loop; estimating a user-specific coordination index which characterizes the motor control loop; differentiating between two or more users based on the user-specific muscular profile and the user-specific coordination index. In some embodiments, the method comprises: based on the monitored pointing device dynamics and gestures of said user, estimating a length of an arm of said user; based on the estimated length of arm of said user, differentiating between said user and another user interacting with said computerized service.

In some embodiments, the method comprises: based on the monitored pointing device dynamics and gestures of said user, estimating a length of a wrist of said user; based on the estimated length of wrist of said user, differentiating between said user and another user interacting with said computerized service. In some embodiments, the method comprises: based on the monitored pointing device dynamics and gestures of said user, estimating a range of a wrist of said user; based on the estimated range of wrist of said user, differentiating between said user and another user interacting with said computerized service.

In some embodiments, the method comprises: based on the monitored pointing device dynamics and gestures of said user, estimating level of flexibility of movement of a wrist of said user; based on the estimated level of flexibility of movement of wrist of said user, differentiating between said user and another user interacting with said computerized service. In some embodiments, the method comprises: based on the monitored pointing device dynamics and gestures of said user, estimating movement agility of said user; based on the estimated movement agility of said user, differentiating between said user and another user interacting with said computerized service.

In some embodiments, the method comprises: based on the monitored pointing device dynamics and gestures of said user, estimating movement dexterity of said user; based on the estimated movement dexterity of said user, differentiating between said user and another user interacting with said computerized service. In some embodiments, the method comprises: based on the monitored pointing device dynamics and gestures of said user, estimating a movement range of fingers of said user; based on the estimated movement range of fingers of said user, differentiating between said user and another user interacting with said computerized service. In some embodiments, the method comprises: based on the monitored pointing device dynamics and gestures of said user, estimating a movement range of a mouse-wheel operating finger of said user; based on the estimated movement range of the mouse-wheel operating finger of said user, differentiating between said user and another user interacting with said computerized service.

In some embodiments, the method comprises: based on the monitored pointing device dynamics and gestures of said user, estimating whether or not an elbow of said user is resting on a surface; based on estimation of whether or not the elbow of said user is resting on the surface, differentiating between said user and another user interacting with said computerized service. In some embodiments, the method comprises: based on the monitored pointing device dynamics and gestures of said user, estimating whether the user is right-handed; based on estimation of whether said user is right-handed, differentiating between said user and another user interacting with said computerized service. In some embodiments, the method comprises: based on the monitored pointing device dynamics and gestures of said user, estimating whether the user is left-handed; based on estimation of whether said user is left-handed, differentiating between said user and another user interacting with said computerized service.

In some embodiments, the method comprises: based on the monitored pointing device dynamics and gestures of said user, estimating one or more parameters characterizing an eye-hand cognitive correction feedback of said user; based on the estimated one or more parameters characterizing the eye-hand cognitive correction feedback of said user, differentiating between said user and another user interacting with said computerized service. In some embodiments, the method comprises: based on the monitored pointing device dynamics and gestures of said user, estimating a level of accuracy of said user in reaching an on-screen user interface element; based on the estimated level of accuracy of said user, differentiating between said user and another user interacting with said computerized service. In some embodiments, the method comprises: based on the monitored pointing device dynamics and gestures of said user, estimating an eye saccade model of said user; based on the estimated eye saccade model of said user, differentiating between said user and another user interacting with said computerized service. In some embodiments, the method comprises: based on the monitored pointing device dynamics and gestures of said user, estimating a smooth pursuit movement model of said user; based on the estimated smooth pursuit movement model of said user, differentiating between said user and another user interacting with said computerized service.

In some embodiments, the method comprises: based on the monitored pointing device dynamics and gestures of said user, estimating an eye-hand coordination model of said user in response to an introduced interference to user experience at said computerized service; based on the estimated eye-hand coordination model of said user in response to the introduced interference to user experience at said computerized service, differentiating between said user and another user interacting with said computerized service. In some embodiments, the method comprises: based on the monitored pointing device dynamics and gestures of said user, estimating a level of awareness of said user to a freshly-loaded page of said computerized service; based on the estimated level of awareness of said user, differentiating between said user and another user interacting with said computerized service. In some embodiments, the method comprises: based on the monitored pointing device dynamics and gestures of said user, estimating a level of awareness of said user to a freshly-modified non-reloaded page of said computerized service; based on the estimated level of awareness of said user, differentiating between said user and another user interacting with said computerized service.

In some embodiments, the method comprises: based on the monitored pointing device dynamics and gestures of said user, estimating a level of awareness of said user to a modification in one or more user interface elements of said computerized service; based on the estimated level of awareness of said user, differentiating between said user and another user interacting with said computerized service. In some embodiments, the method comprises: presenting to said user a number of choices; subsequently, modifying the number of choices presented to said user; based on the monitored pointing device dynamics and gestures of said user, estimating a level of awareness of said user to modification of the number of choices; based on the estimated level of awareness of said user, differentiating between said user and another user interacting with said computerized service. In some embodiments, the method comprises: based on the monitored pointing device dynamics and gestures of said user, estimating parameters of a Fitts's Law function indicating ability of said user to rapidly reach an on-screen target; based on the estimated parameters of the Fitts's Law function of said user, differentiating between said user and another user interacting with said computerized service.

In some embodiments, the method comprises: a monitoring module configured to operate during a first session of a user who utilizes a pointing device for interacting with a computerized service, wherein the monitoring module is to monitor the pointing device dynamics and gestures of said user; a motor control loop model estimator, to estimate, based on the monitored dynamics and gestures, parameters that characterize a sensorimotor control loop model of said user. In some embodiments, the method comprises: a database to store a record indicating that said user is associated with said parameters that characterize the sensorimotor control loop model of said user; wherein, in a subsequent session of interaction with said computerized service, the monitoring module is to monitor pointing device dynamics and gestures of a subsequent user, wherein the motor control loop model estimator is to estimate current parameters that characterize a sensorimotor control loop of said subsequent user; wherein the system comprises a comparator to compare the current parameters to said record of parameters, and based on comparison results, to determine whether said subsequent user of the second session is the same person as said user of the first session.

In some embodiments, a method comprises: during a first session of a user, who utilizes a pointing device and a keyboard for interacting with a computerized service, monitoring pointing device dynamics and gestures and keystrokes of said user; analyzing the monitored pointing device dynamics and gestures and keystrokes, in relation to (a) state and context of said computerized service, and (b) user interface elements displayed by said computerized service; generating a user-specific biometric trait indicating a user-specific service usage pattern, which comprises at least one of: a user-specific inter-application usage pattern, and a user-specific intra-application usage pattern. In some embodiments, the method comprises: monitoring whether said user more frequently utilizes the pointing device or the keyboard in order to perform a particular type of interaction with said computerized service; based on said monitoring, generating a user-specific intra-application usage pattern associated with said user.

In some embodiments, the method comprises: monitoring whether said user more frequently utilizes the pointing device or the keyboard in order to submit a form at said computerized service; based on said monitoring, generating a user-specific intra-application usage pattern associated with said user. In some embodiments, the method comprises: monitoring whether said user more frequently utilizes the pointing device or the keyboard in order to fill-in data in a form at said computerized service; based on said monitoring, generating a user-specific intra-application usage pattern associated with said user. In some embodiments, the method comprises: monitoring whether said user more frequently utilizes the pointing device or the keyboard in order to move a cursor between fields at said computerized service; based on said monitoring, generating a user-specific intra-application usage pattern associated with said user.

In some embodiments, the method comprises: monitoring whether said user more frequently utilizes the pointing device or the keyboard in order to paste data into a particular field at said computerized service; based on said monitoring, generating a user-specific intra-application usage pattern associated with said user. In some embodiments, the method comprises: monitoring whether said user more frequently (a) pastes data into a particular field at said computerized service, or (b) types data into said particular field at said computerized service; based on said monitoring, generating a user-specific intra-application usage pattern associated with said user. In some embodiments, the method comprises: determining a user-specific inter-application usage pattern that indicates that said user, in most of its interactions with said computerized service, performs a first particular action prior to performing a second particular action; based on said user-specific inter-application usage pattern, determining whether a subsequent user of said computerizes service is the same person as said user.

In some embodiments, the method comprises: determining a user-specific inter-application usage pattern that indicates that said user, in most of its interactions with said computerized service, visits a first particular page of said computerized service prior to visiting a second particular page of said computerized service; based on said user-specific inter-application usage pattern, determining whether a subsequent user of said computerizes service is the same person as said user. In some embodiments, the method comprises: determining a user-specific inter-application usage pattern that indicates that said user, in most of its interactions with said computerized service, spends a first period of time at a first particular page of said computerized service prior to spending a second period of time at a second particular page of said computerized service; based on said user-specific inter-application usage pattern, determining whether a subsequent user of said computerizes service is the same person as said user. In some embodiments, the method comprises: monitoring for each field in a computerize service, mouse dynamics and gestures for that field; based on said monitoring, generating a user-specific field-usage pattern associated with said user.

In some embodiments, the method comprises: monitoring for each field in a computerize service, (a) a mouse angle of approach to the field, (b) a mouse angle of exit from the field, (c) velocities of mouse approach and mouse exit, (d) time period spent within the field, and (e) location of a mouse click event within the field; based on said monitoring, generating a user-specific field-usage pattern associated with said user. In some embodiments, the method comprises: based on monitored pointing device dynamics and gestures and based on monitored keystrokes of said user, estimating a user-specific behavioral trait of page-usage stream pattern of said user; based on the estimated user-specific behavioral trait of page-usage stream pattern of said user, differentiating between said user and another user interacting with said computerized service.

In some embodiments, the method comprises: based on monitored pointing device dynamics and gestures and based on monitored keystrokes of said user, estimating a user-specific behavioral trait of multiple-field-usage stream pattern of said user in relation to multiple fields on a particular page of said computerized service; based on the estimated user-specific behavioral trait of multiple-field-usage stream pattern of said user, differentiating between said user and another user interacting with said computerized service. In some embodiments, the method comprises: based on monitored pointing device dynamics and gestures of said user, estimating a user-specific behavioral trait corresponding to angle of approach by said user to an on-screen field of said computerized service; based on the estimated user-specific behavioral trait of angle of approach of said user, differentiating between said user and another user interacting with said computerized service.

In some embodiments, the method comprises: based on monitored pointing device dynamics and gestures of said user, estimating a user-specific behavioral trait corresponding to angle of exit by said user from an on-screen field of said computerized service; based on the estimated user-specific behavioral trait of angle of exit of said user, differentiating between said user and another user interacting with said computerized service. In some embodiments, the method comprises: based on monitored pointing device dynamics and gestures of said user, estimating a user-specific behavioral trait corresponding to speed of approach by said user to an on-screen field of said computerized service; based on the estimated user-specific behavioral trait of speed of approach of said user, differentiating between said user and another user interacting with said computerized service.

In some embodiments, the method comprises: based on monitored pointing device dynamics and gestures of said user, estimating a user-specific behavioral trait corresponding to speed of exit by said user from an on-screen field of said computerized service; based on the estimated user-specific behavioral trait of speed of exit of said user, differentiating between said user and another user interacting with said computerized service. In some embodiments, the method comprises: based on monitored pointing device dynamics and gestures of said user, estimating a user-specific behavioral trait corresponding to acceleration of approach by said user to an on-screen field of said computerized service; based on the estimated user-specific behavioral trait of acceleration of approach of said user, differentiating between said user and another user interacting with said computerized service.

In some embodiments, the method comprises: based on monitored pointing device dynamics and gestures of said user, estimating a user-specific behavioral trait corresponding to acceleration of exit by said user from an on-screen field of said computerized service; based on the estimated user-specific behavioral trait of acceleration of exit of said user, differentiating between said user and another user interacting with said computerized service. In some embodiments, the method comprises: based on monitored pointing device dynamics and gestures of said user, estimating a user-specific behavioral trait corresponding to jerk of approach by said user to an on-screen field of said computerized service; based on the estimated user-specific behavioral trait of jerk of approach of said user, differentiating between said user and another user interacting with said computerized service.

In some embodiments, the method comprises: based on monitored pointing device dynamics and gestures of said user, estimating a user-specific behavioral trait corresponding to jerk of exit by said user from an on-screen field of said computerized service; based on the estimated user-specific behavioral trait of jerk of exit of said user, differentiating between said user and another user interacting with said computerized service. In some embodiments, the method comprises: based on monitored pointing device dynamics and gestures of said user, estimating whether said user typically clicks with said pointing device (i) at a center region of a particular user interface element of said computerized service, or (ii) at a right-side region of said particular user interface element of said computerized service, or (iii) at a left-side region of said particular user interface element of said computerized service; based on estimation of whether said user typically clicks at said center region, at said right-side region, or at said left-side region, of said particular user interface element of said computerized service, differentiating between said user and another user interacting with said computerized service.

In some embodiments, the method comprises: based on monitored pointing device dynamics and gestures of said user and based on monitored keystrokes of said user, estimating a time period that is typically required for said user in order to move an on-screen pointer from a first particular field to a second particular field of said computerized service; based on estimation of said time period, that is typically required for said user in order to move an on-screen pointer from a first particular field to a second particular field of said computerized service, differentiating between said user and another user interacting with said computerized service. In some embodiments, the method comprises: based on monitored pointing device dynamics and gestures of said user and based on monitored keystrokes of said user, estimating a time period that is typically required for said user in order to proceed from (i) a click within a particular field of said computerized service, to (ii) typing within said particular field of said computerized service; based on estimation of said time period, that is typically required for said user in order to proceed from (i) click within said particular field of said computerized service, to (ii) typing within said particular field of said computerized service, differentiating between said user and another user interacting with said computerized service.

In some embodiments, the method comprises: based on monitored pointing device dynamics and gestures of said user and based on monitored keystrokes of said user, estimating a time period that is typically required for said user in order to proceed from (i) end of typing within a particular field of said computerized service, to (ii) moving an on-screen pointer away from said particular field of said computerized service; based on estimation of said time period, that is typically required for said user in order to proceed from (i) end of typing within said particular field of said computerized service, to (ii) moving an on-screen pointer away from said particular field of said computerized service, differentiating between said user and another user interacting with said computerized service.

In some embodiments, the method comprises: based on monitored pointing device dynamics and gestures of said user and based on monitored keystrokes of said user, estimating whether said user typically scrolls a page of said computerized service (i) using a mouse, or (ii) using a keyboard; based on estimation of whether said user typically scrolls a page of said computerized service (i) using a mouse, or (ii) using a keyboard, differentiating between said user and another user interacting with said computerized service. In some embodiments, the method comprises: based on monitored pointing device dynamics and gestures of said user, estimating whether said user typically scrolls a page of said computerized service (i) using mouse-clicks on an on-screen scroll-bar, or (ii) using mouse-wheel; based on estimation of whether said user typically scrolls a page of said computerized service (i) using mouse-clicks on an on-screen scroll-bar, or (ii) using mouse-wheel, differentiating between said user and another user interacting with said computerized service.

In some embodiments, the method comprises: based on monitored keystrokes of said user, estimating whether said user typically scrolls a page of said computerized service (i) using arrow-down and arrow-up keys, or (ii) using page-up and page-down keys; based on estimation of whether said user typically scrolls a page of said computerized service (i) using arrow-down and arrow-up keys, or (ii) using page-up and page-down keys, differentiating between said user and another user interacting with said computerized service. In some embodiments, the method comprises: based on monitored pointing device dynamics and gestures of said user, estimating an average pointing device movement speed of said user; based on estimation of average pointing device movement speed of said user, differentiating between said user and another user interacting with said computerized service.

In some embodiments, the method comprises: based on monitored pointing device dynamics and gestures of said user, estimating a standard deviation of pointing device movement speed of said user; based on estimation of standard deviation of pointing device movement speed of said user, differentiating between said user and another user interacting with said computerized service. In some embodiments, the method comprises: based on monitored pointing device dynamics and gestures of said user, estimating a distribution of pointing device movement speed of said user; based on estimation of distribution of pointing device movement speed of said user, differentiating between said user and another user interacting with said computerized service. In some embodiments, the method comprises: based on monitored pointing device dynamics and gestures of said user, estimating an average of positive values of acceleration of pointing device movement of said user in a particular direction; based on estimation of said average of positive values of acceleration, differentiating between said user and another user interacting with said computerized service. In some embodiments, the method comprises: based on monitored pointing device dynamics and gestures of said user, estimating an average of negative values of acceleration of pointing device movement of said user in a particular direction; based on estimation of said average of negative values of acceleration, differentiating between said user and another user interacting with said computerized service.

In some embodiments, the method comprises: based on monitored pointing device dynamics and gestures of said user, estimating a standard deviation of acceleration of pointing device movement of said user in a particular direction; based on estimation of said standard deviation of acceleration, differentiating between said user and another user interacting with said computerized service. In some embodiments, the method comprises: based on monitored pointing device dynamics and gestures of said user, estimating a ratio between (i) a number of positive values of acceleration in a direction of movement, and (ii) a number of negative values of acceleration in said direction of movement; based on estimation of said ratio, differentiating between said user and another user interacting with said computerized service. In some embodiments, the method comprises: based on monitored pointing device dynamics and gestures of said user, estimating an average of positive values of acceleration of pointing device movement of said user in a direction perpendicular to a direction of movement of said pointing device; based on estimation of said average of positive values of acceleration, differentiating between said user and another user interacting with said computerized service.

In some embodiments, the method comprises: based on monitored pointing device dynamics and gestures of said user, estimating an average of negative values of acceleration of pointing device movement of said user in a direction perpendicular to a direction of movement of said pointing device; based on estimation of said average of negative values of acceleration, differentiating between said user and another user interacting with said computerized service. In some embodiments, the method comprises: based on monitored pointing device dynamics and gestures of said user, estimating a median of absolute values of angular velocity of pointing device movement of said user; based on estimation of median of absolute values of angular velocity of pointing device movement of said user, differentiating between said user and another user interacting with said computerized service. In some embodiments, the method comprises: based on monitored pointing device dynamics and gestures of said user, estimating a distribution of angular velocity of pointing device movement of said user; based on estimation of distribution of angular velocity of pointing device movement of said user, differentiating between said user and another user interacting with said computerized service. In some embodiments, the method comprises: based on monitored pointing device dynamics and gestures of said user, estimating a median speed of movement at a click event of said pointing device of said user; based on estimation of median speed of movement at a click event of said pointing device of said user, differentiating between said user and another user interacting with said computerized service.

In some embodiments, the method comprises: based on monitored pointing device dynamics and gestures of said user, estimating an average of time difference between a mouseclick-down event and a mouseclick-up event of said pointing device of said user; based on estimation of average of time difference between a mouseclick-down event and a mouseclick-up event of said pointing device of said user, differentiating between said user and another user interacting with said computerized service. In some embodiments, the method comprises: based on monitored pointing device dynamics and gestures of said user, estimating an average direction of pre-mouseclick movements of said pointing device of said user; based on estimation of average direction of pre-mouseclick movements of said pointing device of said user, differentiating between said user and another user interacting with said computerized service.

In some embodiments, the method comprises: based on monitored pointing device dynamics and gestures of said user, estimating a ratio between (i) mouse movement events of said user, to (ii) all mouse events of said user; based on estimation of said ratio between (i) mouse movement events of said user, to (ii) all mouse events of said user, differentiating between said user and another user interacting with said computerized service. In some embodiments, the method comprises: based on monitored pointing device dynamics and gestures of said user, estimating a ratio between (i) mouse click events of said user, to (ii) all mouse events of said user; based on estimation of said ratio between (i) mouse click events of said user, to (ii) all mouse events of said user, differentiating between said user and another user interacting with said computerized service.

In some embodiments, the method comprises: based on monitored pointing device dynamics and gestures of said user, estimating a ratio between (i) mouse wheel events of said user, to (ii) all mouse events of said user; based on estimation of said ratio between (i) mouse wheel events of said user, to (ii) all mouse events of said user, differentiating between said user and another user interacting with said computerized service. In some embodiments, the method comprises: based on monitored pointing device dynamics and gestures of said user, estimating a ratio between (i) sharp mouse movements of said user, to (ii) all mouse movements of said user; based on estimation of said ratio between (i) sharp mouse movements of said user, to (ii) all mouse movements of said user, differentiating between said user and another user interacting with said computerized service. In some embodiments, a system comprises: a monitoring module operative during a first session of a user, who utilizes a pointing device and a keyboard for interacting with a computerized service, wherein the monitoring module is to monitor pointing device dynamics and gestures and keystrokes of said user; an analysis module (i) to analyze the monitored pointing device dynamics and gestures and keystrokes, in relation to (a) state and context of said computerized service, and (b) user interface elements displayed by said computerized service, and (ii) to generate a user-specific biometric trait indicating a user-specific service usage pattern, which comprises at least one of: a user-specific inter-application usage pattern, and a user-specific intra-application usage pattern.

The present invention includes a method and device for confirming computer end-user identity. For example, the identity of an end-user operating a computer is confirmed by analyzing user reactions to aberrations in output. More specifically, an aberration is caused in output that the computer provides to an output device, and the end-user's response to the aberration is received. An end-user characteristic is extracted from the response and compared to stored characteristic responses to find a match. A match is indicative of the identity of the computer user. It can also be checked whether, after causing an aberration in output the end-user responded differently to the output than if the output did not have the aberration. The lack of a different response can be interpreted as indicative that the end-user is a bot.

Some embodiments may comprise a method of confirming the identity of an end-user interacting with a remote server, using an end-user electronic device; the method comprising: a. during an interaction session of said end-user, executed by said end-user via an input unit associated with said end-user electronic device, causing an aberration in output that is displayed upon an output unit of said end-user device, wherein said aberration comprises modifying input data from said input unit of said end-user device, resulting in display of said aberration upon said output unit; b. receiving an end-user response to the displayed aberration from said input unit of said end-user electronic device; c. extracting from said end-user response, a user-specific end-user characteristic that is based on the response of a specific end-user to said displayed aberration; and d. comparing between the user-specific end-user characteristic extracted from said end-user response; with one or more stored characteristic responses that are stored in a database of prior responses of said end-user to displayed aberrations, to find a match; e. wherein finding a match using said comparison, is indicative of the identity of the end-user.

In some embodiments, the aberration is causing the output unit to display a character that differs from a character specified for display by the end-user via a keyboard or an emulated keyboard. In some embodiments, the method comprises: repeating the steps of: causing of an aberration, the receiving of the end-user response, the extracting of a user-specific end-user characteristic, and the comparing of the extracted user-specific end-user characteristic with stored characteristic responses. In some embodiments, said comparing of the extracted user-specific end-user characteristic with stored characteristic responses comprises generating a learning curve associated with an end-user's responsiveness to aberrations. In some embodiments, generating said learning curve comprises generating the learning curve by utilizing at least one measurable parameter selected from: the speed of correction for said aberration; an end-user's time for identification of an aberration; continuity of correction for said aberration; mistakes made by said end-user during correction for said aberration; noises in correcting said aberration; and parameters of the efficiency of cursor movement during correction of said aberration.

In some embodiments, an apparatus for confirming the identity of an end-user operating an end-user device, comprises: a processor; and a memory storing instructions that, when executed by the processor, cause the processor to perform a method which comprises: a. during an interaction session of said end-user, executed by said end-user via an input unit associated with said end-user electronic device, causing an aberration in output that is displayed upon an output unit of said end-user device, wherein said aberration comprises modifying input data from said input unit of said end-user device, resulting in display of said aberration upon said output unit b. receiving an end-user response to the displayed aberration from said input unit of said end-user electronic device; c. extracting from said end-user response, a user-specific end-user characteristic that is based on the response of a specific end-user to said displayed aberration; and d. comparing between the user-specific end-user characteristic extracted from said end-user response; with one or more stored characteristic responses that are stored in a database of prior responses of said end-user to displayed aberrations, to find a match; e. wherein finding a match using said comparison, is indicative of the identity of the end-user.

In some embodiments, said input unit is operative to communicate the end-user response to the displayed aberration through a communication network. In some embodiments, the output unit is a display for human use or an emulated display for a bot, and wherein the aberration comprises a diverted movement of a cursor on the display or on the emulated display, wherein the diverted movement is a diversion from the movement that the end-user entered via a cursor movement device or via an emulated cursor movement device; wherein the cursor movement is diverted by changing one or more of the following: the ratio of the angle of cursor movement displayed, from that specified by said end-user; the magnitude of cursor movement displayed, from that specified by said end-user. In some embodiments, the instructions stored by the memory, when executed by the processor, cause the processor to repeat the causing of an aberration, the receiving of the end-user response, the extracting of a user-specific end-user characteristic, and the comparing of the extracted user-specific end-user characteristic with stored characteristic responses.

Elaborate schemes have been devised to maintain security during interactive sessions between an end-user and a computer. Previously, a simple requirement for a single password sufficed, but malicious intrusions, by parties sometimes referred to as "hackers", resumed after such hackers were able to develop methods to bypass simple password requirements. End-users are now typically advised, and sometimes even required, to compose personal passwords of a random or semi-random nature, such as having at least one capital letter and one lower-case letter, at least one numeral, and a special character (e.g., "!", "@", "$", and "#"). End-users are often asked to change their passwords occasionally, for example, every three months.

Intruders have found ways to by-pass passwords, even those of a random nature, so other protections schemes have been developed, such as those requiring biometric data. One example of such scheme employs a fingerprint reader, so an end-user desiring to conduct an interactive session must supply the fingerprint that is associated with a particular account. However, even biometric data can be stolen and then used to gain unauthorized access to protected data.

Another growing problem is the use of bots (computer programs that run automatically) to bypass user authentication schemes. There is a need for a way to distinguish between bots and humans attempting to begin an interactive session with a computer.

Another method to confirm user identity is to implement transparent continuous authentication (TCA). TCA operates continuously during the whole user session in order to authenticate users according to their behavior or biometric behavior, for example, according to voice. This type of TCA may monitor a speaker's voice during an entire conversation with a call center.

The problem with conventional TCA is that the learning and detecting process for user confirmation is very long. Unlike requesting a password and waiting for a user response, TCA does not have standard requests that produce expected responses from authorized users and unexpected responses from unauthorized users. By not prompting particular responses, the validation method necessarily must take longer due to the need to wait for distinguishable behavior from users for confirmation.

Two common categories of solutions became known as "log-in authentication" and "continuous authentication," the former being more common.

Log-in authentication involves the transfer of "secrets" during an interactive process, such as, login-in, using USB encryption keys, and biometric authentication (fingerprint, voice, pictures, and even keystrokes and mouse dynamics). This type of authentication could be defeated by unauthorized acquisition of the secrets, such as by phishing or planning Trojan horses.

Continuous authentication, also known as "transparent continuous authentication" (TCA) involves the collecting of information in the background throughout a user session, and this form of authentication could detect an unauthorized user after his/her credentials were already stolen. Applying this transparent method, a user would not be aware that his actions are being scrutinized (unlike the awareness, for example, of being asked to provide a password). Examples of TCA include voice recognition, mouse dynamic recognition, and keystroke analysis. The drawback of this method is that the transparent process is by definition not an interactive process, so by not "involving" the user the authentication process last longer. Thus, the user had more freedom to conduct various activities before the authentication was complete. From the perspective of the protection provides, the session is considered pseudo-random, uncontrolled, unsupervised, and unpredictable.

The present invention provides embodiments that authenticate end-users either while attempting to begin interactive sessions with computer or throughout user sessions to determine whether the users are authorized to use the identities they provide. The embodiments can also distinguish between human users and bots. Further, embodiments can determine if one user has created multiple identities.

Embodiments of the invention include motor control TCA, which was developed to prove the significance of current TCA solution dealing with keyboard and mouse dynamic. The concept implements theory taken from the field of mechanical robotics to imitate human movements by modeling the motor control as a complex system. A feedback loop facilitates the flow of signals among the eyes, the brain, and muscles.

Another embodiment of the invention is interactive transparent continuous authentication, which actually implements transparent continuous authentication in the background of a user session without the user being aware of the authentication process but nonetheless staying involved. Such is achieved by causing interferences (aberration) during user sessions so the users will respond but will not be aware that a test was in progress. This solution controls the session and is more predictable than "normal" TCA despite being transparent.

A further embodiment is interactive TCA. Such also provides protection against bots and Trojan horses. These automated intruders do always respond to interferences (aberrations) as human users do, and interactive TCA exploits that deficiency as discussed below.

The invention may comprise a method of confirming the identity of an end-user operating a computer. The method includes: causing an aberration in output that the computer provides to an output device; receiving a response to the aberration; extracting from the response an end-user characteristic; and comparing the extracted end-user characteristic response with stored characteristic responses to find a similarity of the end-user's response to a stored response; wherein a similarity is indicative of the identity of the computer user.

The invention may also comprise an alternate method of confirming the identity of an end-user operating a computer. More specifically, the method includes: causing an aberration in output that the computer provides to an output device; determining whether the end-user responds differently to the output than if the output did not have the aberration; and interpreting the lack of a different response as indicative that the end-user is a bot.

The invention may further comprise a device for confirming the identity of an end-user operating a computer. The device has a processor and a memory. The memory holds instructions that, when executed by the processor, cause the processor to: cause an aberration in output that the computer provides to an output device; receive a response to the aberration; extract from the response an end-user characteristic; and compare the extracted end-user characteristic response with stored characteristic responses to find a similarity of the end-user's response to a stored response. A similarity is indicative of the identity of the end-user.

The invention may further comprise a device for confirming the identity of an end-user operating a computer. The device has a processor and a memory. The memory holds instructions that, when executed by the processor, cause the device to: cause an aberration in output that the computer provides to an output device; determine whether the end-user responds differently to the output than if the output did not have the aberration; and interpret the lack of a different response as indicative that the end-user is a bot.

Human physiological features differ from one person to the next, and knowledge of such differences can be exploited to identify a computer end-user (or "user") based on how he/she uses the computer. This identification is made possible by observing characteristic responses of a user to unexpected output when using the computer.

As an example, consider a computer operatively connected to the display and to a mouse that a user slides along the mouse pad to alter the position of a mouse cursor displayed in the image on the display. The mouse cursor in this example is initially located at point A, and the user wants to reposition the cursor to point B. To effect such change in position, the user grasps with his hand the mouse, located at point A' on the mouse pad, and slides it to point B'.

The change in cursor position on the display is represented by a straight line, and the user may think of the associated motion as linear or more likely not even think consciously about the shape of the mouse's path at all. In this example, the shape of mouse's path is curved, for the following reason: the user rests his elbow or on a prominent forearm muscle near the elbow on a region of a stationary surface, such as a desktop or a chair armrest, to act as a pivot point for the forearm as the forearm moves from position to position to change the mouse location. Although the mouse's path is represented as an arc of a circle, more often the shape of such path is more complex, because the locations of the points A' and B' and the region and length of the user's forearm are unlikely to be such that the user can move the mouse as needed by only a simple pivoting of the forearm. It may be necessary to flex and/or extend the forearm muscles and perhaps also to move or remove the pivot point.

The exact motion of the mouse's path on the mouse pad affects the shape of the cursor's path on the display, and the shape of the cursors path will usually differ from one user to the next due to differing physiological features, such as the length of the users' forearms and muscle characteristics. With sufficient tracking and recording of user characteristics that are associated with how users move mouse cursors, it is possible to identify users in the future based on past observations.

The length of the users' forearms and their muscle characteristics are only two of many physiological features that relate to trackable characteristics suitable for user identification. Additional examples of trackable characteristics include visual reaction times, internal jitter noises, muscle dexterity and control, and nervous and muscular systems reaction times. Monitoring and analyzing such physiological features for the purpose of user identification can be referred to as "motor control based transparent continuous authentication (TCA)."

Another procedure for user identification may be referred to as "motor control based interactive transparent continuous authentication." This procedure uses an algorithm to interfere with the visual display that the user sees to cause an aberration to appear in the output. The aberration can be subtle enough so that the user does not sense any mechanism attempting to confirm his/her identity. For example, if the user moves the mouse from point A' to point B' on the mouse pad, the procedure will prevent the cursor from moving exactly to point B on the display. Perhaps instead the cursor will be a little higher or to the right of point B. The user probably does not know that the interference was added by the interactive TCA algorithm during the user session. Instead, the user probably just thinks that he did not move the mouse to the appropriate position to cause the cursor to appear where he intended.

Aberrations may fall into one of two categories: continuous and local. A continuous aberration is not consciously sensed by the user. Over time, the user becomes accustomed to the conditions of the aberration, and his/her body adapts accordingly. Force field and distortion effects on cursors are examples of such conditions. Users do sense local aberrations, but they do not realize that the aberrations are caused just for the purpose of distorting output, as the types of aberrations resemble typical web experiences, such as that of a mouse cursor disappearing. With either continuous or local aberrations, a user's adaptation thereto is indicative of identity.

In all likelihood, the user will compensate for the aberration in output, and the specific compensating motions are the user's "characteristic response" that can be used for user identification. For example, one user may not compensate for the motion until he has moved the mouse to point B' and then noticed that the cursor was not displayed at point B. Then, he will move the mouse appropriately in a new attempt to bring the cursor to point B. Another user my notice the aberration significantly before the curser gets far for point A, and then she will start her compensation earlier. Of course, by initially tracking a greater number of responses to aberrations, the results later for user identification can become more significant. Also, by causing output aberrations under the motor control interactive TCA procedure, instead of merely collecting responses to unplanned conditions using the motor control based TCA, more controlled conditions are available for more significant and quicker user identification.

The present invention may be embodied as a method of confirming the identity of an end-user operating a computer. A server interfacing with a computer via a local area network (LAN) or the Internet may be programmed to perform this method. Alternatively, the method may be performed on the same computer for which its user's identity is being confirmed. The user may be operating the computer in a home or office setting. The user may instead be in a more public area, such as a bank, and using a computer commonly used by many other users in the same day.

The method begins by causing an aberration in output that the computer provides to an output device. (Step S1.) The output device may be a display for human use, such as the display. The aberration may be caused by a software module, such as JavaScript or flash, in the computer's web browser acting according to instructions from an external server or within the computer.

It is recognized that a bot attempting to operate the computer will not need the same type of output device, for example, a visual display that a human would use. Nonetheless, the bot and its associated computer system implement an analogous type of output device to appear as a user (to "emulate" the user) to the server or other mechanism that is executing the present process of determining whether to confirm the user's identity. Instead of a standard "human" display, the bot may use instead an "emulated display" to receive output in way that attempts to appear as a human display.

As discussed earlier, the aberration of step S1 may be a diverted movement of a cursor on a display. If a bot associated with an emulated display is operating the computer, then the aberration may analogously be a diverted movement on an emulated display. The cursor movement may be diverted by changing the ratio of the angle and/or magnitude of cursor movement that the cursor movement device (or an emulated cursor movement device) specifies to the angle and/or magnitude of the movement of the cursor on the display (or on the emulated display). Types of cursor movement devices include a mouse, a trackball, a touch pad, a natural user interface (NUI) controlled for example by voice or body movement, and the like.

In certain instances, cursor movement may be controlled by a user using a device having a touch-screen display. The user's specific compensating motions upon the touch-screen are then measured to determine the user's "characteristic response" for user identification. In use of the method of the invention with a touch-screen display, the "cursor movement device" is defined as the touch-screen and its associated software for controlling cursor movement.

An emulated cursor movement device is simply the mechanism that a bot may use to communicate to the server or other mechanism executing the present method as if a genuine cursor movement device were being used. That is, the emulated cursor movement device sends signals to appear as if a human is operating the computer.

Other types of aberrations are within the scope of step S1. For example, the aberration can be the disappearance from the display of the cursor that is moved according to signals from of the cursor movement device (as opposed to a keyboard cursor, that is, the cursor that moves in response to characters entered via a keyboard). If the computer is being operated by a bot, then the disappearance would be that of the emulated cursor that moves according to signals from an emulated cursor movement device.

Another kind of aberration to use when the output device is a display (or an emulated display) is the disappearance of the keyboard cursor from the display (or the disappearance of a bot's emulated keyboard cursor from an emulated display). Some users might respond by pressing their keyboards' cursor movement keys. Other might respond by positioning their mouse cursor where they want the keyboard cursor to appear. The specifics of different responses can be used later for user identification, as discussed in more detail below.

An additional kind of aberration is the display of a character that differs from a character that a user specified using his/her keyboard (or that a bot specified using an emulated keyboard). Some users may respond quickly by pressing their keyboard's backspace key. Others may not notice the mistake immediately, especially if they do not typically view the display when typing characters. (They may focus their attention instead on documents.) When they do notice the mistakes, some may delete unwanted characters using the "backspace" key while others respond using the "delete" key. Also, programming common misspellings as aberrations differentiates users by how well they notice the misspellings.

Other types of aberrations become available when another peripheral is used the output device for this method. For example, if the output device is an audio speaker, an aberration could be an increase in volume, either by a small or a large amount (with the intention of seeing whether the user reduces the volume quickly, slowly, or not at all, or whether the user turns the sound off completely).

The preceding discussion of aberrations caused in step S1 is by no means an exhaustive list. Many other types of aberrations are suitable. The goal is to cause the user to respond in such a way to provide information useful for identifying him/her, as discussed in the following.

After the step S1 of causing the aberration, the next step is receiving a response to the aberration. (Step S2.) For example, if the aberration of step S1 was the disappearance or diverted movement of a cursor from the computer's display (or the disappearance or diverted movement of an emulated cursor from an emulated display), the response received in step S2 may be that relating to the cursor movement device (or the emulated cursor movement device) associated with the computer. As one example of the performance of Step S2, if a server is configured to perform the present method, step S2 may be performed by the server receiving the response from the computer operated by the end-user whose identity is to be confirmed. Such may be effected by client-side software, such as JavaScript or flash, installed on the computer's browser to collect raw data relating to the user response and to forward it to the server. The system may be such that the server receives the response from the computer through a LAN or the Internet. The server may instead have a direct connection to the computer, such as by a USB cable or wireless connection. (This latter system can be considered a network of two computers.) Alternatively, this method can be performed on an end-user's computer, so there is no separate server or network. Computer software may be implemented to collect raw data, as in the server example, but the data are transferred internal to the computer for receipt.

After the step S2 of receiving the response to the aberration, the next step is extracting from the response an end-user characteristic. (Step S3.) One way to extract the end-user characteristics is to analyze the raw data collected from in the client side as discussed above, extracting movement features and building a model for each user accordingly. Cross-movement features could also be extracted to enhance model accuracy. Moreover, movement could be characterized by a tag which indicates its type (for example, left/right movement). This tagging could both effected as part of the user model and also in order to create sub-models per tag type. A user's model may be based on supervised learning techniques, which treat other user data as a sample of possible adversaries and thus infer what are the features which are most relevant to detect the current user out of the entire population of users. Alternatively or additionally, a statistical model could be built for each user independently of models for other users. One example algorithm for this is a support vector machine (SVM), which analyzes data and recognizes patterns, and there are other such methods in the field of classification and machine learning.

After the step S3 of building an end-user model from the user's (bot's) response, the next step is to find a similarity of the end-user's response to a stored response. (Step S4.) Accordingly, there is a comparison of the extracted end-user characteristic with the stored responses of that user and with responses of other stored user models that are potential intruders. In each session, the user gets a score value that indicates how much the characteristics are similar to those in the model built in a previous learning process. This score can be accompanied by a certainty level that is based on a self assessment of the model to determine its accuracy. The score and accuracy could possibly be a combined value of both. Moreover, scores from different times or of different types could be integrated to improve classification performance.

A similarity of the end-user's response to a stored response is indicative of the identity of the computer user. In some implementations, though, it may be difficult to obtain enough identifying information from the only one response to an aberration, and repeating the above process can increase accuracy and accelerate the user identification process. Accordingly, it can be desirable to repeat the causing of an aberration (step S1), the receiving of the response (step S2), the extracting of an end-user characteristic (step S3), and the comparing of the end-user characteristic response with stored characteristic responses (step S4). Accordingly, it is queried whether to run the test cycle again (step S5), and if another cycle is to be performed the process flow returns to step S1. For example, it may be desired to repeat the test cycle every time a repeated predetermined time period ends. If the test cycle is not to be run again, the process ends at this point.

A user's response and his extracted end-user characteristics to an aberration, may be plotted by the software of the invention, to determine the user's learning curve over time. During any specific session, several aberrations may appear, and a single human user will correct more rapidly to the aberration as the session progresses (while a bot will not). Additionally, the learning curve of a human user will be more rapid over several sessions than that of either an intruder, unfamiliar with the aberration, or of a bot. The learning curve of the identified (authentic) user will have additional measurable parameters useful for extracting end-user characteristics that may be utilized for identification of the user. Examples of additional measurable parameters of a user's learning curve include: the time a user takes to identify an aberration and the time he takes to correct for it; the continuity of the correction for the aberration; mistakes in correcting for the aberration; noises in correcting the aberration; parameters that define the level of control the user has over the output device (in spite of the aberration) such as parameters of the efficiency of cursor movement in respect to the desired user response.

Embodiments of the present inventors address the situation in which a bot, programmed to emulate an end-user, may fail to "notice" an aberration in output provided to an output device. For example, if the bot is programmed to enter "john.smith" in a user name field, and the display (or emulated display) shows "joh.ith," the bot may have no functionality to check whether "john.smith" indeed appeared as expected. The bot would simply proceed as programmed, such as, by entering a password in a password field. A human user, whether an authorized user or another human acting as if he were an authorized user, would likely respond to the display of "joh.ith" by adding the missing letters "n," "s," and "m" where appropriate.

That is, a human user would most likely respond to an aberration in output differently than if the output did not have the aberration. In contrast, a bot of lesser sophistication might not respond differently at all to the aberration. Thus, the lack of different response to the output with the aberration from the response to the output that did not have the aberration is an indication that the end-user is likely a bot. Thus, the present invention may be embodied as a method of confirming the identity of an end-user operating a computer, the method being particularly suitable for determining whether the end-user is a bot.

Another method begins by causing an aberration in output that the computer provides to an output device. (Step S1.) Such step may be executed analogously to how step S1 of the previous embodiment is executed. After the step S1 of causing the aberration, the next step is determining whether the end-user responds differently to the output than if the output did not have the aberration. (Step S2.) With reference to the example above, if a server or other mechanism were executing the present method, client-side software, such as JavaScript or flash, may be implemented in the computer's browser to collect any cursor movements and keystrokes of a user's response. For example, server could cause the display of "joh.ith" in a user name field after the human user or bot entered "john. smith" and then determine whether the user (or bot) attempts to add the missing "n," "s," and "m." It is assumed in this example that a human user would attempt to add the missing letters.

It is then queried whether the result of the step S2 determination is that the end-user, whether human or a bot, responded differently to the output with the aberration than if the output did not have the aberration. (Step S3.) If the result is affirmative, it is interpreted that the end-user is not a bot. (Step S4.) If instead the result is negative, it is interpreted that the end-user is a bot. (Step S5.) The process then ends.

The preceding discussions explain how the invention may be implemented to detect a bot or an unauthorized human trying to gain access to protected information as if the bot or unauthorized human were the authorized user. However, the invention can also be embodied to detect whether a single human user is acting as multiple users, for example, by having multiple user accounts. A single human user has limited control of his/her characteristic responses, so embodiments of the invention may be used to detect a single user associate with multiple user accounts under the guise of multiple users.

The invention may also be implemented as a device for confirming the identity of an end-user operating a computer. The device may be a server, such as part of a system, or a "stand alone" computer, such as the personal computer. Alternatively, the device may be another type of computing device, such as a smart phone or a tablet, as non-limiting examples. In both the implementations, the device has a processor and a memory. The processor may be an Intel Pentium Processor E5400, an Intel Xeon 5130 CPU, or any other equivalent means for processing (executing) instructions held in the memory. The memory may be a SATA hard drive, a flash memory, SSD, or any other equivalent means for storing instructions that when executed by the processor cause the processor to function as described herein. The memory may also be an external USB flash drive. In some configurations, the end-user interfaces directly with the device of the present embodiment, the personal computer. In some systems, the end-user uses a personal computer to interface with the device, the server, through a network. The network may be a LAN or the Internet or other suitable wired or wireless network.

The personal computer has operationally connected thereto a display, a keyboard, and a mouse on a mouse pad. In alternate embodiments, a different cursor movement device may be used instead in place of the mouse. An end-user may to access the server so its processor data would process data or to view records stored in the memory. For example, the server may be administered by a bank, and the end-user may want to use the processor to effect a funds transfer. Alternatively, the end-user may want to view bank records stored in the memory. In any case, the bank is able to confirm the identity of an end-user that is operating the personal computer. The following explains how the server confirms the identity. The personal computer functions analogously to the server.

The memory holds instructions that the processor executes, which results in the processor causing an aberration in output that the personal computer provides to the display. (In alternate embodiments, a different output device, such as an audio speaker, as discussed above, may be used in place of the display.) Examples of aberrations are as discussed above, such as, the disappearance from or a diverted movement on the display of the cursor that the end-user controls using the mouse, the disappearance of the cursor that the end-user controls using the keyboard, and the display of a character that differs from the character that the end-user specified using the keyboard.

When the end-user experiences the aberration, he/she is likely to react accordingly. Such as, if the cursor did not appear on the display where anticipated, he/she would move the mouse is a fashion to move the cursor to the desired position. The end-user's reaction is detected, for example, by client-side software, such as in a JavaScript or flash module of a web browser loaded on the personal computer, and the software module or equivalent detection means sends a response based thereon to the server, where it is received. (In some embodiments, a software module of JavaScript, Flash, or equivalent detection means on the personal computer transfers a response internal to the personal computer and is handled by the processor.)

After the server receives the response, it extracts an end-user characteristic. Then, the server compares this characteristic response with other characteristic responses, which have been stored, for example, in the memory or in other storage, to find similarities that are indicative of the identity of the end-user. (In some embodiments, a database of characteristic responses may reside on the memory or in another location that is accessible to the processor.)

If desired, the server and the personal computer can repeatedly cause output aberrations throughout a user session to obtain additional identifying information as opposed to the information from only one response to an aberration. Repeatedly causing output aberrations can increase accuracy of and accelerate the user identification procedure as discussed above.

A bot may be operationally connected to the network. Unauthorized users may attempt to gain access to the server by programming the bot to appear to the server as an authorized end-user operating a personal computer, such as the personal computer. The bot includes as functional modules an emulated display, an emulated mouse cursor, an emulated cursor movement device (such as an emulated mouse), and an emulated keyboard, and an emulated cursor that moves according to keystrokes. The purpose of the emulation is to appear to the server as a human user when the server sends instructions, such as those intended for an output device like a display, and when the server receives responses, such as those based on user mouse movements and keystrokes. For implementations in which the server expects responses from a JavaScript, Flash, or like software module of a web browser, the reactions that the bot emulates are received by the JavaScript module and forwarded to the server for processing.

The bot, although programmed to emulate a human end-user as much as possible, may fail to even notice when the server provides an aberration in output. As discussed above (see the example of a bot sending "john.smith" in a user name field and an aberration causing an output "joh.ith"), if the bot responds no differently to an aberration than if there were no aberration, suspicion is raised that a bot is attempting to access the server.

Accordingly, the memory of the server may hold instructions that, when executed by the processor, cause the server to cause an aberration in output that a computer, seemingly like the personal computer, provides to an output device, like the display. If the server determines that there was no different response to the output aberration, the server may interpret the lack of a different response (or, an in sufficient or partial corrective response) as indicative that the end-user is a bot or non-human. The server may be programmed to execute multiple tests such as this as desired to confirm such suspicions.

Having thus described exemplary embodiments of the invention, it will be apparent that various alterations, modifications, and improvements will readily occur to those skilled in the art. Alternations, modifications, and improvements of the disclosed invention, though not expressly described above, are nonetheless intended and implied to be within spirit and scope of the invention. For example, motor control TCA can be applied without the aberrations caused in user output. Accordingly, the foregoing discussion is intended to be illustrative only; the invention is limited and defined only by the following claims and equivalents thereto.

Some embodiments comprise a system, method, and device of detecting identity of a user of an electronic device. A method for confirming identity of a user of a mobile electronic device, the method including: receiving touch data from a touch-screen of the mobile electronic device; receiving acceleration data from an accelerometer of the mobile electronic device; correlating between the touch data and the acceleration data; based on the correlating, generating a user-specific trait indicative of said user. The method further includes storing a reference value of the user-specific trait, indicative of said user; in a subsequent usage session of the mobile electronic device, generating a current value of the user-specific trait correlating between touch data and acceleration data; and based on a comparison between the current value of the user-specific trait and the reference value of the user-specific trait, determining whether or not a current user of the mobile electronic device is an authorized user of the mobile electronic device.

For example, a method for confirming identity of a user of an electronic device, may comprise: receiving touch data from a touch-screen of the electronic device; receiving device orientation data from a gyroscope of the electronic device; determining a relation between (i) the touch data received from the touch-screen of the electronic device, and (ii) the device orientation data received from the gyroscope of the electronic device; based on said relation between (i) the touch data received from the touch-screen of the electronic device, and (ii) the device orientation data received from the gyroscope of the electronic device, generating a user-specific trait indicative of said user of said electronic device and reflecting relation between a manner in which said user is orienting the electronic device while also touching the touch-screen of the electronic device; storing, either locally within said electronic device or on a remote server, a reference value of said user-specific trait which reflects said relation between a manner in which said user is orienting the electronic device while also touching the touch-screen of the electronic device; in a subsequent usage session, generating and storing a current value of the user-specific trait indicating relation between touch data and device orientation data; and based on a comparison process between (A) the current value of the user-specific trait that was generated, and (B) the reference value of the user-specific trait that was previously generated, determining whether or not a current user of the electronic device is an authorized user of the electronic device.

In some embodiments, the step of receiving touch data comprises: receiving non-tactile touch data indicating a hovering user gesture in proximity to said touch-screen of said electronic device.

In some embodiments, the method comprises: determining a user-specific relation among: (I) touch data received from the touch-screen of the electronic device, and (II) device orientation data received from the gyroscope of the electronic device, and (III) acceleration data received from an accelerometer of said electronic device; based on said relation among (I) the touch data and (II) the device orientation data and (III) the device acceleration data, generating said user-specific trait to reflect a distinct manner in which said user both accelerates and orients said electronic device while touching the touch-screen of said electronic device.

In some embodiments, the method comprises: based on the relation between the touch data and the acceleration data, (A) determining that a first physiological region of said user moves when a particular gesture is performed, and (B) determining that a second physiological region of said user does not move when said particular gesture is performed; based on said two determining operations, differentiating among multiple users.

In some embodiments, the method comprises: determining an offset of holding said electronic device in a hand of said user, wherein the offset comprises an offset selected from the group consisting of: the electronic device being held with a palm area of the hand, and the electronic device being held with a fingers area of the hand; based on said offset of holding the electronic device in the hand, differentiating among multiple users.

In some embodiments, the method comprises: determining whether (A) the same hand of the user is utilized for both holding the electronic device and tapping the touch-screen of the electronic device, or (B) a first hand of the user is utilized for holding the electronic device and a second hand of the user is utilized for tapping the touch-screen of the electronic device; based on said determining, differentiating among multiple users.

In some embodiments, the method comprises: constructing a user-specific profile based on said touch data and said acceleration data, wherein the constructing is performed over a pre-defined time-period; dynamically shortening the pre-defined time period for constructing said user-specific profile if one or more identified traits of said user are distinctive.

In some embodiments, the method comprises: constructing a user-specific profile based on said touch data and said acceleration data, wherein the constructing is performed within a constraint selected from the group consisting of: (A) a pre-defined time-period, and (B) a pre-defined number of user interactions; dynamically modifying said constraint for constructing said user-specific profile, based on distinctiveness of one or more traits of said user; storing a flag indicating whether said user-specific profile is either (i) under construction, or (ii) fully constructed.

In some embodiments, the method comprises: constructing a user-specific profile which indicates that for a user-gesture that is performed at a particular geometric place of the touch-screen of said electronic device, a first body part of the user is moving while a second body part of the user is at rest; based on said user-specific profile, differentiating among multiple users.

In some embodiments, the method comprises: constructing a user-specific profile which indicates that for a scrolling gesture that is performed on the touch-screen of said electronic device, a first hand-region of the user is moving while a second hand-region of the user is at rest; based on said user-specific profile, differentiating among multiple users. In some embodiments, the method comprises: analyzing touch-data of a swipe gesture performed by the user on the touch-screen of said electronic device, to determine an estimated width of a finger of said user; constructing a user-specific profile which comprises said estimated width of the finger of the user; based on said user-specific profile, differentiating among multiple users.

In some embodiments, the method comprises: the method comprises: analyzing touch-data of a swipe gesture performed by the user on the touch-screen of said electronic device, to determine an estimated width of a finger of said user; constructing a user-specific profile which comprises said estimated width of the finger of the user; based on said user-specific profile, differentiating among multiple users. In some embodiments, the method comprises: analyzing touch-data of a circular swipe gesture performed by the user on the touch-screen of said electronic device, to determine an estimated distance between (A) a tip of a swiping finger of a hand of said user, and (B) a palm of said hand of said user; constructing a user-specific profile which comprises said estimated distance between the tip of the swiping finger and the palm of the hand; based on said user-specific profile, differentiating among multiple users.

In some embodiments, the method comprises: analyzing touch-data of generally-straight swipe gestures performed by user on the touch-screen of said electronic device; determining that a first user typically rotates the electronic device clockwise while performing generally-straight swipe gestures; determining that a second user typically rotates the electronic device counter-clockwise while performing generally-straight swipe gestures; based on said determinations, differentiating among said first and second users.

In some embodiments, the method comprises: the method comprises: analyzing said touch data and said acceleration data of said electronic device, to determine a level of shakiness of the electronic device while the user operates said electronic device; analyzing said touch data and said acceleration data of said electronic device, to determine an effect, of a performed user-gesture, on said level of shakiness of the electronic device; constructing a user-specific profile which comprises an indication of the effect of the performed user-gesture on the level of shakiness of the electronic device; based on said user-specific profile, differentiating among multiple users. In some embodiments, the method comprises: sensing by said electronic device an amount of pressure of a body part of the user while the user performs a gesture on said electronic device; determining a relation between the sensed amount of pressure and at least one of: said touch data of the electronic device, and acceleration data of said electronic device; based on said relation, differentiating among multiple users.

In some embodiments, the method comprises: determining a current location of the electronic device; determining a relation among: (A) the current location of the electronic device, and (B) said touch data of the electronic device, and (C) said acceleration data of the electronic device; based on said relation, differentiating among multiple users.

In some embodiments, the method comprises: determining geographic location of the electronic device; determining a relation among: (A) the current location of the electronic device, and (B) said touch data of the electronic device, and (C) said acceleration data of the electronic device; based on said relation, (a) determining that a first user, typically places the electronic device horizontally on a flat surface when utilizing the electronic device in a first geographic location, and (b) determining that said first user, typically holds the electronic device slanted relative to the ground when utilizing the electronic device in a second geographic location; based on said determinations, differentiating among the first user and another user. In some embodiments, the method comprises: determining a currently-used application of the electronic device, that the user is currently utilizing on said electronic device; determining a relation among: (A) the currently-used application of the electronic device, and (B) said touch data of the electronic device, and (C) said acceleration data of said electronic device; based on said relation, differentiating among multiple users.

In some embodiments, the method comprises: determining a currently-used application of the electronic device, that the user is currently utilizing on said electronic device; determining a relation among: (A) the currently-used application of the electronic device, and (B) said touch data of the electronic device, and (C) said acceleration data of the electronic device; based on said relation, (a) determining that a first user typically holds the electronic device vertically when utilizing a first particular application of the electronic device, and (b) determining that said first user typically holds the electronic device slanted relative to the ground when utilizing a second particular application of the electronic device; based on said determinations, differentiating among multiple users. In some embodiments, the method comprises: determining whether a current location of the electronic device is outdoors or indoors; determining a relation among: (A) the current location of the electronic device being either outdoors or indoors, and (B) said touch data of the electronic device, and (C) said acceleration data of said electronic device; based on said relation, differentiating among multiple users.

The present invention may include, for example, systems, devices, and methods for detecting identity of a user of a mobile electronic device, and for determining that a mobile electronic device is used by a fraudulent user. In accordance with the present invention, for example, a method for confirming identity of a user of a mobile electronic device may comprise: receiving touch data from a touch-screen of the mobile electronic device; receiving acceleration data from an accelerometer of the mobile electronic device; correlating between the touch data and the acceleration data; based on the correlating, generating a user-specific trait indicative of said user. In accordance with the present invention, for example, the method may comprise: storing a reference value of the user-specific trait, indicative of said user; in a subsequent usage session of the mobile electronic device, generating a current value of the user-specific trait correlating between touch data and acceleration data; and based on a comparison between the current value of the user-specific trait and the reference value of the user-specific trait, determining whether or not a current user of the mobile electronic device is an authorized user of the mobile electronic device. In accordance with the present invention, for example, storing comprises: storing within said mobile electronic device; and said comparison is performed within said mobile electronic device. In accordance with the present invention, for example, storing comprises storing externally to said mobile electronic device; and said comparison is performed externally to said mobile electronic device, and comprises wirelessly receiving at the mobile electronic device an indication of said comparison. In accordance with the present invention, for example, said touch data comprises non-tactile touch data indicating a hovering user gesture in proximity to said touch-screen. In accordance with the present invention, for example, the method may comprise: receiving gyroscope data from a gyroscope of the mobile electronic device; correlating between the touch data and the gyroscope data; based on the correlating between the touch data and the gyroscope data, generating another user-specific trait indicative of said user.

In accordance with the present invention, for example, the method may comprise: capturing non-tactile motion data indicating a user gesture; correlating between the non-tactile motion data and the acceleration data; based on the correlating between the non-tactile motion data and the acceleration data, generating another user-specific trait indicative of said user.

In accordance with the present invention, for example, the method may comprise: comparing between (a) a currently-calculated value of the user-specific trait, corresponding to a current usage of the mobile electronic device, and (b) a previously-calculated value of the user-specific trait, corresponding to a previous usage of the mobile electronic device; and based on a comparison result, performing at least one of: restricting access of said user to an online service; restricting access of said user to an application installed on said mobile electronic device; requiring the user to authenticate his identity to an online service; requiring the user to authenticate his identity to an application installed on said mobile electronic device.

In accordance with the present invention, for example, the method may comprise: based on said touch data, estimating user-specific motor control parameters and user-specific motor control noise; and based on the estimated user-specific motor control parameters and user-specific motor control noise, differentiating between said user and another user.

In accordance with the present invention, for example, the method may comprise: based on said touch data, estimating user-specific motor control parameters and user-specific motor control noise of a control loop which comprises translation error and gesture velocity error; and based on the estimated user-specific motor control parameters and user-specific motor control noise, differentiating between said user and another user. In accordance with the present invention, for example, the method may comprise: based on said correlating, estimating a user-specific physiological trait of said user; and based on the user-specific physiological trait, differentiating between said user and another user. In accordance with the present invention, for example, estimating the user-specific physiological trait of said user comprises at least one of: estimating a length of a finger of the user; estimating a width of a finger of the user; estimating a size-related parameter of a finger of the user; estimating a distance between a tip of a finger of the user and another part of a hand of the user. In accordance with the present invention, for example, the method may comprise: based on said correlating, estimating a user-specific behavioral trait of said user; and based on the user-specific behavioral trait, differentiating between said user and another user. In accordance with the present invention, for example, estimating the user-specific behavioral trait of said user comprises: determining that said user typically performs a particular inadvertent gesture while performing a user-intended input-providing gesture.

In accordance with the present invention, for example, estimating the user-specific behavioral trait of said user comprises one or more of: determining that said user typically moves the mobile electronic device at a particular direction while performing a touch gesture; determining that said user typically rotates the mobile electronic device while performing a touch gesture; determining that said user typically slants the mobile electronic device at a particular angle while performing a touch gesture. In accordance with the present invention, for example, estimating the user-specific behavioral trait of said user comprises: determining that said user typically holds the mobile electronic device with a first hand of the user and concurrently performs an input-providing gesture with a second hand of the user. In accordance with the present invention, for example, estimating the user-specific behavioral trait of said user comprises: determining that said user typically holds the mobile electronic device with a single hand and concurrently performs an input-providing gesture with said single hand. In accordance with the present invention, for example, the method may comprise: based on said correlating, estimating a first user-specific behavioral trait of said user which corresponds to a first usage scenario; based on said correlating, estimating a second user-specific behavioral trait of said user which corresponds to a second usage scenario; based on the first and second user-specific behavioral traits, differentiating between said user and another user. In accordance with the present invention, for example, the method may comprise: based on said correlating, estimating a first user-specific behavioral trait of said user which corresponds to a first usage scenario in which said user operates said mobile electronic device while the user holds said mobile electronic device; based on said correlating, estimating a second user-specific behavioral trait of said user which corresponds to a second usage scenario in which said user operates said mobile electronic device while the user does not hold said mobile electronic device; based on the first and second user-specific behavioral traits, differentiating between said user and another user. In accordance with the present invention, for example, a mobile electronic device may be configured to confirm identity of a user of said mobile electronic device; the mobile electronic device comprising: a touch-screen to receive touch data; an accelerometer to receive acceleration data; a correlator module to correlate between the touch data and the acceleration data; a trait extractor module to generate a user-specific trait indicative of said user, based on correlation between the touch data and the acceleration data.

Applicants have realized that each user of a mobile electronic device may handle the device in a unique manner which may be detected and may be utilized for confirming the identity of the user, or for other security-related purposes or fraud-detection purposes. Applicants have realized, for example, that different users cause different type of acceleration to the mobile device when they perform the same operation or touch-gesture (e.g., swiping or tapping or scrolling on the touch-screen), or may tilt or rotate or slant the mobile device in different, unique ways when they perform such gestures or operations.

The present invention may include, for example, biometric modalities, personal trait extraction modalities, and/or identity authentication modalities which may be used in conjunction with a mobile or portable electronic device, and may utilize a combination of (or correlation between) acceleration parameters and/or touch data. Such parameters may be used in order to deduce unique insights regarding the identity or possible identity of the user of the mobile electronic device, or in order to determine whether or not the user is considered to be the "genuine" user, or in contrast, an attacker or impersonator or "fraudster".

The present invention may capture, monitor, or otherwise utilize for deduction of insights, the coupling or correlation between (a) touch-screen interaction, or other user gestures, and (b) accelerometer(s) measurements and/or gyroscope(s) measurements. The present invention may further deduce and/or utilize one or more other biometric traits or identity-authentication traits, for example, touch or swipe locations, pressure dynamics, identification of physiological regions (e.g., in the hand of the user) that move while other regions do not move when a user gesture is performed, or other suitable traits in order to assist in identification and/or authentication of the user of the mobile device. The present invention may sufficiently capture unique qualities of a human user to be usable as a biometric for authentication. Different people may have different preferred orientations for holding or grasping (e.g., in their hand) a mobile device, and/or a different way in which they press or touch or tap the touch-screen (e.g., the applied force, the duration of the tapping, or the like).

Applicants have realized that physical traits such as, for example, hand size, hand mass, or other traits, may change the way in which a user's interacting hand and his device-holding hand are correlated. In a demonstrative example, the present invention may distinguish or differentiate between (a) a person who is using one single hand for both holding the mobile device and tapping on its touch-screen (or performing other touch gesture), and (b) a person who is using one hand to hold the mobile device and another hand to tap on its touch-screen (or to perform other touch gesture or user gesture). Moreover, as Applicants have realized, different tap locations (e.g., top-left corner or region of the touch-screen, versus bottom-right corner or region) may create different torque(s) on the mobile device, further depending on the tap strength, the offset of the mobile device in the hand (e.g., the device being held high or low, with the palm area or the fingers area, or the like) and/or the size of the hand (e.g., if the same hand is used for both holding the device and tapping on its touch-screen).

The terms "mobile device" or "mobile electronic device" as used herein may include, for example, a smartphone, a cellular phone, a mobile phone, a tablet, a handheld device, a portable electronic device, a portable gaming device, a portable audio/video player, a smart-watch, a digital watch, a digital wrist-watch, an Augmented Reality (AR) or Virtual Reality (VR) device or glasses or helmet or headset (e.g., similar to Google Glass, or similar to Oculus Rift), a fitness band or fitness watch, a laptop computer, a tablet computer, a notebook computer, a netbook computer, an electronic device which comprises at least an accelerometer and a touch-screen, or the like.

The term "genuine user" as used herein may include, for example, an owner of a mobile electronic device; a legal or lawful user of a mobile electronic device; an authorized user of a mobile electronic device; a person who has legal authorization and/or legal right to utilize a mobile electronic device, for general purpose(s) and/or for one or more particular purpose(s); or the person who had originally defined user credentials (e.g., username and password) for performing an activity through the mobile electronic device.

The term "fraudulent user" as used herein may include, for example, any person who is not the "genuine user" of the mobile electronic device; an attacker; an intruder; a man-in-the-middle attacker; a man-in-the-browser attacker; an unauthorized user; an impersonator; a hacker; a cracker; a person attempting to hack or crack or compromise a security measure utilized by the mobile electronic device or utilized by an activity or service accessible through the mobile electronic device; a fraudster; a human fraudster; a "bot" or a malware or an automated computerized process (e.g., implemented by using software modules and/or hardware components) which attempts to imitate human behavior or which attempts to act as if such "bot" or malware or process was the genuine user; or the like.

The term "user gesture" as used herein may include, for example, a gesture or movement or other operation that a user of a mobile device performs on a touch-screen of the mobile device, or performs in proximity to the touch-screen of the mobile device; touch gesture; tap gesture or double-tap gesture or prolonged tap gesture; scroll gesture; drag gesture, or drag-and-drop gesture; release gesture; click or double-click gesture; hovering gestures, in which the user may hover with his finger(s) or hand(s) in proximity to the touch-screen of the mobile device but without necessarily touching the touch-screen device; hovering gestures that may be captured by a camera of the mobile device, or by a touch-screen of the mobile device (e.g., by taking into account electrical and/or magnetic effects of such gestures); hovering gestures which may be generally similar to touch-free hovering gestures that a Samsung Galaxy S4 smart-phone is able to detect; finger(s) gestures and/or hand(s) gestures made in a three-dimensional space, for example, similar to movement gestures that a Microsoft Kinect motion sensing input device is able to sense; and/or a combination of such gestures or other gestures.

In some embodiments, a mobile device may comprise, for example, a processor, a memory unit, a storage unit, a wireless transceiver, a touch-screen, one or more accelerometers, and one or more gyroscopes. The mobile device may further comprise, for example, one or more hovering sensors, one or more motion gesture sensor(s), a correlator, a trait extractor, a trait repository, a profile constructor module, an identity authenticator module, and a physiological trait estimator. Mobile device may comprise other suitable hardware components and/or software modules, for example, a power source (e.g., a rechargeable battery), an Operating System, software applications, or the like.

Touch-screen may receive user gestures, for example, tapping, double-tapping, dragging, pressing, holding down, releasing, scrolling, pinching fingers for zoom-out, spreading fingers for zoom-in, or the like). Touch data may be stored in a touch data repository, optionally in association with a time-stamp associated with each touch data-item being stored.

Accelerometer(s) may comprise, for example, a three-axis accelerometer able to measure acceleration, separately, along three axes (X axis, Y axis, Z axis). Accelerometer readings may be stored in an acceleration data repository, optionally in association with a time-stamp associated with each acceleration data-item being stored.

Gyroscope(s) may comprise, for example, a three-axis gyroscope able to measure orientation and/or rotation, e.g., separately along three axes (X axis, Y axis, Z axis). The measured data may be stored in a gyroscope data repository, optionally in association with a time-stamp associated with each orientation/rotation data-item being stored.

Hovering sensor(s) may comprise, for example, one or more sensors (e.g., optical sensors, magnetic sensors, electric sensors, touch-screen components, camera components, or the like) able to sense hovering gesture(s) of the user of the device, for example, in a three-dimensional space or separately along three axes (X axis, Y axis, Z axis). The measured data may be stored in a hovering data repository, optionally in association with a time-stamp associated with each hovering data-item being stored.

Motion gesture sensor(s) may comprise, for example, one or more sensors able to sense motion gesture(s) of the user of the device, for example, in a three-dimensional space or separately along three axes (X axis, Y axis, Z axis). The measured data may be stored in a motion gesture data repository, optionally in association with a time-stamp associated with each motion gesture data-item being stored.

Correlator may search for, or identify or determine, correlation among (a) acceleration data and/or gyroscope data, and (b) touch data and/or hovering data and/or motion gesture data. Trait extractor may determine one or more user-specific traits or characteristics which may be, or may appear to be, unique to (or indicative of) a particular user, based on one or more correlation(s) identified by correlator. Trait values or trait indicators, or data indicative of extracted user-specific traits, may be stored in a trait repository.

Profile constructor module may utilize a learning algorithm to construct a user profile based on the one or more user-specific traits identified by trait extractor and stored in trait repository. Profile construction may be performed over a per-defined time period (e.g., five hours, or three days) of the user interacting with the device; or over a pre-defined number of interactions (e.g., 12 or 25 or 100 interactions) of the user with the device. Optionally, profile constructor module may dynamically extend or shorten or modify the required time-period or interaction number, for example, if traits of a particular user are distinctive and are rapidly extracted over a shorter period of time or over a smaller number of user interactions. Constructed user profiles may be stored in a user profile repository, which may be internal to the device or may be external thereto (e.g., in a remote server or in a "cloud computing" server), optionally with an associated flag or parameter indicating whether a particular user profile is fully constructed or under construction.

Identity authenticator module may capture one or more traits of a user who is currently utilizing device, and may analyze and determine whether or not these traits are similar to, or different from, user-specific traits in a user profile associated with a user that is believed to be a "genuine" user of the device. The analysis results may be notified by identity authenticator module to other units or modules, within the device (e.g., an application or process running in the device) and/or externally to the device (e.g., on a remote server, on a remote web-site or web-page, in a "cloud" server or device).

For example, if the analysis indicates that the current user of the device is not the genuine user, then, one or more fraud-stopping operations or additional authentication operations may be triggered and performed, for example, requiring the user to re-enter his password or pass-phrase or Personal Identification Number (PIN), requiring the user to answer one or more security questions, requiring the user to perform log-in operations or to provide account details (e.g., to provide date-of-birth data), requiring the user to place a phone call to a fraud department or a security department of a service or entity associated with an application running on the device; blocking or restricting or curtailing access of the user to one or more services or features which may be generally available through the device; or the like.

Correlator may identify user-specific physiological correlations. For example, correlator may identify one or more geometric place(s), on touch-screen or in a space proximate to touch-screen, in which a user gesture is associated with movement of a user body part (e.g., the thumb; one or more fingers; the palm or wrist) while also being associated with rest or non-movement of other body parts of the user. Based on the user-specific physiological correlations, trait extractor may extract user-specific physiological trait(s).

In a demonstrative example, trait extractor may determine that for the user Adam, a vertical scroll-down touch-gesture is typically associated with movement of the root of the thumb, while the other fingers are at rest and while the wrist or palm-base are at rest; whereas, for the user Bob, a vertical scroll-down touch-gesture is typically associated with both movement of the root of the thumb, as well as with slight rotational movement of fingers that hold or support the rear of the mobile device, and while the wrist or palm-base are at rest. This may be subsequently used for user authentication or for identity confirmation, to distinguish between a "genuine" user (e.g., Adam) and a fraudulent user or non-genuine user (e.g., Bob) when the user of the device performs a similar user gesture.

In another demonstrative embodiment, correlator may determine that the user of the device (e.g., the "genuine" user), while performing a primary gesture or an intended gesture (e.g., required in order to provide user input to the device), typically also performs a secondary gesture an inadvertent gesture (e.g., not required in order to provide user input to the device). For example, the primary gesture may be a scrolling gesture, a zoom-in or zoom-out gesture, a dragging gesture, a tapping gesture, or other user input gesture; whereas, the secondary gesture (e.g., the inadvertent or unintended gesture, to which the user may not even be aware) may be, for example, slight or significant rotating or spinning of the device, slight or significant movement of the device (e.g., in a particular direction), slight or significant tilting or slanting of the device (e.g., at a particular angle or range-of-angles), or the like.

In another demonstrative embodiment, correlator may be associated with, or may operate in conjunction with, physiological trait estimator which may be able to indirectly estimate one or more physiological traits or physiological characteristics of the user of the device, and particularly, of the hand(s) or finger(s) (e.g., a finger, a thumb, or the like) of that user. For example, physiological trait estimator may estimate a width of a finger or thumb based on a width of a swiping trace performed by the finger on touch-screen; may estimate a length of a finger or thumb based on a radius of a circular or arched or curved swiping motion on touch-screen; may estimate the distance between the tip of a finger or thumb and the palm of the hand, or the wrist; may estimate other dimensions of hand-parts, or relations between such hand parts; or the like. Physiological trait estimator may thus estimate physiological characteristics which may be unique to a particular user, and may assist in confirming user identity and/or in detecting a non-genuine user impersonating the genuine user.

Additionally or alternatively, correlator may be associated with, or may operate in conjunction with, a motor control estimator which may estimate user-specific motor control parameters based on the user's interaction with the mobile device. Such parameters may include, for example, parameters of the action-perception loop modeling the hand-eye coordination, as well as control loop parameter, motor noise, perception noise, or the like. Motor control estimator may estimate user-specific parameters of motor control, which may be more inherent to the user and may be less action-dependent.

In a demonstrative implementation, for example, motor control estimator may track a user gesture on the touch-screen (e.g., a scroll or swipe gesture). The movement or gesture may begin at rest in a start-point (X0, Y0) and may end at rest in an end-point (X1, Y1). A demonstrative control loop of the second order, for example, may assume that the force of the hand is governed by a linear combination of two error terms: a translation error, and the current velocity error. Examples of such determinations of a motor control loop, and its parameters, which are user specific, are described above.

Accordingly, motor control estimator may estimate or may simulate trajectories which may be similar to human trajectories; and although a velocity curve may be different for each movement of the same movement, the velocity curve may be generated by the same model parameters of that specific user. Motor control estimator may thus estimate these three parameters (for the X-axis, and/or for the Y-axis), thereby estimating user-specific motor control traits which may be used for differentiating between a genuine user and an impersonator or attacker, regardless of the specific movement(s) or gesture(s) performed. The above is only a demonstrative example, and motor control estimator may utilize other motor control estimations, forward model(s), feedback model(s), estimation of similar peak velocity (or other movement properties) for different movements (e.g., if the error terms are distorted by a non-linear function).

Additionally or alternatively, correlator may identify user-specific behavioral correlations. For example, correlator may identify that when a particular user performs a particular user-gesture, performance of the gesture affects in a particular way the acceleration data and/or the orientation/rotation data of the device. Based on the user-specific behavioral correlations, trait extractor may extract user-specific behavioral trait(s).

In a demonstrative example, trait extractor may determine that for the user Adam, a horizontal swipe gesture is typically associated with a counter-clockwise rotation in the range of 10 to 15 degrees around a vertical axis (e.g., a rotation axis parallel to the longest dimension of the device); whereas, for the user Bob, a horizontal swipe gesture is typically associated with a clockwise rotation in the range of 5 to 10 degrees (or, with substantially no rotation at all) around that vertical axis. This may be subsequently used for user authentication or for identity confirmation, to distinguish between a "genuine" user (e.g., Adam) and a fraudulent user or non-genuine user (e.g., Bob) when the user of the device performs a similar user gesture.

Correlator may be configured to search for, and detect, other user-specific behavioral correlations, for example: correlations based on the manner of holding device (e.g., a primary angle of holding), and the effect of various user gestures on such holding or on the primary angle of holding; correlations based on the stability or the shakiness of device (e.g., optionally taking into account the amount and/or frequency and/or timing of hand vibrations or hand movements), and the effect of various user gestures on such device stability or shakiness, or on stability or shakiness of the hand of the user that holds or operates the device; correlations based on movement, spinning, rotation and/or acceleration of the device, along one axis or two axes or three axes, as a result of (or concurrently with) a user gesture such as, for example, tap, double-tap, prolonged tap, release, drag, drag and drop, click, double-click, rotation or movement of an on-screen object, rotation of the device by 90 degrees or 180 degrees or 270 degrees, horizontal or vertical or diagonal swipe gesture, scroll gesture, zoom-in or zoom-out gestures, user operations on physical buttons or sliders or interface components of the device (e.g., volume interface, camera button, button for capturing an image or a video), or the like.

Correlator may further detect correlations based on movement, spinning, rotation and/or acceleration of the device, along one axis or two axes or three axes, that occur prior to or subsequent to a user gesture. For example, correlator may detect that a first particular user typically tilts the phone from being generally perpendicular to the ground, to being generally parallel to the ground, immediately prior to performing a zoom-out gesture (e.g., a "pinching" gesture with two fingers on touch-screen). Similarly, correlator may detect that a second particular user typically rotates the phone counter-clockwise, immediately subsequent to performing a zoom-in gesture (e.g., spacing apart two fingers on touch-screen). In some implementations, for example, a correlation may be detected while the user gesture is performed, immediately before the user gesture is performed (e.g., within 0.5 seconds prior to the user gesture), and/or immediately after the user gesture is performed (e.g., within 0.5 seconds subsequent to the user gesture).

Optionally, correlator may detect other suitable correlations, and may take into account other types of readings or sensed data, for example, data indicating a temperature or moisture level or sweat level which may be associated with a user gesture, data indicating the amount of pressure or force applied by a user (e.g., when pressing on touch-screen), or the like.

In a demonstrative example, a first user may typically scroll down with his finger on touch-screen while slightly rotating the mobile device around its longest axis; and a correlation may be identified between the respective touch data and acceleration/orientation data, indicative of the first user. In contrast, a second user may typically scroll down while maintaining the mobile device non-rotating, or while rotating the mobile device at a different direction or angle, or at a different acceleration value, thereby allowing to identify a different correlation, indicative of the second user.

Optionally, the present invention may identify, create and utilize a first set of behavioral traits which correspond to the behavior of a particular user when he is utilizing his mobile device in a first holding scenario (e.g., when the user is holding the mobile device in his hand), and a second (different) set of behavioral traits which correspond to the behavior of that particular user when he is utilizing his mobile device in a second holding scenario (e.g., when the mobile device is placed on a table or flat surface and the user operates the mobile device without holding it). Accordingly, the present invention may create and utilize a behavioral profile for that user, which may comprise multiple sub-profiles of behavioral traits that correspond to such multiple usage scenarios by the same (e.g., "genuine") user. In a subsequent usage of the mobile device, the system may compare the behavioral traits of the subsequent user, to each one (e.g., separately) of the pre-stored sets of behavioral traits (or behavioral sub-profiles), in order to detect or determine whether that subsequent user is the "genuine" user operating in one of the known usage scenarios, or alternatively a fraudulent user or attacker. Similarly, the present invention may generate and/or utilize complex profiles that may comprise sub-profiles or sets of traits (e.g., behavioral traits, physiological traits, motor control traits), such that each set or sub-profile may correspond to a particular usage scenario or a particular holding scenario of the user; and a subsequent usage may be compared, separately, to each one of those sub-profiles (or sets of traits) in order to determine user authenticity.

The terms "correlation", "correlator", "to correlate", and similar or equivalent terms which may be used herein, are used for demonstrative purpose only; they may include, for example, statistical correlation, or statistically-significant correlation, or any other type of relation or indication or matching between two parameters or between groups of values. In some embodiments, there need not be statistically-significant correlation between, for example, touch data and acceleration data, in order to identify or extract unique user trait(s); but rather, there may be other type of relation or matching between touch-data and acceleration data in order to determine such "correlation".

In accordance with the present invention, the mobile device may continuously track and/or monitor the correlation between touch-data and acceleration/orientation data. Correlation values may be used to determine user-specific traits, that are indicative of the user of the mobile device, which may be regarded initially as the "genuine" user. Then, during subsequent usage of the mobile device, correlation between touch-data and acceleration/orientation data may be tracked and identified, and may be compared to the correlation previously-determined for the genuine user, in order to confirm that a current user is indeed the genuine user, or in order to determine or to estimate that a current user is a non-genuine user.

In a demonstrative implementation, an application or a website may be accessible through the device through an access control process or a user authentication process. Such application or website may be, for example, an email account, a social network account, a video conference application, a chat application, an online banking application or website, a securities trading application or website, an electronic commerce account or website, or the like. The user may be prompted to create a new user account (e.g., define a username and password); and then, or in parallel, user-specific traits may be captured through passive means and/or active means, which may be known to the user or may be hidden from the user.

For example, a profile creation page or application may require the user to perform various touch operations (e.g., tapping, scrolling, dragging, or the like), and may capture touch data as well as acceleration/orientation data, which may then be correlated in order to identify a biometric trait indicative of the user who is currently creating the profile, or who is otherwise believed to be a genuine user (e.g., based on password entry and/or responses to security questions or other challenge-response mechanisms). Optionally, an active challenge may be posed to the user, for example, by explicitly asking the user to perform one or more particular touch gestures on touch-screen, either as "hidden" challenges (in which the user is not aware that he is actively challenged for security purposes) or as non-hidden challenges (in which the user is advised that, as a security measure, he is required to perform certain touch gestures in order to extract biometric traits).

A method may be implemented by a mobile electronic device, by one or more hardware components and/or software modules of a mobile electronic device, by a system, or the like. The method may include, for example, capturing at least one of touch data, hovering data, motion data, gesture data (block 510). The method may include, for example, capturing at least one of acceleration data, gyroscope data, device orientation/rotation data, principal axes rotation data (e.g., normal axis or yaw, lateral axis or pitch, longitudinal axis or roll) (block 520). The operations of block 520 may be performed simultaneously or concurrently with, or in parallel to, the operations of block 510. The method may include, for example, correlating or matching (block 530) between the data captured in block 510 and the data captured in block 520. The method may include, for example, extracting a user-specific trait (block 540) based on the correlating or matching of block 530. The user-specific trait may include, for example, one or more behavioral traits, physiological traits, motor control traits, or other user-specific characteristics. The method may include, for example, subsequently, confirming user identity based on said user-specific trait (block 550). Other suitable operations may be used in accordance with the present invention.

In accordance with the present invention, correlation between touch-data and acceleration/orientation data may be identified and/or checked locally in the mobile device; or remotely, such as in a remote server which may receive such data via a wireless communication link from the mobile device; or by using other suitable architecture, for example, a hybrid architecture in which some operations may be performed locally and other operations may be performed remotely. Accordingly, components or modules that are depicted, for demonstrative purposes, as being included in the mobile device, may be implemented at a remote server or within other suitable units. The present invention may be implemented in a stand-alone mobile device, such that data collection and processing may be performed within the device; or in a client-server architecture, such that the device may collect data and may wirelessly transmit the collected data to a remote server for processing and analysis; or in a "cloud computing" architecture in which data is stored remotely and is also processed remotely. Other suitable architectures may be used, to deploy a system in which a particular mobile device "knows" or recognizes its genuine user, or, to deploy a system in which a particular application or website "know" or recognize a genuine user, based on the above-mentioned correlations.

In a demonstrative experiment in accordance with the present invention, multiple participants were asked to hold a particular mobile device (an iPad tablet), to drag (with a finger) a displayed green circle towards a displayed red target, and then to release the dragged item once it reached the red target. Accelerometer data and touch data were collected while performing the requested operations. The experiment measured the touch and release signals, as well as accelerometer measurements; and then triggered the acceleration data according to the touch time. The Applicants generated graphs, which demonstrate acceleration as a function of time over three separate axes, thereby demonstrating at least two identifying characteristics which may be used as a user-specific trait. As a first identifying characteristic, the phasic level (observed at the X axis) may have different values for different people, corresponding to different posture of the mobile device. As a second identifying characteristic, the transient shape once the device is clicked (observed at the Z axis) may have different values for different people. This data may be transformed or analyzed, for example, by using dimension reduction techniques (e.g., kernel-principle-component-analysis), thereby demonstrating the biometric capability of synergizing between touch data and acceleration data.

The Applicants generated another graph of the main axes of the dimension-reduced space of the accelerometer reaction to tapping. Each small item in the graph represents one trial, and each shape or character in the graph (e.g., circle, square, diamond, triangle) represents a different user. This graph demonstrated identifiable clusters of trials, each such cluster corresponding to a different user.

In certain scenarios, posture data (e.g., phasic response) may be neglected or may not be available, for example, if the mobile device is operated while being placed on a table or a flat surface and is not hand-held by the user. In such scenarios, only the device's kinematics during taps may be taken into account, and still the present invention may capture sufficient information for biometric functions. The Applicants generated another graph, depicting the feature space, where each dot represents a trial; greyed circles represent trials performed by one particular user, and black circles represent trials performed by the other participants. It demonstrated dimension reduction when only the device's kinematics are taken into account, showing that, still, sufficient significant biometric information may be captured and determined.

The present invention may be used in order to automatically identify that a user (e.g., an attacker or a "fraudster") is attempting to pose as (or impersonate, or "spoof") another user (e.g., the "real" user or the genuine user). In accordance with the present invention, the attacker would need to carefully and correctly imitate the exact accelerometer response for tapping (or for other suitable touch-screen operations, such as scrolling, dragging, releasing), taking into account the particular kinematics properties of the genuine user; and such imitation may be extremely difficult and unlikely, or even impossible, for most attackers.

The present invention may utilize signal processing and/or machine learning techniques, in order to build or generate a template model or a profile which corresponds to the genuine user; and then compare subsequent instance(s) or sample(s) to the pre-built (and locally stored, or remotely stored) model or profile. If the subsequent samples are consistent with the pre-built model or profile, then a first output score may be generated (e.g., having a high value in a predefined numeric range, such as a value of 98 on a scale of 0 to 100); whereas, if the subsequent samples are inconsistent with the pre-built model or profile, then a second output score may be generated (e.g., having a lower value on the predefined numeric range, such as a value of 34 on the scale of 0 to 100). In some implementations, an output score greater than a threshold value may be used (alone, or in combination with other biometric traits and/or other authentication measures) as an indication that the current user is the genuine user; whereas an output score lower than the threshold value may be used (alone, or in combination with other biometric traits and/or other authentication measures) as an indication that the current user is not the genuine user.

The present invention may further be used to differentiate or distinguish between the genuine (human) user, and a robot or a machine-operable module or function (e.g., implemented as a computer virus, a Trojan module, a cyber-weapon, or other malware) which attempts to automatically imitate or emulate or simulate movement of a cursor or other interaction with a touch-screen. For example, false identity created by automated malware may be detected by the present invention as such automated malware may lack the characterization of human (e.g., manual) behavior, such as the touch features (e.g., speed, pressure) and/or its accelerometer correlated measurements.

The present invention may operate and may provide an efficient biometric or user-authentication modality, without capturing, storing, or otherwise identifying any Personally Identifiable Information (PII). For example, the present invention may be used to distinguish between a genuine user and a fraudster, without knowing any PPI of the genuine user and/or of the fraudster.

The present invention may detect correlations and extract user-specific traits based on passive data collection and/or based on active challenges. In passive data collection, the mobile device may detect that the user is performing a particular operation (e.g., a vertical scroll gesture), and may further detect that performing this gesture affects in a user-specific way the acceleration and/or the orientation/rotation of the mobile device. In an active challenge, the mobile device (or an application or process thereof) may actively present a challenge to the user, such as, a requirement to the user to perform horizontal scrolling, in order to capture data and detect user-specific correlation(s). The active challenge may be hidden or may be unknown to the user, for example, implemented by creating a Graphical User Interface (GUI) that requires the button to scroll in order to reach a "submit" button or a "next" button or a "continue"

button, thereby "forcing" the user to unknowingly perform a particular user-gesture which may be useful for correlation detection or for extraction of user-specific traits, as described. Alternatively, the active challenge may be known to the user, and may be presented to the user as an additional security feature; for example, by requesting the user to drag and drop an on-screen object from a first point to a second point, as an action that may be taken into account for confirming user identity.

Some embodiments of the present invention may be implemented, for example, as a built-in or integrated security feature which may be a component or a module of a mobile device, or may be a downloadable or install-able application or module, or plug-in or extension; or as a module of a web-site or web-page, or of a client-server system or a "cloud computing" system; or as machine-readable medium or article or memory unit able to store instructions and/or code which, when executed by the mobile device or by other suitable machine (e.g., a remote server, or a processor or a computer) cause such machine to perform the method(s) and/or operations described herein.

Some units, components or modules, that are discussed for demonstrative purposes as comprised within the mobile device, may be implemented externally to the mobile device, may be implemented in a remote server, a web server, a website or webpage, a "cloud computing" server or database, a client/server system, a distributed system, a peer-to-peer network or system, or the like.

In some embodiments of the present invention, the analysis or correlation or matching (e.g., between accelerometer/gyroscope data, and touch-data or hovering data or other user-gesture data) may be location-based and/or application-based, or may otherwise take into account a geographical location or geo-spatial location of the mobile device or the application(s) being used or that are installed on the device. In a demonstrative example, a suitable module (e.g., a location-aware module or location-determining module) in the mobile device may determine the current location of the mobile device, based on GPS data or Wi-Fi data or cellular triangulation data or mobile network cell data or other location-identification techniques. The mobile phone may then utilize a suitable module (e.g., a correlator or matching module between location and user-specific behavioral usage traits) in order to deduce or determine, for example: that when the user utilizes his mobile device in a first location (e.g., in his office), then the mobile phone is typically placed horizontally on a flat surface (e.g., a table); that when the user utilizes his mobile phone in a second location or type of location (e.g., outdoor, on the street, in the park), then the mobile phone is typically held by the hand of the user at a slanted angle or diagonally (e.g., at approximately 45 to 60 degrees relative to the ground); that when the user utilizes his mobile phone in a third location or type of location (e.g., at a Point-Of-Sale (POS) terminal or register or cashier, at a supermarket or a retail store), then the mobile phone is typically held generally horizontally by the hand of the user (e.g., generally parallel to the ground); that when the user utilizes his mobile phone in a fourth location or type of location (e.g., at an Automatic Teller Machine (ATM) or a vending machine), then the mobile phone is typically held generally vertically by the hand of the user (e.g., at an angle of approximately 90 degrees, or between 80 to 100 degrees, relative to the ground); or the like. These determinations may be location-based or location-aware, thereby triangulating or crossing among three dimensions, namely, behavioral user-specific traits (e.g., holding the phone diagonally), gesture data (e.g., performing a scroll-down gesture), and location data (e.g., when utilizing the phone at a retailer); and such determinations may be part of the user-specific profile of that user. In a subsequent usage of the mobile device, similar determinations may be made, in order to analyze whether or not a current user is indeed the same user as in previous usage session(s) or is a "genuine" user. In a demonstrative example, this three-prone approach may raise an alert if, for example, typically the user of the mobile device holds his mobile device horizontally when performing a scroll-operation at a Point of Sale terminal; and in a subsequent usage session of the mobile device, a user holds that phone vertically when performing a scroll-operation at such Point of Sale terminal, thereby indicating that the subsequent user may not be the genuine or authorized user of the mobile device. In some embodiments, these multi-prone determinations may further be augmented with, or matched or correlated with, application-specific data or application-specific determinations, in order to improve the tailoring of the behavioral traits to the specific user. For example, the mobile device may differentiate and determine that the genuine user typically holds the phone vertically (e.g., anywhere, or in a particular location or type of location) when utilizing the camera application of the mobile device, but typically holds the phone horizontally (e.g., anywhere, or in that particular location or type of location) when utilizing the address book application of the mobile device; and these user-specific traits may be extracted and subsequently compared to data captured in a subsequent usage session of that mobile device, to authenticate user identity.

Some embodiments may comprise a system, device, and method of detecting identity of a user of an electronic device. A method for confirming identity of a user of a mobile electronic device, may include: receiving touch data from a touch-screen of the mobile electronic device; receiving acceleration data from an accelerometer of the mobile electronic device; correlating between the touch data and the acceleration data; based on the correlating, generating a user-specific trait indicative of said user. The method further includes storing a reference value of the user-specific trait, indicative of said user; in a subsequent usage session of the mobile electronic device, generating a current value of the user-specific trait correlating between touch data and acceleration data; and based on a comparison between the current value of the user-specific trait and the reference value of the user-specific trait, determining whether or not a current user of the mobile electronic device is an authorized user of the mobile electronic device.

For example, a method for confirming identity of a user of a smartphone may comprise: receiving touch data from a touch-screen of the smartphone; receiving acceleration data from an accelerometer of the smartphone; correlating between the touch data and the acceleration data; based on the correlating, generating a user-specific trait indicative of said user of said smartphone; storing, either locally within said smartphone or on a remote server, a reference value of the user-specific trait, indicative of said user of said smartphone; in a subsequent usage session of the smartphone, generating and storing a current value of the user-specific trait correlating between touch data and acceleration data; and based on a comparison process between (A) the current value of the user-specific trait that was generated, and (B) the reference value of the user-specific trait that was previously generated, determining whether or not a current user of the smartphone is an authorized user of the smartphone.

In some embodiments, said touch data comprises non-tactile touch data indicating a hovering user gesture in proximity to said touch-screen of said smartphone.

In some embodiments, the method comprises: receiving gyroscope data from a gyroscope of the smartphone; correlating between the touch data and the gyroscope data and the acceleration data; based on the correlating between the touch data and the gyroscope data and the acceleration data, generating another user-specific trait indicative of said user.

In some embodiments, the method comprises: determining by said smartphone, an offset of holding said smartphone in a hand of said user, wherein the offset comprises an offset selected from the group consisting of: the smartphone being held with a palm area of the hand, and the smartphone being held with a fingers area of the hand; based on said offset of holding the smartphone in the hand, differentiating among multiple users.

In some embodiments, the method comprises: determining by said smartphone, whether (A) the same hand of the user is utilized for both holding the smartphone and tapping the touch-screen of the smartphone, or (B) a first hand of the user is utilized for holding the smartphone and a second hand of the user is utilized for tapping the touch-screen of the smartphone; based on said determining, differentiating among multiple users.

In some embodiments, the method comprises: constructing a user-specific profile which indicates that for a user-gesture that is performed at a particular geometric place of the touch-screen of said smartphone, a first body part of the user is moving while a second body part of the user is at rest; based on said user-specific profile, differentiating among multiple users.

In some embodiments, the method comprises: constructing a user-specific profile which indicates that for a scrolling gesture that is performed on the touch-screen of said smartphone, a first hand-region of the user is moving while a second hand-region of the user is at rest; based on said user-specific profile, differentiating among multiple users.

In some embodiments, the method comprises: analyzing touch-data of a swipe gesture performed by the user on the touch-screen of said smartphone, to determine an estimated width of a finger of said user; constructing a user-specific profile which comprises said estimated width of the finger of the user; based on said user-specific profile, differentiating among multiple users.

In some embodiments, the method comprises: analyzing touch-data of a circular swipe gesture performed by the user on the touch-screen of said smartphone, to determine an estimated distance between (A) a tip of a swiping finger of a hand of said user, and (B) a palm of said hand of said user; constructing a user-specific profile which comprises said estimated distance between the tip of the swiping finger and the palm of the hand; based on said user-specific profile, differentiating among multiple users. In some embodiments, the method comprises: analyzing touch-data of generally-straight swipe gestures performed by user on the touch-screen of said smartphone; determining that a first user typically rotates the smartphone clockwise while performing generally-straight swipe gestures; determining that a second user typically rotates the smartphone counter-clockwise while performing generally-straight swipe gestures; based on said determinations, differentiating among said first and second users.

In some embodiments, the method comprises: analyzing said touch data and said acceleration data of said smartphone, to determine a level of shakiness of the smartphone while the user operates said smartphone; analyzing said touch data and said acceleration data of said smartphone, to determine an effect, of a performed user-gesture, on said level of shakiness of the smartphone; constructing a user-specific profile which comprises an indication of the effect of the performed user-gesture on the level of shakiness of the smartphone; based on said user-specific profile, differentiating among multiple users. In some embodiments, the method comprises: analyzing said touch data and said acceleration data of said smartphone, to determine that immediately prior to performing an on-screen zoom gesture, the user of the smartphone modifies a tilt angle of the smartphone relative to ground; constructing a user-specific profile which comprises an indication that immediately prior to performing on-screen zoom gestures, the user of the smartphone modifies the tilt angle of the smartphone relative to ground; based on said user-specific profile, differentiating among multiple users.

In some embodiments, the method comprises: sensing by said smartphone a sweat level of the user while the user performs a gesture on said smartphone; correlating between the sensed sweat level of the user and at least one of: said touch data of the smartphone, and said acceleration data of said smartphone; based on said correlating, differentiating among multiple users. In some embodiments, the method comprises: sensing by said smartphone a temperature of a body part of the user while the user performs a gesture on said smartphone; correlating between the sensed temperature and at least one of: said touch data of the smartphone, and said acceleration data of said smartphone; based on said correlating, differentiating among multiple users. In some embodiments, the method comprises: sensing by said smartphone an amount of pressure of a body part of the user while the user performs a gesture on said smartphone; correlating between the sensed amount of pressure and at least one of: said touch data of the smartphone, and said acceleration data of said smartphone; based on said correlating, differentiating among multiple users.

In some embodiments, the method comprises: determining a current location of the smartphone; correlating between (A) the current location of the smartphone, and (B) said touch data of the smartphone, and (C) said acceleration data of said smartphone; based on said correlating, differentiating among multiple users.

In some embodiments, the method comprises: determining geographic location of the smartphone; correlating between (A) the current location of the smartphone, and (B) said touch data of the smartphone, and (C) said acceleration data of said smartphone; based on said correlating, (a) determining that a first user, typically places the smartphone horizontally on a flat surface when utilizing the smartphone in a first geographic location, and (b) determining that said first user, typically holds the smartphone slanted relative to the ground when utilizing the smartphone in a second geographic location; based on said determinations, differentiating among the first user and another user.

In some embodiments, the method comprises: determining a currently-used application of the smartphone, that the user is currently utilizing on said smartphone; correlating between (A) the currently-used application of the smartphone, and (B) said touch data of the smartphone, and (C) said acceleration data of said smartphone; based on said correlating, differentiating among multiple users.

In some embodiments, the method comprises: determining a currently-used application of the smartphone, that the user is currently utilizing on said smartphone; correlating between (A) the currently-used application of the smartphone, and (B) said touch data of the smartphone, and (C)

said acceleration data of said smartphone; based on said correlating, (a) determining that a first user typically utilizes the smartphone vertically when utilizing a first particular application of the smartphone, and (b) determining that said first user typically holds the smartphone slanted relative to the ground when utilizing a second particular application of the smartphone; based on said determinations, differentiating among multiple users.

In some embodiments, the method comprises: determining whether a current location of the smartphone is outdoors or indoors; correlating between (A) the current location of the smartphone being either outdoors or indoors, and (B) said touch data of the smartphone, and (C) said acceleration data of said smartphone; based on said correlating, differentiating among multiple users.

In some embodiments, a method for confirming identity of a user of a tablet may comprise: receiving touch data from a touch-screen of the tablet; receiving acceleration data from an accelerometer of the tablet; correlating between the touch data and the acceleration data; based on the correlating, generating a user-specific trait indicative of said user of said tablet; storing, either locally within said tablet or on a remote server, a reference value of the user-specific trait, indicative of said user of said tablet; in a subsequent usage session of the tablet, generating and storing a current value of the user-specific trait correlating between touch data and acceleration data; and based on a comparison process between (A) the current value of the user-specific trait that was generated, and (B) the reference value of the user-specific trait that was previously generated, determining whether or not a current user of the tablet is an authorized user of the tablet.

The present invention may include, for example, systems, devices, and methods for detecting identity of a user of a mobile electronic device, and for determining that a mobile electronic device is used by a fraudulent user.

In accordance with the present invention, for example, a method for confirming identity of a user of a mobile electronic device may comprise: receiving touch data from a touch-screen of the mobile electronic device; receiving acceleration data from an accelerometer of the mobile electronic device; correlating between the touch data and the acceleration data; based on the correlating, generating a user-specific trait indicative of said user. In accordance with the present invention, for example, the method may comprise: storing a reference value of the user-specific trait, indicative of said user; in a subsequent usage session of the mobile electronic device, generating a current value of the user-specific trait correlating between touch data and acceleration data; and based on a comparison between the current value of the user-specific trait and the reference value of the user-specific trait, determining whether or not a current user of the mobile electronic device is an authorized user of the mobile electronic device. In accordance with the present invention, for example, storing comprises: storing within said mobile electronic device; and said comparison is performed within said mobile electronic device.

In accordance with the present invention, for example, storing comprises storing externally to said mobile electronic device; and said comparison is performed externally to said mobile electronic device, and comprises wirelessly receiving at the mobile electronic device an indication of said comparison. In accordance with the present invention, for example, said touch data comprises non-tactile touch data indicating a hovering user gesture in proximity to said touch-screen. In accordance with the present invention, for example, the method may comprise: receiving gyroscope data from a gyroscope of the mobile electronic device; correlating between the touch data and the gyroscope data; based on the correlating between the touch data and the gyroscope data, generating another user-specific trait indicative of said user. In accordance with the present invention, for example, the method may comprise: capturing non-tactile motion data indicating a user gesture; correlating between the non-tactile motion data and the acceleration data; based on the correlating between the non-tactile motion data and the acceleration data, generating another user-specific trait indicative of said user. In accordance with the present invention, for example, the method may comprise: comparing between (a) a currently-calculated value of the user-specific trait, corresponding to a current usage of the mobile electronic device, and (b) a previously-calculated value of the user-specific trait, corresponding to a previous usage of the mobile electronic device; and based on a comparison result, performing at least one of: restricting access of said user to an online service; restricting access of said user to an application installed on said mobile electronic device; requiring the user to authenticate his identity to an online service; requiring the user to authenticate his identity to an application installed on said mobile electronic device. In accordance with the present invention, for example, the method may comprise: based on said touch data, estimating user-specific motor control parameters and user-specific motor control noise; and based on the estimated user-specific motor control parameters and user-specific motor control noise, differentiating between said user and another user.

In accordance with the present invention, for example, the method may comprise: based on said touch data, estimating user-specific motor control parameters and user-specific motor control noise of a control loop which comprises translation error and gesture velocity error; and based on the estimated user-specific motor control parameters and user-specific motor control noise, differentiating between said user and another user. In accordance with the present invention, for example, the method may comprise: based on said correlating, estimating a user-specific physiological trait of said user; and based on the user-specific physiological trait, differentiating between said user and another user. In accordance with the present invention, for example, estimating the user-specific physiological trait of said user comprises at least one of: estimating a length of a finger of the user; estimating a width of a finger of the user; estimating a size-related parameter of a finger of the user; estimating a distance between a tip of a finger of the user and another part of a hand of the user. In accordance with the present invention, for example, the method may comprise: based on said correlating, estimating a user-specific behavioral trait of said user; and based on the user-specific behavioral trait, differentiating between said user and another user. In accordance with the present invention, for example, estimating the user-specific behavioral trait of said user comprises: determining that said user typically performs a particular inadvertent gesture while performing a user-intended input-providing gesture.

In accordance with the present invention, for example, estimating the user-specific behavioral trait of said user comprises one or more of: determining that said user typically moves the mobile electronic device at a particular direction while performing a touch gesture; determining that said user typically rotates the mobile electronic device while performing a touch gesture; determining that said user typically slants the mobile electronic device at a particular angle while performing a touch gesture. In accordance with the present invention, for example, estimating the user-specific behavioral trait of said user comprises: determining that said user typically holds the mobile electronic device with a first hand of the user and concurrently performs an input-providing gesture with a second hand of the user. In accordance with the present invention, for example, estimating the user-specific behavioral trait of said user comprises: determining that said user typically holds the mobile electronic device with a single hand and concurrently performs an input-providing gesture with said single hand.

In accordance with the present invention, for example, the method may comprise: based on said correlating, estimating a first user-specific behavioral trait of said user which corresponds to a first usage scenario; based on said correlating, estimating a second user-specific behavioral trait of said user which corresponds to a second usage scenario; based on the first and second user-specific behavioral traits, differentiating between said user and another user. In accordance with the present invention, for example, the method may comprise: based on said correlating, estimating a first user-specific behavioral trait of said user which corresponds to a first usage scenario in which said user operates said mobile electronic device while the user holds said mobile electronic device; based on said correlating, estimating a second user-specific behavioral trait of said user which corresponds to a second usage scenario in which said user operates said mobile electronic device while the user does not hold said mobile electronic device; based on the first and second user-specific behavioral traits, differentiating between said user and another user.

In accordance with the present invention, for example, a mobile electronic device may be configured to confirm identity of a user of said mobile electronic device; the mobile electronic device comprising: a touch-screen to receive touch data; an accelerometer to receive acceleration data; a correlator module to correlate between the touch data and the acceleration data; a trait extractor module to generate a user-specific trait indicative of said user, based on correlation between the touch data and the acceleration data.

Some embodiments may include a system, device, and method of detecting identity of a user of a mobile electronic device; such as, a method for confirming identity of a user of a mobile electronic device, the method including: receiving touch data from a touch-screen of the mobile electronic device; receiving acceleration data from an accelerometer of the mobile electronic device; correlating between the touch data and the acceleration data; based on the correlating, generating a user-specific trait indicative of said user. The method further includes storing a reference value of the user-specific trait, indicative of said user; in a subsequent usage session of the mobile electronic device, generating a current value of the user-specific trait correlating between touch data and acceleration data; and based on a comparison between the current value of the user-specific trait and the reference value of the user-specific trait, determining whether or not a current user of the mobile electronic device is an authorized user of the mobile electronic device.

The method may comprise: receiving touch data from a touch-screen of the smartphone; receiving acceleration data from an accelerometer of the smartphone; correlating between the touch data and the acceleration data; based on the correlating, generating a user-specific trait indicative of said user of said smartphone; storing locally within said smartphone a reference value of the user-specific trait, indicative of said user; in a subsequent usage session of the smartphone, generating locally within said smartphone and storing locally within said smartphone a current value of the user-specific trait correlating between touch data and acceleration data; and based on a comparison process that is performed exclusively within said smartphone, between (A) the current value of the user-specific trait that was generated locally and stored locally within said smartphone, and (B) the reference value of the user-specific trait that was previously generated locally and stored locally within said smartphone, determining whether or not a current user of the smartphone is an authorized user of the smartphone.

In some embodiments, the method comprises: determining by said smartphone, an offset of holding said smartphone in a hand of said user, wherein the offset comprises an offset selected from the group consisting of: the smartphone being held with a palm area of the hand, and the smartphone being held with a fingers area of the hand; based on said offset of holding the smartphone in the hand, differentiating among multiple users.

In some embodiments, the method comprises: analyzing touch-data of generally-straight swipe gestures performed by user on the touch-screen of said smartphone; determining that a first user typically rotates the smartphone clockwise while performing generally-straight swipe gestures; determining that a second user typically rotates the smartphone counter-clockwise while performing generally-straight swipe gestures; based on said determinations, differentiating among said first and second users.

Some embodiments comprise a method, device, and system of differentiating between virtual machine and non-virtualized device; as well as devices, systems, and methods of detecting user identity, differentiating between users of a computerized service, and detecting a cyber-attacker. An end-user device (a desktop computer, a laptop computer, a smartphone, a tablet, or the like) interacts and communicates with a server of a computerized server (a banking website, an electronic commerce website, or the like). The interactions are monitored, tracked and logged. Communication interferences are intentionally introduced to the communication session; and the server tracks the response or the reaction of the end-user device to such communication interferences. The system determines whether the user is a legitimate human user; or a cyber-attacker posing as a legitimate human user but actually utilizing a Virtual Machine.

In some embodiments, a method comprises: determining whether a user, who utilizes a computing device to interact with a computerized service, (A) is a user interacting with a non-virtualized computing device, or (B) is a Virtual Machine (VM) running on top of a Virtual Machine Monitor (VMM); wherein the determining comprises: generating and introducing an interference into a communication session between the computerized service and the computing device; monitoring response of the computing device to said interference; based on the monitored response, determining whether said user, who utilizes the computing device to interact with a computerized service, (A) is a user interacting with a non-virtualized computing device, or (B) is a Virtual Machine (VM) running on top of a Virtual Machine Monitor (VMM).

In some embodiments, generating the interference comprises duplicating a packet in said communication session between the computerized service and the computing device; wherein the determining comprises: based on the response of the computing device to said interference of a duplicated packet, determining whether said user, who utilizes the computing device to interact with a computerized service, (A) is a user interacting with a non-virtualized computing device, or (B) is a Virtual Machine (VM) running on top of a Virtual Machine Monitor (VMM).

In some embodiments, generating the interference comprises intentionally dropping a packet in said communication session between the computerized service and the computing device; wherein the determining comprises: based on the response of the computing device to said interference of a dropped packet, determining whether said user, who utilizes the computing device to interact with a computerized service, (A) is a user interacting with a non-virtualized computing device, or (B) is a Virtual Machine (VM) running on top of a Virtual Machine Monitor (VMM).

In some embodiments, generating the interference comprises inserting an error code into said communication session between the computerized service and the computing device; wherein the determining comprises: based on the response of the computing device to said interference of error code insertion, determining whether said user, who utilizes the computing device to interact with a computerized service, (A) is a user interacting with a non-virtualized computing device, or (B) is a Virtual Machine (VM) running on top of a Virtual Machine Monitor (VMM).

In some embodiments, generating the interference comprises generating network congestion in said communication session between the computerized service and the computing device; wherein the determining comprises: based on the response of the computing device to said interference of network congestion, determining whether said user, who utilizes the computing device to interact with a computerized service, (A) is a user interacting with a non-virtualized computing device, or (B) is a Virtual Machine (VM) running on top of a Virtual Machine Monitor (VMM).

In some embodiments, generating the interference comprises slowing-down network transport in said communication session between the computerized service and the computing device; wherein the determining comprises: based on the response of the computing device to said interference of slowed-down network transport, determining whether said user, who utilizes the computing device to interact with a computerized service, (A) is a user interacting with a non-virtualized computing device, or (B) is a Virtual Machine (VM) running on top of a Virtual Machine Monitor (VMM).

In some embodiments, generating the interference comprises generating latency in said communication session between the computerized service and the computing device; wherein the determining comprises: based on the response of the computing device to said interference of latency, determining whether said user, who utilizes the computing device to interact with a computerized service, (A) is a user interacting with a non-virtualized computing device, or (B) is a Virtual Machine (VM) running on top of a Virtual Machine Monitor (VMM).

In some embodiments, generating the interference comprises generating a communication error that causes a Virtual Machine Monitor (VMM) to handle the communication error without passing the communication error for handling by an underlying Virtual Machine (VM); based on the handling of said communication error, determining that the computing device is a Virtual Machine (VM) running on a Virtual Machine Monitor (VMM).

In some embodiments, the method comprises: generating a communication error that causes a packet to be handled by both (i) a virtualized network card of a Virtual Machine (VM), and (ii) a hardware network card of a computer on which said Virtual Machine (VM) is running; detecting dual-handling of said packet due to said communication error; based on said dual-handling, determining that said computing device is a Virtual Machine (VM).

In some embodiments, the method comprises: generating a communication error that causes a packet to be handled by both (i) a virtualized driver of a Virtual Machine (VM), and (ii) a non-virtualized driver of a computer on which said Virtual Machine (VM) is running; detecting dual-handling of said packet due to said communication error; based on said dual-handling, determining that said computing device is a Virtual Machine (VM).

In some embodiments, the method comprises: determining whether said computing device is defined by utilizing Network Address Translation (NAT) or by utilizing bridged networking; based on a determination that said computing device is defined by utilizing Network Address Translation (NAT), determining that said computing device is a Virtual Machine (VM).

In some embodiments, the method comprises: generating a communication error that is typically handled by an end-user device at a communication layer that is higher than data link layer (L2); monitoring the handling of said communication error by said computing device; detecting that said communication error was handled at the data link layer (L2); based on said detecting, determining that said computing device is a Virtual Machine (VM).

In some embodiments, the method comprises: measuring a time-to-live (TTL) value of packets transported from said computerized service to said computing device; based on said TTL value, determining whether said user, who utilizes the computing device to interact with a computerized service, (A) is a user interacting with a non-virtualized computing device, or (B) is a Virtual Machine (VM) running on top of a Virtual Machine Monitor (VMM).

In some embodiments, the method comprises: measuring a Transmission Control Protocol (TCP) window size of said computing device; based on said TCP window size of said computing device, determining whether said user, who utilizes the computing device to interact with a computerized service, (A) is a user interacting with a non-virtualized computing device, or (B) is a Virtual Machine (VM) running on top of a Virtual Machine Monitor (VMM).

In some embodiments, the method comprises: storing in a repository profiles of multiple computing stacks of Virtual Machines (VMs); during the communication session between said computerized service and said computing device, generating an ad-hoc computing stack profile of said computing device; if the ad-hoc computing stack profile of said computing device matches a previously-stored profile of computing stack of Virtual Machine (VM), then determining that said computing device is a Virtual Machine (VM).

In some embodiments, the method comprises: storing in a repository profiles of multiple computing stacks of non-virtualized computing platforms; during the communication session between said computerized service and said computing device, generating an ad-hoc computing stack profile of said computing device; if the ad-hoc computing stack profile of said computing device matches a previously-stored profile of a computing stack of non-virtualized computing platform, then determining that said computing device is a non-virtualized computing platform.

In some embodiments, the method comprises: estimating two or more parameters of a computing stack of said computing device; generating a weighted score based on said two or more parameters of the computing stack of said computing device; if the weighted score matches a previously-calculated score that typically characterizes a Virtual Machine (VM), then determining that said computing device is a Virtual Machine (VM).

In some embodiments, the method comprises: causing said computing device to perform a processing-intensive process, and monitoring progress of said processing-intensive process; based on monitored progress of said processing-intensive process, estimating whether said computing device is a single-core computing device or a multiple-core computing device; if it is estimated that said computing device is a single-core computing device, then determining that said computing device is a Virtual Machine (VM).

In some embodiments, the method comprises: causing said computing device to perform a resource-overloading process, and monitoring progress of said resource-overloading process; based on monitored progress of said processing-intensive process, estimating whether said computing device is a high-resource computing device or a low-resource computing device; if it is estimated that said computing device is a low-resource computing device, then determining that said computing device is a Virtual Machine (VM).

In some embodiments, the method comprises: causing said computing device to invoke a process that attempts to directly access a graphics card of said computing device; monitoring whether or not said process successfully accessed directly the graphics card of said computing device; if it is detected that said process did not successfully access directly the graphics card of said computing device, then determining that said computing device is a Virtual Machine (VM).

In some embodiments, the method comprises: causing said computing device to invoke a process that attempts to draw a particular on-screen graphic item that can be drawn only by direct access to a graphics card of said computing device; monitoring whether or not said process successfully drew said graphic item; if it is detected that said process did not successfully draw said graphic item, then determining that said computing device is a Virtual Machine (VM).

The present invention may include, for example, systems, devices, and methods for detecting identity of a user of an electronic device; for determining whether or not an electronic device is being used by a fraudulent user or by a legitimate user; and/or for differentiating among users of a computerized service or among users of an electronic device. Some embodiments of the present invention may comprise devices, systems, and methods of detecting user identity, differentiating between users of a computerized service, and detecting a possible attacker.

For example, the present invention may differentiate between: (i) a genuine user or legitimate user or authorized user, who directly utilizes a real-world computing device in order to access a service or a remote server; and (ii) an attacker or hacker or "fraudster" or unauthorized user who accesses the service or the remote server by utilizing a Virtual Machine (VM) which runs on top of (or within) a VM host or a VM monitor (VMM).

Applicants have realized that some hackers and fraudulent users may utilize a Virtual Machine (VM) running on top of a hypervisor or VM Monitor (VMM), in order to perform or to facilitate fraudulent activity. The VM, or multiple VMs, may be used by a hacker or attacker for attacking, or carrying out malicious activities on, a remote system or remote computer. Each VM may have a unique or different "fingerprint", and/or may mimic or imitate to some extent one or more characteristics of a the victim's computerized environment (e.g., Operating System type and/or version, browser, utilization of a stolen "cookie" file or "cookie" data-item, or the like); thereby allowing the hacker or attacker to avoid being detected or captured by security applications that are device-oriented or that are based on identification of Device-ID, by security applications which track devices or computers that had been known in the past to engage in hacking activities or attacks against the current system or other systems.

Applicants have further realized that a hacker may perform "cloning" or duplication of a computer (or computing environment) of a legitimate user, in order to imitate the legitimate user or in order to pretend being the legitimate user, thereby avoiding the requirement to perform an authentication process (e.g., after the legitimate user performs authentication towards the service provider, such as a banking website or electronic commerce website; and such that the cloned environment may already contain a cloned or copied authentication key or "cookie" that indicates to the server that the client is logged-in or authenticated). Additionally, a hacker may utilize VM technology in order to create, define and/or utilize a large number of VMs running on relatively small computers or servers, thereby obviating the need for the hacker to acquire and operate numerous physical devices by utilizing virtualization instead.

The present invention may detect activity performed by a VM, for example, based on identifying different feedback or reaction from a mouse or keyboard or other input unit; and/or by identifying differences between the VM and the computer on top of which the VM is running ("the hosting environment").

For demonstrative purposes, some portions of the discussion herein may relate to differentiation between: (A) a legitimate or authorized human user, and (B) an unauthorized user, or attacker, or cyber-attacker, who utilizes a VM in order to access a computerized service and/or while posing as if he is the legitimate authorized user. However, the present invention, and the modules and operations describe herein, may also be used, similarly, in order to differentiate between: (i) a human user that interacts with a computerized service directly, without a VM, without a VMM, without a virtualized environment, by using a non-virtualized platform; and (ii) another human user, who may be a cyber-attacker but may not necessarily be a cyber-attacker, who utilizes a VM and/or VMM and/or virtualized environment to access the computerized service, without necessarily cyber-attacking the computerized service (e.g., may be a human user that attempts to access the computerized service via a VM for testing purposes, or for grabbing data or copying data, or for learning or probing the features or the elements of the computerized service).

In some embodiments of the present invention, a system may comprise, for example: an end-user device able to communicate (directly or indirectly) with a server of a computerized service. The interactions between end-user device and server may be monitored by an interactions monitoring module, may be stored in an interactions log, and may be analyzed by an interactions analyzer. The interactions analyzer may be associated with, or may comprise, a legitimate user/VM differentiator, which may optionally comprise one or more of sub-systems that are described herein; and/or may implement one or more other differentiating operations or methods that are described herein. The output of the legitimate user/VM differentiator may be transferred to an optional fraud estimator, which may estimate an aggregated threat-level or fraud-score associated with the particular user or session or account; and which may accordingly trigger a fraud mitigation module to perform one or more fraud mitigation operations.

The system may be implemented by using suitable hardware components and/or software modules, which may be co-located or may be distributed over multiple locations or multiple devices. Components and/or modules of the system may interact or communicate over one or more wireless communication links, wired communication links, cellular communication, client/server architecture, peer-to-peer architecture, or the like.

In some embodiments, the system may comprise, for example, an input unit, an output unit, a user interactions sampling/monitoring module, a user-specific feature extraction module, a database to store user profiles, an ad-hoc or current user profile, a comparator/matching module, a user identity determination module, a Fraud Detection Module (FDM), and a fraud mitigation module.

The system may monitor interactions of a user with a computerized service, for example, user interactions performed via an input unit (e.g., mouse, keyboard, stylus, touch-screen) and an output unit (e.g., monitor, screen, touch-screen) that the user utilizes for such interactions at the user's computing device (e.g., smartphone, tablet, laptop computer, desktop computer, or other electronic device). For example, a user interactions monitoring/sampling module may monitor all user interactions via the input unit and/or the output unit; and may record, log, track, capture, or otherwise sample such user interactions; and/or may otherwise collect user interaction data.

In a demonstrative implementation, for example, an end-user may utilize a computing device or an electronic device in order to launch a Web browser and browse to a website or web-based application of a computerized service (e.g., a banking website, a brokerage website, an online merchant, an electronic commerce website). The web-server of the computerized service may serve code, for example HTML code, that the Web browser of the end-user device may parse and may display and/or execute. In accordance with the present invention, for example, a JavaScript code or code-portion may be served to the Web-browser of the end-user device; or may otherwise be "called from" or loaded from an HTML page that is served to the end-user device. The JavaScript code may operate as a "silent key-logger" module, and may monitor and track and log all the user interactions via keyboard, mouse, touch-screen, and/or other input units, as well as their timing; and may write or upload or send such information to the web-server or to a third-party server in which the user interactions monitoring/sampling module may reside. In some embodiments, such "silent key-logger" may be implemented such that it logs or records or stores or uploads to the server, or analyzes, only anonymous data, or only data that excludes the actual content of user interactions, or only data that on its own does not enable identification of the user or of the content that the user types; e.g., by logging or storing only the data-entry rate or timing, or the key-presses rate or timing, and while not storing (or while discarding) the actual key-presses or content types; for example, logging and storing that the user typed eight characters in two seconds, rather than logging and typing that the user types the word "Jonathan" in two seconds. The data describing the user interactions may be sent or uploaded, for example, every pre-defined time interval (e.g., every second, or every 3 or 5 or 10 seconds), or once a buffer of interactions is filled (e.g., once 20 keystrokes are logged; once 6 mouse-clicks are logged). Other suitable methods may be used to monitor and log user interactions.

The user interaction data may enable a user-specific feature extraction module to extract or estimate or determine or calculate user-specific features that characterize the interaction and which are unique to the user (or, which are probably unique to the user). The user-specific feature extraction module may store in a database multiple user profiles, corresponding to various users of the computerized service. A user may have a single stored profile; or a user may have multiple stored profiles that correspond to multiple usage sessions of that user (e.g., across multiple days; or across multiple usage sessions that begin with a log-in and end with a log-out or a time-out).

Once a user accesses (or attempts to access) the computerized service, and/or during the access of the user to the computerized service, the user interaction monitoring/sampling module may monitor or sample the current user interactions; and the user-specific feature extraction module may optionally create a current or ad-hoc user profile that characterizes the user-specific features that are currently exhibited in the current session of user interactions.

A comparator/matching module may compare or match, between: (i) values of user-specific features that are extracted in a current user session (or user interaction), and (ii) values of respective previously-captured or previously-extracted user-specific features (of the current user, and/or of other users, and/or of pre-defined sets of values that correspond to known automated scripts or "bots"). In some implementations, the comparator/matching module may compare between the current ad-hoc user profile, and one or more previously-stored user profiles that are stored in the database.

If the comparator/matching module determines that one or more features, or a set of features, that characterize the current interaction session of the current user, does not match those features as extracted in previous interaction session(s) of that user, then, a possible-fraud signal may be generated and may be sent or transmitted to other modules of the system and/or to particular recipients.

Additionally or alternatively, the comparator/matching module may compare the features characterizing the current session of the current user, to features characterizing known automatic fraudulent mechanisms, known as malware or "bot" mechanisms, or other pre-defined data, in order to determine that, possibly or certainly, the current user is actually a non-genuine user and/or is accessing the service via a fraudulent mechanism.

In some embodiments, the comparator/matching module may comprise, or may operate in association with, a Fraud Detection Module (FDM), which may comprise (or may be implemented as) one or more sub-modules, as described herein.

In some embodiments, the output of the comparator/matching module may be taken into account in combination with other information that the fraud detection module may determine to be relevant or pertinent, for example, security information, user information, meta-data, session data, risk factors, or other indicators (e.g., the IP address of the user; whether or not the user is attempting to perform a high-risk activity such as a wire transfer; whether or not the user is attempting to perform a new type of activity that this user did not perform in the past at all, or did not perform in the past 1 or 3 or 6 or 12 months or other time-period; or the like).

The combined factors and data may be taken into account by a user identity determination module, which may determine whether or not the current user is a fraudster or is possibly a fraudster. The user identity determination module may trigger or activate a fraud mitigation module able to perform one or more fraud mitigating steps based on that determination; for example, by requiring the current user to respond to a challenge, to answer security question(s), to contact customer service by phone, to perform a two-step authentication or two-factor authentication, or the like.

The system may be implemented by using suitable hardware components and/or software modules, which may be co-located or may be distributed over multiple locations or multiple devices. Components and/or modules of the system may interact or communicate over one or more wireless communication links, wired communication links, cellular communication, client/server architecture, peer-to-peer architecture, or the like In some embodiments, the system may comprise a computerized service platform able to communicate (e.g., via wireless communication links, via wired communication links, over the Internet, over TCP/IP or other protocols, over cellular network, or the like) with one or more end-user devices, for example, end-user device 201 (e.g., operated by a legitimate user or authorized user) and end-user device 202 (e.g., operated by an attacker or hacker or fraudulent user). In accordance with the present invention, a Fraud Detection Module (FDM), or multiple FDMs, may be utilized in order to detect fraud or possible fraud, and/or in order to differentiate between (a) end-user device 201 operated by a legitimate user, and (b) end-user device 202 operated by an attacker.

The computerized service platform may comprise, for example, a Web server, an application server, and a database which may provide a service to remote user(s) that operate remote device(s). Such service may be, for example, banking service, brokerage service, financial service, electronic commerce or e-commerce service, information service, entertainment service, or the like.

End-user device 201 may be operated by a legitimate user. End-user device 201 may utilize an Operating System (OS), which may enable the user to utilize one or more installed software applications, for example, an application, a web browser, or the like. The OS interacts with hardware components of end-user device, either directly or via OS driver (s), in a non-virtualized way.

In contrast, end-user device 202 may be operated by an attacker. For example, end-user device 202 may comprise a first OS (e.g., Linux), on which a Virtual Machine Monitor (VMM) or Virtual Machine (VM) Hosting Environment may be installed and may run. The VMM may create and may control a Virtual Machine (VM), for example, having a second OS (e.g., Windows) and having one or more applications (e.g., an application, a web browser, or the like). The applications that run within the VM do not interact directly with the hardware of end-user device; rather, the VMM handles such interactions on their behalf.

One or more components of the system may comprise an FDM module. For example, in some implementations, the computerized service platform may comprise therein an FDM; or may be associate with (or coupled to) an external FDM. Additionally or alternatively, FDM(s) may monitor communications between end-user devices and the computerized service platform; for example, an FDM may monitor communications between end-user device 201 and the computerized service platform; and similarly, an FDM may monitor communications between end-user device 202 and the computerized service platform. In some implementations, the FDM may be implemented as part of end-user device, or as part of the OS or application or web-browser that runs on the end-user device. Each one of the FDM(s) (or other FDM which may be located elsewhere in the system) may perform fraud detection, and/or may differentiate between legitimate user of end-user device 201 and fraudulent user of end-user device 202; and/or may differentiate between end-user device 201 which operates in a non-virtualized environment, and end-user device 202 which operates utilizing a VM or in a virtualized environment.

A fraud detection sub-system in accordance with some demonstrative embodiments of the present invention, may operate to detect activity or fraudulent activity that is performed by an attacker via a Virtual Machine (VM), or by a set or batch or group of VMs. The sub-system may be implemented as part of, or as a sub-module of, the FDM(s) mentioned above, or the legitimate user/VM differentiator, and/or other suitable systems or modules.

The fraud-detection sub-system may comprise, for example: a communication interference generator; a packet duplicator; an error code inserter; a network congestion generator; a slow transport generator; a latency/delay generator; a packet dropper; a response-to-communication-interference analyzer; and a VM existence estimation module.

The fraud-detection sub-system may comprise one or more security applications or electronic services which may inject or may introduce, for example, small interferences in the communication between the service and the user's device. For example, a communication interference generator may generate and/or inject and/or introduce small interferences in the communication between the service and the user's device. In some embodiments, a packet duplicator module may intentionally perform duplication of sent packet (s), or may cause the sending of multiple identical packets, as a communication interference. In some embodiments, an error code inserter module may cause intentional insertion of error codes into a communication session or communication message that is transmitted to (or responded to) a user device. A network congestion generator may create one or more network conditions that mimic or reflect network congestion, at pre-defined time intervals, or at pseudo-random time intervals. Similarly, a slow transport generation module may cause the online service to slow-down the transport of data to the user, mimicking a slow network condition, at pre-defined times or time-intervals, or at pseudo-random times or time-intervals. A latency/delay generator may artificially inject latency or delay(s) into particular communications, or at pre-defined times or time-intervals, or at pseudo-random times or time-intervals. A packet dropper module may intentionally drop a packet (or a set of consecutive packets, or a group of non-consecutive packets), or may mimic or imitate the accidental dropping or loss of such packet(s), from an ongoing communication session between a server and the user's computer.

The fraud detection sub-system may additionally comprise a response to communication interference analyzer and a VM existence estimation module. The Response-to-communication-interference analyzer may operate to track and monitor the response of the end-user device to the generated communication interference or abnormality and to analyze the response and its characteristics in order to determine whether or not the end-user device is a VM based on the fact that VM(s) respond in a different manner to such communication interferences, compared to the response of a human user that directly utilizes a physical computing device. For example, one or more of such injected communication interferences may force the hosting environment (which hosts a VM in it, or on it) to expose its existence, thereby indicating that a VM is running on top of the hosting environment. Other suitable modules may identify, for example, that the activity received from the user originates from a VM, rather than from a human user, as described herein.

Applicants have realized that in a usage session that involves virtualization, there is a greater amount or greater number of components that are involved in communication: the physical Network Interface Card (NIC) (or modem, or wireless modem, or other suitable adaptor or interface adapter); a driver supplied by the manufacturer of the physical NIC; a driver or application of the hypervisor (for example, "esx" from VMware); a virtual driver that the hypervisor provides to the VM; a driver of the VM itself (e.g., as Windows XP). The VM existence estimation module may detect that one or more, or all, of these components are involved in the communication session, based on, for example, their handling of communication interferences, error codes, network congestion, slow transport, latency or delays, or the like.

In a demonstrative implementation, the system may measure the time it takes for the "user"—be it the legitimate human user, or a cyber-attacker operating a VM posing as the legitimate human user—to respond to various interferences or communication errors that may be intentionally introduced to the communication session; such as, non-responsiveness of the website or web-page or service that is being accessed, a response that includes errors or that appears to be erroneous, an "invalid" or improper response from the website or web-page or service being accessed, or the like. Analysis of the reaction (e.g., as detailed herein) may point to the possibility that the "user" is actually or more-probably a VM running within or on top a hosting environment or VMM, rather than a human user interacting directly with a computing device.

Some implementations may monitor and/or identify the response from the end-user device (a real-world computer operated directly by a human user, or a VM hosted on top of a hosting environment) to such intentionally-introduced interference; for example, whether re-send or re-submit operation were performed, whether the communication session (or website, or web-page) was abandoned or dropped, whether one or more parameters or characteristics of the communication session was changed in response to the interference (e.g., resizing or maximizing of the window size), or the like.

In some implementations, for example, the system may intentionally drop or disregard an incoming packet, and may inspect whether or not the packet is re-sent, what is the period of time that elapses until such re-sending, and/or detect traffic incoming from a bot-net; optionally using such methods in order to detect an Application Denial-of-Service (DOS) attack.

In some embodiments, a fraud detection sub-system may operate to detect activity or fraudulent activity that is performed by an attacker via a Virtual Machine (VM), or by a set or batch or group of VMs. The fraud-detection sub-system may comprise, for example: a stack-based VM estimator; a TTL measurer; a TCP window-size measurer; an abnormal network conditions generator; a stack profile generator; a stack profiles repository; a stack profile comparator; a stack-components comparator; and a weighting module.

For example, some embodiments may utilize a Stack-based VM estimator to detect and/or identify differences among VM versus non-VM implementations; which may take into account that a stack of one operating system (e.g., Microsoft Windows) is different from the stack of another operating system (e.g., Linux), and that stacks of different versions of an OS (such as Windows XP versus Windows 8) are different from each other. This may affect other measurable characteristics, such as, for example, Time-To-Live (TTL) of packets which may be measured or tracked by a TTL measurer (e.g., by inspecting "Expires" header or "Expires" field in packets or HTTP headers or HTTP packets, or in a "cookie"; or using other TTL measurement techniques). Accordingly, each implementation may depend on the OS type, on the version of the OS or some of its components (e.g., kernel version), on the patching level of the OS, and on other (e.g., default) configuration parameters of that OS; for example, the TCP window size in Linux of a particular version may be X, whereas the TCP window size in Linux of another version (or, of Microsoft Windows 7) may be Y, and these parameters may be tracked or measured by a TCP window size measurer; thereby assisting the Stack-based VM estimator to detect VM or non-VM users.

In accordance with the present invention, a computing system may be assembled and configured; for example, to comprise various configurations and various setups of various VMs, having different hypervisors, different OS types and/or OS versions, different NICs or network cards, or the like. The system may further comprise an abnormal network conditions generator able to generate interference or abnormality or error in particular communication network conditions or characteristics (e.g., delays, error codes, network congestion). The system may additionally comprise real-life non-virtualized computing platforms, to be used for comparison purposes against the various VMs. The abnormal network conditions generator may generate abnormal network conditions or communication interferences based on a "fuzzy logic" algorithm; and/or based on specific pre-defined interference scenarios, for example, by using advanced settings of TCP or irregular settings for establishing TCP connection, introducing packet loss, irregular packets, invalid packets, erroneous packets, dropped packets, duplicate packets, or the like.

Optionally, a stack profiles repository may be used to store multiple profiles or multiple "signatures" of various computing stacks (e.g., a set of computing elements that consists of an operating system, kernel version, drivers, hardware components that are used, TCP parameters, browser version, or the like). A stack profile generator may be used to generate profiles or signatures to a variety of computing platforms, including real-life computing platforms as well as various VMs that are hosted on various hosting environments or VMMs; and such stack profiles may be stored in the stack profiles repository; each profile or signature may include a unique arrangement or aggregation of indicators corresponding to the above-mentioned computing elements (e.g., represented as a long string or bit-stream, indicating operating system, kernel version, browser version, or the like). Subsequently, when an end-user device connects or attempts to connect to a service, the stack profile generator may generate an ad-hoc stack profile for that end-user device, and a stack profile comparator may compare the current ad-hock stack profile to previously-stored stack profiles in the stack profile repository. The comparison may yield a match between the current ad-hoc computing stack profile, and a pre-stored computing stack profile of a real-world computing platform that is known to be authentic and non-VM, thereby indicating that a VM is most probably not involved in the current communication session. Alternatively, the comparison may yield a match between the current ad-hoc computing stack profile, and a pre-stored computing stack profile that is associated with a VM or with a hosted environment or VMM, thereby indicating that a VM is most probably involved in the current communication session.

The system may check each interference scenario, against each VM and against each non-virtualized platform; and may detect differences with regard to functional parameters, performance time, delays, the content that is actually transported (payload, metadata, control data), the particular timing of transport of data items, and other parameters, in order to detect differences between VM and non-VM users. For example, a stack-components comparator 430 may compare the value of each tracked parameter or component, with pre-stored values of real-world (non-virtualized) components and virtualized components; and a weighting module 431 may generate a weighted score indicating whether the entirety of the computing stack, based on the weighted aggregation of its discrete components, tends to be closer to matching a virtualized platform (a VM) or a non-virtualized platform (a real-world hardware computer). The weights may be pre-defined or pre-allocated (e.g., using a lookup table or other weights list), or the weights may be implemented as weight-parameters in a weighted fraud-score (or risk level, or threat level) formula which may be calculated.

Based on the insights of the comprehensive system, such communication interference module(s) may be integrated as part of the actual service or website or web-service or online service; and may generate the particular interference(s) that would allow the system to detect that a "user" interacting with the service is actually a VM and not a direct human user (namely, a human user that utilizes a non-virtualized platform).

In some embodiments, the fraud-detection sub-system may comprise, for example: a resource-overloading module; a resource performance estimator; a processing core(s) estimator; a communication interference generator; an additional packet handler estimator; a layer-of-handler estimator; a NAT/Bridged estimator; and a direct access tester.

For example, the present invention may identify that the user of a service is actually utilizing a VM, by estimating and/or determining the number of processing cores and/or CPU cores and/or processing resources that are associated with the user. Applicants have realized that some hackers often create VMs that are relatively weak in terms of processing power or processing resources, and that are allocated only some and not all of the processing resources of the hosting environment; and/or that many VMs are defined or created by using a "default" setting of a single-core machine (e.g., even if the hosting computer is a dual-core or multiple-core machine).

The system may utilize a resource-overloading module 533 in order to intentionally run CPU-intensive or processing-intensive parallel computations or calculations, and may utilize a resource performance estimator to measure or estimate the CPU strength and/or the processor core count that are associated with the user-side device; which in turn may be indicative of whether or not the end-user device is a (typically-weaker) virtualized environment (e.g., based on the time or processing-cycles or memory, which are actually used in order to complete a processing task or other resource-examining task). Optionally, the number of processing core(s) of the end-user device may be estimated or determined by a processing core(s) estimator, based on the performance of the end-user device in response to processing-intensive tasks that may be generated by the resource-overloading module. In some implementations, an estimate that the user-side machine has extensive processing resources and/or utilizes more than one processing core (e.g., may contribute to (or may base) a determination that the user is not a VM. In some implementations, an estimate that the user-side machine has low processing resources and/or utilizes a single processing core, may contribute to (or may base) a determination that the user is actually a VM and not a human user. Other characteristics may be measured or estimated, by using JavaScript or other methods, and other indicators may be used for identifying a VM and/or for supporting a possible decision that the user is actually a VM.

Applicants have realized that some attackers or hackers may utilize a VM in order to imitate or mimic or emulate another computer or another computing platform; for example, in order to create an impression towards a server computer of a service, as if the attacker's computer (which is a VM) is identical to or similar to the real-world computer (or computing device) of the victim (the real user, whose identity the attacker is imitating; or whose user account the attacker is trying to fraudulently access); and/or in order to create an impression towards a server computer of a service, as if the attacker's computer (which is a VM) is different from the real-world computer that the attacker utilizes. Accordingly, an attacker that wishes to pose as a victim user, or that wishes to pose as a different (non-attacker) user, may utilize a VM that may mimic or imitate characteristic of a victim computer or of a non-attacker computer. The present invention may utilize one or more methods or modules, in order to expose the fact that there is inconsistency, or incompatibility or mismatch, between (a) the characteristics of the computer that appears to be accessing the server, and (b) the characteristics of the computer that is actually accessing the server as they are inferred or deduced from the behavior of such computer in response to injected real-time communication errors or interferences.

The present invention may thus determine, identify and/or estimate, that there is an additional or alternate "handler" which handles or manipulates the communication packet; instead of or in addition to the expected, single "handler" of communication packets. Based on the responses to one or more injected communication interferences, an Additional Packet Handler estimator may estimate or determine the existence of such additional packet handler, which may be or may include, for example, the physical NIC or network card of the computer hardware that hosts (or monitors) the VM; and/or the driver of the hypervisor, or the Operating System that hosts the VM; or the like. For example, the Additional Packet Handler Estimator may estimate or may determine that the characteristics of the virtual NIC or the virtual network card (of the VM), or the virtual OS (of the VM), are characteristics that are typically associated with a VM and not with a real-world computing platform that runs directly on hardware (without a VMM); thereby estimating that probably a VM is being used to access the service or the server.

In some implementations, any packet that reaches the VM, is handled by one additional handler or by two (or more) additional handlers, namely, additional component(s) that are not present in the communication flow when a real-world computer is utilized (without a VM); and such packet(s) are handled by particular software modules that are part of the VM software (e.g., a virtualized network card, a virtualized driver of a virtualized OS).

Applicants have realized that in some implementations, the VMM or hypervisor is often defined by utilizing Network Address Translation (NAT), as a network element in Layer 2, rather than by utilizing bridged networking. Accordingly, a NAT/Bridged Estimator may estimate that a client device is utilizing NAT networking, rather than bridged networking; and may utilize this to determine or estimate that the client device is actually a VM running on top of a VMM, rather than a real-world computer that directly runs on hardware.

In some implementations a Layer of Handler estimator may analyze the communications data and/or meta-data in order to estimate, at which layer of the communication session are packets being handled by the user's device, or at which layer of the communication session are communication errors being handled by the user's device. For example, a communication interference generator may inject or generate or introduce communication interferences or abnormalities; and the Layer of Handler estimator may identify or may estimate that lower-layer elements or modules are handling such interferences or errors, thereby indicating that a VMM is handling such interferences or errors (and not transferring such errors or interferences to handling by the VM itself).

Applicants have realized that typically, a VM may not be capable of directly accessing a graphics card (or other graphic-processing hardware element) of the host computer on which the VM is hosted; whereas a non-VM environment may typically be capable of directly accessing the graphics card (or other graphic-processing hardware element). Accordingly, a Direct Access Tester may attempt to directly access the graphics card of the end-user device, by utilizing one or more suitable algorithms or functions (e.g., by using or invoking WebGLWorker or other suitable functions), and may examine the success or failure of such attempt for direct access in order to deduce the possible existence of a VM.

In a demonstrative embodiment, for example, the Direct Access Tester may utilize WebGLWorker (or other suitable function) in order to attempt to draw on the screen (e.g., on the actual screen of the end-user device, or on an invisible screen or a software-side screen that is not visible by the user) a pre-defined or randomly-selected visual item that typically requires direct access to the graphics card (e.g., a three-dimensional rotating cube or cuboid or box). If the attempt is successful, namely, the particular graphic element is successfully drawn, then the Direct Access Tester may determine that the end-user device is not a VM (or, is most-probably not a VM); whereas, if the attempt fails, namely, the particular graphic element fails to be drawn, then the Direct Access Tester may determine that the end-user device is actually a VM running on top of a VMM.

In accordance with some embodiments of the present invention, a method may comprise: determining whether a user, who utilizes a computing device to interact with a computerized service, (A) is a user interacting with a non-virtualized computing device, or (B) is a Virtual Machine (VM) running on top of a Virtual Machine Monitor (VMM); wherein the determining comprises: generating and introducing an interference into a communication session between the computerized service and the computing device; monitoring response of the computing device to said interference; based on the monitored response, determining whether said user, who utilizes the computing device to interact with a computerized service, (A) is a user interacting with a non-virtualized computing device, or (B) is a Virtual Machine (VM) running on top of a Virtual Machine Monitor (VMM).

In some embodiments, generating the interference comprises duplicating a packet in said communication session between the computerized service and the computing device; wherein the determining comprises: based on the response of the computing device to said interference of a duplicated packet, determining whether said user, who utilizes the computing device to interact with a computerized service, (A) is a user interacting with a non-virtualized computing device, or (B) is a Virtual Machine (VM) running on top of a Virtual Machine Monitor (VMM).

In some embodiments, generating the interference comprises intentionally dropping a packet in said communication session between the computerized service and the computing device; wherein the determining comprises: based on the response of the computing device to said interference of a dropped packet, determining whether said user, who utilizes the computing device to interact with a computerized service, (A) is a user interacting with a non-virtualized computing device, or (B) is a Virtual Machine (VM) running on top of a Virtual Machine Monitor (VMM).

In some embodiments, generating the interference comprises inserting an error code into said communication session between the computerized service and the computing device; wherein the determining comprises: based on the response of the computing device to said interference of error code insertion, determining whether said user, who utilizes the computing device to interact with a computerized service, (A) is a user interacting with a non-virtualized computing device, or (B) is a Virtual Machine (VM) running on top of a Virtual Machine Monitor (VMM).

In some embodiments, generating the interference comprises generating network congestion in said communication session between the computerized service and the computing device; wherein the determining comprises: based on the response of the computing device to said interference of network congestion, determining whether said user, who utilizes the computing device to interact with a computerized service, (A) is a user interacting with a non-virtualized computing device, or (B) is a Virtual Machine (VM) running on top of a Virtual Machine Monitor (VMM).

In some embodiments, generating the interference comprises slowing-down network transport in said communication session between the computerized service and the computing device; wherein the determining comprises: based on the response of the computing device to said interference of slowed-down network transport, determining whether said user, who utilizes the computing device to interact with a computerized service, (A) is a user interacting with a non-virtualized computing device, or (B) is a Virtual Machine (VM) running on top of a Virtual Machine Monitor (VMM).

In some embodiments, generating the interference comprises generating latency in said communication session between the computerized service and the computing device; wherein the determining comprises: based on the response of the computing device to said interference of latency, determining whether said user, who utilizes the computing device to interact with a computerized service, (A) is a user interacting with a non-virtualized computing device, or (B) is a Virtual Machine (VM) running on top of a Virtual Machine Monitor (VMM).

In some embodiments, generating the interference comprises generating a communication error that causes a Virtual Machine Monitor (VMM) to handle the communication error without passing the communication error for handling by an underlying Virtual Machine (VM); based on the handling of said communication error, determining that the computing device is a Virtual Machine (VM) running on a Virtual Machine Monitor (VMM).

In some embodiments, the method may comprise: generating a communication error that causes a packet to be handled by both (i) a virtualized network card of a Virtual Machine (VM), and (ii) a hardware network card of a computer on which said Virtual Machine (VM) is running; detecting dual-handling of said packet due to said communication error; based on said dual-handling, determining that said computing device is a Virtual Machine (VM).

In some embodiments, the method may comprise: generating a communication error that causes a packet to be handled by both (i) a virtualized driver of a Virtual Machine (VM), and (ii) a non-virtualized driver of a computer on which said Virtual Machine (VM) is running; detecting dual-handling of said packet due to said communication error; based on said dual-handling, determining that said computing device is a Virtual Machine (VM).

In some embodiments, the method may comprise: determining whether said computing device is defined by utilizing Network Address Translation (NAT) or by utilizing bridged networking; based on a determination that said computing device is defined by utilizing Network Address Translation (NAT), determining that said computing device is a Virtual Machine (VM).

In some embodiments, the method may comprise: generating a communication error that is typically handled by an end-user device at a communication layer that is higher than data link layer (L2); monitoring the handling of said communication error by said computing device; detecting that said communication error was handled at the data link layer (L2); based on said detecting, determining that said computing device is a Virtual Machine (VM).

In some embodiments, the method may comprise: measuring a time-to-live (TTL) value of packets transported from said computerized service to said computing device; based on said TTL value, determining whether said user, who utilizes the computing device to interact with a computerized service, (A) is a user interacting with a non-virtualized computing device, or (B) is a Virtual Machine (VM) running on top of a Virtual Machine Monitor (VMM).

In some embodiments, the method may comprise: measuring a Transmission Control Protocol (TCP) window size of said computing device; based on said TCP window size of said computing device, determining whether said user, who utilizes the computing device to interact with a computerized service, (A) is a user interacting with a non-virtualized computing device, or (B) is a Virtual Machine (VM) running on top of a Virtual Machine Monitor (VMM).

In some embodiments, the method may comprise: storing in a repository profiles of multiple computing stacks of Virtual Machines (VMs); during the communication session between said computerized service and said computing device, generating an ad-hoc computing stack profile of said computing device; if the ad-hoc computing stack profile of said computing device matches a previously-stored profile of computing stack of Virtual Machine (VM), then determining that said computing device is a Virtual Machine (VM).

In some embodiments, the method may comprise: storing in a repository profiles of multiple computing stacks of non-virtualized computing platforms; during the communication session between said computerized service and said computing device, generating an ad-hoc computing stack profile of said computing device; if the ad-hoc computing stack profile of said computing device matches a previously-stored profile of a computing stack of non-virtualized computing platform, then determining that said computing device is a non-virtualized computing platform.

In some embodiments, the method may comprise: estimating two or more parameters of a computing stack of said computing device; generating a weighted score based on said two or more parameters of the computing stack of said computing device; if the weighted score matches a previously-calculated score that typically characterizes a Virtual Machine (VM), then determining that said computing device is a Virtual Machine (VM).

In some embodiments, the method may comprise: causing said computing device to perform a processing-intensive process, and monitoring progress of said processing-intensive process; based on monitored progress of said processing-intensive process, estimating whether said computing device is a single-core computing device or a multiple-core computing device; if it is estimated that said computing device is a single-core computing device, then determining that said computing device is a Virtual Machine (VM).

In some embodiments, the method may comprise: causing said computing device to perform a resource-overloading process, and monitoring progress of said resource-overloading process; based on monitored progress of said processing-intensive process, estimating whether said computing device is a high-resource computing device or a low-resource computing device; if it is estimated that said computing device is a low-resource computing device, then determining that said computing device is a Virtual Machine (VM).

In some embodiments, the method may comprise: causing said computing device to invoke a process that attempts to directly access a graphics card of said computing device; monitoring whether or not said process successfully accessed directly the graphics card of said computing device; if it is detected that said process did not successfully access directly the graphics card of said computing device, then determining that said computing device is a Virtual Machine (VM).

In some embodiments, the method may comprise: causing said computing device to invoke a process that attempts to draw a particular on-screen graphic item that can be drawn only by direct access to a graphics card of said computing device; monitoring whether or not said process successfully drew said graphic item; if it is detected that said process did not successfully draw said graphic item, then determining that said computing device is a Virtual Machine (VM).

Modules, elements, systems and/or sub-systems described herein may be implemented by using hardware components and/or software modules; for example, utilizing a processor, a controller, an Integrated Circuit (IC), a logic unit, memory unit, storage unit, input unit, output unit, wireless modem or transceiver, wired modem or transceiver, internal or external power source, database or data repository, Operating System (OS), drivers, software applications, or the like. Some embodiments may utilize client/server architecture, distributed architecture, peer-to-peer architecture, and/or other suitable architectures; as well as one or more wired and/or wireless communication protocols, links and/or networks.

Some embodiments may comprise devices, systems, and methods of detecting user identity, differentiating between users of a computerized service, and detecting a possible attacker. The methods include monitoring of user-side input-unit interactions, in general and in response to an interference introduced to user-interface elements. The monitored interactions are used for detecting an attacker that utilizes a remote access channel; for detecting a malicious automatic script, as well as malicious code injection; to identify a particular hardware assembly; to perform user segmentation or user characterization; to enable a visual login process with implicit two-factor authentication; to enable stochastic cryptography; and to detect that multiple users are utilizing the same subscription account.

In some embodiments, a method comprises: determining whether a human user, who utilizes a computing device to interact with a computerized service via a communication channel, (i) is a human user that is co-located physically near said computing device, or (ii) is a human user that is located remotely from said computing device and is operating remotely said computer device via a remote access channel; wherein the determining comprises: (a) monitoring interactions of the user with an input unit of said computing device, in response to one or more communication lags that are exhibited by said communication channel; (b) based on monitored user interactions via the input unit in response to said one or more communication lags, determining whether said human user (i) is a human user that is co-located physically at said computing device, or (ii) is a human user that is located remotely from said computing device and is controlling remotely said computing device via said remote access channel.

In some embodiments, the method comprises: injecting a communication latency into said communication channel between said computing device and said computerized service; introducing an input/output aberration that causes said input unit of said computing device to exhibit abnormal behavior; determining an actual reaction time of said user to said input/output aberration; if the actual reaction time of said user to the input/output aberration, is greater than a pre-defined reaction-time threshold value, then determining that the user is located remotely from said computing device and is controlling remotely said computing device via said remote access channel.

In some embodiments, the method comprises: injecting a communication latency into said communication channel between said computing device and said computerized service; introducing an input/output aberration that causes said input unit of said computing device to exhibit abnormal behavior; determining an actual reaction time of said user to said input/output aberration; defining a reference reaction time that characterizes a maximum time that elapses between (I) generation of said input/output aberration to a local user, and (II) sensing of a reaction by the local user to said input/output aberration; if the actual reaction time of said user to the input/output aberration, is greater than said reference reaction time, then determining that the user is located remotely from said computing device and is controlling remotely said computing device via said remote access channel.

In some embodiments, the method comprises: injecting a communication latency into said communication channel between said computing device and said computerized service; introducing an input/output aberration that causes said input unit of said computing device to exhibit abnormal behavior; determining a time-length of a time-gap between (I) introduction of said input/output aberration, and (II) first discovery of the input/output aberration by the user as exhibited by commencement of a corrective action by the user; if the time-length of said time-gap, is greater than a pre-defined time-gap threshold value that characterizes non-remote users, then determining that the user is located remotely from said computing device and is controlling remotely said computing device via said remote access channel.

In some embodiments, the method comprises: injecting a communication latency into said communication channel between said computing device and said computerized service; introducing an input/output aberration that causes said input unit of said computing device to exhibit abnormal behavior; determining a time-length of a time-gap between (I) introduction of said input/output aberration, and (II) an end of a corrective action that the user performed in response to said input/output aberration; if the time-length of said time-gap, is greater than a pre-defined time-gap threshold value that characterizes non-remote users, then determining that the user is located remotely from said computing device and is controlling remotely said computing device via said remote access channel.

In some embodiments, the method comprises: hiding a mouse-pointer on a screen of said computerized service; monitoring input unit reactions of said user in response to the hiding of the mouse-pointer; based on the input unit reactions of said user in response to the hiding of the mouse-pointer, determining whether said user is (i) co-located physically at said computing device, or (ii) is located remotely rom said computing device and controlling remotely said computing device via said remote access channel.

In some embodiments, the method comprises: temporarily hiding an on-screen pointer of said computerized service; monitoring input unit reactions of said user in response to the hiding of the on-screen pointer; detecting latency in said input unit reactions of said user in response to the hiding of the on-screen pointer; based on detected latency in the input unit reactions of said user in response to the hiding of the on-screen pointer, determining whether said user is (i) co-located physically at said computing device, or (ii) is located remotely rom said computing device and controlling remotely said computing device via said remote access channel.

In some embodiments, the method comprises: causing an on-screen pointer to deviate relative to its regular on-screen route; monitoring input unit reactions of said user in response to deviation of the on-screen pointer; detecting latency in said input unit reactions of said user in response to the deviation of the on-screen pointer; based on detected latency in the input unit reactions of said user in response to the deviation of the on-screen pointer, determining whether said user is (i) co-located physically at said computing device, or (ii) is located remotely rom said computing device and controlling remotely said computing device via said remote access channel.

In some embodiments, the method comprises: sampling multiple interactions of said user with said input unit of said computing device; based on a frequency of said sampling, determining latency of communications between said user and the computerized service; based on said latency of communications, determining whether said user is (i) co-located physically at said computing device, or (ii) is located remotely from said computing device and controlling remotely said computing device via said remote access channel.

In some embodiments, the method comprises: sampling multiple interactions of said user with said input unit of said computing device; based on a frequency of said sampling, determining latency of communications between said user and the computerized service; based on said latency of communications, determining whether said user is (i) co-located physically at said computing device, or (ii) is located remotely from said computing device and controlling remotely said computing device via said remote access channel.

In some embodiments, the method comprises: sampling multiple interactions of said user with a computer mouse; if said sampling indicates generally-smooth movement of the computer mouse, then, determining that said user is co-located physically near said computing device.

In some embodiments, the method comprises: sampling multiple interactions of said user with a computer mouse; if said sampling indicates generally-rough movement of the computer mouse, then, determining that said user is located remotely from said computing device and controlling remotely said computing device via said remote access channel.

In some embodiments, the method comprises: sampling multiple interactions of said user with a computer mouse; if said sampling indicates generally-linear movement of the computer mouse, then, determining that said user is located remotely from said computing device and controlling remotely said computing device via said remote access channel.

In some embodiments, the method comprises: sampling multiple interactions of said user with a computer mouse; if said sampling indicates sharp-turn movements of the computer mouse, then, determining that said user is located remotely from said computing device and controlling remotely said computing device via said remote access channel.

In some embodiments, the method comprises: sampling multiple interactions of said user with said input unit; if a frequency of said multiple interactions is below a pre-defined threshold, then, determining that said user is located remotely from said computing device and controlling remotely said computing device via said remote access channel; if the frequency of said multiple interactions is above the pre-defined threshold, then, determining that said user is co-located physically near said computing device.

In some embodiments, the method comprises: overloading a data transfer communication channel of the computing device that is used for accessing said computerized service; measuring an effect of said overloading on frequency of sampling user interactions via an input unit; based on the measured effect of said overloading, determining whether said user is (i) co-located physically at said computing device, or (ii) is located remotely from said computing device and controlling remotely said computing device via said remote access channel.

In some embodiments, the method comprises: sampling user interactions with an input unit of a mobile computing device; analyzing temporal relationship between touch events and accelerometer events of sampled user interactions with said input unit of the mobile computing device; based on analysis of temporal relationship between touch and accelerometer events, of sampled user interactions with said input unit of the mobile computing device, determining whether the said mobile computing device is controlled remotely via said remote access channel.

In some embodiments, the method comprises: sampling user interactions with an input unit of a mobile computing device; analyzing temporal relationship between touch movement events and accelerometer events, of sampled user interactions with said input unit of the mobile computing device; based on analysis of temporal relationship between touch movement event and accelerometer events, of sampled user interactions with said input unit of the mobile computing device, determining whether the said mobile computing device is controlled remotely via said remote access channel.

In some embodiments, the method comprises: (A) sampling touch-based gestures of a touch-screen of a mobile computing device; (B) sampling accelerometer data of said mobile computing device, during a time period which at least partially overlaps said sampling of touch-based gestures of the touch-screen of the mobile computing device; (C) based on a mismatch between (i) sampled touch-based gestures, and (ii) sampled accelerometer data, determining that the mobile computing device was controlled remotely via said remote access channel.

In some embodiments, the method comprises: (A) sampling touch-based gestures of a touch-screen of a mobile computing device; (B) sampling accelerometer data of said mobile computing device, during a time period which at least partially overlaps said sampling of touch-based gestures of the touch-screen of the mobile computing device; (C) determining that sampled touch-based gestures indicate that a user operated the mobile computing device at a particular time-slot; (D) determining that the sampled accelerometer data indicate that the mobile computing device was not moved during said particular time-slot; (E) based on the determining of step (C) and the determining of step (D), determining that the mobile computing device was controlled remotely via said remote access channel during said particular time-slot.

The present invention may include, for example, systems, devices, and methods for detecting identity of a user of an electronic device, for determining whether or not an electronic device is being used by a fraudulent user, and/or for differentiating between users of a computerized service or between users of an electronic device.

Some embodiments may include devices, systems, and methods of detecting user identity, differentiating between users of a computerized service, and detecting a possible attacker. The methods may include, for example: monitoring of user-side input-unit interactions, in general and in response to an interference introduced to user-interface elements. The monitored interactions are used for detecting an attacker that utilizes a remote access channel; for detecting a malicious automatic script, as well as malicious code injection; to identify a particular hardware assembly; to perform user segmentation or user characterization; to enable a visual login process with implicit two-factor authentication; to enable stochastic cryptography; and to detect that multiple users are utilizing the same subscription account.

The present invention may include detection and/or prevention of Remote Access Trojan (RAT) attacks. For example, a RAT may include a computer program or malware designed to give an attacker full access to a victim's computer. The present invention may protect a computer user from RAT attacks, by using transparent Behavioral Biometrics methods which may be based on analysis of interactions through mouse, keyboard and/or touch interfaces. The system may utilize an Invisible Challenge-Response mechanism that proactively generates larger amount of additional behavioral biometric data without users noticing any change to the user experience. The RAT catcher module of the present invention may utilize knowledge of remote access protocols to provide tailored made yet robust detection and prevention techniques.

Cybercriminals use RAT to gain ultimate access to infected victim computer(s). Using the victim's access privileges and hardware fingerprint, they can access and steal sensitive business and personal data bypassing hardware detection security. Many types of Advanced Persistent Threat (APT) attacks take advantage of RAT technology for bypassing strong authentication and are commercially available (e.g., Poison Ivy, Dark Comet, Silent VNC, Zeus Plugin, Silent Team Viewer). These may be maliciously installed on a victim's computer using drive-by-download and spear-phishing tactics.

In a demonstrative RAT attack, a hacker's computer communicates with a hacker's command-and-control server; which communicates with a victim's computer; which communicates with a service provider (e.g., an online banking service). The victim's computer sends (through the hacker's command-and-control server) to the hacker's computer, the screen and cursor data that the victim computer "sees" when it interacts with the service provider; whereas, the hacker's computer sends (through the hacker's command-and-control server) to the victim's computer mouse data, keyboard data, or other input unit data, which the victim's computer sends further to the service provider. The victim's computer sends out malicious or fraudulent interactions to the service provider, through the hardware of the victim's computer; thereby traversing any hardware identification system.

There are multiple protocols for implementing RAT. Some are proprietary and not published, while others are known. For instance, RFB ("remote frame buffer") protocol works at the frame buffer level, and thus it is applicable to all windowing systems and applications, including X11, Windows and Macintosh. RFB is the protocol used in Virtual Network Computing (VNC) and its derivatives. The latter is commonly used by a fraudster (e.g., Silent VNC). Another example is the Remote Desktop Protocol (RDP) developed by Microsoft, which may be used for cybercrime. Moreover, some fraudsters may utilize proprietary software such as TeamViewer for creating a silent fraud-style version or write their own tool from scratch.

In an experiment in accordance with the present invention, 255 users entered a website designed to be similar to PayPal login screen, and entered an email address, a password, and clicked a login button. Most users accessed the website directly, while 60 users were requested to access it through a web-based remote access tool (Dell SonicWALL, and Ericom AccessNow). The system of the present invention was able to detect RAT with 100% true detection rate, and with 0% false detection rate.

The Applicants have generated a scatter-graph demonstrating the differentiation that may be achieved, in accordance with some demonstrative embodiments of the present invention. The vertical axis indicates a first user-specific feature or characteristic, measured or extracted from monitored user interaction (for example, average curvature of mouse movement). The horizontal axis indicates a second user-specific feature or characteristic, measured or extracted from monitored user interaction (for example, mouse movement speed in one or more directions). Other suitable user-specific traits may be extracted, estimated, and/or charted or graphed.

Samples of interactions from a local are indicated with circles; samples of interactions from a user utilizing a first RAT mechanism (RDP through SonicWall) are indicated with squares; samples of interactions from a user utilizing a second RAT mechanism (Ercom AccessNow) are indicated with triangles. The two different RAT systems operate in different (non-similar) manner; and both of them, and each one of them, is different from the characteristic of a local (genuine, non-RAT) user. The present invention may thus place user characteristics (interaction features) on a similar chart or graph, utilizing one-dimension, two-dimensions, or multiple dimensions; in order to distinguish between a genuine local user, and a fraudster (human hacker, or automatic script or "bot") that utilizes a RAT-based mechanism, to access the service.

A system in accordance with some demonstrative embodiments of the present invention may comprise various components and/or modules. The system may be implemented by using suitable hardware components and/or software modules, which may be co-located or may be distributed over multiple locations or multiple devices. Components and/or modules of the system may interact or communicate over one or more wireless communication links, wired communication links, cellular communication, client/server architecture, peer-to-peer architecture, or the like.

The system may comprise a user-specific feature extraction module, which may extract or estimate user-specific features or traits or characteristics, that characterize an interaction (or a set or batch of interactions, or a session of interactions) of a user with a service, through an input unit (e.g., mouse, keyboard, stylus, touch-screen) and an output unit (e.g., monitor, screen, touch-screen) that the user utilizes for such interactions. A user interaction monitoring/sampling module may monitor all user interactions and may record, capture, or otherwise sample such interactions, and/or may otherwise collect user interaction data which may enable the user-specific feature extraction module to extract or estimate user-specific features of the interaction. A database may store records of users and their respective estimated user-specific feature values.

A comparator/matching module may compare or match, between values of user-specific features that are extracted in a current user session (or user interaction), and values of respective previously-captured or previously-extracted user-specific features (of the current user, and/or of other users, and/or of pre-defined sets of values that correspond to known automated scripts or "bots" or RAT mechanism). If the comparator/matching module 204 determines that one or more features, or a set of features, that characterize the current interaction session of the current user, does not match those features as extracted in previous interaction session(s) of that user, then, a possible-fraud signal may be sent or transmitted to other modules of the system and/or to particular recipients. The user-specific features, whose values may be compared or matched across usage-sessions, may include, for example, curvature (or curvature radius) of mouse movement or mouse strokes; acceleration and/or speed of mouse movement in one or more directions; and/or other suitable features.

Optionally, additionally or alternatively, the comparator/matching module may compare the features characterizing the current session of the current user, to features characterizing known RAT mechanisms, known malware or "bot" mechanisms, or other pre-defined data; in order to determine that, possibly or certainly, the current user is actually a non-genuine user and/or is accessing the service via a RAT mechanism.

In some embodiments, the output of comparator module may be taken into account in combination with other information, security information, user information, meta-data, session data, risk factors, or other indicators (e.g., the IP address of the user; whether or not the user is attempting to perform a high-risk activity such as wire transfer; whether or not the user is attempting to perform a new type of activity that this user did not perform in the past at all, or did not perform in the past 1 or 3 or 6 or 12 months or other time-period; or the like). The combined factors and data may be taken into account by a user identity determination module, which may determine whether or not the current user is a fraudster or is possibly a fraudster. The user identity determination module may trigger or activate a fraud mitigation module able to perform one or more fraud mitigating steps based on that determination; for example, by requiring the current user to respond to a challenge, to answer security question(s), to contact customer service by phone, to perform two-step authentication or two-factor authentication, or the like.

The present invention may utilize active sensing and preventing of RAT, based on examination of different remote access protocols, operation systems, hardware and viruses in a controlled environment and under different network configurations. RAT detection may be achieved or improved by using a perturbation generator module, able to introduce active perturbation(s) on the client computer, which may not affect the local (genuine) user but may help to detect or even prevent remote user functionality or a RAT-based user, thereby making the RAT-catching system of the present invention more robust and efficient, allowing to both detect and prevent RAT in various protocols and scenarios with zero or near-zero false rejection rates.

Some embodiments may utilize a mouse-pointer hiding module, able to cause the mouse-pointer to "disappear" or vanish or be non-visible or be less visible on a screen or monitor of a remote user (who utilizes a RAT mechanism), while the mouse-pointer is fully-visible or at least partially-visible (or continuously visible) on the victim's computer screen; or vice versa. In some embodiments, the mouse-pointer hiding module may operate to avoid showing a mouse-pointer on the victim's computer screen (e.g., by showing a white-on-white arrow, or a transparent arrow), while the victim's computer continues to transmit or transfer mouse-pointer coordinates to the remote attacker's computer which presents (on the screen of the attacker's computer) a visible mouse-pointer based on the transmitted pointer coordinates; and in such case, the system may differentiate or distinguish between users, since for example, the remote attacker may continue to operate regularly with regular mouse movements (as he is able to see the mouse-pointer on the attacker's computer screen), whereas a genuine local user may not see locally the mouse-pointer and may perform reactive operations (e.g., may move his mouse in a circle, or may move his mouse sideways back-and-forth, or up-and-down; or may press the Escape key, or may perform hectic mouse movements).

In another implementation, a mouse-pointer displacement module may operate to cause displacement of the mouse-pointer (e.g., an arrow or other cursor or pointer), visible on the remote attacker's screen, relative to the mouse-pointer that is visible on the victim's screen. For example, the mouse-pointer displacement module may replace the mouse-pointer in the victim's computer with a large transparent image (e.g., square or rectangle; for example, 150× 150 pixels, or 200×200 pixels), having a smaller arrow (e.g., 10 or 15 or 20 pixels long) at an edge or corner or side-region of the image. The remote attacker's computer may present the mouse-pointer according to the coordinates of the center of the image (the center of the square or rectangle); and as a result, a click or double-click performed by the remote attacker, based on the location of the center of the large image, would actually be displaced or deviated relative to the location of the arrow that is visible on the victim's computer. The system may utilize this deviation or displacement of the mouse-pointer, to distinguish among users; for example, the remote attacker (whose computer shows an arrow based on transmitted cursor coordinates) would click "correctly" on buttons or fields or items; whereas a genuine local user, who sees a "displaced" arrow shown in a corner or an edge of a greater transparent rectangle, would click "incorrectly" on white spaces or in proximity to GUI elements (e.g., near buttons, near text-fields, near radio-buttons, near checkboxes) but not inside them.

Some embodiments may generate and utilize a modified mouse-pointer which may be used for distinguishing a local (genuine) user from a remote attacker. For example, the mouse-pointer of a computing device (which belongs to the genuine user, the local user) may be modified or changed or replaced with a rectangular or square-shaped image, having a "fake" arrow pointer in its upper-left corner. The result of replacing the mouse-pointer with the image is, that a "fake" arrow is shown at the corner, away from the "real" center which is empty and does not show any pointer. A remote attacker is able to correctly and/or rapidly click on a "submit" button. The remote attacker's computer receives from the victim's computer the coordinates of the center, and the remote attacker's computer shows to the attacker (on his remote computer) a mouse-pointer at that center; the remote attacker brings that mouse-pointer into the "submit" button, and is able to correctly click within the submit button. In contrast, the local genuine user is not able to correctly (or rapidly) click within the "submit" button. The local user does not see the mouse-pointer at the center of the image; rather, the local user sees only the "fake" arrow at the corner of the image. Therefore, the local user may move his mouse to bring that "fake" arrow into the "submit" button, and may click on the mouse button there. However, such mouse-click will not actuate the "submit" button, because only the "fake" arrow is within the boundaries of the "submit" button, whereas the "real" coordinates of the center are deviated away, externally to the "submit" button. Accordingly, the local user may be clicking (sometimes repeatedly, several times in a row) within a white area, or within area that is not occupied by GUI elements. This may enable the system to differentiate between the local genuine user and the remote attacker.

In another implementation, a RAT latency estimator may be used in order estimate whether a current user is a local (genuine) user or a remote (fraudulent, RAT-based) user, by introducing or generating or injecting an aberration or perturbation or interference or anomaly (e.g., a UI-based or GUI-based aberration or perturbation or interference or anomaly), and measuring or monitoring the response time that elapses until the user reacts to such perturbation. For example, the perturbation generator module may cause the mouse-pointer to entirely disappear, on both the victim's computer screen and the remote attacker's computer screen, via a suitable command or operating system procedure or function or script; a local (genuine) user may immediately react to such disappearance of a mouse-pointer (or cursor), via one or more suitable reactions (e.g., may move his mouse in a circle, or may move his mouse sideways back-and-forth, or up-and-down; or may press the Escape key, or may perform hectic mouse movements); whereas a remote attacker or a RAT-based attacker may suffer from some degree of latency or lag or delay in communication, due to his being remote, and thus the remote attacker would react to such disappearance later or significantly later than a local (genuine) user would react (e.g., at a reaction delay that is greater than a pre-defined threshold value, or that is not within an acceptable pre-defined range of delay values). The system may thus utilize such injected GUI-based (or other types of user experience) interferences, as a trigger for measuring the latency or delay or lag in user response or the latency (or delay, or lag) in user reaction; a greater latency or delay or lag (e.g., relative to previous measurements, or relative to a threshold value, or relative to a range of acceptable values) may indicate that the user is a remote attacker or a RAT-based attacker; while a shorter latency or delay or lag (e.g., relative to previous measurements, or relative to a threshold value or range of values) may indicate that the user is a local (genuine) user and not a remote attacker.

Optionally, the system may create user-specific profiles which may comprise cognitive and/or behavioral user-specific traits, based on aberrations or discrepancies that may be based on (or related to) cognitive bias, in order to identify possible identity theft, fraudster, "man in the browser" attacker, and/or non-human ("bot") module impersonating a human user. Such user-specific traits may be extracted by utilizing, for example, priming, Stroop effect, bias of free choice, false fame effect, or the like. For example, a cognitive bias estimator may be used to trigger, and measure or estimate, cognitive bias or user(s) for purposes of differentiating between a genuine or local user, versus a remote user or remote attacker or RAT-based used. In a demonstrative example, the perturbation generator module may introduce a GUI-based perturbation only at a log-in screen of a service or application or website; for example, causing the mouse-pointer to move in a certain deviated manner relative to the hand-movement of the user. A genuine (local) user may have cognitive bias, and may operate his local mouse device in a way that "corrects" the mouse-pointer deviation in the log-in screen. In the next or subsequent screen, the perturbation may not be maintained by the system, or may be removed by the system; a local (genuine) user may still have some degree of cognitive bias, and may still operate the mouse (at least for a short period of time, e.g., 1 or 2 or 5 seconds) in the previous "corrective" manner that he did in the log-in screen. In contrast, some types of remote attackers, or RAT-based attackers, may not operate prior to the logging-in of the genuine user, or may start operating only after the genuine user logged-in; and such remote attacker would not be aware of any log-in screen perturbation that had occurred, and would not have any cognitive bias, and would not operate his mouse in the "corrective" manner that a biased local user would do. This may allow the cognitive bias estimator to distinguish between a genuine local user and a remote attacker.

Some embodiments may identify man-in-the-browser attacks or session hijacking attacks, based on behavioral and/or cognitive meta-data related to the particular application being used, for example, different response time, different hardware-related behavior, cognitive variance between adjacent sessions, responses to aberrations, cognitive bias, or the like. Some embodiments may utilize biasing, hardware identification, adjacent sessions identification, and/or identification of RAT attacks. In some embodiments, the RAT identification may have an equal error rate (EER) of virtually zero percent when hundreds of users are observed.

In some embodiments, an interaction signal sampling and analysis module may analyze a sample of the signal of the user interaction, the frequency of sampling, the types of noise of the sample, channel estimation, response time to aberrations, diluted mouse trajectory samples, first order hold sampling of mouse trajectory, or other user-specific traits which may be extracted or analyzed when two users (human and/or non-human) generate a signal corresponding to user-interaction at different times and at different sampling rate. For example, sampling of mouse movement of a remote attacker's mouse, may be different from sampling of mouse movement of a local (genuine) user.

In a first example, in a remote communication session the communication protocol attempts to reduce communication overhead, and thus may sample less mouse-movement points or may sample the mouse movement at a lower (or reduced) frequency, relative to a local system that does not have communication limitations; and as a result, the mouse movement of a remote attacker, when sampled, may show a less-smooth movement or a more "noisy" or noise-affected movement, whereas sampling of a mouse movement of a local user would show a smooth or smoother movement with less noise; thereby allowing the interaction signal sampling and analysis module to differentiate between a remote attacker and a local user.

In a second example, the remote communication session (of the RAT-based attacker) may suffer from its own limitations, constraints, latency, or its own noises or patterns of noise; which may affect the mouse-movement sampling, and may allow differentiation between the remote attacker and a local user based on such communication noises of the remote access protocol.

In both examples, additionally or alternatively, such "noises" in the remote access protocol may affect the latency (or timing) of user reaction to the injected perturbation, and/or may affect the pattern or other characteristics of the user reaction (e.g., the shape of the mouse movement itself). In some embodiments, optionally, a remote-access burdening module may be used by the system in order to intentionally burden or overload the victim's computer resources and/or to burden or overload the remote access protocol (for example, by requiring the victim's computer to upload and/or download large amounts of data from a server controlled by the service being protected, thereby leaving narrower bandwidth and increased latency for the attacker's remote access communication channel); and thereby increasing the effects of such noises due to overloaded communication protocol, or making such communication noise more significant and more observable, and enabling the system to detect the remote attacker more rapidly or in a more certain manner.

The user-specific signal characteristics may be stored in the database, and may be used subsequently by comparator/matching module in order to compare or match between current-characteristics and previously-estimated characteristics, thereby enabling a decision whether or not the current user is genuine or fraudulent.

Some embodiments may identify man-in-the-browser (MITB) attacks or session hijacking attacks, based on user-interaction data, injection of aberrations, analysis of user reaction, and extraction of parameters that may indicate fraud. In a demonstrative example, a remote attacker may utilize a "Trojan" malware module that is installed on the computing device of the genuine user, when the genuine user is logged-in to the relevant service (e.g., online interface of a bank account). The attacker may thus enter into the account of the genuine user, and may operate therein. Such attack may include, for example, two sessions that take place in parallel or in sequence; operation of the attacker from a remote computer; utilization by the attacker of hardware which may be different from the hardware of the victim's device; and/or utilization of an automatic script which may operate on the bank account (from a remote server, or directly from the victim's device). The terms "RAT" or "Remote Access Trojan" are used herein for demonstrative purposes; and may include other types of Remote Access (RA), remote access via a malware or virus or malicious code, or other types of unauthorized or illegitimate or illegal remote access.

In some RAT attacks, a malware module is installed in a victim's device, and sends or transmits data to a remote computer of the attacker, the data including mouse data as well as screen-shots. Often, to allow a smaller upload of data from the victim to the attacker, images are compressed, or are skipped (e.g., the mouse pointer may be uploaded to the attacker, whereas an underlying background image may be sometimes skipped). The system may utilize an aberration generator to generate one or more aberration(s) that will cause a situation in which the attacker and the victim do not see a visually identical screen, and therefore their reaction would be different and may allow the system to identify the attacker. For example, the aberration generator 209 may generate or inject an aberration or interference, which causes the victim's computer and the remote attacker's computer to show non-identical screens, due to timing difference, latency, bandwidth or throughput limitations (of the connection between the attacker and the victim), due to utilization of different hardware (e.g., different screen sizes or screen resolution) by the attacker and victim, or the like. For example, the mouse pointer may be moved or relocated, to be at different locations; such as, to be in a first location at the victim's screen, while being in a second location at an attacker's screen.

Additionally or alternatively, the upload or transmission channel (to the attacker's device) may be sabotaged, by a channel overloading module, such as by creating an overload of data that needs to be uploaded or downloaded or exchanged or transmitted between the attacker and the victim (or vice versa); or by causing a significant delay or latency for the attacker, for example, by sabotaging the ability to efficiently compress image(s), e.g., by broadcasting video (for example, invisibly to the genuine user) or rapidly-changing graphical elements or rapidly-changing content items or rapidly-updating content items. In a demonstrative implementation, data which should not typically be displayed as a video (e.g., text, static image), may be presented as a video or a continuous video clip, to overload a transmission channel which an attacker may utilize for the RAT mechanism. The system may otherwise cause aberrations or intentional discrepancies that may overload the communication channel between the victim device and the attacker device, thereby causing the communication channel to operate in a bursting manner and thus make the attack identifiable.

Optionally, the system may cause the victim's computer to perform an upload at a particular frequency, which may then be identified in the signal of the mouse events of the remote attacker. For example, the system may comprise a sampling frequency modifier module which may perform one or more operations which may cause, directly or indirectly, a modification (e.g., a decrease or reduction) in the frequency of the sampling of the input unit interaction of a remote attacker. In a demonstrative example, the system may comprise an animation/video burdening module which may present on the victim's computer screen, one or more animation clips and/or video clips of generally static content, such that the victim may not even notice that they are animated or videos; for example, rapid animation or video which switches between two (or more) very similar shades of a particular color that are non-distinguishable to the eye of a typical user. The remote access protocol that is used in the RAT attack needs to transmit the screen content of the victim's computer to the remote attacker's computer; and therefore, the excessive animation/video may burden or overload the remote access communication channel, and may cause a modification of the frequency of the sampling of the interactions of the attacker; and the frequency in which the animation (or video clip) is being animated may affect in a particular manner the frequency of the transmittal of packets from the victim's computer to the remote attacker's computer and/or may affect the sampled signal that represents the interactions of the remote attacker; thereby allowing the system to more rapidly or more certainly detect that a remote attacker is interacting with the service.

Some embodiments may extract time-based or time-related parameters which may be user-specific and may be used as user-specific traits for user identification purposes. For example, aberrations or challenges may be generated and injected into an interaction of a user with a service or application or website, which may require a response or reaction from the user (in a visible or conscious manner, or in a non-visible or un-conscious manner, from the user's point of view). An aberration reaction monitoring module may monitor and determine the reaction of the user to introduced aberrations, as well as characteristics of such reaction; for example, was the reaction correct or incorrect, the timing or the latency of the reaction, or the like. Time-based parameters may be extracted, for example, the time period that it takes the user to recognize or discover the aberration and/or to respond to it (or resolve it), the time period that it takes the user to adapt his behavior (e.g., his general mouse movement) to a continuous aberration (e.g., adaptation time, training time), learning curve of the user regarding the aberration (frequency or rate of corrections; magnitude of corrections), or the like. A remote attacker typically has a latency or time-delay, with regard to appearance of the aberration or challenge, as well as different time-based parameters for responding to the aberration or challenge; and this may allow the system to distinguish or discriminate between the genuine user and a remote attacker.

Some embodiments may analyze a sampling signal of the user interaction, for example, sampling frequency (mouse-related, keyboard-related, touch-screen related), types of sampling noises, channel estimates, response time to aberrations, diluted mouse trajectory samples, first order hold sampling of mouse trajectory, or other parameters which may be different from (or may be affected by) parallel operation of two users (e.g., a genuine user and a remote attacker) that generate interaction signals at different times and with different sampling frequencies. Optionally, such features may be extracted in order to estimate or determine the type of hardware utilized by a user, and thereby assist in distinguishing between a local user versus a remote attacker. In a demonstrative example, the system may comprise a hardware identification module able to identify hardware utilized by the user and/or able to distinguish between hardware utilized by a remote attacker or a local (genuine) user. For example, each set of hardware components of a computing device, may sample the mouse events at a different frequency and/or with dependence on the available resources (or the overload) of the computer being used. A machine-learning process may be performed in order to allow the hardware identification module to learn the characteristics of the sampling of the mouse events (or keyboard events) of the genuine user, given an average level of computer resources burdening (or availability), which may be known or unknown. In many cases, the remote attacker may utilize a computer or computing device having hardware specifications and/or resources availability that may be different from those of the victim's computer; and therefore, the sampling of the remote attacker's mouse interactions (or keyboard interactions) may be different from that of the local victim's; thereby allowing the hardware identification module 236 to determine that a current user utilizes a mouse (or keyboard) that are different from those that the genuine user had used in previous usage sessions, triggering a possible fraud alert.

In some embodiments, a remote attacker may utilize a remote device (having a remote display unit and a remote mouse and keyboard), which may translate into a relatively low sampling frequency for the user interaction of such remote attacker. Optionally, an aliasing injector module may inject or introduce aliasing operations, which may not be visible or noticeable or significant to a local (genuine) user, but may significantly burden the interaction of a remote attacker. For example, a mouse pointer may be alternately hidden (e.g., at a frequency of 50 Hz), thereby causing the mouse pointer to be visible only to a local user but not to a remote attacker (or vice versa, depending on the exact configuration of such aberration); and the user's response may allow to identify whether the user is a genuine local user or a remote attacker.

In some embodiments, an adjacent session detection module may identify adjacent usage sessions of the attacker and the victim. For example, the system may compare between sessions having a relatively short time interval between them (e.g., five seconds apart, or one minute apart); the system may compare the user interaction parameters of those two sessions, between themselves and/or relative to one or more historic profile(s) or previously-monitored interaction sessions of that user. In some embodiments, the system may analyze the later of the two sessions against the interaction parameters of the earlier of the two sessions, rather than against the historic or general interaction profile of the user. Optionally, the system may generate an ad-hoc profile or temporary profile, per usage session, which may be stored and utilized for a short period of time (e.g., 30 or 60 minutes); optionally, an ad-hoc profile or temporary profile may not necessarily be merged or fused into the general profile of the user; but rather, may be kept or utilized temporarily, while evaluating whether or not the current user is indeed the genuine user or an attacker; and only if the system determines that the current user is genuine, then, his long-term profile may be updated in view of his interactions in the current session.

Some embodiments may identify a fraudulent usage session by training the user to a particular behavior and testing for such behavior; for example, by launching aberrations that cause the user to change its mode of interaction within the next few seconds or minutes and while the aberration is still carried on. For example, the system may change the relation between the physical movement of the mouse and the virtual or on-screen cursor or pointer during the log-in process, and then make another modification subsequent to the log-in process. Similarly, the system may modify the delay time or delay interval between the pressing-down of a key on the keyboard, and the appearance of the suitable character on the screen. The system may generate other, small, aberrations in proximity to a button or link that needs to be clicked or selected, thereby requiring the user to aim the mouse more accurately; or in a touch-screen device, introducing an artificial delay between touching an on-screen key until character appears on the screen, thereby causing the user to prolong or extend the pressing time or touching time. In some embodiments, one of the two sessions may be injected with such aberrations, whereas another of the two sessions (e.g., the later-starting session) may not be injected with such aberrations; and sampling and analysis of input unit events may enable the system to distinguish between a local (genuine) user and a remote attacker.

Some embodiments may utilize a priming messages module, such that a message is briefly or instantaneously shown or is flashed on the screen for a very short time in order to convince the user, sub-consciously, to use a first button or interface element instead of a second one. The system may identify a remote attacker or "bot" or malware due to their ignoring of such priming messages, which may not be transferred from the victim's computer to the remote attacker's computer due to limitations of the remote-access protocol or communication channel; or the system may identify a remote attacker since such priming messages may differently affect the interactions of different users (e.g., the genuine user may ignore such priming messages, whereas the remote attacker may obey them; or vice versa).

Some embodiments may detect that a mobile computing device (e.g., a smartphone, a tablet) is being controlled (or was controlled) via a remote access channel (e.g., by a remote attacker who utilizes a non-mobile computing platform, such as a desktop computer or a laptop computer). Some embodiments may detect that a mobile computing device that has a touch-screen and an accelerometer (e.g., a smartphone, a tablet) is being controlled (or was controlled) via a remote access channel by a remote attacker who utilizes a computing platform that lacks an accelerometer (such as a desktop computer or a laptop computer). Some embodiments may detect other scenarios or attacks, in which an attacker utilizes a desktop or laptop computer, in order to remotely access a mobile computing device (e.g., smartphone or tablet).

For example, touch-screen movements and/or gestures and/or taps may be monitored, captured and/or sampled; and may be compared or matched against accelerometer(s) data for the same time-period (or for a time period or time-slot which is at least partially overlapping). The system may detect that the touch-screen event sampling indicates that the user of the mobile device has manually performed gestures on the touch-screen; whereas, at the same time, accelerometer data from the mobile computing device is absent, or is null, or indicates no acceleration and no deceleration. Such mismatch or anomaly may indicate that the mobile computing device (e.g., smartphone or tablet) is or was actually being controlled remotely, by an attacker who utilizes a remote access channel, which enabled the attacker to emulate or simulate "touch-screen gestures" (taps, movements) through the attacker's input unit (e.g., mouse, touch-pad), but did not enable the attacker to affect the accelerometer data that the mobile computing device produces. Some implementations may thus detect that a mobile computing device appears to be performing manual gestures, while the device itself is not physically moving or shaking (even minimally), or while the device itself is at a complete rest; thereby indicating that possibly a remote access attack is or was performed.

The system may further comprise an Automatic Script Detector (ASD) module, which may be a component or module able to detect an automatic script (or malware, or virus, or Trojan, or "bot", or malicious automated code or program), which may attempt to control a user account (or a subscriber account, or an online account of a genuine user), in an un-authorized or illegal or fraudulent manner. In some embodiments, the ASD module may utilize one or more of the functions described above, in order to detect such automatic script, or in order to distinguish or differentiate between a human user (e.g., the genuine or legitimate or authorized human user) and a "bot" or automated script. It is clarified that ASD module may detect, for example, that a malicious or unauthorized automatic script or code is running or is "interacting" artificially or automatically with a computerized service, or is "impersonating" a human user. Naturally, some or most computing devices may run authorized scripts, such as Operating System, drivers, anti-virus programs, authorized background tasks (e.g., backups); and the ASD module is not aimed at detecting such authorized processes, but rather, aimed at detecting unauthorized and/or unknown and/or malicious scripts or code or programs.

Some embodiments may detect an automatic script which may operate as a man-in-the-browser attack (or in a man-in-the-middle attack), and which may modify some or all of the data items that are sent from the victim's computing device to a web-server or application-server; for example, modifying a recipient bank account data, when the genuine user instructs his bank to perform a wire transfer. The system may identify such script or attack, by comparing between the original data that the genuine user had inputted and instructed to send out, to the (modified) data that was actually received at the bank's server. In a demonstrative embodiment, the system may detect that the genuine user had inputted six keystrokes when he types the recipient's name, whereas the recipient's name as actually received at the bank server has other number of characters (not six characters). Some embodiments may further examine patterns of the inputting method, if the number of characters is identical, in order to detect a possible fraud.

In some implementations, the ASD module may comprise or may utilize an interaction data correlator, able to correlate or match or compare between: (a) data indicating that a transaction was commanded or ordered or requested from the user's side, and (b) data indicating user-interface interactions (e.g., mouse-clicks, mouse gestures, mouse movements, keyboard keystrokes, touch-pad events, mouse events, keyboard events, other input-unit events). For example, the ASD module may be connected to, or associated with, an online banking application or web-site or service; and may monitor interactions of the user with that service. The ASD module may detect that the online banking service reports that the user commands to perform a wire transfer (e.g., without necessarily receiving from the banking service a copy of the actual data, such as, without receiving the data of the beneficiary name, the beneficiary account number, the amount of wire transfer, or the like). Upon such report or trigger from the online banking service, the ASD module may check whether or not any input-unit interactions were received from the user's device, for example, in a particular recent time-period (e.g., in the most-recent 1 or 2 or 5 or 10 minutes). For example, the interaction data correlator may detect that even though a wire transfer was commanded or requested from the user's side, the GUI or UI interactions or the input-unit interactions do not show any input or any gestures or dynamics in the past 5 minutes; and therefore, the interaction data correlator may determine that the commanded wire transfer was not entered by a human user, but rather, might possibly have been submitted automatically by an automated script or a "bot" program which automatically and electronically submits form data without moving the mouse and/or without typing on the keyboard. The interaction data correlator may thus trigger an alarm or alert notification for possible fraud.

In another implementation, the interaction data correlator may further correlate or compare or match, between (a) meta-data about the input-unit interactions that were actually performed, and (b) meta-data about the data that the banking service has received as part of the banking command. In a demonstrative example, an automated script may manipulate or modify or replace data that a human (genuine) user typed, and may submit the modified or fraudulent data to the banking service in lieu of the correct data that the human user has entered manually. For example, the human user may use the keyboard to enter a first beneficiary name of "John Smith" (having 10 characters, including the Space), and having an account number of "12345678" (having 8 digits), and having a beneficiary city address of "Miami" (five characters); whereas, the automated script may manipulate or modify or replace the user-entered data, after the user typed it but prior to its electronic submission to the banking service's server, to a second beneficiary name (such as "David Malcolm", having 13 characters), having an account number of "1234567" (having 7 digits), residing in a city of "Moscow" (having 6 letters). The interaction data correlator 242 need not receive from the banking service the actual data of the wire transfer details; rather, the interaction data correlator may receive only the meta-data describing the data, such as, that the wire transfer request is to a beneficiary name having 13 characters, to a bank account having 7 digits, and to a city having 6 characters. The interaction data correlator 242 may inspect the recently-captured user interactions (e.g., keystrokes, mouse dynamics, mouse events, keyboard events, other input-unit events) and may determine that the command meta-data does not match the user-interactions (or the user interaction meta-data); because, the beneficiary name in the wire request has 13 characters, but the interaction data correlator does not observe a series of 13 characters entered within a short period of time (e.g., within 4 seconds) as a separate batch from other data; or because the interaction data correlator observes an initial batch of 10 characters entered rather than 13 characters. The interaction data correlator may thus determine or deduce that an automatic script or "bot" has possibly intervened to manipulate, replace or modify the data that the user entered manually, with fraudulent data whose meta-data does not match the meta-data of the user interactions; and the interaction data correlator may proceed to generate an alarm or alert notification of possible fraud.

In some implementations, the interaction data correlator may optionally monitor and analyze the grouping of characters into "fields" or "batches", and not only the total number of keystrokes or characters; by using a grouping analyzer. For example, the genuine user may enter "John Green" and also "Boston", totaling 16 characters; and the automated script may fraudulently replace them with "David Green" and "Miami", which are also totaling 16 characters. The interaction data correlator may perform grouping into batches, and may notice that the manual input that was received corresponds to: a first batch of 10 characters, followed after ten seconds by a second batch of 6 characters; whereas, the data in the wire command (as manipulated by the automated scripts) corresponds to batches of 11+5 characters, and thus does not match the grouping or batching of the manual user interactions; thereby triggering an alert notification for possible fraud.

In some implementations, the interaction data correlator may utilize a hash/checksum module, in order to compare or match or correlate between hash values and/or checksum values of (a) data that the banking service indicates as being received from the user, and (b) data reflecting the monitoring of user interactions through the input unit(s); and without necessarily receiving from the banking service the actual data of the banking order. For example, the banking service may indicate to the interaction data correlator that a wire transfer command has been received, with a beneficiary name having ten characters and having a checksum of a hash-value of "54321". The interaction data correlator, in conjunction with the checksum module, may check whether any recently-entered group or batch of ten characters, as captured from monitored user interactions, has a checksum or hash-value of "54321"; and may generate a possible fraud alert if such match is not detected.

In some implementations, a keystrokes spacing module may be used to detect anomalies or fraud based on expected or observed gaps in keystroke entry. For example, an automated script may input data by emulating a fixed-rate typist which types at a generally fixed rate (e.g., one character every second; or one character every half-a-second); whereas, a human user may not have a fixed time-gap among keystrokes. Furthermore, some automated scripts may attempt to insert random or pseudo-random time-gaps between emulated keystrokes, to create an impression of a human user typing (rather than an automated script). However, a human user typically enters certain groups of keystrokes more rapidly and/or with reduced time-gaps (or with almost no time gaps), and this may be used by the keystrokes spacing module 245 to differentiate between (i) a human user, and (ii) an automated script which enters characters in a synthetic or artificial manner "impregnated" or augmented with pseudo-random time-gaps. For example, a first user may type the common suffix "tion" (as in "question", "motion"), rapidly and with very little time-gaps among characters; or may type the common prefix "re" (as in "recall", "remove") or the common sequence "the" (as in "the", "there", "them") more rapidly or with very little time-gaps among characters; whereas an automated script may enter characters with fixed or pseudo-random time-gaps or intervals that do not correspond to the user-specific spacing or no-spacing while typing manually certain keystroke sequences. These properties may be monitored and analyzed by the keystrokes spacing module 245; and may be utilized in order to distinguish or differentiate between (a) a human user, and (b) an automated script; and/or may be utilized in order to distinguish or differentiate between two human users (e.g., a genuine or legitimate user, versus a fraudster or imposter or attacker or hacker).

The system may further comprise a Code Injection detector, able to detect a fraudulent or possibly-fraudulent situation in which a code or program or script is injected or added to a website or application or service; for example, able to detect an HTML injection attack. In a demonstrative example, a malware or virus or Trojan is maliciously installed on a computing device or electronic device of a genuine user; who then access a particular service or website or application (e.g., banking, electronic commerce). The server of the accessed service (e.g., banking web-server) sends to the user's device an HTML page, which requires the user to enter a username and a password. The malware on the user's computer intercepts the received HTML code prior to its rendering in the browser; and the malware then modifies, manipulates, replaces and/or augments the HTML code. For example, the malware may inject or add to the original HTML code (that was received from the bank's web-server) additional HTML code ("injected code"), which also requires the user to enter her social security number, and/or to answer a security question (e.g., place of birth), as part of a fraudulent, modified, log-in page which is then rendered and displayed to the user by the web-browser. The malware may then capture the additional data that the user enters and/or submits, while transmitting back to the web-server only the data for the originally-required fields (the username and the password) and not the augmented (fraudulent) fields.

The code injection detector may capture such code injection, for example, by monitoring and analyzing the data or meta-data related to user interactions with input unit(s) (e.g., keystrokes, mouse clicks, mouse gestures, mouse events, touch-pad events).

In a first example, the code injection detector may receive from the bank web-server an indication that a form was sent to the user's device for filling and submitting by the user, and that the form (as sent from the web-server) contains two fields to be filled-out. The code injection detector may then detect that the monitored user interactions indicate clearly that the user has filled-out three fields rather than two fields; for example, because the user has entered a sequence of 10 characters (possibly his username), then pressed Tab to move to a second field, then entered a sequence of 12 characters (possibly his password), then pressed Tab again to move to a third field, then entered a sequence of 9 characters (possibly his social security number, or any other third data-item other than the two that the bank web-server requested to be filled-out). The code injection detector may thus determine that possibly a code injection attack is being carried out by a malware component; since the web-server of the service indicates that two fields have been requested to be filled-out, whereas the actual monitored user interactions indicate that three (or more) fields have been filled-out manually by the user.

In a second example, the code injection detector may utilize data or meta-data about the length of field(s) that are expected, compared with actual number of characters typed. For example, the bank web-server may indicate to the code injection detector, that two fields are expected to be filled-out; a username field which is limited to 16 characters, and a password field that is limited to 20 characters. The code injection detector may observe the actually-typed or actually-performed manual interactions, and may detect that the user has typed a string with a length of 45 characters; thereby indicating that possibly a third field (or additional fields) have been fraudulently "injected" into the HTML code by a malware and have fraudulently induced the user to type excessive number of characters than expected.

The system may further comprise a hardware assembly detector able to determine one or more properties of the hardware components that are actually used by a user of a computing device, based on analysis of user interactions (e.g., keystrokes, mouse gestures, mouse events, mouse clicks, touch-pad events, and/or other input-unit events or interactions).

In a first example, a stroke evaluator module (which may also be referred to herein as a long-stroke evaluator module) may be used in order to evaluate or analyze long strokes that the user performs. For example, the long-stroke evaluator module may monitor and may evaluate all the strokes (or gestures) in which the user moves the on-screen pointer (e.g., mouse-pointer, arrow-shaped pointer, cursor, or the like); or the top K percent (e.g., top 5 percent or top 10 percent) of the strokes when ordered based on their length in descending order. The long-stroke evaluator module may detect, for example, that in a first usage session on Monday, the ten longest strokes that the user performed have moved the pointer by 600 to 700 pixels, thereby indicating that a mouse device was used on a flat surface with a long stroke; whereas, in a second usage session on Tuesday, the ten longest strokes that the user performed have moved the pointer by 250 to 300 pixels, thereby indicating that a touch-pad was used in that usage session. Accordingly, evaluation of the long or longest strokes of the user, may indicate on the type of hardware that the using is utilizing; and may allow the long-stroke evaluator module to distinguish or differentiate between a user utilizing a mouse device and a user utilizing a touch-pad.

Additionally or alternatively, the long-stroke evaluator module may detect that in the second usage session, two or three consecutive strokes of approximately 250 pixels each, where performed consecutively with short time-gaps between them (e.g., less than a second, or less than half-a-second), indicating that the user possibly utilized a touch-pad with three consecutive horizontal strokes in order to entirely move the on-screen pointer from the left side of the screen to the right side of the screen.

In another example, some laptop computers may include a mini-joystick in the center of their keyboard, also known as a "pointing stick" (e.g., having a red rubber tip); and the utilization of such keyboard-based pointing-stick may leave a distinguishable footprint on user interactions; for example, may manifest such utilization by shorter strokes that are more "bursting" in their nature, or have a greater initial acceleration, or have a greater ending deceleration, or the like. The long-stroke evaluator module may monitor long-strokes (or strokes in general, not necessarily long ones) in order to detect such typical footprint or pattern that is indicative of a keyboard-based pointing-stick; and may thus distinguish or differentiate between (a) a user utilizing a keyboard-based point-stick, and (b) a user utilizing other type of input unit (e.g., touch-pad, mouse).

The system may further comprise a sampling-based detector able to differentiate between types of input units (e.g., mouse, touch-pad, pointing-stick), and/or even between different input units of the same types (e.g., different types of mouse devices), based on different sampling footprint or sampling characteristics that such input devices may have, individually or due to their assembly with other specific hardware components.

In a first example, monitoring the utilization of a mouse device may lead to a first type of sampling distribution or standard deviation thereof or sampling frequency thereof; which may be different from those obtained from monitoring the utilization of a touch-pad, or a pointing-stick. Accordingly, the sampling-based detector may determine, based on differences in the characteristics of the sampling of the input device, that a first input device is currently utilized, whereas a second input device had been utilized in a previous usage session of the same purported user.

In a second example, mouse devices made by a first manufacturer (e.g., Logitech) may have different sampling characteristics (e.g., frequency, distribution, standard deviation) than corresponding characteristics of mouse devices made by a second manufacturer (e.g., HP); thereby allowing the sampling-based detector to determine that a current user is utilizing a mouse from a different manufacturer, compared to a mouse utilized in a previous usage session of that user.

In a third example, a cordless or wireless mouse may have different sampling characteristics (e.g., frequency, distribution, standard deviation) than corresponding characteristics of a corded mouse; thereby allowing the sampling-based detector to determine that a current user is utilizing a wireless or cordless mouse, in contrast with a corded mouse that had been utilized in a previous usage session of that user (or vice versa).

In a fourth example, various models of the same type of mouse (e.g., cordless, or corded) may have different sampling characteristics (e.g., frequency, distribution, standard deviation), for example, due to different technical specifications of such different mouse devices (e.g., different physical dimensions; different resolution; being a left-handed or right-handed or neutral mouse device; or the like); thereby allowing the sampling-based detector to determine that a current user is utilizing a mouse model which is different from a mouse model that had been utilized in a previous usage session of that user (or vice versa).

The system may further comprise a keyboard identification module, able to distinguish or differentiate among keyboards based on user interactions via such keyboards. For example, rapid typing of a certain sequence of characters (e.g., "tion" or "the") may be indicative of an English keyboard being utilized; whereas, rapid typing of other sequence of characters (e.g., "ez" which is a frequent verb suffix in French) may indicate that a French keyboard is being utilized. Similarly, Russian keyboard, Chinese keyboard, and other keyboard layouts may be detected, by observing and detecting particular rapid sequences of characters that are typically entered in certain languages and not others; regardless or independently of (and sometimes in contradiction to) the estimated geographical region that may be (correctly or incorrectly) deduced from the Internet Protocol (IP) address of the user.

For example, a genuine user may be located in the United States and may utilize an American English keyboard layout; but a remote attacker located in Russia may take control over the genuine user's computer in order to access a bank account of the genuine user. The bank web-server may only "see" the U.S.-based IP address of the genuine user, and may thus assume or determine (incorrectly) that the service is being accessed by a person located in the United States; however, the keyboard identification module may observe one or more rapid key sequences that are indicative of a non-English/non-U.S. keyboard layout, and may alert the banking system that a possible fraud may be occurring, even though the IP address of the logged-in user indicates a U.S.-based IP address.

In another example, different keyboard layouts may dictate, or may be indicative of, different speed or rate of typing (in general, or of various words or syllables or sequences); and these parameters may be monitored and evaluated by the keyboard identification module, and may allow to distinguish or differentiate among users based on the estimated type of keyboard layout that is being utilized in a current session, compared to historical or past keyboard layout(s) that were observed in prior usage sessions.

Optionally, the hardware assembly detector may utilize a resources burdening module for the purposes of hardware assembly detection or identification. In a demonstrative example, a web-page or application of a service (e.g., banking service, or electronic commerce service) may intentionally include excess code, whose purpose is to execute a resource-intensive operation or calculation (e.g., a function that finds all the prime numbers between 1 and 1,000,000); and the user's device may be induced into executing such code (e.g., as a client-side JavaScript code or other client-side program) when the user is accessing the service, in order to capture and use the footprint of such resource burdening. For example, each time that a user logs-in to his banking website, the website may require the user's device to execute (e.g., one time only per each log-in session) a particular resource-intensive user-side (e.g., browser-based) calculation, and to transmit or submit the answer back to the server. The resources burdening module may observe that, for example, in a first usage session the client-side computation required 13 seconds; in a second usage session the client-side computation required 13.3 seconds; in a third usage session the client-side computation required 12.8 seconds; and in a current, fourth, usage session the client-side computation required only 8 seconds. This may indicate that the current usage session is being performed by utilizing a different hardware (e.g., faster processor; increased memory) relative to the previous usage sessions, and may indicate that a possible fraud may be taking place (e.g., by a hacker, a remote attacker, or other fraudster). Optionally, such determination of possible fraud may be reached, even if the IP address and/or "cookie" information indicate that the current user is the same person (or the same device) as the user of a previous usage session.

Optionally, the keyboard identification module may operate in conjunction with, or in association with, a cognitive-based/non-biometric segmentation module, which may be able to estimate that a user is located in a particular geographic region (e.g., continent, country) and/or that the user is fluent or knows how to write a particular language (e.g., a particular non-English language); based on cognitive parameters which may be estimated or determined.

Some embodiments may perform non-biometric segmentation of users based on cognitive behavior. For example, the system may estimate the geographic or geo-spatial location of the user, based on an analysis of the key-typing by the user, which may indicate that a particular keyboard layout (e.g., Russian keyboard layout) is being used, thereby indicating a possible geographical location (e.g., Russia or the former Soviet Union). Some implementations may utilize a CAPTCHA challenge which may require typing of local or region-specific or non-universal characters, thereby indicating a possible geographic location of the user.

Some embodiments may utilize non-biometric segmentation of users based on user interaction characteristics, in order to identify possible attackers or fraudsters. The way that a user interacts with a computing device or website or application, may be indicative of a geographic location of the user, a primary language that the user masters or uses, an age or age-range of the user (e.g., relatively young age between 15 to 30, versus senior citizens over 60), level of computer-proficiency or computer-literacy of the user, or the like. These features may be extracted for each usage session, may assist in creating a user-specific profile, and may be used for detecting a potential attacker.

In a first example, geographic or geo-spatial features may be extracted, and may then be used for identifying a possible attacker located in Asia and who attempts to compromise an account of a United States user or service. In a second example, age-related features may be extracted and may be used for identifying a possible attacker who is relatively young (under 30) and attempts to compromise an account of a senior citizen (over 60). In a third example, some younger or computer-proficient users may utilize certain keyboard shortcuts (for example, CTRL-V to paste text), whereas a senior citizen may not be proficient with such keyboard shortcuts, or may not use them at all, or may even use Menu commands (e.g., Edit/Paste) to perform similar operations; thereby allowing to raise a flag or alert if an account of a senior citizen, who did not user CTRL-V in the past, suddenly detects such usage.

Some embodiments may estimate the geographic or geo-spatial location of a user, based on an estimate of the keyboard layout of that user by analyzing keystroke patterns or other keystroke information; for example, identifying strings of two or three characters, that are typically typed quickly in first keyboard layout of a first region, but are typically types less-quickly or slowly in a second keyboard layout of a second region. For example, the word "wet" may be typed quickly in a standard QWERTY keyboard in the United States, but may be types slowly in a keyboard having a different layout in which the letters of the word "wet" are not adjacent. Similarly, when typing the word "read", a partial string of "re" or "rea" is typically typed faster in some United States keyboard layouts, relative to the remaining portion of the word; and this may be different in other keyboard layouts. The system may track the keystroke patterns, of whole words, or of two-character or three-character or four-character strings, and may utilize such patterns for distinguishing between a genuine user and an attacker, or for determining whether a current user appears to be utilizing a keyboard having a different layout from the keyboard layout of a genuine user who logged-in previously or historically.

Some embodiments may similarly utilize other input-specific combinations in order to distinguish between users, for example, utilization of keyboard shortcuts and/or menu commands, or utilization of a combination of keyboard and mouse (e.g., clicking a mouse button while holding the Shift key or the CTRL key); such advanced combinations may be more typical of a younger user (e.g., age of 15 to 30), rather than a senior citizen user (e.g., age over 60). Similarly, the utilization of Caps Lock or Num Lock or other "shifting" keys (e.g., the Windows key, or a FN function key in a laptop keyboard), may be indicative of a younger or more-proficient user, and may be used for raising a flag or initiating a fraud alert when such user attempts to handle an online account of a senior citizen.

In some embodiments, a CAPTCHA that requires to type local or region-specific characters or language-specific characters may be displayed to the user, in order to further assist in distinguishing among users or for extracting geographic data or keyboard layout data. In a demonstrative example, a web server or application server located in France, typically serving French users and customers, may display a CAPTCHA string of "pr t a porter", in which two letters have accents (or "diacritical marks" or "diacritic marks") on top of them (or under them, or near them); a user that masters the French language and/or utilizes a keyboard (hardware keyboard, or on-screen keyboard) having a French layout would probably type correctly either two or one of those accented characters (with their accents, or with their diacritical marks); whereas a non-French person, or a person utilizing a keyboard that does not have a French layout, would probably type without any accents or diacritical marks, "pret a porter".

The system may further comprise a user-age estimator, able to estimate an age or an age-range or age-group of a user of an electronic device, based on monitored interactions of the user with input unit(s) of the electronic device. Additionally or alternatively, a user expertise estimator may estimate whether a user of an electronic device is a novice user or an expert user; or whether the user is experienced or non-experienced in operating electronic devices and/or in accessing online systems.

In a first example, the typing speed on a keyboard may be monitored and analyzed; rapid typing speed may indicate that the user is relatively young (e.g., between the ages of 15 and 40, or between the ages of 18 and 30), and/or may indicate that the user is an expert or experienced. In contrast, slow typing speed may indicate that the user is relatively old (e.g., over 60 years old; over 70 years old), and/or that the user is non-experienced or novice. Optionally, threshold values (e.g., characters-per-second) may be utilized, with regard to the user's typing, in order to estimate the user's age or age-range, or the user being expert or novice.

In a second example, the user-age estimator may take into account whether or not the user utilizes advanced options for inputting data. For example, utilization of "copy/paste" operations may indicate a younger user or an expert user; whereas, repeated typing (even of duplicate information, such as mailing address and shipping address) and lack of using "copy/paste" operations may indicate an older user or a novice user. Similarly, utilization of various "keyboard shortcuts" in a browser or an application, may indicate a younger user or an expert user; whereas, lack of utilization of "keyboard shortcuts" in a browser or application may indicate an older user or a novice user.

In a third example, the general efficiency and/or speed of the user in completing a task may be monitored and may be taken into account by the user-age estimator and/or by the user expertise estimator. For example, if it takes the user around 60 or 90 seconds to complete all the information required for a wire transfer, then the user may be classified as a younger user and/or an expert user. In contrast, if it takes the user more than 6 minutes to complete all the information required for a wire transfer, then the user may be classified as an older user and/or a novice user.

Some embodiments may distinguish between an expert user and a novice user, or between a technology-savvy user and a common user, based on tracking and identifying operations that are typical of such type of user. For example, usage, or frequent usage, or rapid usage, of keyboard shortcuts or cut-and-paste operations (e.g., CTRL-C for Copy), or using ALT-TAB operations, or performing rapid operations in a short time or at rapid rate, or avoiding usage of menus, may indicate an experienced user rather than a novice user. Utilization of the Tab key for moving among fields in a form, or utilization of the Enter (or Return) key instead of using a "submit" button or a "next" button, may indicate an experienced user. The system may identify that a previous user of an account has typically operated the account with a pattern that typically matches a novice or non-sophisticated user, whereas a current user of the account appears to operate the account with a pattern that typically matches an advanced or expert user; and this may cause the system to raise a flag of alert for potential fraud. Similarly, an attempt to perform a new type or certain type of operation in the account (e.g., a wire transfer; or a money transfer to a new destination or new recipient), together with usage pattern that is indicative of an expert user or sophisticated user, may by itself be a trigger for possible fraud.

The estimations made by the user-age estimator and/or by the user expertise estimator may be compared or match to user data which may appear in a user profile, or may be received from a third party or from the service provider (e.g., the bank web-server); and may be used to trigger a possible fraud alert. For example, the bank web-server may indicate to the system that the current user is in the age-range of 70 to 80 years old; whereas the user-age estimator and/or the user expertise estimator may determine, based on analysis of actual interactions, that the current user appears to interact as if he is an expert user or a younger user, thereby triggering a possible fraud alert.

The system may further comprise a user gender estimator, able to estimate the gender (male or female) of the user of an electronic device, based on analysis of monitored input-unit interactions. In a demonstrative example, most males have short fingernails or non-long fingernails; whereas some females may have long fingernails. Applicants have realized that when a person having long fingernails types on a physical keyboard (having physical keys), there is typically a shorter time-gap between the "key down" and the "key up" events. Some experiments by the Applicants have shown that it may be possible to distinguish between a male user and a female user, with level of confidence of approximately 65 to 70 percent or even higher. The user gender estimator may thus monitor the time-gaps between key typing events, in order to estimate whether the current user is male or female. Such gender estimation may be taken into account by a fraud detection module, in combination with other parameters (e.g., time-gaps in previous usage sessions of that user in the past; the fact that a significant majority of attackers on banking websites or electronic commerce websites are performed by male users and not by female users), and/or in combination with other parameters or data or meta-data received from the service being monitored (e.g., an indication from the bank web-server about the registered gender of the logged-in user as it appears in the user's profile).

Optionally, the gender estimation (and/or other user-specific estimations as described above) may be utilized for triggering a possible fraud alert; or may be used to the contrary, to avoid raising a possible fraud alert. For example, the system may estimate that a first user at 10 AM is a novice old male, and that a second user who accessed the same account at 10:15 AM is an expert young male; thereby indicating a possible fraud (e.g., the second user may be an attacker), possibly taking into account the fact that the account indicates only one account-owner. In contrast, the system may estimate that a first user at 4 PM is a novice old male, and that a second user at 4:10 PM is a novice old female; and may take into consideration also the fact that this bank account is jointly-owned by a married couple of two senior citizens; thereby allowing the second access session without raising a possible fraud alert.

In some embodiments, an advertising/content tailoring module may utilize the estimations or determinations produced by other modules of the system, in order to tailor or select user-specific advertisements or banners or promotional content (or other type of content, such as news articles, videos clips, audio clips), tailored to the estimated characteristics of the user. For example, the user-age estimator may estimate that the current user is in the age-range of 18 to 30 years; the user expertise estimator may estimate that the current user is an expert or experienced user; and the user gender estimator may estimate that the current user is a male; and based on these estimations, the advertising/content tailoring module may select or modify a banner ad which suits this segment of the population. Additionally or alternatively, the advertising/content tailoring module may take into account geographic segmentation and/or language segmentation, which may be based on IP address of the user and/or may be based on analysis of monitored user interactions which may allow identification of foreign keyboard layouts and/or foreign languages, thereby allowing the advertising/content tailoring module to further tailor the displayed promotional content based on the additional geographic information and/or language information.

The system may comprise a credentials sharing detector, for detection, mitigation and/or prevention of credential sharing (e.g., username-and-password sharing, or other cases of "friendly fraud") among two or more users, in which one user is an authorized user or "paying subscriber" who shares his credentials (e.g., for accessing a premium service) with a second user (who is not a "paying subscriber"). For example, John may be a paying subscriber of "Netflix" or other streaming-content provider; or may be a paying subscriber of "NYTimes.com" (newspaper) or of "Lexis.com" (legal information database). The user John (who may be, for example, male, 20 years old, expert user) may share his log-in credentials to such premium subscription service, with his aunt Susan (who may be, for example, female, 60 years old, novice user). The modules of the system may monitor user interactions with the service (e.g., in the log-in page, and/or in subsequent pages that the user may browse, access, or otherwise interact with), and may estimate user-specific characteristics based on the user's interactions with the input unit(s), thereby allowing the system to distinguish and/or differentiate between the legitimate user (the subscriber John) and the illegitimate user who piggy-backs on the credentials of the legitimate user in order to access or consume premium content without separately subscribing to it.

In some embodiments, the system may detect scenarios of two users using one computing device, in the training phase and/or testing phase. If a user's account is suspected to have multiple users, the system may use unsupervised clustering for separating between users. Afterwards, the system may use separate individual model for each cluster (e.g., each estimated user). This may allow the system to build a combined model, consisted of the individual users' models. This solution may outperform building one model for all users, even though it may require more data as the number of training sessions per user may be decreased. In some embodiments, for example, a joint-account user-profile constructor may be used in order to utilize the estimated differentiation or the distinguishing between two (or more) legitimate, authorized users who have authorization to access the same account or service (e.g., two co-owners of a joint bank account), and may construct two separate user-profiles that reflect the biometric and/or cognitive footprints of each user separately (based on each user's separate interactions with the input unit(s) and/or the system). This may enable the system to differentiate between each one of those legitimate (but separate) users, and a third user which may be an unauthorized attacker. This approach may yield improved and/or more reliable results, relative to a conventional approach which constructs a single user profile based on all usage sessions of a certain service or account, or relative to a conventional approach that does not attempt to distinguish between two legitimate users accessing the same account (e.g., joint account, family account).

The system may readily support multiple users per device. The system may approach the problem in two ways: first, identify that two users share the account; then either build separate models for each user, or, if suspicious, generate an alert (e.g., to the bank). Detection of multiple users may happen in two phases: during initial training, or after initial training.

During initial training: if two or more users operate the account during the initial silent period, in which the system learns the user behavior and builds a model, then the system may utilize algorithms to detect this. In case a user's account is determined to consist of multiple humans, the system may use unsupervised clustering for separating between the different users even though a robust profile was not yet built. Afterwards, the system may use separate individual models for each cluster (suspected user). This in turns allows the system to build individual users' models. Some embodiments may utilize 5-10 sessions per user (not per account) to build the model. The system may check to see if any of the users shows typical or specific fraudster behaviors; if yes, then an alert is generated, and if not then the system may deduce that both are genuine and may build a model.

After a model is built for the main user: in such case, a second user starts using the account. The system may alert that this is not the original user, and the system (e.g., a bank's system) may act upon this determination in combination with additional factors (e.g., is the new user conducting suspicious or high-risk activities; are there several account owners on record or a single owner).

For example, one option is to elevate the risk for the account, such that, when the new user conducts a high-risk activity (e.g., paying to a new beneficiary, or registering a new phone number to a service which allows withdrawing cash from ATMs without a PIN), the system may treat such new user as a suspect user.

Another option is to conduct a manual or automated investigation by contacting the main user, ascertaining their identity, and then asking whether a family member may be using the same account. If yes, then this may be reported to the system via case management, and the system may automatically add that new user to the account.

A third option is to assume that as long as the new user is not doing anything risky, and is not identified as a likely fraudster based on their overall usage patterns (e.g., the new user does not appear to operate like expert users, as described above), then the system may determine that the new user is a genuine additional user. In this case the system may automatically build a profile for the new user and assume they are a genuine secondary user, unless follow-up activities do show signs of fraud behavior.

The system may optionally use a profile type in which a combined model is built for the two users (e.g., generating an account profile per account, rather than a user profile per user). The system may thus have, in some embodiments, a single profile for the entire account, and test it by means of cross-validation that it can be used to accept both while rejecting others. Adding this profile to the scoring process might offer some advantages over just building two separate user models.

Detection of multiple users during the training phase may be performed by using a particular algorithm. The system needs to accept training sessions where there are variations between each session (which is the case for the majority of accounts); but the system may also need to spot sessions that are most likely done by another human, although the system has not yet built a robust model.

A confusion matrix user-differentiation matrix may be generated and/or used, in accordance with some demonstrative embodiments of the invention. For demonstrative purposes and for simplicity, such confusion matrix may indicate only four different "shades" or fill-patterns; whereas in real-life many (e.g., 10 or 20) shades or colors may be used.

Using a mobile banking simulated environment, a scenario was tested, in which two people operating on the same account produce data. The confusion matrix shows how each user session compares to all other sessions. For example, when comparing the session of User 1 to itself, the result is a deep dark square (highly unlikely to be a different user), as in all "User-K to User-K" comparison (the diagonal dark squares); but in all other comparisons the color is lighter (highly likely to somewhat likely to be a different user). There are some cases where a single user session appears like another single user session (e.g., User-3 session looks like User-5 session); in this case the system might "miss" the detection of the two separate users. Overall detection rate of some embodiments may be around is 95%, at 0% false positive for this test.

In a demonstrative confusion matrix: the diagonal black squares are the same user (no mixture), and the off-diagonal squares are mixtures of two users. Each number for both rows and columns represents a single user. The color (or shade) of each square represents a score. The diagonal differs from the non-diagonal items, which means that the system may identify a mix of users in a single account even during the training phase.

In some embodiments, the credentials sharing detector may be implemented as, or may be associated with, a "multiple-users for same account" detector, which may be able to detect that two (or more) different users are accessing, or are attempting to access, at different times or during overlapping or partially-overlapping time-periods, the same computerized service, using the same user-account (e.g., utilizing the same credentials, username-password pair, or other same data of user authentication). The computerized service may be for example, streaming video service (e.g., Netflix, Hulu), streaming audio service, legal information database (e.g., Lexis.com), news database or website (e.g., NYTimes.com), bank account, a website or application which provides access to digital content to registered subscribes or to paying subscribers or to premium subscribers, or the like.

The two (or more) users, which may be detected, identified, differentiated and/or distinguished from each other by the system, may be, for example: (a) an authorized or genuine user, and an attacker or hacker; or, (b) a first user who is the paying subscriber that received or created the login credentials, and a second user (e.g., his friend or relative) who is not the paying subscriber, and who received the login credentials from the paying subscriber (e.g., a "friendly fraud" situation, or a password-sharing or credentials-sharing situation); or, (c) a first user who obtained the user credentials from any source (and is not the paying subscriber himself), and a second user who also obtained the user credentials from any source (and is not the paying subscriber himself), such as, for example, a mother and a sister of a paying subscriber who both received the login data from the paying subscriber. Other suitable pairs (or groups, or sets) of multiple users, may be differentiated or distinguished and "broken" or divided or separated into the single entities that comprise them.

In a demonstrative implementation of the "multiple-users for same account" detector, a first user "Adam" may be a paying subscriber that created or obtained (e.g., legally, lawfully) user credentials (e.g., username and password) for a subscription-based service. Adam shared his user credentials (e.g., possibly in contradiction to terms-of-service of the subscription-based service) with a second user, "Bob". Each one of the two users (Adam, Bob) may be able to access the service, from the same electronic device or from separate (distinct) electronic devices, at various time-slots or time-frames which may be distinct or may even be overlapping or partially-overlapping or simultaneous of partially-simultaneous; by entering the same user credentials.

The system may continuously monitor user-interface interactions and/or input-unit interactions (e.g., performed through a mouse, a keyboard, a touchpad, or the like), of users accessing that particular computerized service, including (but not limited to) the interactions performed by users (Adam and/or Bob) who used the user-credentials of Adam, as well as interactions performed by other users of that particular computerized service that are not related or connected to Adam and/or Bob and who log-in to the service using other credentials.

The system may accumulate data reflecting the interactions of dozens, or hundreds, or thousands of users who access that service; as well as data reflecting the interactions of two or more usage sessions in which Adam and/or Bob (without the system necessarily knowing yet which one of them) has accessed the service with Adam's credentials.

The system may analyze the interactions, or may extract properties and/or attributes of such interactions; for example, distribution of interactions per usage session, standard deviation of sampled data per usage session, average time of usage per usage session, average number of clicks (or keystrokes) per usage session, average time-gap between interactions (e.g., between keystrokes) per usage session, typical reaction (or reactive action, or corrective action) that is performed by a user in response to a user-interface interference that is injected into the usage session, and/or other attributes of each usage session. In some implementation, a usage session may be defined as a time period that begins when a user starts accessing the particular service by starting to enter the login credentials, and that ends upon detecting that a pre-defined time period (e.g., one minute, five minutes, ten minutes, one hour, two hours) has elapsed since the last user interaction was observed for that particular service.

In a demonstrative embodiment, the system may generate numerous Cross-Account Pairing Scores for pairs of usage sessions. Firstly, the system may generate pairing scores for two usage sessions that are not for the same subscription account, and thus, necessarily (or most probably), were not performed by the same (single) human user. For example, if the paying subscribers of the particular service are Adam, Charlie, David, Even, Frank, and so forth, then the system may generate:

(a) a first cross-account pairing score that corresponds to a combination of: (i) the interactions of the user who utilized the login credentials for "Charlie", and (ii) the interactions of another user who utilized the login credentials of "David";

(b) a second cross-account pairing score that corresponds to the combination of: (i) the interactions of the user who utilized the login credentials for "Charlie", and (ii) the interactions of another user who utilized the login credentials of "Eve";

(c) a third cross-account pairing score that corresponds to the combination of: (i) the interactions of the user who utilized the login credentials for "Charlie", and (ii) the interactions of another user who utilized the login credentials of "Frank";

(d) a fourth cross-account pairing score that corresponds to the combination of: (i) the interactions of the user who utilized the login credentials for "David", and (ii) the interactions of another user who utilized the login credentials of "Eve"; and so forth, with regard to pairs of usage sessions that are known to be originating from pairs of two different users (because they originated from two different login credentials).

Additionally, the system may generate Intra-Account Pairing Scores that reflect the user interactions for pairs of usage sessions that are known to be performed for the same subscription account. For example, if the user account of "Adam" has logged-in three times (three usage sessions), then the system may generate the following pairing scores:

(a) a first intra-account pairing score for the subscription account of "Adam", that corresponds to the combination of: (i) the interactions of the user who utilized the login credentials for "Adam" in the first usage session, and (ii) the interactions of the user who utilized the login credentials of "Adam" in the second usage session;

(b) a second intra-account pairing score for the subscription account of "Adam", that corresponds to the combination of: (i) the interactions of the user who utilized the login credentials for "Adam" in the second usage session, and (ii) the interactions of the user who utilized the login credentials of "Adam" in the third usage session; and so forth with regard to pairs of two consecutive usage sessions that were performed for the same subscription account, for each such subscription account.

It is noted that a "pairing score" may actually be a "grouping score", by similarly grouping together a set of three or four or other number, which may not necessarily be two.

The system may then analyze the cross-account pairing scores, and may (separately) analyze the intra-account pairing scores, in order to detect typical patterns or significant attributes. For example, the system may calculate that cross-account pairing scores have a first value of a particular attribute (e.g., standard deviation, or average, or the like); and that the intra-account pairing score calculated over two particular usage sessions from a particular (same) subscription account have a different value of that particular attribute.

The system may analyze one or more pairs of usage sessions, that are associated with the subscription account of "Adam", compared relative to: (A) pairs of usage sessions of the general population of usage sessions that belong to the same subscription account; and/or, compared relative to: (B) pairs of usage sessions that are known to belong to different users (e.g., cross-account usage sessions). The system may thus determine whether a pair of usage sessions, that were performed with the login-credentials of the subscriber "Adam", were indeed performed by the same single human user (e.g., if the attributes of such pair of usage sessions are more similar to the attributes of pairs of intra-account usage sessions), or conversely, whether that pair of usage sessions were performed by two different users (e.g., Adam and his friend; or Adam and an attacker), for example, if the attributes of such pair of usage sessions are more similar to the attributes of pairs of cross-account usage sessions.

In a demonstrative example, the system may check whether: (a) a pair of intra-account usage sessions that are associated with the login-credentials of Adam and Adam, is more similar to either: (i) pairs of intra-account usage sessions that are associated with the same login credentials (e.g., a pair of David+David, a pair of Eve+Eve, a pair of Frank+Frank, an average or other parameter computed over multiple such pairs), or is more similar to: (ii) pairs of cross-account usage sessions that are associated with different login credentials (e.g., a pair of David+Eve, a pair of David+Frank, a pair of Eve+Frank, an average or other parameter computed over multiple such pairs).

The system may thus be able to identify that a particular subscription-account is utilized by two different human users, rather by the same single human user; and may generate a suitable notification (e.g., a possible fraud notification; a notification to billing department; a notification to cost-containment department).

The system may be able to identify that a particular subscription-account is utilized by two different human users, rather by the same single human user, without relying on (or without taking into consideration) the Internet Protocol (IP) address associated with each usage session (or each purported user); without relying on (or without taking into consideration) the user-agent data associated with each usage session (or each purported user); without relying on (or without taking into consideration) any "cookie" data or "cookie" file which may be stored or used by the computerized service.

The system may be able to identify that a particular subscription-account is utilized by two different human users, rather by the same single human user, without necessarily building a long-term profile (or any type of user-specific profile) for a particular subscription account; or without having to utilize a "training period" in which the system "learns" the habits or the repeated habits of particular subscribers. The system may commence to detect shared-credentials or multi-users in the same subscription account, without constructing a user profile or a subscription-account profile that spans (or that relies on) three or more usage sessions.

The system may utilize visible changes of the UI or GUI or the on-screen experience, optionally utilizing gamification features (in which features or functions are presented in a manner similar to a game or puzzle or similar online activity), in order to identify user(s) or detect possible fraud. For example, a login process may be subject to gamification by a gamification module, such that a user may be required to perform game-like operations (e.g., move or drag items, handle items relative to a virtual on-screen "magnet" in a particular location on the screen, complete an on-screen puzzle, rotate a spindle or on-screen wheels or handles of a virtual vault), and the user's reactions or behavior or interactions may be utilized for identification or fraud-detection purposes.

Some embodiments of the invention may allow a unique way of two-factor (or two-step) authentication or log-in. For example, entry of user credentials (e.g., username, and/or PIN or password or passphrase) may be subject to gamification or may be implemented by utilizing a graphic user interface (GUI) or on-screen interface in a way that captures or recognizes user-specific traits through the way that the user utilizes such interface for entering is credentials. Accordingly, the mere entry of credentials by the user, may be used as a two-factor authentication, such that entry of a correct PIN or password may serve as a first factor, and the way or pattern or behavioral traits or other-specific traits of the way in which the user enters the PIN or password may serve as a second factor.

In a first example, the user may be required to enter a four-digit PIN. An on-screen keypad may be shown to the user, showing ten digits (from 0 to 9), and showing four empty "slots" into which the user is requested to "drag and drop" digits, one digit at a time. The user may drag the four digits of his PIN, to the four respective slots, in the right order. If the four digits dragged match (in their right order) the user's stored PIN, then a first factor of authentication is met. If the way in which the user drags-and-drops the digits onto the slots, matches previously-recorded information that indicates how the user typically performs such GUI operation, then a second factor of authentication may be met.

In a second example, alphabetical characters, or alpha-numeric characters, or other characters, may be presented to the user as an on-screen keyboard, and the user may drag characters from it towards slot(s) or a field into which the password or PIN is accumulated; and the system may monitor and utilize both the correct entry of the PIN or password, as well as the manner in which the user utilizes the GUI to achieve such correct entry.

In a third example, as part of a user authentication process or a user login process, digits (or letters, or characters) are shown on rollers which may be similar to a slot-machine; and the user may need to shift or turn or roll such rollers in order to reach a particular digit (or letter, or character) on each roller. The correctness of the PIN, as well as the way in which the user utilizes the GUI to reach the correct PIN, may serve as two-factor authentication.

In a fourth example, the log-in process may include PIN entry as well as performing a simple game-like operation, such as, correctly assembling a puzzle having few pieces (e.g., less than ten pieces). The way in which the user utilizes the GUI to assemble the puzzle, may be used as a factor in user authentication, in addition to the correct entry of the PIN or password value.

In some embodiments, the system may utilize a "training period" of, for example, ten user-authentication sessions, in which the system may monitor and track how the user utilizes the GUI to enter his PIN or password. For example, the system may observe and recognize that the user typically drags a first digit of his PIN in a straight short diagonal line, then he drags a second digit of his PIN in a long curved line, or the like, then he pauses a little longer before dragging the third digit, and so forth. The system may generate a user-specific profile that corresponds to such user-specific insights. Subsequently, when the user again logs-in, the system monitors the correctness of his PIN as well as whether the manner in which the user enters his PIN matches his previously-generated profile of GUI utilization, as a two-factor authentication scheme. In some embodiments, if the current manner of GUI utilization does not match the previously-determined user-specific profile of GUI utilization, then the system may declare that the user failed to authenticate, or that a possible fraud exists.

In some embodiments, the present invention may be used to facilitate a process of PIN-reset or password-reset. For example, a PIN-reset process may require the user to enter his current PIN, both by entering the correct PIN value as well as (without the user necessarily knowing) in the particular GUI-utilization manner that matches his user-specific profile. If both factors are met, then PIN-reset may be enabled, without the need to utilize a complex process in which the user is also contacted by phone or by email.

In some embodiments, a tolerance-for-mistakes modification module may be utilized to increase (or decrease, or modify) the system's tolerance for mistakes (or failed attempts) made by the user in an authentication process. For example, a demonstrative system may allow three consecutive failed attempts in logging-in, and may then "lock" the account and may require that the user (e.g., a bank customer) to call a customer service number for further handling. However, if the present invention is utilized, some embodiments may recognize that although three failed log-in attempts were performed, they were all performed in a GUI-utilization manner that closely matches the previously-stored user-specific profile of GUI utilization; and therefore, the system may become more "forgiving" and may allow such user one more (or a few more) log-in attempts before "locking" the account or putting the process on hold.

In some embodiments, the system may periodically update the user-specific GUI-utilization profile, based on the ongoing utilization by the user. For example, the user may start utilizing the system on January 1st, and the system may utilize ten log-in sessions, performed in January, for generating an initial user-specific profile of GUI utilization. The system may proceed to utilize the generated profile, during 25 subsequent log-in profiles of that user, in the months of February through June. The system may continue to update the user-specific profile, based on log-in sessions as they take place. Optionally, the system may discard historic data of GUI-utilization (e.g., in a First-In-First-Out (FIFO) order), since, for example, a user may change the way he utilizes the GUI over time, due to learning the system better, becoming more familiar with the system, getting older in age, or the like. In some embodiments, the system may continuously update the user-specific profile of GUI utilization.

Some embodiments may generate and utilize a login process which may comprise one or more challenges to the user, that the user may not be aware of, or that the user may perform without being aware that the system is checking additional parameters about the user (other than the user's credentials, e.g., username and password).

In a first demonstrative example, a Visual Login module may generate and display an on-screen user interface which requires the user to perform on-screen operations in order to log-in to a service, such that the on-screen operations to be performed by the user may require the user to perform input-unit interactions (e.g., mouse-clicks, mouse movement, keystrokes, or the like) that may be monitored by the system, and such that user-specific traits may be extracted from such input-user interactions, with or without introducing (or injecting) an interference to the on-screen log-in process or to the user experience of the visual login process.

In a more particular example, the Visual Login module may present an on-screen interface showing an on-screen keypad (or keyboard) and a "target" zone (or field, or area); and the user may be requested to drag-and-drop digits (or letters, or character), one by one, in their correct order, from the on-screen keypad (or keyboard) to the target zone, thereby filling-in the user's credentials (e.g., username, password, PIN, or the like). The system may monitor the way that the user drags-and-drops the on-screen items (e.g., digits, letters, characters) from the on-screen keypad (or keyboard) to the on-screen target zone; and may extract user-specific traits from such interactions. For example, a first user may drag a particular digit (e.g., the first digit in his PIN; or the digit "4") in a straight or generally-straight line, whereas a second user may drag that particular digit in a curved line, or in a line having certain attributes (e.g., counter-clockwise direction), or the like. The system may store, in a user's profile or record, data indicating the user-specific trait that was extracted from those interactions; as well as other suitable parameters which may be extracted or computed based on the sampling of the input-device interactions during such Visible Login process (e.g., average time or speed associated with the login process; indicative pauses between entry of particular characters, or before or after entering a particular character; or the like). In a subsequent login process, the extracted user-specific traits may be utilized for differentiating or distinguishing between a first user and a second user; or between a genuine (legitimate) user and a fraudster (or unauthorized user).

In another example, the Visual Login module may operate in conjunction with one or more interference(s), which may be introduced or injected to the visual login process. For example, the Visual Login module may introduce a randomly-selected interference (e.g., selected pseudo-randomly from a pool of several or numerous pre-defined types of interferences), or may introduce a pre-defined interference or set of interferences. For example, when the user drags the second character from the on-screen keypad to the on-screen target zone, the on-screen dragged character may suddenly appear to be "stuck" for three seconds, or may appear to "jump" 200 pixels to the left side of its current location; and the system may monitor the user's reaction to such interference(s), e.g., how long it takes the user to notice the interference and/or to take corrective actions, which type of corrective action the user takes (e.g., shaking the mouse unit sideways, or spinning the mouse-device clockwise, or clicking the mouse several times), and/or other attributes or parameters of the specific corrective action (e.g., if the user shakes his mouse unit, for how many times is it shaken, or the direction of shaking, or the direction of rotation, or the like). In a subsequent login process, the extracted user-specific traits may be utilized for differentiating or distinguishing between a first user and a second user; or between a genuine (legitimate) user and a fraudster (or unauthorized user); for example, by injecting the same type of interference to the accessing user, and by monitoring whether or not the current user's reaction to the interference matches the previously-extracted user-specific traits.

Some embodiments may utilize other types of on-screen visual login process, which may not necessarily involve drag-and-drop operations. For example, an on-screen "vault" may be displayed to the user, with wheels or bolts or cylinders that the user may be required to spin or to rotate (e.g., with one or two or three fingers on a touch-screen), in order to enter a combination which corresponds to the user's PIN. Other types of challenges may be used, optionally having game elements or game-like elements, and optionally hiding from the user the fact that the system may implicitly track user-specific patterns of interactions as part of authenticating the user.

Some embodiments may thus allow or enable the system to perform an implicit Two-Factor Authentication (TFA) process (or two-step authentication process), without the explicit knowledge of the user. For example, the implicit TFA process may combine a first factor ("something you know") with a second factor ("something you have"), such that, for example, the first factor may be the user's knowledge of his PIN or password (e.g., the entered password or PIN matches the previously-defined PIN or password of that user); and the second factor may be the user's particular way of handling of the input-unit, either as general handling, or as a particular handling in response to an interference injected to the login process. The system may thus implement TFA without requiring the user, for example, to utilize a token device for generating a one-time password, or without requiring the user to receive a one-time password via text message or email message or voice message; and without even the actual knowledge of some users that the authentication process is actually an implicit TFA process.

In some embodiments, the visual login (or visible login) process may be implemented by utilizing one or more of the following:

(1) Drag-and-drop of digits or letters or characters, from an on-screen keypad or keyboard, to an on-screen target zone, while monitoring user-specific interaction patterns, without injecting a user-interface interference, and/or in response to an injected user-interface interference.

(2) Rotating or spinning of on-screen "vault" elements or cylinders in order to enter a PIN, while monitoring user-specific interaction patterns, without injecting a user-interface interference, and/or in response to an injected user-interface interference. The system may monitor one or more attributes of the input-user interactions, or of the user interactions, in order to extract or construct a user-specific pattern or model or profile; for example, reflecting or corresponding to: (a) whether the user rotates a cylinder clockwise or counter-clockwise; (b) whether the user utilizes one finger, or two fingers, or three fingers, in order to perform a rotation operation; (c) whether the user typically uses a top-area (or a bottom-area, or a right-area, or a left-area) of the cylinder in order to perform the rotation, or two particular (e.g., opposite) areas of the cylinder in order to perform the rotation; (d) the arrangement, distance and/or spacing between two or more fingers that the user utilizes for rotating the cylinder (e.g., measured via on-screen pixels distance between points of touching the touch-screen); (e) relative movement of each finger that is used for rotation, since not all fingers may move uniformly or at the same speed or to the same direction; (f) time-length or duration that it takes the user to perform a rotation; (g) whether the user typically performs one long rotation movement, or performs multiple shorter rotation movement, in order to achieve a rotation result of a particular type (e.g., a rotation result that requires rotation by at least 180 degrees); or the like. Optionally, one or more user-interface interferences or abnormalities may be injected or introduced; for example, causing an on-screen cylinder to become "stuck" or non-responsive for a pre-defined period of time (e.g., five seconds), causing an on-screen cylinder to rotate faster or slower relative to the rotation of the fingers of the user or to continue rotating after the user stopped his rotating gesture); and a user-specific profile or pattern may be extracted, based on the user's reactions to such interference. In a subsequent usage session or log-in session, an implicit TFA process may thus be able to verify that both: (a) the user knows and enters the correct credentials, and (b) the user enters the credentials in a manual manner that corresponds to (or matches) the user-specific profile that indicates how this user has previously reacted to such interference.

(3) Entering user credentials (e.g., username, password, PIN, or the like), optionally by utilizing the on-screen interface mentioned in (1) above, while de-activating the Enter (or Return) key on the keyboard, thereby requiring the user to click or tap on an on-screen "submit" button (since the Enter or Return key is non-responsive), and while introducing an interference or abnormality to the on-screen "submit" button (e.g., the on-screen "submit" button is non-responsive for a predefined time period, or the on-screen "submit" button is non-responsive for a pre-defined number of clicks, or the on-screen "submit" button is being moved sideways upon approach of the user's pointer; and while monitoring user-specific interaction patterns; thereby allowing the system to perform implicit TFA, by examining whether the user knows the corrected credentials (e.g., password or PIN), and also, whether the user's input-unit interactions (in response to the injected user-interface interference) match the previous user-specific pattern or profile or reaction to such interference.

(4) Presenting an on-screen collection of items (e.g., ten images of various objects or animals); and requesting the user to drag-and-drop, on the screen, one particular item from the collection, based on verbal or textual description that the user has to comprehend in order to match with the correct image; such as, "please drag the image of a Dog to the target zone", or "please drag the image that shows a Fruit to the target zone". While the user performs the drag-and-drop operation, the system may introduce a user-interface interference (e.g., the dragged item suddenly deviates sideways, or suddenly freezes or appears to be "stuck"), and the system may monitor the user's reaction or corrective-action to such interference. Subsequently, such login process may be utilized to verify that the person is human (since he needs to comprehend and process the textual request with the instruction in order to decide which on-screen item to drag from the collection) and that the human user is the genuine user (e.g., who previously logged-in to the service) based on matching of the user's reaction to the interference with a user-specific profile or pattern of reactions to such interference in previous usage sessions.

(5) Adding or introducing, intentionally, a delay or time-gap (which may be constant, or pseudo-random within a particular range of values), between: (a) the pressing or tapping or clicking of a character that the user clicks or taps or presses, as part of entering user credentials; and (b) the appearance of the character on the screen (or, the appearance of an additional "*" or "x" character which indicates that a password is being entered); while measuring the user-specific reaction or pattern-of-reactions to such injected delay or time-gap; and utilizing the user-specific pattern or profile of reactions as a means (or as additional means) in subsequent log-in sessions, or to detect fraudulent users, or to differentiate between users.

(6) Presenting an on-screen puzzle (e.g., a simple jigsaw puzzle) that the user has to solve or complete, by using drag-and-drop operations; monitoring and capturing user-specific cognitive choices (e.g., whether the user typically drags a right-side of the puzzle into the left-side, or whether the user typically drags the left-side of the puzzle into the right side; whether the user solves the puzzle in particular direction, or clockwise, or counter-clockwise, or in a sequence such that each selected piece is the closest to the previously-dragged piece); and optionally by introducing a user-interface interference to the process of solving the puzzle (e.g., a puzzle piece appears to be non-responsive or stuck for a pre-defined time period; a puzzle piece deviates or shifts away from the dragging-route that the user commanded with his gestures), and monitoring the user's reactions to such interference in order to extract a user-specific pattern or profile, which may then be used for user authentication or user differentiation purposes.

Optionally, the system may comprise a stochastic cryptography module, able to utilize stochastic cryptology and/or stochastic cryptography for various purposes such as remote access. For example, the stochastic cryptography module may utilize cognitive aberrations or interruptions or interferences in order to monitor and utilize the response or reaction of the user for cryptographic tasks or cryptographic-related tasks (e.g., encryption, decryption, hashing, digital signing, authorizing, verification, or the like). The human user may be subjected to an aberration or interference (which may be selected by the system pseudo-randomly from a pool of pre-defined types of interferences), and thus may produce a reaction which may be user-specific and have some non-predictable properties (e.g., since each user reacts differently to each interference, and since the particular interference is selected pseudo-randomly from a pool of possible interference types)

In a demonstrative embodiment, the system may monitor the manner in which a user reacts to a user interface interference, that is selected by the system from a pool of pre-defined types of interferences; for example, an interference in which the on-screen pointer appears to be "stuck" or non-responsive; an interference in which the on-screen pointer disappears for a pre-defined time period; an interference in which the on-screen pointer moves erratically, or moves in a manner that is not identical to the route of the movement of the input unit. The user reaction, or the corrective action by the user in response to such interference, may be monitored and analyzed by the system, and a user-specific reaction model may be extracted, on a per-user per-interference-type basis. This user-specific interference-specific reaction model may be used as a parameter known by the system in order to implement an algorithm (e.g., encryption, decryption) that utilizes stochastic cryptography or probabilistic cryptography.

For example, if a user requests to encrypt a document or file or digital asset or digital content item, then the encryption key (or the encryption algorithm) may utilize a user-specific parameter that has been previously extracted by the system by monitoring the user's reaction to a specific interference-type (e.g., as one of the multiplier numbers in establishing a unique product-of-multiplication number which may be used as encryption key). Similarly, in order to decrypt such an encrypted document or file or digital asset, then the system may introduce to the user an interference of the type of interferences that had been used to generate a key in the encryption process; may monitor the user's reaction to the interference; and may extract a user-specific parameter from the monitored user-specific reaction, which may then be used as part of the decryption process (and may be required for successful decryption). In some implementations, the encryption/decryption (or other cryptographic) algorithm may be stochastic or probabilistic, as it may sometimes fail to perform the cryptographic operation since the user's reaction to an interference in a particular instance may not be exactly identical to the user's previous reactions (which had been used in the encryption process); however, such errors may be estimated in advance and/or may be minimized, by taking into account probabilistic consideration.

For example, if it is estimated or observed that one-out-of-four times the user's reaction may not match a previously-calculated model of reaction to interference, then, in one-out-of-four attempts to access the encrypted data, the user may fail even though the user was the genuine user; however, the system may request the user to "try again", by introducing to the interface a same-type interference (e.g., the same interference-type, but the interference being of a different order-of-magnitude or scale), and upon such "further attempt" by the user, the system may extract a user-reaction which corresponds to the previously-calculated model, which had been used as a parameter in the encryption process.

In some embodiments, the stochastic encryption process may be implemented as follows. Initially, an enrollment phase or initiation stage may be performed, in order to monitor and measure the reaction(s) of a particular user to a variety of interferences that are presented to the user, one interference at a time, from a pre-defined pool of possible interferences (e.g., the pool having 5 or 15 or 60 or 100 or 250 or 500 or 800 such interferences, or interference-types, or approximately 200 to 900 interferences, or approximately 400 to 600 interferences). Then, the system may generate a user-specific model or profile, which indicates how the particular user reacts to interference(s) in general ("user-specific general reaction model"), and/or how the particular user reacts to a particular interference (to several particular interferences) in particular ("user-specific particular reaction model").

Subsequently, after the user-specific general reaction model is established, the system may utilize the user-specific general reaction model (or, one or more values of parameters of the user-specific general reaction model) as a parameter for encryption (e.g., for generating an encryption key, or for generating a private encryption key, or otherwise as part of an encryption algorithm. From that time-point and onward, the user-specific general reaction model (and/or any of its parameters) are not transferred, are not transmitted, and are not communicated among any two or more devices or units or entities. This may be in contrast with, for example, a process that utilizes a user's fingerprint as a parameter for encryption; which subsequently requires the user to provide his current fingerprint every time that the user desires to access or decrypt such encrypted content.

Subsequently, in order to decrypt the encrypted content, the system may present to the user an "invisible challenge", namely, an implicit challenge that the user may respond to without even knowing that a challenge-response process is taking place; and in each decryption request (or decryption attempt) that the use initiates, the system may present to the user a different type of invisible challenge from the pool of interferences that had been used by the system in order to build the user-specific general reaction model of that user; optionally by using or re-using a particular interference (or type of interference) while modifying or increasing or decreasing the scale or the order-of-magnitude of the interference or of one or more parameters of that interference or interference-type. Accordingly, the decryption process requires the user to react to a single particular interference out of the set of interferences that were used for generating the user-specific general reaction model; and the decryption process monitors and measures the user's reaction to the single, presented, interference.

Therefore, an attacker or a "listening hacker" that monitors the communication channel during an encryption request, or during multiple (series of) encryption requests, can see one single interference at a time, and one single user-specific reaction at a time to the presented single interference. Accordingly, such listening attacker may not be able to reverse-engineer or to estimate the user-specific general reaction model, which was computed based on numerous different interferences presented in series, and which was the basis for generating the encryption key or for generating encryption-related parameters. Optionally, in order to further burden a potential attacker, the original pool of possible interference may comprise hundreds or even thousands of various different interferences and/or interference-types, having various scales or orders-of-magnitude.

As a further clarification, the encryption process may be regarded as a process that generates and utilize a "generator function" able to generate random or pseudo-random numbers. The generator function exists on both sides; namely, e.g., on the system's stochastic encryption module which monitored and generated the user-specific general reaction model; and at the genuine user's side because the genuine user is able to react "correctly" to each particular interference, similarly to his previously-monitored reactions to such interference. The generator function is able to generate a similar (or identical) sequence or series of random (or pseudo-random) numbers, which are then used as a parameter for encryption; whereas, each decryption operation requires only one particular number from the series of random numbers that were used for the encryption. Accordingly, a listening attacker may be able to observe, at most, random values transmitted from the genuine user's side to the server, and may not be able to reverse-engineer or to estimate or to guess the "generator function" itself, and may not be able to predict or to guess or to estimate the next particular number that might be used in a subsequent decryption request. The generator function (which is used for encryption) may correspond to the user-specific general reaction model; whereas, the particular number for a particular decryption operation may correspond to the particular reaction of the specific user to a particular interference (out of a large set of interferences that had been used in order to generate the user-specific general reaction model for encryption purposes).

The present invention may thus provide various advantages and/or benefits, for cryptographic purposes. For example, a deterministic generator function might be subject to reverse-engineering or estimation, if an attacker listens to (or intercepts) a sufficiently-large number of random numbers generated by the deterministic generator function; whereas, the stochastic generator function of the present invention, which is based on the user-specific general reaction model, may not be reverse-engineered or estimated even if the attacker listens to a large number of values transmitted in a series of decryption requests; and the stochastic generator function may not be easily reverse-engineered or estimated since it is not based on a deterministic mathematical function.

Additionally or alternatively, each decryption attempt, in accordance with the present invention, requires an actual hands-on interaction of the user (or the attacker) with an input unit; thereby heavily burdening any attempt to implement a brute-force attack, or rendering such attack non-cost-effective, or requiring manual interaction for such brute-force attack, or requiring a significant amount of time for such brute-force attack; for example, since an attacker may not be able to merely automatically transmit a sequence of numbers (or values) without performing the hands-on manual human interaction that requires time for performance by the genuine user.

It is clarified that in some implementations, the stochastic encryption/decryption process may trigger "false positive" errors; such that, for example, a genuine user may not be able to decrypt his encrypted file (or content, or digital asset) even though the genuine user has reacted "correctly" to the specific invisible challenge (or interference) presented to him; and thus, two or more "correct" attempts (of reaction to interference) may sometimes be required, in order to allow a genuine user to decrypt his encrypted content. As described above, a deterministic or mathematic generator function always produces the same random numbers on both sides; whereas, the stochastic cryptography of the present invention may sometimes generate non-identical random numbers on both sides, since one side (the server's side) utilizes the previously-computed user-specific general reaction model, whereas the other side (the genuine user's side) utilizes the actual current reaction of the specific user, which may sometime deviate from the user's previous reactions that were used for generating the user-specific general reaction model.

It is clarified that terms such as, for example, "interference", "user interface interference", "input unit interference", "UI interference", "GUI interference", "UI element interference", "on-screen interference", "input process interference", "visual interference", "visible interference", "aberration", "perturbation", "abnormality", "anomaly", "irregularity", "perceived malfunction", "temporary malfunction", "invisible challenge", "hidden challenge", or other similar terms, may be used interchangeably; and may refer to one or more processes or operations in which an irregularity is introduced or generated or injected into a user-interface or is burdening or altering or modifying user interactions, or is generated in order to induce or elicit reaction or reactive action or corrective action in response to such interference(s); or a combination of two or more such interferences, introduced in series or in parallel or simultaneously, over one or more UI element(s) or GUI elements.

In some embodiments, a mood estimator may continuously identify or estimate the mood or feelings of the user (e.g., a customer that utilizes an electronic device), when the user utilizes a website or an application. This may be used in order to adjust or modify or tailor messages (e.g., advertisements, proposals, promotions, business offerings) to the user. The system may inject cognitive aberrations or interferences to the interaction between the user and the application or website; and may monitor and measure the reaction of the user. The mood estimator 261 may compare between the current specific reaction of the user, and a historic profile of the user; and may identify parameters, for example, level of concentration or focusing, response speed, manner of reaction, or the like; thereby allowing a marketing/sales module or sub-system (which may be associated with the website or application) to further analyze the purchase-related and/or viewing-related (or browsing-related) behavior of the user by utilizing such parameters, in order to tailor or modify marketing proposals or other content displayed, to the particular cognitive state of the user as estimated at that time based on the user's reactions to injected interferences.

Some embodiments may identify or detect a remote access attacker, or an attacker or a user that utilizes a remote access channel to access (or to attack, or to compromise) a computerized service.

In some embodiments, a method comprises: determining whether a user, who utilizes a computing device to interact with a computerized service, (i) is co-located physically near said computing device, or (ii) is located remotely from said computing device and controlling remotely said computer device via a remote access channel; wherein the determining comprises: (a) injecting, to a user interface of said computerized service, an interference which affects differently local users and remote users; (b) monitoring interactions of the user with an input unit, in response to said interference; (c) based on said monitoring, determining whether said user (i) is co-located physically at said computing device, or (ii) is located remotely from said computing device and controlling remotely said computing device via said remote access channel.

In some embodiments, the determining of step (c) is based on a latency between (A) the injecting of said interference, and (B) the input unit interactions of said user in response to said interference.

In some embodiments, the determining of step (c) is based on a type of reaction of said user to the injecting of said interference.

In some embodiments, the method comprises: hiding a mouse-pointer on a screen of said computerized service; monitoring input unit reactions of said user in response to the hiding of the mouse-pointer; based on the input unit reactions of said user in response to the hiding of the mouse-pointer, determining whether said user is (i) co-located physically at said computing device, or (ii) is located remotely from said computing device and controlling remotely said computing device via said remote access channel.

In some embodiments, the method comprises: replacing an original mouse-pointer on a screen of said computerized service, with a fake mouse-pointer deviated from a location of said original mouse-pointer; monitoring input unit interactions of said user when the fake mouse-pointer is displayed on said computing device that is accessing said computerized service; based on the input unit interactions with the fake mouse-pointer, determining whether said user is (i) co-located physically at said computing device, or (ii) is located remotely from said computing device and controlling remotely said computing device via said remote access channel.

In some embodiments, the method comprises: sampling multiple interactions of said user with said input unit; based on a frequency of said sampling, determining whether said user is (i) co-located physically at said computing device, or (ii) is located remotely from said computing device and controlling remotely said computing device via said remote access channel.

In some embodiments, the method comprises: sampling multiple interactions of said user with said input unit; based on a level of noise in said sampling, determining whether said user is (i) co-located physically at said computing device, or (ii) is located remotely from said computing device and controlling remotely said computing device via said remote access channel.

In some embodiments, the method comprises: sampling multiple interactions of said user with a computer mouse; if said sampling indicates generally-smooth movement of the computer mouse, then, determining that said user is co-located physically near said computing device.

In some embodiments, the method comprises: sampling multiple interactions of said user with a computer mouse; if said sampling indicates generally-rough movement of the computer mouse, then, determining that said user is located remotely from said computing device and controlling remotely said computing device via said remote access channel.

In some embodiments, the method comprises: sampling multiple interactions of said user with a computer mouse; if said sampling indicates generally-linear movement of the computer mouse, then, determining that said user is located remotely from said computing device and controlling remotely said computing device via said remote access channel.

In some embodiments, the method comprises: sampling multiple interactions of said user with a computer mouse; if said sampling indicates sharp-turn movements of the computer mouse, then, determining that said user is located remotely from said computing device and controlling remotely said computing device via said remote access channel.

In some embodiments, the method comprises: sampling multiple interactions of said user with said input unit; if a frequency of said multiple interactions is below a pre-defined threshold, then, determining that said user is located remotely from said computing device and controlling remotely said computing device via said remote access channel; if the frequency of said multiple interactions is above the pre-defined threshold, then, determining that said user is co-located physically near said computing device.

In some embodiments, the method comprises: overloading one or more resources of the computing device which is used for accessing said computerized service; measuring an effect of said overloading on frequency of sampling user interactions via an input unit; based on the measured effect of said overloading, determining whether said user is (i) co-located physically at said computing device, or (ii) is located remotely from said computing device and controlling remotely said computing device via said remote access channel.

In some embodiments, the method comprises: overloading a data transfer communication channel of the computing device that is used for accessing said computerized service; measuring an effect of said overloading on frequency of sampling user interactions via an input unit; based on the measured effect of said overloading, determining whether said user is (i) co-located physically at said computing device, or (ii) is located remotely from said computing device and controlling remotely said computing device via said remote access channel.

In some embodiments, the method comprises: overloading a screen display of the computing device that is used for accessing said computerized service; measuring an effect of said overloading on frequency of sampling user interactions via an input unit; based on the measured effect of said overloading, determining whether said user is (i) co-located physically at said computing device, or (ii) is located remotely from said computing device and controlling remotely said computing device via said remote access channel.

In some embodiments, the method comprises: displaying an instantaneous priming message on a screen of the computing device that is utilized for accessing said computerized service; measuring an effect of the instantaneous priming message on sampled user interactions via an input unit; based on the measured effect of said instantaneous priming message, determining whether said user is (i) co-located physically at said computing device, or (ii) is located remotely from said computing device and controlling remotely said computing device via said remote access channel.

In some embodiments, the method comprises: injecting, into a log-in screen of the computerized service, a user interface interference that causes non-remote users to perform corrective mouse gestures; immediately after a log-in into the computerized service, displaying a subsequent screen of the computerized service without said user interface interference; monitoring mouse gestures of the user in the subsequent screen; if the monitored mouse gestures in the subsequent screen comprise corrective mouse gestures, then, determining that a user of the subsequent screen is a local user located physically at the computing device; if the monitored mouse gestures in said subsequent screen lacks corrective mouse gestures, then, determining that a user of the subsequent screen is located remotely from said computing device and controlling remotely said computing device via said remote access channel.

In some embodiments, the method comprises: sampling user interactions with an input unit of said computing device; based on said sampling, determining that said user is utilizing a first set of hardware components which is capable of sampling the input unit at a first frequency; subsequently, (A) sampling additional, subsequent user interactions; (B) determining that a second, lower, frequency characterizes said subsequent sampling; (C) determining that a second, different, set of hardware components is being used; (D) determining that a non-authorized person is accessing said computerized service.

In some embodiments, the method comprises: sampling user interactions with an input unit of a mobile computing device; analyzing temporal relationship between touch and accelerometer events of sampled user interactions with said input unit of the mobile computing device; based on analysis of temporal relationship between touch and accelerometer events, of sampled user interactions with said input unit of the mobile computing device, determining whether the said mobile computing device is controlled remotely via said remote access channel.

In some embodiments, the method comprises: sampling user interactions with an input unit of a mobile computing device; analyzing temporal relationship between touch movement events and accelerometer events, of sampled user interactions with said input unit of the mobile computing device; based on analysis of temporal relationship between touch movement event and accelerometer events, of sampled user interactions with said input unit of the mobile computing device, determining whether the said mobile computing device is controlled remotely via said remote access channel.

In some embodiments, the method comprises: (A) sampling touch-based gestures of a touch-screen of a mobile computing device; (B) sampling accelerometer data of said mobile computing device, during a time period which at least partially overlaps said sampling of touch-based gestures of the touch-screen of the mobile computing device; (C) based on a mismatch between (i) sampled touch-based gestures, and (ii) sampled accelerometer data, determining that the mobile computing device was controlled remotely via said remote access channel.

In some embodiments, the method comprises: (A) sampling touch-based gestures of a touch-screen of a mobile computing device; (B) sampling accelerometer data of said mobile computing device, during a time period which at least partially overlaps said sampling of touch-based gestures of the touch-screen of the mobile computing device; (C) determining that sampled touch-based gestures indicate that a user operated the mobile computing device at a particular time-slot; (D) determining that the sampled accelerometer data indicate that the mobile computing device was not moved during said particular time-slot; (E) based on the determining of step (C) and the determining of step (D), determining that the mobile computing device was controlled remotely via said remote access channel during said particular time-slot.

In some embodiments, a comprises: a user identity determination module to determine whether a user, who utilizes a computing device to interact with a computerized service, is either (i) co-located physically near said computing device, or (ii) located remotely from said computing device and is controlling remotely said computer device via a remote access channel; wherein the user identity determination module is: (a) to inject, to a user interface of said computerized service, an interference which affects differently local users and remote users; (b) to monitor interactions of the user with an input unit, in response to said interference; (c) based on the monitored interactions, to determine whether said user (i) is co-located physically at said computing device, or (ii) is located remotely from said computing device and controlling remotely said computing device via said remote access channel.

In some embodiments, the user identity determination module is to determine in step (c), based on a latency between (A) injection of said interference, and (B) the input unit interactions of said user in response to said interference.

In some embodiments, the user identity determination module is to determine in step (c), based on a type of reaction of said user to the injecting of said interference.

Some embodiments may detect a malicious automatic script, and/or may detect malicious code injection (e.g., malicious HTML code injection).

In some embodiments, a method comprises: determining whether a user, who utilizes a computing device to interact with a computerized service, (i) is a human user, or (ii) is an automatic script executed by a processor; wherein the determining comprises: (a) monitoring user-side input-unit interactions performed through one or more input units; (b) matching between (A) the user-side input-unit interactions and (B) data sent electronically from said computerized service; (c) if the comparing result is that (A) the user-side input-unit interactions do not exactly match (B) the data sent electronically from said computerized service, then determining that the computing device is operated by automatic script executed by said processor.

In some embodiments, the method comprises: based on the monitoring of the user-side input-unit interactions, detecting absence of any user-side input-unit interactions within a pre-defined time period during which the computing device transmitted data to the computerized service; based on detecting absence of any user-side input-unit interactions within said pre-defined time period, determining whether the computing device is operated by automatic script executed by said processor.

In some embodiments, the method comprises: based on the monitoring of the user-side input-unit interactions, detecting a number of keystrokes entered via a keyboard within a pre-defined time period during which the computing device transmitted data to the computerized service; determining a total number of keystrokes that a human is expected to manually enter in order to cause the computing device to transmit said data to the computerized service; based on matching between (A) the number of keystrokes entered via the keyboard, and (B) the total number of keystrokes that the human is expected to manually enter, determining whether the computing device is operated by automatic script executed by said processor.

In some embodiments, the method comprises: based on the monitoring of the user-side input-unit interactions, determining that keystrokes entered via a keyboard, within a pre-defined time period during which the computing device transmitted data to the computerized service, correspond to: (a) a first batch of keystrokes having a first keystrokes-length; and (b) a second batch of keystrokes having a second keystrokes-length; determining that the data transmitted from the computing device to the computerized service corresponds to: (A) a first string having a first string-length; and (B) a second string having a second string-length; based on matching between the first keystrokes-length and the first string-length, determining whether the computing device is operated by automatic script executed by said processor.

In some embodiments, the method comprises: based on the monitoring of user-side input-unit interactions, determining that keystrokes entered via a keyboard, within a pre-defined time period during which the computing device transmitted data to the computerized service, correspond to: (a) a first batch of keystrokes having a first keystrokes-length; and (b) a second batch of keystrokes having a second keystrokes-length; determining that the data transmitted from the computing device to the computerized service corresponds to: (A) a first string having a first string-length; and (B) a second string having a second string-length; wherein a total of the first and second keystrokes-length, is equal to a total of the first and second string lengths; based on matching between the first keystrokes-length and the first string-length, determining whether the computing device is operated by automatic script executed by said processor.

In some embodiments, the method comprises: monitoring time-intervals among the user-side input-unit interactions; based on said time-intervals among the user-side input-unit interactions being constant, determining that the computing device is operated by an automatic script executed by said processor.

In some embodiments, the method comprises: monitoring time-intervals among the user-side input-unit interactions; modeling human user's time-intervals among the user-side input-unit interactions; based on comparing between (A) said monitored time-intervals among the user-side input-unit interactions and (B) said modeled human user's time-intervals among the user-side input-unit interactions, determining whether the computing device is operated by an automatic script executed by said processor.

In some embodiments, the method comprises: monitoring time-gaps among the user-side input-unit interactions; determining distribution of said time-gaps among the user-side input-unit interactions; if said distribution corresponds to a pseudo-random distribution, then determining that the computing device is operated by automatic script executed by said processor.

In some embodiments, the method comprises: monitoring time-gaps among the user-side input-unit interactions; storing in a database a user profile indicating that a particular human user typically types at a particular temporal pattern of typing when interacting with said computerizes service; subsequently, determining whether a current temporal pattern of typing, reflected in a current usage session of said computing device for interacting with said computerized service, is different by at least a threshold percentage from said particular temporal pattern of typing stored in said user profile; based on said determining, further determining whether the computing device is operated by automatic script executed by said processor.

In some embodiments, the method comprises: monitoring time-gaps among the user-side input-unit interactions; storing in a database a user profile indicating that a particular human user typically types a particular sequence of multiple characters in a specific temporal pattern; subsequently, monitoring keystrokes of current user-side input-unit interactions; determining whether the current user-side input-unit interactions, comprise typing of said particular sequence of multiple characters, but do not comprise rapid typing of said particular sequence of multiple characters; based on said determining, further determining whether the computing device is operated by automatic script executed by said processor.

In some embodiments, the method comprises: computing a first checksum of data entered manually via a keyboard of said computing device; receiving from said computerized service a second checksum of user-provided data which was transmitted from the computing device to the computerized service; matching between (A) the first checksum of data entered manually via the keyboard of said computing device, and (B) the second checksum of user-provided data which was transmitted from the computing device to the computerized service; based on said matching of said first and second checksums, determining whether the computing device is operated by automatic script executed by said processor.

In some embodiments, the method comprises: computing a first checksum of data entered manually via a keyboard of said computing device; receiving from said computerized service a second checksum of user-provided data which was transmitted from the computing device to the computerized service; matching between (A) the first checksum of data entered manually via the keyboard of said computing device, and (B) the second checksum of user-provided data which was transmitted from the computing device to the computerized service; based on said matching of said first and second checksums, determining whether the computing device is operated by automatic script executed by said processor; wherein said determining is performed without receiving from said computerized service a copy of said user-provided data which was transmitted from the computing device to the computerized service.

In some embodiments, the method comprises: computing a first hashing result of data entered manually via a keyboard of said computing device; receiving from said computerized service a second hashing result of user-provided data which was transmitted from the computing device to the computerized service; matching between (A) the first hashing result of data entered manually via the keyboard of said computing device, and (B) the second hashing result of user-provided data which was transmitted from the computing device to the computerized service; based on said matching of said first and second hashing results, determining whether the computing device is operated by automatic script executed by said processor.

In some embodiments, the method comprises: computing a first hashing result of data entered manually via a keyboard of said computing device; receiving from said computerized service a second hashing result of user-provided data which was transmitted from the computing device to the computerized service; matching between (A) the first hashing result of data entered manually via the keyboard of said computing device, and (B) the second hashing result of user-provided data which was transmitted from the computing device to the computerized service; based on said matching of said first and second hashing results, determining whether the computing device is operated by automatic script executed by said processor; wherein said determining is performed without receiving from said computerized service of a copy of said user-provided data which was transmitted from the computing device to the computerized service.

In some embodiments, the method comprises: comparing (A) meta-data about the user-side input-unit interactions, with (B) meta-data about the data sent electronically from said computing device to said computerized service; wherein the method is performed without receiving from said computerized service a copy of the data sent electronically from said computing device to said computerized service; matching (A) the meta-data about the user-side input-unit interactions, with (B) the meta-data about the data sent electronically from said computing device to said computerized service; based on said matching, determining whether the computing device is operated by automatic script executed by said processor.

In some embodiments, the method comprises: determining that the computing device is infected by a code injector malware, by performing: detecting a mismatch between (A) a total number of data fields that the computing device transmitted to said computerized service, and (B) a total number of data fields that the user of the computing device filled-out manually via a keyboard of said computing device.

In some embodiments, the method comprises: determining that the computing device is infected by a code injector malware, by performing: detecting a mismatch between (A) a total number of data fields that the computing device transmitted to said computerized service, and (B) a total number of strings that the user of the computing device typed manually via a keyboard of said computing device.

In some embodiments, the method comprises: determining that the computing device is infected by a code injector malware, by performing: (a) receiving from said computerized service, meta-data about a number of filled-out fields that the computerized service received electronically from said computing device; (b) based on monitored user-side input-unit interactions, that were manually performed via a keyboard of said computing device, calculating meta-data about a number of filled-out fields that were manually filled-out via said keyboard; (c) detecting a mismatch between (A) the meta-data about the number of filled-out fields that the computerized service received electronically from said computing device, and (B) the calculated meta-data about the number of filled-out fields that were manually filled-out via said keyboard.

In some embodiments, the method comprises: determining that the computing device is infected by a code injector malware, by performing: (a) receiving from said computerized service, meta-data about a number of filled-out fields that the computerized service received electronically from said computing device; (b) based on monitored user-side input-unit interactions, that were manually performed via a keyboard of said computing device, calculating meta-data about a number of filled-out fields that were manually filled-out via said keyboard; (c) detecting a mismatch between (A) the meta-data about the number of filled-out fields that the computerized service received electronically from said computing device, and (B) the calculated meta-data about the number of filled-out fields that were manually filled-out via said keyboard; wherein detecting said mismatch is performed without receiving, and without taking into consideration, a copy of the data that the computerized service received electronically from said computing device.

In some embodiments, the method comprises: based on monitored user-side input-unit interactions, computing a particular velocity profile of pointer strokes; generating a model corresponding to velocity profile of pointer strokes performed by human users; based on comparison between (A) said particular velocity profile, and (B) said model corresponding to velocity profile of pointer strokes performed by human users—determining whether the computing device is operated by automatic script executed by said processor.

In some embodiments, the method comprises: based on monitored user-side input-unit interactions, extracting a particular time interval profile reflecting time intervals between down click events and up click events of a pointing device; generating a model of time intervals between down click events and up click events of pointing devices performed by human users; based on a comparison between (A) said particular time interval profile, and (B) said model of time intervals between down-click events and up click events of pointing devices performed by human users, determining whether the computing device is operated by automatic script executed by said processor.

In some embodiments, the method comprises: based on monitored user-side input-unit interactions, extracting a profile of time intervals between pointer strokes and down click events of a pointing device; generating a model of time intervals between pointer strokes and down click events of pointing devices performed by human users; based on comparing between (A) said profile of time intervals, and (B) said model of time intervals, determining whether the computing device is operated by automatic script executed by said processor.

In some embodiments, a system comprises: an automatic script detector module to determine whether a user, who utilizes a computing device to interact with a computerized service, is either (i) a human user, or (ii) an automatic script executed by a processor; wherein the automatic script detector module is: (a) to monitor user-side input-unit interactions performed through one or more input units; (b) to match between (A) the user-side input-unit interactions and (B) data sent electronically from said computerized service; (c) if the comparing result is that (A) the user-side input-unit interactions do not exactly match (B) the data sent electronically from said computerized service, then to determine that the computing device is operated by automatic script executed by said processor.

Some embodiments may detect hardware components and/or hardware assembly.

In some embodiments, a method comprises: differentiating between (a) a first hardware assembly utilized for interacting with a computerized service, and (b) a second hardware assembly utilized for interacting with said computerized service, by performing: monitoring user-side input-unit interactions of one or more input units which are being used for interacting with said computerized service; extracting from said user-side input-unit interactions a hardware-assembly-specific usage characteristic; performing said differentiating based on said hardware-assembly-specific usage characteristic.

In some embodiments, the differentiating is independent of, and does not take into account, data stored in any cookie file on any one of the first and second hardware assemblies.

In some embodiments, the differentiating is independent of, and does not take into account, Internet Protocol (IP) addresses associated with any one of the first and second hardware assemblies.

In some embodiments, the method comprises: sampling pointing-device-events of said user-side input-unit interactions; determining a device-specific signature reflecting said pointing-device-events sampling; performing said differentiating based on said device-specific signature reflecting said pointing-device-events sampling.

In some embodiments, the method comprises: sampling keyboard-events of said user-side input-unit interactions; determining a device-specific signature reflecting said keyboard-events sampling; performing said differentiating based on said device-specific signature reflecting said keyboard-events sampling.

In some embodiments, the method comprises: sampling touchpad-events of said user-side input-unit interactions; determining a device-specific signature reflecting said touchpad-events sampling; performing said differentiating based on said device-specific signature reflecting said touchpad-events sampling.

In some embodiments, the method comprises: sampling pointing-stick events of said user-side input-unit interactions; determining a device-specific signature reflecting said pointing-stick events sampling; performing said differentiating based on said device-specific signature reflecting said pointing-stick events sampling.

In some embodiments, the method comprises: measuring a first length of a longest-stroke of on-screen pointer movement, in a first usage session of the computerized service; measuring a first length of a longest-stroke of on-screen pointer movement, in a second usage session of the computerized service; if the first length of the longest-stroke in the first usage session, is different from the second length of the longest-stroke in the second usage session, by at least a pre-defined percentage value, then determining that (A) the first usage session of the computerized service was accessed via the first hardware assembly, and that (B) the second usage session of the computerized service was accessed via the second hardware assembly.

In some embodiments, the method comprises: measuring a first length of a longest-stroke of on-screen pointer movement, in a first usage session of the computerized service; measuring a first length of a longest-stroke of on-screen pointer movement, in a second usage session of the computerized service; if the first length of the longest-stroke in the first usage session, is different from the second length of the longest-stroke in the second usage session, by at least a pre-defined percentage value, then determining that (A) the first usage session of the computerized service was accessed via a computer mouse, and that (B) the second usage session of the computerized service was accessed via a touchpad.

In some embodiments, the method comprises: analyzing strokes of movements of an on-screen pointer movement, in a first usage session of the computerized service; analyzing strokes of movements of the on-screen pointer movement, in a second usage session of the computerized service; based on both of said analyzing, determining that (A) the first usage session of the computerized service was accessed via a computer mouse, and that (B) the second usage session of the computerized service was accessed via a touchpad.

In some embodiments, the method comprises: analyzing strokes of movements of an on-screen pointer movement, in a first usage session of the computerized service; analyzing strokes of movements of the on-screen pointer movement, in a second usage session of the computerized service; based on both of said analyzing, determining that (A) the first usage session of the computerized service was accessed via a computer mouse, and that (B) the second usage session of the computerized service was accessed via a pointing-stick.

In some embodiments, the method comprises: analyzing strokes of movements of an on-screen pointer movement, in a first usage session of the computerized service; analyzing strokes of movements of the on-screen pointer movement, in a second usage session of the computerized service; based on both of said analyzing, determining that (A) the first usage session of the computerized service was accessed via a touchpad, and that (B) the second usage session of the computerized service was accessed via a pointing-stick.

In some embodiments, the method comprises: measuring acceleration of an on-screen pointer movement, in a first usage session of the computerized service; measuring acceleration of an on-screen pointer movement, in a second usage session of the computerized service; based on both of said measuring, determining that (A) the first usage session of the computerized service was accessed via a computer mouse, and that (B) the second usage session of the computerized service was accessed via a touchpad.

In some embodiments, the method comprises: measuring acceleration of an on-screen pointer movement, in a first usage session of the computerized service; measuring acceleration of an on-screen pointer movement, in a second usage session of the computerized service; based on both of said measuring, determining that (A) the first usage session of the computerized service was accessed via a computer mouse, and that (B) the second usage session of the computerized service was accessed via a pointing-stick.

In some embodiments, the method comprises: measuring acceleration of an on-screen pointer movement, in a first usage session of the computerized service; measuring acceleration of an on-screen pointer movement, in a second usage session of the computerized service; based on both of said measuring, determining that (A) the first usage session of the computerized service was accessed via a touchpad, and that (B) the second usage session of the computerized service was accessed via a pointing-stick.

In some embodiments, the method comprises: sampling and analyzing mouse-events in a first usage session of the computerized service; sampling and analyzing mouse-events in a second usage session of the computerized service; based on differences between (a) the sampled and analyzed mouse events in the first usage session, and (b) the sampled and analyzed mouse events in the second usage session, determining that (A) the first usage session was accessed via a first mouse-device made by a first manufacturer, and that (B) the second usage session was accessed via a second mouse-device made by a second manufacturer.

In some embodiments, the method comprises: sampling and analyzing mouse-events in a first usage session of the computerized service; sampling and analyzing mouse-events in a second usage session of the computerized service; based on differences between (a) the sampled and analyzed mouse events in the first usage session, and (b) the sampled and analyzed mouse events in the second usage session, determining that (A) the first usage session was accessed via a first mouse-device made by a particular manufacturer and having a particular model number, and that (B) the second usage session was accessed via a second mouse-device made by the same particular manufacturer and having the same particular model number.

In some embodiments, the method comprises: temporarily generating a resource-consuming burden on client-side hardware assemblies that are used for accessing said computerized service; measuring performance of multiple client-side hardware assemblies in response to the generated resource-consuming burden; based on the measured performance of multiple client-side hardware assemblies in response to the generated resource-consuming burden, differentiating between said first hardware assembly and said second hardware assembly.

In some embodiments, the method comprises: temporarily generating a computation-intensive burden on client-side hardware assemblies that are used for accessing said computerized service; measuring performance of multiple client-side hardware assemblies in response to the generated computation-intensive burden; based on the measured performance of multiple client-side hardware assemblies in response to the generated computation-intensive burden, differentiating between said first hardware assembly and said second hardware assembly.

In some embodiments, the method comprises: monitoring keyboard interactions with said computerized service; identifying a sequence of multiple particular characters, that are entered consecutively via keyboard more rapidly than other character sequences; determining that said sequence of multiple characters, is more common in a particular natural language; determining that said computerized service is accessed via a hardware assembly utilizing a keyboard having a keyboard-layout of said particular natural language.

In some embodiments, the method comprises: monitoring keyboard interactions with said computerized service; identifying a sequence of multiple particular characters, that are entered consecutively via keyboard more rapidly than other character sequences; determining that said sequence of multiple characters, is more common in a particular natural language; determining that said computerized service is accessed via a hardware assembly utilizing a keyboard having a keyboard-layout of said particular natural language; wherein both of said determining operations are performed without taking into consideration an Internet Protocol (IP) address associated with said hardware assembly being used for accessing said computerized service.

In some embodiments, the method comprises: displaying through said computerized service a challenge requesting a user to correctly enter a particular word in a particular non-English natural language, wherein typing of the particular word requires typing an accented character; receiving user-entered keystrokes which indicate typing of said particular word while typing said accented character; based on said user-entered keystrokes which indicate typing of said particular word while typing said accented character, determining that the computerized service is accessed by a user that utilizes a keyboard having a non-English keyboard layout which corresponds to said particular non-English natural language.

In some embodiments, the method comprises: displaying through said computerized service a challenge requesting a user to correctly enter a particular word in a particular non-English natural language, wherein typing of the particular word requires typing a character having a diacritical mark; receiving user-entered keystrokes which indicate typing of said particular word while typing said character having said diacritical mark; based on said user-entered keystrokes which indicate typing of said particular word while typing said character having said diacritical mark, determining that the computerized service is accessed by a user that utilizes a keyboard having a non-English keyboard layout which corresponds to said particular non-English natural language.

In some embodiments, a system comprises a hardware assembly detector module to differentiate between (a) a first hardware assembly utilized for interacting with a computerized service, and (b) a second hardware assembly utilized for interacting with said computerized service; wherein the hardware assembly detector module is: to monitor user-side input-unit interactions of one or more input units which are being used for interacting with said computerized service; to extract from said user-side input-unit interactions a hardware-assembly-specific usage characteristic; to perform differentiation based on said hardware-assembly-specific usage characteristic.

Some embodiments may enable user segmentation based on monitoring of input-unit interactions.

In some embodiments, a method comprises: differentiating between (a) a first user interacting with a computerized service, and (b) a second user interacting with said computerized service; wherein the differentiating does not rely on Internet Protocol (IP) address analysis; wherein the differentiating does not rely on cookie files analysis; wherein the differentiating comprises: monitoring user-side input-unit interactions with said computerized service; extracting from said user-side input-unit interactions a user-specific characteristic; based on the user-specific characteristic extracted from said user-side input-unit interactions, differentiating between said first user and said second user.

In some embodiments, the differentiating (A) does not rely on injection of a user-interface interference to said computerized service, and (B) does not rely on user reaction to any user-interface interference.

In some embodiments, the extracting comprises: extracting from said user-side input-unit interactions a user-specific characteristic which indicates at least one of: (a) user gender; (b) user age-range; (c) user geographic location; (d) user level of expertise in computer-related tasks; (e) user anatomical characteristics.

In some embodiments, the method comprises: monitoring utilization of keyboard shortcuts during interactions with said computerized service; based on the monitored utilization of keyboard shortcuts during interactions with said computerized service, determining the level of expertise of a particular user in operating computerized platforms.

In some embodiments, the method comprises: monitoring utilization of keyboard shortcuts during interactions with said computerized service; based on the monitored utilization of keyboard shortcuts during interactions with said computerized service, determining whether a particular user is (a) within an age-range of 15 to 30 years old, or (b) within an age-range of 65 and greater years old.

In some embodiments, the method comprises: monitoring utilization of copy-and-paste operations during interactions with said computerized service; based on the monitored utilization of copy-and-paste operations during interactions with said computerized service, determining the level of expertise of a particular user in operating computerized platforms In some embodiments, the method comprises: monitoring average typing speed during interactions with said computerized service; based on the monitored average typing speed during interactions with said computerized service, determining the level of expertise of a particular user in operating computerized platforms.

In some embodiments, the method comprises: monitoring average typing speed during interactions with said computerized service; based on the monitored average typing speed during interactions with said computerized service, determining whether a particular user is an old user or a young user.

In some embodiments, the method comprises: monitoring user keystrokes during interactions with said computerized service; extracting statistics of time-gaps between pairs of key-down and key-up events; based on the extracted statistics of said time-gaps between pairs of key-down and key-up events, determining whether a particular user is a male user or a female user.

In some embodiments, the method comprises: monitoring keyboard interactions of a user with said computerized service; extracting statistics of time-gaps between pairs of key-down and key-up events, for keys in different locations along the keyboard; based on the extracted statistics of time-gaps, determining whether the fingers of a particular user are short or long.

In some embodiments, the method comprises: monitoring keystrokes of a first user during interactions with said computerized service; extracting first statistics of the time-gaps between pairs of key-down and key-up events during the first user interactions with the computerized service; monitoring keystrokes of a second user during interactions with said computerized service; extracting second statistics of the time-gaps between pairs of key-down and key-up events during the second user interactions with the computerized service; based on said extracted first statistics of first user and said extracted second statistics of second user, differentiating that the first user is male and that the second user is female.

In some embodiments, the method comprises: monitoring keyboard interactions of a first user with said computerized service; identifying a sequence of multiple particular characters, that are entered by the first user consecutively via keyboard more rapidly than other character sequences that the first user types; determining that said sequence of multiple characters, is more common in a particular natural language; determining that keyboard interactions of a second user, with said computerized service, lack rapid typing of said sequence of particular characters; based on both of said determining, differentiating between the first user and the second user.

In some embodiments, the method comprises: monitoring keyboard interactions of a first user with said computerized service; identifying a sequence of multiple particular characters, that are entered by the first user consecutively via keyboard more rapidly than other character sequences that the first user types; determining that said sequence of multiple characters, is more common for users of a particular keyboard layout that is more common at a particular geographic region; determining that keyboard interactions of a second user, with said computerized service, lack rapid typing of said sequence of particular characters; based on both of said determining, differentiating between the first user and the second user.

In some embodiments, the method comprises: sampling user-side input-unit interactions of a user with said computerized service; performing frequency analysis of said sampled user-side input-unit interactions of a first user with said computerized service; based on said frequency analysis, determining characteristics of a power supply of the computing device of said user; based on determinations of characteristics of the power supply of the computing device of said user, determining that the computing device of said user is located in a particular geographic region.

In some embodiments, the method comprises: monitoring keyboard interactions of a first user with said computerized service; based on characteristics of the monitored keyboard interactions, determining both (A) gender of the first user, and (B) age-range of said user; based on the determined gender and age-range of said first user, displaying to said first user tailored advertisement content.

In some embodiments, the method comprises: monitoring keyboard interactions of a first user with said computerized service; based on characteristics of the monitored keyboard interactions, determining both (A) a natural language spoken by the first user, and (B) age-range of said user; based on the determined natural language and age-range of said first user, displaying to said first user tailored advertisement content.

In some embodiments, the method comprises: monitoring user-side input-unit interactions of the first user with said computerized service; based on characteristics of the monitored keyboard interactions and pointing device events, determining a current mood of said user; based on the determined mood of said first user, displaying to said first user tailored content suitable for said current mood of said first user.

In some embodiments, a system comprises: a user identity determination module to differentiate between (a) a first user interacting with a computerized service, and (b) a second user interacting with said computerized service; wherein the differentiating by the user identity determination module does not rely on Internet Protocol (IP) address analysis; wherein the differentiating by the user identity determination module does not rely on cookie files analysis; wherein the user identity determination module is: to monitor user-side input-unit interactions with said computerized service; to extract from said user-side input-unit interactions a user-specific characteristic; based on the user-specific characteristic extracted from said user-side input-unit interactions, to differentiate between said first user and said second user.

In some embodiments, the system comprises: a user expertise estimator module (A) to monitor utilization of keyboard shortcuts during interactions with said computerized service, and (B) based on the monitored utilization of keyboard shortcuts during interactions with said computerized service, determining the level of expertise of a particular user in operating computerized platforms.

In some embodiments, the system comprises: a user gender estimator module (a) to monitor user keystrokes during interactions with said computerized service, (b) to extract statistics of time-gaps between pairs of key-down and key-up events, and (c) based on the extracted statistics of said time-gaps between pairs of key-down and key-up events, to determine whether a particular user is a male user or a female user.

Some embodiments may identify multiple-users accessing the same account (e.g., subscription account, personal account).

In some embodiments, a method comprises: determining that a particular subscription account of a computerized service, is accessed by two different human users who utilize a same set of login credentials, by performing: (a) monitoring input-unit interactions of pairs of usage sessions that originated from pairs of two different subscriptions accounts; (b) extracting from the input-unit interactions that were monitored in step (a), a cross-account usage-session pairing pattern; (c) monitoring input-unit interactions of pairs of usage sessions that originated from a same subscription account; (d) extracting from the input-unit interactions that were monitored in step (c), an intra-account usage-session pairing pattern; (e) determining whether a pair of usage sessions, that originated from said particular subscription account, is: (i) relatively more similar to the cross-account usage-session pairing pattern, or (ii) relatively more similar to the intra-account usage-session pairing pattern.

In some embodiments, the method comprises: if it is determined in step (e) that the pair of usage session, that originated from said particular subscription account, is relatively more similar to the cross-account usage-session pairing pattern, then generating a notification that said particular subscription account is accessed by two different human users who utilize the same set of login credentials.

In some embodiments, the monitoring of step (a) comprises: monitoring input-unit interactions of pairs of usage sessions that originated from pairs of two different subscriptions accounts and which comprise user reactions to an injected user-interface interference; wherein the monitoring of step (c) comprises: monitoring input-unit interactions of pairs of usage sessions that originated from a same subscription account and which comprise user reactions to said injected user-interface interference.

In some embodiments, the monitoring of step (a) comprises: monitoring input-unit interactions of pairs of usage sessions that originated from pairs of two different subscriptions accounts and which comprise natural interactions that are not induced by any user-interface interference; wherein the monitoring of step (c) comprises: monitoring input-unit interactions of pairs of usage sessions that originated from a same subscription account and which comprise natural interactions that are not induced by any user-interface interference.

In some embodiments, the method comprises: checking whether a characteristic of monitored user-interface interactions over a pair of usage-sessions of a same subscription account, is more similar to either: (i) a first pattern of user-interface interactions that characterize multiple pairs of usage sessions of different human users, or (ii) a second pattern of user-interface interactions that characterizes multiple pairs of usage sessions wherein each pair of usage session belong to the same subscription account.

In some embodiments, the method comprises: if it is determined that said characteristic of monitored user-interface interactions, over said pair of usage-sessions of the same subscription account, is more similar to said first pattern of user-interface interactions that characterize multiple pairs of usage sessions of different human users, then generating a notification that said particular subscription account is accessed by two different human users who utilize the same set of login credentials.

In some embodiments, the method comprises: checking whether a characteristic of monitored user-interface interactions over a pair of usage-sessions of a same subscription account, that comprise user reactions to an injected user-interface interference, is more similar to either: (i) a first pattern of user-interface interactions that characterize multiple pairs of usage sessions of different human users, or (ii) a second pattern of user-interface interactions that characterizes multiple pairs of usage sessions wherein each pair of usage session belong to the same subscription account.

In some embodiments, the method comprises: if it is determined that said characteristic of monitored user-interface interactions, over said pair of usage-sessions of the same subscription account, that comprise user reactions to said injected user-interface interference, is more similar to said first pattern of user-interface interactions that characterize multiple pairs of usage sessions of different human users, then generating a notification that said particular subscription account is accessed by two different human users who utilize the same set of login credentials.

In some embodiments, the computerized service comprises a service selected from the group consisting of: a digital streaming video service; a digital streaming audio service; an online gaming service.

In some embodiments, the computerized service comprises a service selected from the group consisting of: an online premium-content service available only to paying subscribers; an online legal information service available only to paying subscribers; an online financial information service available only to paying subscribers; an online business information service available only to paying subscribers; an online news information service available only to paying subscribers.

In some embodiments, the method comprises: generating an attributes vector for each usage session; utilizing a clustering algorithm to determine the number of most-probable sources for the usage sessions; based on the clustering result, determining whether the usage sessions correspond to one use or to multiple users.

In some embodiments, the method comprises: generating an ad-hoc model reflecting user-side interactions that were performed in all usage sessions that originated from a particular computing device; based on said ad-hoc model, for all other usage sessions accesses using a different device, comparing said usage sessions to said model; if a particular usage session is determined to be significantly different than said ad-hoc model, then determining the said particular usage session originated from a different user.

In some embodiments, a method comprises: determining that a particular subscription account of a computerized service, is accessed by two or more different human users who utilize a same set of login credentials, by performing: (a) monitoring input-unit interactions of sets of multiple usage sessions that originated from sets of multiple different subscriptions accounts; (b) extracting from the input-unit interactions that were monitored in step (a), a cross-account usage-session grouping pattern; (c) monitoring input-unit interactions of sets of usage sessions that originated from a same subscription account; (d) extracting from the input-unit interactions that were monitored in step (c), an intra-account usage-session grouping pattern; (e) determining whether a set of multiple usage sessions, that originated from said particular subscription account, is: (i) relatively more similar to the cross-account usage-session grouping pattern, or (ii) relatively more similar to the intra-account usage-session grouping pattern.

In some embodiments, each one of the sets of multiple usage sessions comprise a pair of usage sessions. In some embodiments, each one of the sets of multiple usage sessions comprise a set of three usage sessions. In some embodiments, each one of the sets of multiple usage sessions comprise a group of four usage sessions.

In some embodiments, a system comprises: a multiple-users for same account detector, to determine that a particular subscription account of a computerized service, is accessed by two different human users who utilize a same set of login credentials; wherein the multiple-users for same account detector is: (a) to monitor input-unit interactions of pairs of usage sessions that originated from pairs of two different subscriptions accounts; (b) to extract from the input-unit interactions that were monitored in step (a), a cross-account usage-session pairing pattern; (c) to monitor input-unit interactions of pairs of usage sessions that originated from a same subscription account; (d) to extract from the input-unit interactions that were monitored in step (c), an intra-account usage-session pairing pattern; (e) to determine whether a pair of usage sessions, that originated from said particular subscription account, is: (i) relatively more similar to the cross-account usage-session pairing pattern, or (ii) relatively more similar to the intra-account usage-session pairing pattern.

In some embodiments, if it is determined in step (e) that the pair of usage session, that originated from said particular subscription account, is relatively more similar to the cross-account usage-session pairing pattern, then the multiple-users for same account detector is to generate a notification that said particular subscription account is accessed by two different human users who utilize the same set of login credentials.

In some embodiments, in step (a), the multiple-users for same account detector is to monitor input-unit interactions of pairs of usage sessions that originated from pairs of two different subscriptions accounts and which comprise user reactions to an injected user-interface interference; wherein in step (c), the multiple-users for same account detector is to monitor input-unit interactions of pairs of usage sessions that originated from a same subscription account and which comprise user reactions to said injected user-interface interference.

In some embodiments, the multiple-users for same account detector is to determine that a particular subscription account of a computerized service, is accessed by two or more different human users who utilize a same set of login credentials, by performing: (a) monitoring input-unit interactions of sets of multiple usage sessions that originated from sets of multiple different subscriptions accounts; (b) extracting from the input-unit interactions that were monitored in step (a), a cross-account usage-session grouping pattern; (c) monitoring input-unit interactions of sets of usage sessions that originated from a same subscription account; (d) extracting from the input-unit interactions that were monitored in step (c), an intra-account usage-session grouping pattern; (e) determining whether a set of multiple usage sessions, that originated from said particular subscription account, is: (i) relatively more similar to the cross-account usage-session grouping pattern, or (ii) relatively more similar to the intra-account usage-session grouping pattern.

Some embodiments may enable a visual login process, as well as an implicit two-factor authentication (TFA) process, and stochastic cryptography based on monitored user-side input-unit interactions.

In some embodiments, a method comprises: differentiating between a first user and a second user of a computerized service, by performing: presenting an on-screen visual login interface which requires a user of the computerized service to interact with user interface elements in order to enter user login credentials for said computerized service; monitoring interactions of said used via an input unit with said user interface elements of said on-screen visual login interface; extracting from said interaction of the user via the input unit, a user-specific trait indicating a user-specific manner of interaction with said on-screen visual login interface; based on the extracted user-specific manner of interaction, differentiating between a first user and a second user of said computerized service.

In some embodiments, the presenting comprises: presenting an on-screen keypad of digits, and an on-screen target zone; generating a drag-and-drop interface that allows the user to selectively drag individual digits, which correspond to a Personal Identification Number (PIN) that the user desires to enter, from said on-screen keypad to said on-screen target zone; wherein the monitoring of interactions comprises: monitoring a manner in which the user performs drag-and-drop operations of said individual digits, and extracting a user-specific trait from said drag-and-drop operations of individual digits.

In some embodiments, the presenting comprises: presenting an on-screen vault interface having one or more on-screen cylinders; generating an on-screen interface that allows the user to selectively rotate the one or more on-screen rotatable cylinders in order to input a Personal Identification Number (PIN) that the user desires to enter; wherein the monitoring of interactions comprises: monitoring a manner in which the user performs rotations of the one or more on-screen rotatable cylinders, and extracting a user-specific trait from said rotations.

In some embodiments, the method comprises: injecting a user interface interference to an operation of said user interface elements; monitoring a corrective reaction of the user to the injected user interface interference; extracting a user-specific trait corresponding to said corrective reaction; based on the user-specific trait corresponding to said corrective reaction, differentiating between the first user and the second user of said computerized service.

In some embodiments, the presenting comprises: presenting an on-screen keypad of digits, and an on-screen target zone; generating a drag-and-drop interface that allows the user to selectively drag individual digits, which correspond to a Personal Identification Number (PIN) that the user desires to enter, from said on-screen keypad to said on-screen target zone; wherein injecting the user interface interference comprises: injecting a user interface interference to an operation of said drag-and-drop interface; wherein the monitoring of interactions comprises: monitoring a manner in which the user reacts to the injected user-interface interference to the operation of said drag-and-drop interface, and extracting a user-specific trait from the corrective reaction of the user.

In some embodiments, the presenting comprises: presenting an on-screen vault interface having one or more on-screen cylinders; generating an on-screen interface that allows the user to selectively rotate the one or more on-screen rotatable cylinders in order to input a Personal Identification Number (PIN) that the user desires to enter; wherein injecting the user interface interference comprises: injecting a user interface interference to an operation of said rotatable cylinders; wherein the monitoring of interactions comprises: monitoring a manner in which the user reacts to the injected user-interface interference to the operation of said on-screen rotatable cylinders, and extracting a user-specific trait from the corrective reaction of the user.

In some embodiments, the injected user-interface interference causes an on-screen pointer to be non-responsive for a pre-defined period of time.

In some embodiments, the injected user-interface interference causes an on-screen pointer to move in a route that is non-identical to a movement route of said input unit.

In some embodiments, the method comprises: presenting an on-screen collection of items; presenting to the user a textual notification that the user is required to select a particular item from said collection, wherein the textual notification comprise a textual instruction in a natural language that a human user is required to comprehend in order to correctly select said particular item from said collection; introducing an interference to a drag-and-drop operation of said particular item; checking whether a current reaction of the user to said interference, matches a user-specific profile of said user indicating past reactions of said user to said interference.

In some embodiments, the method comprises: presenting an on-screen jigsaw puzzle as part of a login process; monitoring a manner in which the user solves the on-screen jigsaw puzzle; extracting a user-specific profile corresponding to the manner in which the user solves the on-screen jigsaw puzzle; in a subsequent login process, checking whether (a) a current manner of the user solving the on-screen jigsaw puzzle, matches (b) the user-specific profile corresponding to the manner in which the user solved the on-screen jigsaw puzzle in previous login sessions.

In some embodiments, the method comprises: during a log-in process and while the user enters user credentials through a mobile computing device, injecting a time-delay between (A) tapping of a character on an on-screen keyboard by the user, and (B) displaying said character on the screen of the mobile computing device; monitoring user reactions to the injected time-delay between tapping and displaying; extracting a user-specific profile reflecting a typical reaction of said user to injected time-delays between tapping and displaying; in a subsequent log-in session, checking whether (i) a current reaction of the user to time-delay between tapping and displaying, matches (ii) the user-specific profile reflecting the typical reaction of said user to injected time-delays between tapping and displaying.

In some embodiments, the method comprises: during a log-in process, causing an Enter key to be non-responsive to keystrokes; presenting an on-screen Submit button; introducing an on-screen interference to regular operation of said on-screen Submit button; monitoring user reactions to the on-screen interference to the regular operation of said on-screen Submit button; extracting a user-specific profile reflecting a typical reaction of said user to the on-screen interference to the regular operation of said on-screen Submit button; in a subsequent log-in session, checking whether (i) a current reaction of the user to the on-screen interference to the regular operation of the on-screen Submit button, matches (ii) the user-specific profile reflecting the typical reaction of said user to the on-screen interference to the regular operation of the on-screen Submit button.

In some embodiments, the method comprises: performing an implicit two-factor authentication process as a condition for authorizing said user to access said computerized service, wherein a first-step of the implicit two-factor authentication process comprises receiving from the user a correct value of a password previously-defined by said user; wherein a second-step of the implicit two-factor authentication process comprises receiving from said user said correct value in an input manner that exhibits a particular user-specific trait that had been extracted from previous input-unit interactions of said user.

In some embodiments, the method comprises: performing an implicit two-factor authentication process as a condition for authorizing said user to access said computerized service, wherein a first-step of the implicit two-factor authentication process comprises receiving from the user a correct value of a password previously-defined by said user; wherein a second-step of the implicit two-factor authentication process comprises: injecting a user interface interference to an interface presented to said user; and receiving from said user said correct value in an input manner which reacts to said interference and which exhibits a particular user-specific trait that had been extracted from previous input-unit interactions of said user in response to said interference.

In some embodiments, the method comprises: presenting to the user, one interference at a time, a sequence of user-interface interferences that are selected one at a time from a pool of possible user-interface interferences; monitoring user reactions to the user-interface interferences that were presented to the user, one interference at a time; generating a user-specific general reaction model that reflects a general manner of reactions to user-interface interferences by said user; generating an encryption key by using a parameter of said user-specific general reaction model; encrypting a content item of said user by using said encryption key that was generated based on said user-specific general reaction model.

In some embodiments, the method comprises: upon a user request to decrypt said content item, performing: presenting to the user a single user-interface interference, from the sequence of user-interface interferences that were selected and used for generating the user-specific general reaction model prior to said encrypting step; monitoring a current reaction of said user to the single user-interface interference that is presented to the user; extracting a user-specific value from the current reaction of said user to the single user-interface interference that is presented to the user; calculating a decryption key based on the user-specific value that was extracted from the current reaction of said user to the single user-interface interference that is presented to the user; decrypting said content item by using said decryption key.

In some embodiments, said sequence of user-interface interference comprise a sequence of at least 20 user-interface interferences, that are selected one-at-a-time from a pool comprising at least 100 user-interface interferences.

In some embodiments, the method comprises: performing stochastic encryption of a content item associated with said user, by utilizing an encryption key that is based, at least partially, on a user-specific model that reflects a general manner in which said user responds to at least 10 different user-interface interferences.

In some embodiments, the method comprises: performing stochastic encryption of a content item associated with said user, by utilizing an encryption key that is based, at least partially, on a user-specific model that reflects a general manner in which said user responds to a series of at least 10 different user-interface interferences that were presented to said user one interference at a time; performing stochastic decryption of said content item associated with said user, by utilizing a decryption key that is based, at least partially, on a single reaction of said user to a single user-interface interference that is presented to said user in response to a user request to decrypt said content item.

In some embodiments, the method comprises: performing a stochastic cryptography operation which utilizes, as a cryptographic parameter, a value of a user-specific model of reaction to a user interface interference of a particular type.

In some embodiments, the method comprises: injecting a user interface interference to an interaction of said user with said computerized service; monitoring user reaction to said user interface interference; extracting a user-specific interference-specific parameter which indicates an attribute of the user reaction to said user interface interference; performing a stochastic cryptography operation which utilizes, as a cryptographic parameter, a value of said user-specific interference-specific parameter which indicates said attribute of the user reaction to said user interface interference.

In some embodiments, the method comprises: estimating a false positive margin-of-error of said stochastic cryptography operation; allowing the user to perform multiple access attempts to compensate for the estimated false positive margin-of-error of said stochastic cryptography operation.

In some embodiments, the stochastic cryptography operation comprises at least one of: encryption, decryption.

In some embodiments, the cryptographic parameter comprises: a value of said user-specific interference-specific parameter which indicates said attribute of the user reaction to said user interface interference which is introduced during said visual login process.

In some embodiments, a system comprises: a visual login module to differentiate between a first user and a second user of a computerized service, wherein the visual login module is: to present an on-screen visual login interface which requires a user of the computerized service to interact with user interface elements in order to enter user login credentials for said computerized service; to monitor interactions of said used via an input unit with said user interface elements of said on-screen visual login interface; to extract from said interaction of the user via the input unit, a user-specific trait indicating a user-specific manner of interaction with said on-screen visual login interface; based on the extracted user-specific manner of interaction, to differentiate between a first user and a second user of said computerized service.

In some embodiments, the visual login module is to perform an implicit two-factor authentication process as a condition for authorizing said user to access said computerized device, wherein a first-step of the implicit two-factor authentication process comprises receiving from the user a correct value of a password previously-defined by said user; wherein a second-step of the implicit two-factor authentication process comprises receiving from said user said correct value in an input manner that exhibits a particular user-specific trait that had been extracted from previous input-unit interactions of said user.

In some embodiments, the system comprises a stochastic cryptography module, wherein the stochastic cryptography module is: to inject a user interface interference to an interaction of said user with said computerized service; to monitor user reaction to said user interface interference; to extract a user-specific interference-specific parameter which indicates an attribute of the user reaction to said user interface interference; to perform a stochastic cryptography operation which utilizes, as a cryptographic parameter, a value of said user-specific interference-specific parameter which indicates said attribute of the user reaction to said user interface interference.

In some embodiments, a method comprises: determining whether a human user, who utilizes a computing device to interact with a computerized service via a communication channel, (i) is a human user that is co-located physically near said computing device, or (ii) is a human user that is located remotely from said computing device and is operating remotely said computer device via a remote access channel; wherein the determining comprises: (a) monitoring interactions of the user with an input unit of said computing device, in response to one or more communication lags that are exhibited by said communication channel; (b) based on monitored user interactions via the input unit in response to said one or more communication lags, determining whether said human user (i) is a human user that is co-located physically at said computing device, or (ii) is a human user that is located remotely from said computing device and is controlling remotely said computing device via said remote access channel.

In some embodiments, the method comprises: injecting a communication latency into said communication channel between said computing device and said computerized service; introducing an input/output aberration that causes said input unit of said computing device to exhibit abnormal behavior; determining an actual reaction time of said user to said input/output aberration; if the actual reaction time of said user to the input/output aberration, is greater than a pre-defined reaction-time threshold value, then determining that the user is located remotely from said computing device and is controlling remotely said computing device via said remote access channel.

In some embodiments, the method comprises: injecting a communication latency into said communication channel between said computing device and said computerized service; introducing an input/output aberration that causes said input unit of said computing device to exhibit abnormal behavior; determining an actual reaction time of said user to said input/output aberration; defining a reference reaction time that characterizes a maximum time that elapses between (I) generation of said input/output aberration to a local user, and (II) sensing of a reaction by the local user to said input/output aberration; if the actual reaction time of said user to the input/output aberration, is greater than said reference reaction time, then determining that the user is located remotely from said computing device and is controlling remotely said computing device via said remote access channel.

In some embodiments, the method comprises: injecting a communication latency into said communication channel between said computing device and said computerized service; introducing an input/output aberration that causes said input unit of said computing device to exhibit abnormal behavior; determining a time-length of a time-gap between (I) introduction of said input/output aberration, and (II) first discovery of the input/output aberration by the user as exhibited by commencement of a corrective action by the user; if the time-length of said time-gap, is greater than a pre-defined time-gap threshold value that characterizes non-remote users, then determining that the user is located remotely from said computing device and is controlling remotely said computing device via said remote access channel.

In some embodiments, the method comprises: injecting a communication latency into said communication channel between said computing device and said computerized service; introducing an input/output aberration that causes said input unit of said computing device to exhibit abnormal behavior; determining a time-length of a time-gap between (I) introduction of said input/output aberration, and (II) an end of a corrective action that the user performed in response to said input/output aberration; if the time-length of said time-gap, is greater than a pre-defined time-gap threshold value that characterizes non-remote users, then determining that the user is located remotely from said computing device and is controlling remotely said computing device via said remote access channel.

In some embodiments, the method comprises: hiding a mouse-pointer on a screen of said computerized service; monitoring input unit reactions of said user in response to the hiding of the mouse-pointer; based on the input unit reactions of said user in response to the hiding of the mouse-pointer, determining whether said user is (i) co-located physically at said computing device, or (ii) is located remotely rom said computing device and controlling remotely said computing device via said remote access channel.

In some embodiments, the method comprises: temporarily hiding an on-screen pointer of said computerized service; monitoring input unit reactions of said user in response to the hiding of the on-screen pointer; detecting latency in said input unit reactions of said user in response to the hiding of the on-screen pointer; based on detected latency in the input unit reactions of said user in response to the hiding of the on-screen pointer, determining whether said user is (i) co-located physically at said computing device, or (ii) is located remotely rom said computing device and controlling remotely said computing device via said remote access channel.

In some embodiments, the method comprises: causing an on-screen pointer to deviate relative to its regular on-screen route; monitoring input unit reactions of said user in response to deviation of the on-screen pointer; detecting latency in said input unit reactions of said user in response to the deviation of the on-screen pointer; based on detected latency in the input unit reactions of said user in response to the deviation of the on-screen pointer, determining whether said user is (i) co-located physically at said computing device, or (ii) is located remotely rom said computing device and controlling remotely said computing device via said remote access channel.

In some embodiments, the method comprises: sampling multiple interactions of said user with said input unit of said computing device; based on a frequency of said sampling, determining latency of communications between said user and the computerized service; based on said latency of communications, determining whether said user is (i) co-located physically at said computing device, or (ii) is located remotely from said computing device and controlling remotely said computing device via said remote access channel.

In some embodiments, the method comprises: sampling multiple interactions of said user with said input unit of said computing device; based on a frequency of said sampling, determining latency of communications between said user and the computerized service; based on said latency of communications, determining whether said user is (i) co-located physically at said computing device, or (ii) is located remotely from said computing device and controlling remotely said computing device via said remote access channel.

In some embodiments, the method comprises: sampling multiple interactions of said user with a computer mouse; if said sampling indicates generally-smooth movement of the computer mouse, then, determining that said user is co-located physically near said computing device.

In some embodiments, the method comprises: sampling multiple interactions of said user with a computer mouse; if said sampling indicates generally-rough movement of the computer mouse, then, determining that said user is located remotely from said computing device and controlling remotely said computing device via said remote access channel.

In some embodiments, the method comprises: sampling multiple interactions of said user with a computer mouse; if said sampling indicates generally-linear movement of the computer mouse, then, determining that said user is located remotely from said computing device and controlling remotely said computing device via said remote access channel.

In some embodiments, the method comprises: sampling multiple interactions of said user with a computer mouse; if said sampling indicates sharp-turn movements of the computer mouse, then, determining that said user is located remotely from said computing device and controlling remotely said computing device via said remote access channel.

In some embodiments, the method comprises: sampling multiple interactions of said user with said input unit; if a frequency of said multiple interactions is below a pre-defined threshold, then, determining that said user is located remotely from said computing device and controlling remotely said computing device via said remote access channel; if the frequency of said multiple interactions is above the pre-defined threshold, then, determining that said user is co-located physically near said computing device.

In some embodiments, the method comprises: overloading a data transfer communication channel of the computing device that is used for accessing said computerized service; measuring an effect of said overloading on frequency of sampling user interactions via an input unit; based on the measured effect of said overloading, determining whether said user is (i) co-located physically at said computing device, or (ii) is located remotely from said computing device and controlling remotely said computing device via said remote access channel.

In some embodiments, the method comprises: sampling user interactions with an input unit of a mobile computing device; analyzing temporal relationship between touch events and accelerometer events of sampled user interactions with said input unit of the mobile computing device; based on analysis of temporal relationship between touch and accelerometer events, of sampled user interactions with said input unit of the mobile computing device, determining whether the said mobile computing device is controlled remotely via said remote access channel.

In some embodiments, the method comprises: sampling user interactions with an input unit of a mobile computing device; analyzing temporal relationship between touch movement events and accelerometer events, of sampled user interactions with said input unit of the mobile computing device; based on analysis of temporal relationship between touch movement event and accelerometer events, of sampled user interactions with said input unit of the mobile computing device, determining whether the said mobile computing device is controlled remotely via said remote access channel.

In some embodiments, the method comprises: (A) sampling touch-based gestures of a touch-screen of a mobile computing device; (B) sampling accelerometer data of said mobile computing device, during a time period which at least partially overlaps said sampling of touch-based gestures of the touch-screen of the mobile computing device; (C) based on a mismatch between (i) sampled touch-based gestures, and (ii) sampled accelerometer data, determining that the mobile computing device was controlled remotely via said remote access channel.

In some embodiments, the method comprises: (A) sampling touch-based gestures of a touch-screen of a mobile computing device; (B) sampling accelerometer data of said mobile computing device, during a time period which at least partially overlaps said sampling of touch-based gestures of the touch-screen of the mobile computing device; (C) determining that sampled touch-based gestures indicate that a user operated the mobile computing device at a particular time-slot; (D) determining that the sampled accelerometer data indicate that the mobile computing device was not moved during said particular time-slot; (E) based on the determining of step (C) and the determining of step (D), determining that the mobile computing device was controlled remotely via said remote access channel during said particular time-slot.

In some embodiments, latency or delays or lags may be injected into the communication channel, by one or more suitable means, for example: by re-sending duplicate or erroneous packets or redundant packets; by causing the server to wait a pre-defined time period between sending of packets; by avoiding to send a packet (or several packets) for a pre-defined time-period; by sending redundant or unnecessary data together with relevant data; by sending large multimedia content (e.g., video, audio, images), larger than a pre-defined threshold size, in order to over-burden the communication channel and cause delays and latency; by causing the end-user device to respond slowly and/or to transmit packets slowly, e.g., by over-burdening the processor and/or the memory and/or the wireless transceiver of the end-user device; and/or other suitable means.

Some embodiments may compare between: the actual latency that is exhibited by the user's reactions and/or corrective actions, and a "reference" latency value that is expected to be exhibited by local users that are located physically adjacent to the computing device and are not controlling the device via a Remote Access channel; and such comparison may enable detection of a Remote Access user, for example, if the actual, sensed, measured response times or reaction times of the user, are at least K percent slower (or greater) than the "reference" values of response time or reaction time that is typically measured for local, non-remote, users (e.g., based on a calculated average of response times or reaction times, measured in a population of known local users).

Embodiments of the present invention may be utilized with a variety of devices or systems having a touch-screen or a touch-sensitive surface; for example, a smartphone, a cellular phone, a mobile phone, a smart-watch, a tablet, a handheld device, a portable electronic device, a portable gaming device, a portable audio/video player, an Augmented Reality (AR) device or headset or gear, a Virtual Reality (VR) device or headset or gear, a "kiosk" type device, a vending machine, an Automatic Teller Machine (ATM), a laptop computer, a desktop computer, a vehicular computer, a vehicular dashboard, a vehicular touch-screen, or the like.

The system(s) and/or device(s) of the present invention may optionally comprise, or may be implemented by utilizing suitable hardware components and/or software components; for example, processors, processor cores, Central Processing Units (CPUs), Digital Signal Processors (DSPs), circuits, Integrated Circuits (ICs), controllers, memory units, registers, accumulators, storage units, input units (e.g., touch-screen, keyboard, keypad, stylus, mouse, touchpad, joystick, trackball, microphones), output units (e.g., screen, touch-screen, monitor, display unit, audio speakers), acoustic microphone(s) and/or sensor(s), optical microphone(s) and/or sensor(s), laser or laser-based microphone(s) and/or sensor(s), wired or wireless modems or transceivers or transmitters or receivers, GPS receiver or GPS element or other location-based or location-determining unit or system, network elements (e.g., routers, switches, hubs, antennas), and/or other suitable components and/or modules.

The system(s) and/or devices of the present invention may optionally be implemented by utilizing co-located components, remote components or modules, "cloud computing" servers or devices or storage, client/server architecture, peer-to-peer architecture, distributed architecture, and/or other suitable architectures or system topologies or network topologies.

In accordance with embodiments of the present invention, calculations, operations and/or determinations may be performed locally within a single device, or may be performed by or across multiple devices, or may be performed partially locally and partially remotely (e.g., at a remote server) by optionally utilizing a communication channel to exchange raw data and/or processed data and/or processing results.

Some embodiments may be implemented by using a special-purpose machine or a specific-purpose device that is not a generic computer, or by using a non-generic computer or a non-general computer or machine. Such system or device may utilize or may comprise one or more components or units or modules that are not part of a "generic computer" and that are not part of a "general purpose computer", for example, cellular transceivers, cellular transmitter, cellular receiver, GPS unit, location-determining unit, accelerometer(s), gyroscope(s), device-orientation detectors or sensors, device-positioning detectors or sensors, or the like.

Some embodiments may be implemented as, or by utilizing, an automated method or automated process, or a machine-implemented method or process, or as a semi-automated or partially-automated method or process, or as a set of steps or operations which may be executed or performed by a computer or machine or system or other device.

Some embodiments may be implemented by using code or program code or machine-readable instructions or machine-readable code, which may be stored on a non-transitory storage medium or non-transitory storage article (e.g., a CD-ROM, a DVD-ROM, a physical memory unit, a physical storage unit), such that the program or code or instructions, when executed by a processor or a machine or a computer, cause such processor or machine or computer to perform a method or process as described herein. Such code or instructions may be or may comprise, for example, one or more of: software, a software module, an application, a program, a subroutine, instructions, an instruction set, computing code, words, values, symbols, strings, variables, source code, compiled code, interpreted code, executable code, static code, dynamic code; including (but not limited to) code or instructions in high-level programming language, low-level programming language, object-oriented programming language, visual programming language, compiled programming language, interpreted programming language, C, C++, C #, Java, JavaScript, SQL, Ruby on Rails, Go, Cobol, Fortran, ActionScript, AJAX, XML, JSON, Lisp, Eiffel, Verilog, Hardware Description Language (HDL, BASIC, Visual BASIC, Matlab, Pascal, HTML, HTML5, CSS, Perl, Python, PHP, machine language, machine code, assembly language, or the like.

Some embodiments of the present invention may perform steps or operations such as, for example, "determining", "identifying", "comparing", "checking", "querying", "searching", "matching", and/or "analyzing", by utilizing, for example: a pre-defined threshold value to which one or more parameter values may be compared; a comparison between (i) sensed or measured or calculated value(s), and (ii) pre-defined or dynamically-generated threshold value(s) and/or range values and/or upper limit value and/or lower limit value and/or maximum value and/or minimum value; a comparison or matching between sensed or measured or calculated data, and one or more values as stored in a look-up table or a legend table or a list of reference value(s) or a database of reference values or ranges; a comparison or matching or searching process which searches for matches and/or identical results and/or similar results and/or sufficiently-close results, among multiple values or limits that are stored in a database or look-up table; utilization of one or more equations, formula, weighted formula, and/or other calculation in order to determine similarity or a match between or among parameters or values; utilization of comparator units, lookup tables, threshold values, conditions, conditioning logic, Boolean operator(s) and/or other suitable components and/or operations.

Some embodiments may comprise, or may be implemented by using, an "app" or application which may be downloaded or obtained from an "app store" or "applications store", for free or for a fee, or which may be pre-installed on a computing device or electronic device, or which may be transported to and/or installed on such computing device or electronic device.

While certain features of the present invention have been illustrated and described herein, many modifications, substitutions, changes, and equivalents may occur to those skilled in the art. Accordingly, the claims are intended to cover all such modifications, substitutions, changes, and equivalents.

What is claimed is:

1. A method comprising:
   (a) monitoring multiple interactions of a particular user that utilizes an electronic device to access a particular bank account;
   (b) performing an analysis that is based on at least one of:
   (b1) data of transactions submitted for execution in said particular bank account,
   (b2) user-specific behavioral data indicating a behavioral manner in which said particular user utilizes said electronic device, extracted from monitored interactions and monitored gestures of said particular user,
   (b3) data about one or more operational properties of said electronic device,
   (b4) one or more signals captured from a communication channel between said electronic device and a server associated with said particular bank account;
   (c) based on said analysis, generating a notification alert that said online bank account is used as a mule bank account or as a money laundering bank account or as a terror-funding bank account; and
   wherein the analysis of step (b) comprises:
   (A) detecting that a first amount of money was transferred from a first account to a second account;
   (B) detecting that a second amount of money, which is at least 50 percent of the first amount of money, was transferred from the second account to a third account;
   (C) detecting that the second account was accessed via a Remote Access channel;
   (D) based cumulatively on the detecting of step (A) and the detecting of step (B) and the detecting of step (C), determining that said second account is used as a mule bank account or as a money laundering bank account or as a terror-funding bank account.

2. The method of claim 1,
   wherein the analysis of step (b) comprises:
   (A) detecting that a set of banking operations comprise: (i) a first funds transfer from a first bank account to a second bank account, followed by (ii) a second funds transfer from the second bank account to a third bank account;
   (B) analyzing (I) a first set of user interactions that were performed in a first usage session in which funds were transferred out from the first bank account, and also (II) a second set of user interactions that were performed in a second usage session in which funds were transferred out from the second bank account to the third bank account; and detecting a set of user-specific features that appear in both the first set of user interactions and the second set of user interactions;
   (C) based on the detecting of step (B), performing:
   (C1) determining that said first bank account was a victim bank account, and
   (C2) determining that said second bank account was used as a mule bank account, and
   (C3) determining that said third bank account was used as a real destination bank account.

3. The method of claim 1,
   wherein the analysis of step (b) comprises:
   (A) monitoring and analyzing user interactions during multiple, different, usage sessions in which said online bank account was accessed;
   (B) based on step (A), creating a plurality of user-specific profiles that correspond to a plurality of users that accessed said online bank account, and generating an estimated number of said plurality of users that accessed said online bank account;
   (C) based on step (B), determining that said target bank account is used as a mule bank account to illegally receive and transfer money.

4. The method of claim 1,
   wherein the analysis of step (b) comprises:
   (A) monitoring and analyzing user interactions during multiple usage sessions in which said online bank account was accessed;
   (B) detecting that the user interactions in said multiple usage session, comprise: (i) an incoming funds transfer, and (ii) a subsequent outgoing funds transfer, and (iii) lack of cash withdrawals, and (iv) lack of check withdrawals; (C) based on the detecting of said (B), determining that said online bank account was used as a mule bank account to illegally receive and transfer money.

5. The method of claim 1,
   wherein the analysis of step (b) comprises:
   (A) receiving a list of bank accounts that are known to be mule bank accounts; analyzing user interactions that were performed via input units of computing devices by users that accessed said mule bank accounts; and extracting a set of interaction features that characterize the user interactions across multiple mule bank accounts;
   (B) subsequently, checking whether user interactions in a particular bank account, match said set of interaction features that were extracted in step (A); and if the checking result is positive, then determining that said particular bank account was used as a mule bank account to illegally receive and transfer money.

6. The method of claim 1,
wherein the analysis of step (b) comprises:
(A) based on analysis of communications latency in a communication channel between said computing device and a remote server, determining that said user is located remotely from said computing device and is controlling remotely said computing device via said remote access channel;
(B) based on detection of utilization of said remote access channel, determining that said online banking account is used as a mule bank account to illegally receive and transfer money.

7. The method of claim 1,
wherein the analysis of step (b) comprises:
(A) sampling touch-based gestures of a touch-screen of said computing device;
(B) sampling accelerometer, gyro and device orientation data of said computing device, during a time period which at least partially overlaps said sampling of touch-based gestures of the touch-screen of the computing device;
(C) based on a mismatch between (i) sampled touch-based gestures, and (ii) sampled accelerometer, gyro and device orientation data, determining that the computing device was controlled remotely via a remote access channel;
(D) based on detection of utilization of said remote access channel, determining that said online banking account is used as a mule bank account to illegally receive and transfer money.

8. The method of claim 1,
The method of The method of wherein the analysis of step (b) comprises:
(A) sampling interactions of said user with said computing device during multiple online accesses to said banking account, and creating a user-specific profile of the interaction of said user with an input unit of said computing device;
(B) matching said user-specific profile with interactions of said user with said banking account via an electronic device that is different from said computing device;
(C) based on said matching, determining that said online banking account is used as a mule bank account to illegally receive and transfer money.

9. The method of claim 1,
wherein the analysis of step (b) comprises:
(A) monitoring and analyzing interactions of a first user who transfers funds from said online banking account to a target banking account; and creating a first user-specific profile based on said interactions monitored and analyzed in step (A);
(B) monitoring and analyzing interactions of a second user who accesses said target bank account; and creating a second user-specific profile based on said interactions monitored and analyzed in step (B);
(C) determining a match between the first user-specific profile and the second user-specific profile;
(D) based on said match, determining that said target bank account is used as a mule bank account to illegally receive and transfer money.

10. The method of claim 1,
wherein the analysis of step (b) comprises:
(A) monitoring and analyzing user interactions during usage sessions in which said online bank account was accessed, and generating a primary user-specific interaction profile that characterizes the interactions of said user with said online bank account;
(B) monitoring and analyzing interactions of users during usage sessions in which other online bank account were accessed; and generating, respectively, a plurality of user-specific interaction profiles;
(C) detecting a match between (I) said primary user-specific interaction profile that was generated in step (A), and (II) another user-specific interaction profile that was generated in step (B) pertaining to another online bank account;
(D) based on said match, determining that at least one bank account is utilized by said user as a mule bank account to illegally receive and transfer money.

11. The method of claim 1,
wherein the analysis of step (b) comprises:
(A) monitoring and analyzing user interactions during online accesses to multiple different banking accounts;
(B) based on step (A), determining that a particular banking account is accessed by a particular user which also accesses one or more other online banking accounts;
(C) based the determining of step (B), determining that at least one bank account is utilized by said user as a mule bank account to illegally receive and transfer money.

12. The method of claim 1,
wherein the analysis of step (b) comprises:
(A) detecting that a first amount of money was transferred from a first account to a second account;
(B) detecting that a second amount of money, which is at least 50 percent of the first amount of money, was transferred from the second account to a third account;
(C) detecting that the second account was accessed via a proxy server;
(D) based cumulatively on the detecting of step (A) and the detecting of step (B) and the detecting of step (C), determining that said second account is used as a mule bank account or as a money laundering bank account or as a terror-funding bank account.

13. The method of claim 1,
The method of The method of wherein the analysis of step (b) comprises:
(A) detecting that a first amount of money was transferred from a first account to a second account;
(B) detecting that a second amount of money, which is at least 50 percent of the first amount of money, was transferred from the second account to a third account;
(C) detecting that the second account was accessed via a Virtual Machine;
(D) based cumulatively on the detecting of step (A) and the detecting of step (B) and the detecting of step (C), determining that said second account is used as a mule bank account or as a money laundering bank account or as a terror-funding bank account.

14. The method of claim 1,
wherein the analysis of step (b) further comprises, and is further based on:
determining that
(i) user-specific behavioral characteristics that are extracted from spatial orientation properties of a first electronic device that was used to access a first bank account, are similar beyond a pre-defined threshold value of similarity to
(ii) (ii) user-specific behavioral characteristics, that are extracted from spatial orientation properties of a second, different, electronic device that was used to access a second, different, bank account.

15. The method of claim 1,
wherein the analysis of step (b) further comprises, and is further based on:
determining that
(i) user-specific behavioral characteristics that are extracted from accelerometer data sensed by a first electronic device that was used to access a first bank account, are similar beyond a pre-defined threshold value of similarity to
(ii) (ii) user-specific behavioral characteristics, that are extracted from accelerometer data sensed by a second, different, electronic device that was used to access a second, different, bank account.

16. The method of claim 1,
wherein the analysis of step (b) further comprises, and is further based on: determining that
(i) user-specific behavioral characteristics that are extracted from gyroscope data sensed by a first electronic device that was used to access a first bank account, are similar beyond a pre-defined threshold value of similarity to
(ii) (ii) user-specific behavioral characteristics, that are extracted from gyroscope data sensed by a second, different, electronic device that was used to access a second, different, bank account.

17. The method of claim 1,
wherein the analysis of step (b) further comprises, and is further based on: determining that
(i) user-specific behavioral characteristics that are extracted from (I) gyroscope data and (II) accelerometer data and (III) spatial orientation data sensed by a first electronic device that was used to access a first bank account, are similar beyond a pre-defined threshold value of similarity to
(ii) (ii) user-specific behavioral characteristics, that are extracted from (I) gyroscope data and (II) accelerometer data and (III) spatial orientation data sensed by a second, different, electronic device that was used to access a second, different, bank account.

18. A non-transitory storage medium having stored thereon instructions that, when executed by a machine, cause the machine to perform a method comprising:
(a) monitoring multiple interactions of a particular user that utilizes an electronic device to access a particular bank account;
(b) performing an analysis that is based on at least one of:
(b1) data of transactions submitted for execution in said particular bank account,
(b2) user-specific behavioral data indicating a behavioral manner in which said particular user utilizes said electronic device, extracted from monitored interactions and monitored gestures of said particular user,
(b3) data about one or more operational properties of said electronic device,
(b4) one or more signals captured from a communication channel between said electronic device and a server associated with said particular bank account;
(c) based on said analysis, generating a notification alert that said online bank account is used as a mule bank account or as a money laundering bank account or as a terror-funding bank account; and
wherein the analysis of step (b) comprises:
(A) detecting that a first amount of money was transferred from a first account to a second account;
(B) detecting that a second amount of money, which is at least 50 percent of the first amount of money, was transferred from the second account to a third account;
(C) detecting that the second account was accessed via a Remote Access channel;
(D) based cumulatively on the detecting of step (A) and the detecting of step (B) and the detecting of step (C), determining that said second account is used as a mule bank account or as a money laundering bank account or as a terror-funding bank account.

19. A system comprising:
one or more hardware processors, configured to execute code;
one or more memory units, configured to store code;
wherein the one or more hardware processors are configured to perform a process comprising:
(a) monitoring multiple interactions of a particular user that utilizes an electronic device to access a particular bank account;
(b) performing an analysis that is based on at least one of:
(b1) data of transactions submitted for execution in said particular bank account,
(b2) user-specific behavioral data indicating a behavioral manner in which said particular user utilizes said electronic device, extracted from monitored interactions and monitored gestures of said particular user,
(b3) data about one or more operational properties of said electronic device,
(b4) one or more signals captured from a communication channel between said electronic device and a server associated with said particular bank account;
(c) based on said analysis, generating a notification alert that said online bank account is used as a mule bank account or as a money laundering bank account or as a terror-funding bank account; and
wherein the analysis of step (b) comprises:
(A) detecting that a first amount of money was transferred from a first account to a second account;
(B) detecting that a second amount of money, which is at least 50 percent of the first amount of money, was transferred from the second account to a third account;
(C) detecting that the second account was accessed via a Remote Access channel;
(D) based cumulatively on the detecting of step (A) and the detecting of step (B) and the detecting of step (C), determining that said second account is used as a mule bank account or as a money laundering bank account or as a terror-funding bank account.

* * * * *